US011340637B2

(12) United States Patent
Faiczak

(10) Patent No.: US 11,340,637 B2
(45) Date of Patent: May 24, 2022

(54) METHOD, APPARATUS AND SYSTEM FOR BALANCING THE FLUID PRESSURE OF FLUID DISTRIBUTION SYSTEMS

(71) Applicant: John Faiczak, Toronto (CA)

(72) Inventor: John Faiczak, Toronto (CA)

( * ) Notice: Subject to any disclaimer, the term of this patent is extended or adjusted under 35 U.S.C. 154(b) by 221 days.

(21) Appl. No.: 15/363,636

(22) Filed: Nov. 29, 2016

(65) Prior Publication Data

US 2018/0113481 A1 Apr. 26, 2018

(30) Foreign Application Priority Data

Oct. 21, 2016 (CA) ................................. CA 2946117

(51) Int. Cl.
*G05D 7/06* (2006.01)
*G05D 16/20* (2006.01)
*F24D 19/10* (2006.01)

(52) U.S. Cl.
CPC ......... *G05D 7/0676* (2013.01); *G05D 7/0664* (2013.01); *G05D 7/0688* (2013.01); *G05D 16/206* (2013.01); *G05D 16/208* (2013.01); *G05D 16/2013* (2013.01); *G05D 16/2026* (2013.01); *G05D 16/2066* (2013.01); *F24D 19/1015* (2013.01); *F24D 2220/0264* (2013.01); *G05D 7/0641* (2013.01)

(58) Field of Classification Search
CPC .. G05D 7/0676; G05D 7/0664; G05D 7/0688; G05D 16/2013; G05D 16/2026; G05D 16/206; G05D 16/2066; G05D 16/208; G05D 7/0641; F24F 19/1015; F24D 2220/0264
See application file for complete search history.

(56) References Cited

U.S. PATENT DOCUMENTS 7,792,126 B1 * 9/2010 Montestruque ........... E03F 7/00
370/386
2010/0049480 A1 2/2010 Pekar et al.
(Continued)

OTHER PUBLICATIONS

Definition of mechanical load. From Wikipedia, the free encyclopedia, Oct. 14, 2016. p. 1. (Year: 2016).*

*Primary Examiner* — Rocio Del Mar Perez-Velez
*Assistant Examiner* — Christopher W Carter
(74) *Attorney, Agent, or Firm* — Benesch Friedlander Coplan & Aronoff LLP

(57) ABSTRACT

The present invention is a fluid distribution system comprising connected conduits (e.g., lines) wherein fluid flows, such as pipes within a building. The lines may be configured to: (i) include multiple lines that connect at intersections (some of the intersections will be identified as nodes); and (ii) incorporate node units associated with line pressure loss simulation assemblies ("LLSAs"). Activities of a node unit incorporating a LLSA can result in alterations in fluid pressure, such as by a loop control process to reposition balancing valves or other valves of one or more LLSAs, and/or by alteration of the speed of the system pump. These activities adjust fluid pressure to cause the system to produce a balanced and high efficiency energy transfer (e.g., heating or cooling), and do not involve or require any identification or use of any specific, fixed or absolute pressure value. They function based on an operation locus (for a node unit) and/or an operation locus range (for node unit groupings) to adjust the fluid pressure.

20 Claims, 41 Drawing Sheets

(56) References Cited

U.S. PATENT DOCUMENTS

| | | | |
|---|---|---|---|
| 2010/0147394 A1* | 6/2010 | Trnka | F24D 19/1015 137/12 |
| 2013/0048114 A1* | 2/2013 | Rothman | F24D 19/1012 137/551 |
| 2015/0277446 A1 | 10/2015 | Peczalski et al. | |
| 2016/0378123 A1* | 12/2016 | Montestruque | G05B 15/02 700/282 |

* cited by examiner

METHOD, APPARATUS AND SYSTEM FOR BALANCING THE FLUID PRESSURE OF FLUID DISTRIBUTION SYSTEMS

This application claims priority to Canadian Patent Application No. 2,946,117 filed Oct. 21, 2016.

FIELD OF INVENTION

This invention relates in general to the field of monitoring and controlling the fluid flowing in a fluid distribution system and more particularly to monitoring and controlling the balancing of line pressure loss relating to the pressure of the fluid flowing in a fluid distribution system.

BACKGROUND OF THE INVENTION

Known, prior art, fluid distributions systems function to control fluid (i.e., liquid) distribution to a thermal load (such as a space in a building) in accordance with specific, fixed or absolute pressure values. In such prior art systems a specific, fixed pressure value is set at one or more pressure controllers (e.g., manually adjusted balancing valves) within the system. The setting can be determined through automation or manually. The purpose of the setting is to achieve as close to a balanced line pressure loss of the fluid flowing in a system as possible.

Control of the flow of a liquid within a system is applied in industries such as cooling and heating systems, as well as other types of systems that require fluid to flow through the system. In such prior art the flow of fluid between two elements of the system is controlled. The control is achieved through identifying and applying settings within the system that are fixed values to which flow, pressure level and positions of valves can be set.

Thus, in the prior art generally, it is a specific requirement of the system that it be operable so that functions such as line pressure loss settings can be manually set. Balancing valves can be manually set to specific fixed values, such as is required to achieve a particular flow within the system. Examples of the prior art systems are provided below. The discussion of the prior art below incorporates cooling and heating systems, as well as other systems that control liquid flow.

As an example of prior art, U.S. Pat. No. 5,904,292 issued on May 18, 1999 to Douglas S. McIntosh, discloses a modulating fluid control device for a fluid-based heating and cooling system for a measured environment. To control the flow of liquid in the system valves must be set to a specific level in accordance with a detected flow rate value.

Another example of prior art is PCT Patent Application Publication WO2014/152585 filed Mar. 14, 2014 as PCT application PCT/US2014/027501 by Schlumberger Holdings Limited. This application discloses a system that incorporates multi-stage downhole oil-water separators that are connected in a hydraulic series and are flow balanced and pressure balanced with respect to each other. This invention is directed to controlling the flow between the separators by reducing or increasing the flow rate between upstream and downstream elements of the invention. (Downstream is referenced herein in relation to the flow of the liquid in the conduits, such that the flow is always in a downstream direction, therefore upstream, as used herein, references the opposite direction to the liquid flow.)

Another example of prior art is U.S. Pat. No. 8,105,995 issued on Sep. 13, 2011 to Entegris, Inc. This patent discloses a flow control device that is operable to measure pressure and to generate a valve control signal based upon the measurement. The measurement is expressed as an absolute pressure value (e.g., a measured pressure by voltage level).

Another example of prior art is U.S. Patent Application Publication No. 2011/0005605 filed as U.S. patent application Ser. No. 12/934,021 on Sep. 22, 2010 by Arkray, Inc. This application discloses a liquid delivery control method for delivering a liquid by generating a differential pressure within a micro-channel in respect to the liquid through the use of a pump. Pressure loss in the micro-channel causes a change in direction of the flow of the liquid. A pressure sensor detects the pressure of the liquid in the micro-channel and this is provided to the control processing unit (CPU) as a specific value.

Another example of prior art is U.S. Pat. No. 8,746,269 issued on Jun. 10, 2014 to Shell Oil Company. This patent discloses a method and apparatus for controlling gas flow through a conjunction between one or more incoming streams and one or more outgoing streams. The method utilizes a biased mass flow imbalance value. The flow of the incoming and outgoing streams is adjusted to move the biased mass flow imbalance value towards zero.

Another example of prior art is U.S. Patent Application Publication No. 2014/0332088 filed as U.S. patent application Ser. No. 14/358,547 on May 15, 2014 by Yona Senesh. This patent application discloses a network of conduits distributing liquid and said network being coupled to a supply of liquid and to a network. The flow of the fluid in the conduits is controlled in accordance with an absolute pressure value used to operate the valves in the system that control the flow rate of the fluid.

Another example of prior art is U.S. Patent Application Publication No. 2013/0263611 filed as U.S. patent application Ser. No. 13/442,897 on Apr. 10, 2012 by International Business Machines Corporation. This patent application discloses automated control of a cooling system that is responsive to the predicted probability of fail exceeding a first acceptable threshold or the expected residual life being below a second acceptable threshold. The system requires measuring the cooling system to identify absolute pressure values that are used to determine if the first or second thresholds have been exceeded or not reached.

Another example of prior art is U.S. Pat. No. 3,729,051 issued on Apr. 24, 1973 to Gerald F. Mannion and James R. Mannion. This patent discloses a flow regulation unit and system for regulating the flow of chilled water, hot water or other incompressible process fluid to a series of stations. The valves in the system that control the flow of fluid in the system are set to specific absolute pressure values.

The prior art includes references that disclose inventions specifically focused upon the control of the position of valves. These prior art references involve setting a valve to a specific position that represents an absolute state level change. These prior art systems do not involve differential increments of changes of the valve position to achieve balanced line pressure loss in a system. These prior art systems further generally involve setting a valve in accordance with a specific absolute pressure value. Some examples of this type of prior art include the references below.

An example of the prior art is U.S. Pat. No. 8,788,105 issued on Jul. 22, 2014 to Oventrop GmbH & Co. KG. This patent discloses a heating-cooling system wherein flow in zones within the system is adjusted by controlling the respective valves to cause the value of the differential pressure in the zone to correspond to a set-point value.

Another example of prior art is U.S. Pat. No. 6,155,283 issued on Dec. 5, 2000 to The Foxboro Company. This patent discloses a valve position controller tuning method that incorporates a valve position controller activated by a valve position controller output signal to cause the valve positioner to move the valve flow modulating member from one stuck position to another stuck position.

Another example of prior art is U.S. Pat. No. 8,109,289 issued Feb. 7, 2012 to Honeywell International Inc. This patent discloses a valve balancing unit coupled with a valve. The method of the invention incorporates adjusting the setting of a valve to a specific valve position corresponding to a target flow rate at that valve, in accordance with a specific differential pressure level.

Another example of prior art is Natasa Djuric, et al, "Optimization of energy consumption in building with hydronic heating systems considering thermal comfort by use of computer-based tools", Energy and Buildings 39 (2007) 471-477. This article discloses a method for determining a specific optimal parameter value to derive thermal comfort within a building.

Another example of prior art is U.S. Pat. No. 8,024,161 issued Sep. 20, 2011 to Honeywell International Inc. This patent discloses a mathematical model and set of available measurements to generate balancing valve settings that are fixed differential pressure settings. The valve is a lockable flow-control valve.

What is needed is a fluid distribution system that operates so that a balanced line pressure loss that ensures that a target level of fluid flow is achieved and maintained throughout the system, so that the needs (such as heating and/or cooling needs, or other needs to achieve a particular environment) of all areas of a building wherein the system is installed are met. What is further needed is a fluid distribution system wherein automatic updates to adjust line pressure loss occur based on the identification of an operation locus range wherein all node units in the system can function to cause the system to produce a balanced and high efficiency energy transfer.

SUMMARY OF THE INVENTION

In one aspect, the present disclosure relates to a fluid distribution system comprising: a pump connected to a pump variable speed drive, and further connected to a conduit; one or more nodes incorporated in the conduit; one or more node units incorporated in the conduit, each of the one or more node units being operable to receive information from other node units and from one or more external sources, and to process the received information to produce processed information for the purpose of determining if balanced flow in the conduit and line pressure loss at the one or more nodes is achieved and to generate adjustments to generate balanced flow and line pressure loss in the fluid distribution system; a return conduit wherein fluid flows directly to the pump; and said fluid distribution system being operable to maintain balance of flow in the conduit and line pressure loss at each of the one or more nodes after initiation of the fluid distribution system to achieve a high efficiency energy transfer within the fluid distribution system devoid of any of the following: pinpoint settings for any pressure value; pinpoint settings for any exact pump speed; and any manual adjustment of any one or more valves of the one or more node units.

In another aspect, the present disclosure relates to said fluid distribution system wherein the system adjustments generated by the one or more node units including the following: alteration of the position of the one or more valves of the one or more node units to an open position, a closed position, or any position between open and closed; and alteration of the speed of the pump.

In another aspect, the present disclosure relates to said fluid distribution system wherein each of the one or more node units is one of the following types: a group node unit associated with a line pressure loss assembly (LLSA) that is operable to generate processed information that is flow target information and a change report that indicates any line pressure loss change required to achieve balance in the fluid distribution system, and further operable to receive from one or more node units flow target information and change reports and to process such flow target information and change reports with the flow target information and change report generated by the group node unit to generate net flow target information and a net change report that the group node unit transmits as flow target information and net change report to one of the one or more node units that is directly upstream of the group node unit; a pump control node unit that is operable to receive from one or more node units flow target information and change reports and to process such flow target information and change reports to generate: a pump speed signal to indicate if a change in pump speed is required and to transmit the pump speed signal to the pump speed variable drive that utilizes the pump speed signal to make any alteration to the pump speed in accordance with the pump speed signal; and flow target information and to transmit the flow target information to any load node unit that is directly downstream of the pump; a load node unit associated with a line pressure loss assembly (LLSA) that is operable to receive flow information and to generate load node unit information relating to the load node unit, and to utilize the flow information and the load node unit information to generate processed information that is flow target information and a change report, and further operable to transmit the flow target information and change report to one of the one or more node units that is directly upstream of the load node unit; or a load control node unit associated with a line pressure loss assembly (LLSA) that is operable to receive virtual target controlled variable setting information and controlled variable information, and to generate load control node unit information relating to the load control node unit, and to utilize the virtual target controlled variable setting information, the controlled variable information and the load control node unit information to generate processed information that is flow target information and a change report, and further operable to transmit the flow target information and change report to one of the one or more node units that is directly upstream of the load node unit.

In another aspect, the present disclosure relates to said fluid distribution system wherein the one or more of the one or more node units are configured into one or more node unit groupings, and each one or more node unit groupings incorporate one of the one or more nodes that is directly upstream or direction downstream of each of the one or more node units in the node unit grouping.

In another aspect, the present disclosure relates to said fluid distribution system wherein one of the one or more node units is directly downstream of the pump in the conduit.

In another aspect, the present disclosure relates to said fluid distribution system operable to determine an operation locus for one or more of the one or more node units, and such node units being operable in accordance with the operation locus.

In another aspect, the present disclosure relates to said fluid distribution system operable to determine an operation locus range for two or more of the one or more node units, and such node units being operable in accordance with the operation locus range.

In another aspect, the present disclosure relates to said fluid distribution system wherein one or more node unit groupings are configured in one or more fluid distribution sections, and the fluid distribution system is configured to incorporate the one or more fluid distribution sections, each of said one or more fluid distribution sections being connected to the return conduit on a downstream end.

In another aspect, the present disclosure relates to said fluid distribution system wherein one or more of the one or more node units has a thermal load connected downstream thereof and between such node unit and the return conduit.

In another aspect, the present disclosure relates to said fluid distribution system wherein the thermal load is a secondary distribution section incorporating a junction node, at least one sensor, one or more node units that are one or more secondary node units, and a secondary pump connected to a secondary pump variable speed drive.

In another aspect, the present disclosure relates to said fluid distribution system further comprising one or more of the following: one or more display units; and one or more man machine interface units.

In yet another aspect, the present disclosure relates to a method for generating and maintaining balanced of fluid flow and line pressure loss in a fluid distribution system comprising the steps of: operating the fluid distribution system configured to incorporate: a pump connected to a pump variable speed drive, and further connected to a conduit; one or more nodes incorporated in the conduit; one or more node units incorporated in the conduit; an electronic communications network (ECN) connecting each of the one or more node units to the one node unit that is directly upstream and to any one or more of the one or more node units that are directly downstream; and a return conduit; and each of the one or more node units: receiving information from other node units and from one or more external sources; processing the received information to produce processed information for the purpose of determining if balanced flow in the conduit and line pressure loss at the one or more nodes is achieved; generating system adjustments to create balanced flow and line pressure loss in the fluid distribution system; and transmitting the processed information to one of the one or more node units that is upstream or to the pump variable speed drive via the ECN; and each of the one or more node units and the pump operating after initiation of the fluid distribution system to achieve a high efficiency energy transfer devoid of any of the following: pinpoint settings for any pressure value; pinpoint settings for any exact pump speed; and any manual adjustment of any one or more valves of the one or more node units.

In another aspect, the present disclosure relates to said method, further incorporating the following steps: each of the one or more nodes units determining an operation locus and operating in accordance with the received processed information and the operation locus;

and one or more of the one or more node units determining an operation locus range and transmitting processed information that effects operation of the fluid distribution system in accordance with the operation locus range.

In another aspect, the present disclosure relates to said method wherein each of the one or more node units is one of the following types and the fluid distribution system incorporates the following steps in relation to each of the types of node units: a group node unit associated with a line pressure loss assembly (LLSA) generating processed information that is flow target information and a change report that indicates any line pressure loss change required to achieve balance in the fluid distribution system, and further receiving from one or more node units flow target information and change reports and processing such flow target information and change reports with the flow target information and change report generated by the group node unit and thereby generating net flow target information and a net change report that the group node unit transmits as flow target information and net change report to one of the one or more node units that is directly upstream of the group node unit; a pump control node unit receiving from one or more node units flow target information and change reports and further processing such flow target information and change reports to generate: a pump speed signal to indicate if a change in pump speed is required and transmitting the pump speed signal to the pump speed variable drive that utilizes the pump speed signal to make any alteration to the pump speed in accordance with the pump speed signal; and flow target information and transmitting the flow target information to any load node unit that is directly downstream of the pump; a load node unit associated with a line pressure loss assembly (LLSA) receiving flow information, generating load node unit information relating to the load node unit, and utilizing the flow information and load node unit information to generate processed information that is flow target information and a change report, and further transmitting the flow target information and change report to one of the one or more node units that is directly upstream of the load node unit; or a load control node unit associated with a line pressure loss assembly (LLSA) receiving virtual target controlled variable setting information and controlled variable information, generating load control node unit information relating to the load control node unit, and utilizing the virtual target controlled variable setting information, the controlled variable information, and the load control node unit information to generate processed information that is flow target information and a change report, and further transmitting the flow target information and change report to one of the one or more node units that is directly upstream of the load node unit.

In another aspect, the present disclosure relates to said method incorporating one or more of the further steps: one or more of the load node units receiving information from an external source that one or more of the following: a thermal load; and one or more external probes; and one or more of the load control node units receiving information from an external source that is one or more of the following: a thermal load; and one or more external probes.

In another aspect, the present disclosure relates to said method incorporating the steps of the fluid distribution system operating to achieve equal temperatures in any thermal load that is a secondary distribution section and any primary distribution section for the fluid distribution system, said secondary distribution section being downstream of a load node unit or a load control node unit in the primary distribution section, and the secondary distribution system incorporating a temperature sensor, and incorporating the following steps: the temperature sensor measuring the temperature of the fluid in the secondary distribution section; the node unit in the primary distribution section that is upstream of the secondary distribution section measuring the temperature of the fluid at said node unit; and said node unit comparing the temperature of the fluid in the secondary distribution section to the temperature of the fluid in the primary distribution section, and operating to adjust the valves of such node unit and to transmit the temperature comparison to an upstream node unit for the purpose of achieving an equal temperature of the fluid in the primary distribution section and the secondary distribution section.

In another aspect, the present disclosure relates to said method incorporating the step of the group node units generating the net flow target information and a net change report relating to one or more node units downstream of the group node unit, said one or more node units downstream of the group node unit all being directly downstream of the one of the one or more nodes that is directly downstream of the group node unit, the group node unit and such downstream one or more node units being configured in a node unit grouping.

In another aspect, the present disclosure relates to said method incorporating the step of transferring information in any of the following: from one or more of the one or more node units to one or more display units; and bi-directionally between one or more man machine interface units and one or more of the one or more node units, whereby the fluid distribution system is operable in accordance with the information received from the one or more man machine interface units.

In another aspect, the present disclosure relates to said method incorporating the step of the one or more node units operating to balance the flow and line loss pressure in the fluid distribution system that is one of the following: a constant volume system; a variable flow system; and a combination of a constant volume system and a variable flow system.

In another aspect, the present disclosure relates to said method incorporating the steps of the load node unit, the load control node unit, and the group node unit, each generating the change report to indicate a requirement for the line pressure to be increased, decreased, or have a null change at the one of the one or more nodes that is directly upstream thereof.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein.

Figure 1:
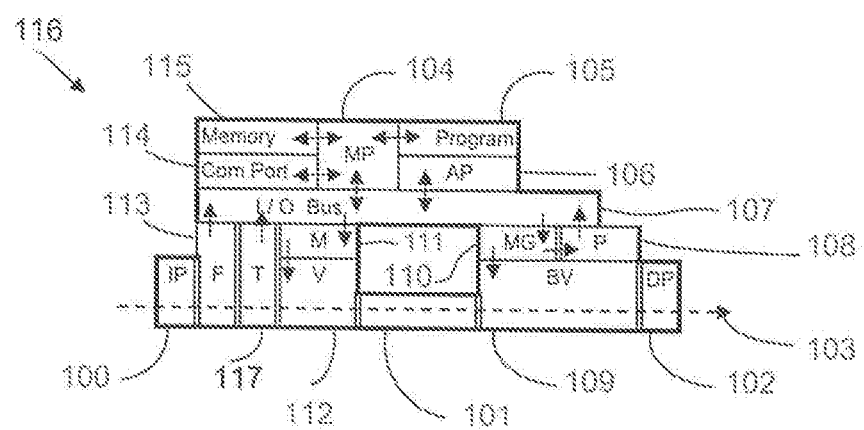
FIG. 1 is a systems drawing showing of a line pressure loss assembly (LLSA) configuration, in accordance with an embodiment of the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The present invention is a fluid distribution system comprising connected conduits (e.g., lines) wherein fluid flows, such as pipes within a building. The lines may be configured to: (i) include multiple lines that connect at intersections (some of the intersections will be identified as nodes); and (ii) incorporate node units associated with line pressure loss simulation assemblies ("LLSAs"). Activities of a node unit incorporating a LLSA can result in alterations in fluid pressure, such as by a loop control process to reposition balancing valves or other valves of one or more LLSAs, and/or by alteration of the speed of the system pump. These activities adjust fluid pressure to cause the system to produce a balanced and high efficiency energy transfer (e.g., heating or cooling), and do not involve or require any identification or use of any specific, fixed or absolute pressure value. They function based on an operation locus (for a node unit) and/or an operation locus range (for node unit groupings) to adjust the fluid pressure.

The discussions herein may introduce embodiments of the present invention shown in some of the drawings, and a skilled reader will recognize that such discussions are provided as examples to aid the description of the present invention. Other embodiments of the present invention, including embodiments shown in other drawings, may also be applicable.

The terms "line", "conduit", "pipes" and other words indicating the element of the invention that the fluid flows through in the system are to be understood to have the same meaning. These words may be used interchangeably within this document.

The term "information" when utilized in this documents is to be understood to include all forms of information, including data.

The term "operation locus range" references a range that is determined by the system and is a range wherein the line pressure loss will be balanced to meet the operational needs of the whole of the distribution system. Identification and generation of the operation locus range may occur in accordance with a number of steps, as discussed herein. The term "operation locus" is applied to an individual node unit and it references an operational range wherein the line pressure loss will be balanced at that individual node unit.

The term "pressure" as used herein generally relates to fluid pressure. As discussed herein, one or more pumps that are each controlled by a corresponding pump variable speed drive, may be utilized to control fluid pressure within the fluid distribution system of the present invention. The pumps further operate to maintain a balanced line pressure loss. A balanced line pressure loss references the fluid pressure that ensures that a target level of fluid flow in the system is achieved. The pumps in embodiments of the present invention, and the corresponding variable pump speed drives, are chosen in accordance with the configuration of the fluid distribution system, as discussed herein.

The term "fluid flow" as used herein generally relates to the volume of fluid conveyed through a LLSA connected to a node unit over a period of time. Fluid flow may be calculated as gallons per minute (gpm), or liters per second, or in accordance with some other measurement.

The term "node pressure" as used herein generally relates to calculations undertaken by node units that are downstream of a node to determine the pressure at the upstream node.

As such, node pressure is not the pressure measured at the node itself. Node pressure is a pressure measurement occurring at the downstream node unit based upon activities of the node unit to determine the pressure at the upstream node.

For the purpose of this document: the term "DEC" indicates a decrease setting, value, status, classification, or change indicator; the term "NULL" indicates a setting, value, status, classification, or change indicator that is null, zero or nothing; and the term "INC" indicates a decrease setting, value, status, classification, or change indicator.

LLSAs

All node units in the present invention are associated with LLSAs, and vice versa. Therefore, any reference to a LLSA should be read to recognize that the LLSA is associated with a node unit, and any reference to a node unit should be read to recognize that the node unit is associated with a LLSA. The exception being a pump control node unit that is not associated with a LLSA, as discussed herein.

The associated LLSA and node unit may be incorporated in a single housing or as attached components. The node unit/LLSA combination generally functions to process and generate information, such as change reports, and incorporates many elements having multiple functions, as disclosed here. Thus, the node unit/LLSA may incorporate any combination of one or more of the following, memory, program, microprocessor, communication port, and input and output Bus elements in some embodiments of the present invention. When a node unit is discussed herein the discussion should be read to include the LLSA, whether the LLSA is explicitly referenced in such discussion or not and vice versa.

The present invention is applicable to both constant and variable volume (flow) distribution systems.

The LLSAs in the present invention may be non-virtual LLSAs. References to "line loss" herein should be understood to include non-virtual line loss.

The description of the present invention herein references graphs and tables representing aspects of the present invention or prior art. These graphs and tables and the discussion thereof may reference specific values. These values relate to particular environments that the invention or prior art may be utilized within. Any specific values or particular environments referenced are only examples. Other values or particular environments for use of the present invention are also possible. As an example, a specific value for intersection M may be referenced, but this value is only applicable to a particular environment in which the present invention is used, and intersection M may represent different values in other environments.

Figure 2:
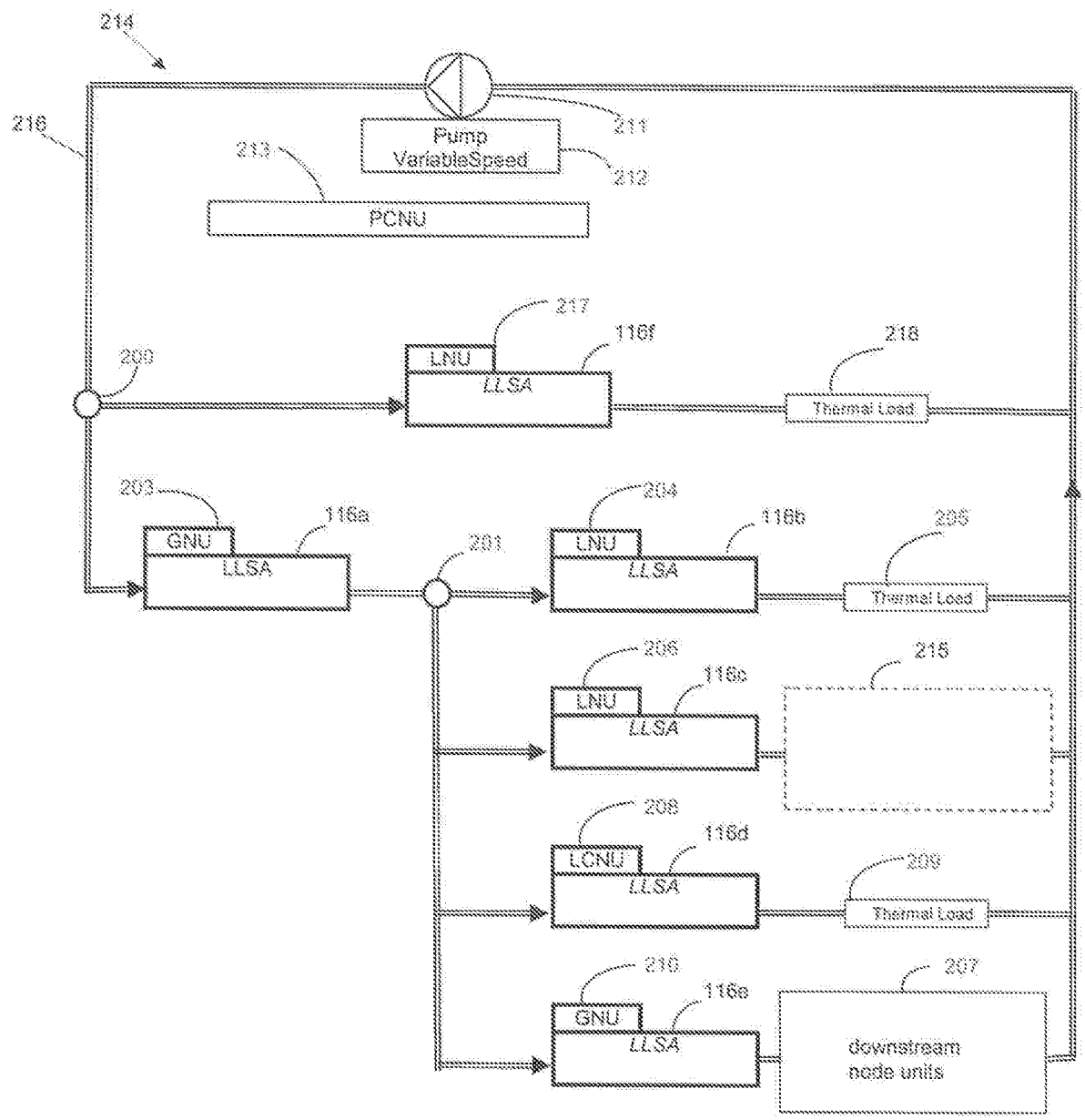
FIG. 2 is a systems drawing showing a distribution system incorporating at least two node unit groups and at least one secondary distribution section, in accordance with an embodiment of the present invention.

Within this document "downstream" refers to the direction that the fluid flows within the system, whereas "upstream" refers to the direction that is opposite to the direction that the fluid flows within the system. (For example, the direction of the flow of the fluid is indicated by the arrows associated with the lines, as shown in FIG. 2.)

The lines incorporated in the present invention may include a supply section and a return section. The lines in the supply section are the lines through which fluid flows towards a node unit (i.e., supply lines). Node units may be positioned in the lines, and may be grouped (i.e., multiple lines may be recognized as a group of lines, wherein node units are located directly upstream and downstream of a shared node, as described herein).

Nodes

Intersections or other positions in the supply lines that are designated or otherwise identified as nodes may be positioned to be shared by upstream and downstream node units, such as: (i) upstream of a node unit that is a group node unit and downstream of a pump; (ii) upstream of a node unit that is a load node unit and downstream of a pump or a group node unit; or (iii) upstream of a group of node units (the group of node units downstream of the node may include a combination of one or more load node units, a load control node unit, and a group node unit) and downstream of the node unit that receives information from the group of node units (i.e., a group node unit, as described herein). The group of node units may collective be referenced herein as a node unit grouping, or a node unit group.

The positions of the nodes in the distribution system are each selected based upon several criteria and facts relating to the distribution system. For example, line distances, service areas, relative magnitude of flows in a distribution section, expertise of a system manager, and knowledge of the system designer can all be individually or collectively utilized as factors in determining the position of the nodes.

The lines in the return section are the lines through which fluid flows after it has passed through a node unit (i.e., return lines). The fluid flows through the return lines directly to the system pump. Nodes are not positioned in the return lines.

The present invention operates to collect information from elements in a fluid distribution system. Downstream of each node there may be one or more node units operable to collect information.

Information Collection and Transfer

The LLSA of each node unit is operable to process information, perform measurements, and undertake other activities to generate information relating to the operation of the fluid distribution system. The information collected and generated by the LLSA and node unit collectively can be shared with other upstream node units. The information may be utilized at the upstream node unit, and may be processed by that upstream node unit. The processing of the information results in a determination as to whether each node unit and the system generally are operating in a manner that offers a balanced performance throughout the whole of the building where the system in installed. A balanced performance is achieved when the system functions so that all of the requirements of all of the sections of the system are addressed. The outcome of a balanced performance is an efficient and effective function of the system.

For example, if the fluid distribution system is a heating and cooling system, balanced performance occurs when the heating or cooling requirements for all of the areas within a building are being met simultaneously. Some areas of the building may require more or less heating or cooling than other areas. A balanced system functions in a manner that allows for all areas of the building to receive the heating or cooling that is required in the area simultaneously, and does so in a manner that is efficient. For example, efficiency is achieved when the least amount of energy required to produce the balance in the system is utilized by the system and balance is achieved in the system.

To achieve and maintain balanced performance the system may require alterations from time to time. The alterations will be made in association with the information collected by and shared within the system. For example, the alterations may involve changes to the pump speed, or changes to the position of the balancing valve or other valves within one or more LLSAs. These alterations are made based upon a range of operation values and/or settings generated from the information collected from the node units and LLSAs (e.g., operation locus, operation locus range, system operator information, etc., as discussed herein).

The system does not require that any fixed or absolute value for operational activities, such as specific pressure levels or exact pump speeds, be identified or set within the system. Fixed flow values may be used to establish the fluid flow settings of the system or other parameters of the system before the system begins operation. However, after the system is running the system will identify an operation locus range, as discussed herein. Alternations to pump speed and positions of the balancing valves and other valves of LLSAs will occur in accordance with the operation locus of the individual node units and and/or the operation locus range determined by the system. No fixed absolute pressure setting, or differential pressure setting is identified or set by a person or the system after the system begins running. The operation locus range is determined on an ongoing basis. The operation locus range is amended as required by the system in accordance with the ongoing determination, such that each determination or some determinations may identify a new operation locus range. The new operation locus range will be applied by the system, replacing the previously identified operation locus range. This occurs on an ongoing basis such that the operation locus range is a dynamic aspect of the present invention.

Alterations in pressure can occur in the system due to alterations to the pump speed and alterations to the positioning of the balancing valve or other valves within one or more of the LLSAs. Notably, the positioning of the balancing valve or other valves within one or more of the LLSAs occurs in accordance with a loop control process that is described herein. The loop control of the present invention is not a proportional-integral-derivative (PID) controller known in the prior art.

There can be multiple node units within a system, and those node units may be of a variety of types. For example, some types of node units (i.e., group node units, pump control node units, and secondary pump control node units) may be operable to process information received from one or more downstream node units. Other types of node units (i.e., load node units and load control node units) may receive information from one or more probes, system designer information (or information from another third party person or element), and/or thermal loads (that may be secondary distribution sections), and may operate one or more sensors and thereby generate information that is sent to the upstream node unit that is operable to process info received from downstream node units.

Any node units located within a secondary distribution section of the fluid distribution section may function in a manner similar to the same type of node unit located in the primary distribution section. Therefore, any processes or functions that are described for a node unit in the primary distributions section should be read as also be in processes and functions that the same type of node unit can perform in any secondary distribution section. For example, a pump control node unit can perform the same processes and functions as a secondary pump control node unit. As other examples, a load node unit can perform the same processes and functions as a secondary load node unit, a load control node unit can perform the same processes and functions as a secondary load control node unit, and a group node unit can perform the same processes and functions as a secondary group node unit.

Shared Nodes

A shared node is positioned between at least two node units, or between a node unit and the pump of a primary distribution section. A shared node will be downstream of at least one node unit or the pump, and upstream of at least one node unit. As an example, a shared node may be downstream of a group node unit, and may be upstream of one or more node units that transmit information to the group node unit. As another example, a shared node may be downstream of the pump of a primary distribution section of the distribution system, and may be upstream of one or more node units that transmit information to the pump control node unit. A variety of configurations for the position of shared nodes are discussed and shown herein.

In general, node units are positioned within the distribution system in relation to at least one node. For example, one or more node units may be directly downstream of a node (e.g., this can include any type of node unit except for a pump control node unit). These downstream node units may send information upstream to another node unit that is directly upstream of the node (i.e., to a group node unit or a secondary pump control node unit), or to a pump control node unit. The node that is between the one or more downstream node units and the upstream node unit is known as a "shared node", as it is positioned between at least two nodes units, or a node unit and the pump.

Herein a node unit is "directly" upstream or downstream of a shared node if there are no other elements (such as other node units or other elements) between the node unit and the node in the indicated direction (e.g., upstream or downstream).

Information is collected and/or generated by one or more node units that are downstream of a shared node, and this information is relayed to a node unit that is upstream of the shared node. The upstream node unit (and the LLSA associated therewith) process the information collected from and otherwise obtained from the downstream node unit(s). The upstream node unit may further operate based upon the information collected or otherwise obtained from the downstream node unit(s).

The upstream node unit may further transfer the results of its processing of the information it receives to a node unit that is upstream of it (if there is an upstream node unit), or to a pump control node unit if there is no node unit upstream and the pump is directly upstream. There may be a node between two or more node units (in the same manner as has been described). For example, a group node unit may receive and process information from one or more downstream node units with which it has a shared node in common. The group node unit may transfer the results of the processing of the information to an upstream node unit with which it has a shared node in common. One or more node units that have a shared node unit between them form a node unit grouping, and one or more node units downstream of a shared node that has the pump upstream also form a node unit grouping. Some node units may be incorporated in more than one node unit grouping, as a node unit may have a shared node with one or more downstream node units, and a shared node with one or more upstream node units.

The node units that have a shared node between them can each function individually, such as to collect and generate information based on internal sensors, external probes, or information received from any one or more downstream node units (if any such information is received) and/or information provided by the system designer (or information from another third party person or element). Although most node units will receive information from a sensor, thermal load, one or more downstream node units, or a system designer (or information from another third party person or element), it is possible that a node unit may not receive such information.

Each node unit may generate a virtual target demand flow that represents the target flow for the fluid of the system to achieve balanced flow. Each node may also generate a report that reflects information specifically related to whether flow is within the operation locus of the node unit (i.e., a change report). Any of the virtual target demand flow, change report and information collected or generated by the node unit may be sent upstream to another node unit (if there is a node unit upstream) or to the pump control node unit if the pump is directly upstream of the node unit. Node units that receive virtual target demand flow, change reports and information from multiple node units will process such virtual target demand flow, change reports and information, along with any information and/or change report it generates itself, to generate any of a virtual target demand flow, change report (that is a net change report based on the information and change reports received from the downstream node units in a node unit grouping) and information that it can send to an upstream node unit in its node unit grouping (if any, or to the pump control node unit if the pump is directly upstream of the node unit).

An exception is the pump control node unit that may not generate any change report, or virtual target demand flow or other such information, and will generate and transmit speed change information, such as in the form of a signal, to the pump variable speed drive. Thus, of the node units in a node unit grouping the upstream node unit will process the information that it receives from the one or more downstream nodes.

As an example, node units function as follows:

Group Node Unit: Fluid flows from a group node unit to a downstream thermal load via another node unit (i.e., a load node unit, a load control node unit or a group node unit), such that 100% of the fluid flow from the group node unit is received by the thermal load. The downstream thermal load may be any of many types of thermal loads. For example, thermal loads may be caused by factors such as heat transfer through the building wherein the distribution system is located from the sun, the earth, and the outside environment (and weather), or heat generated by people, lighting, and equipment inside a building. A thermal load may further be a secondary distribution section, as discussed herein.

Fluid flows through a group node unit to a downstream shared node and/or to one or more downstream node units. Therefore, the group node unit is positioned upstream of: (i) a shared node; and (ii) one or more downstream node units. The one or more downstream node units transmit and send information upstream to the group node unit.

There is no maximum number of downstream node units that may be in a node unit grouping. A group node unit may operate within the fluid distribution system to balance the pressure at the shared node, by maintaining flow in accordance with the virtual target demand flow relating to that group node unit. Node pressure may be balanced when the group node unit and each of the downstream node units in a node unit group are all operating to maintain flow in accordance with their own virtual target demand flows.

The group node unit generates its virtual target demand flow to be equal to the sum total of all the virtual target demand flows it receives from the downstream node units in a node unit grouping (i.e., the shared node of the node unit grouping is downstream of the group node unit). The virtual target demand flow that the group node unit generates is transferred by the group node unit to an upstream node unit in its upstream node unit grouping (i.e., the shared node in the upstream node unit grouping is upstream of the group node unit). A group node unit may utilize loop control to maintain its virtual target demand flow, by operating to adjust the balancing valve of the LLSA connected to the group node unit in accordance with an operation locus of that group node unit.

A group node unit further generates a change report periodically based upon its operation locus. The internal change report, generated by the group node unit, is based on the then current operation locus of the group node unit (as determined in relation to the operation of the connected LLSA). The change report may be any of an INC, DEC or NULL change report, and is related to the alteration of pressure required at its upstream shared node.

The group node unit also receives change reports from the downstream node units in a node unit grouping. The group node unit consolidates the change report it generates with the change reports it receives to generate a change report that is a net change report. The net change report that the group node unit generates is transferred to an upstream node unit in its upstream node unit grouping.

Load Node Unit: Fluid flows from a load node unit to a downstream thermal load, such that 100% of the fluid flow from the load node unit is received by the thermal load. The downstream thermal load may be any of many types of thermal loads, such as thermal loads discussed herein. A load node unit may operate within the fluid distribution system to balance pressure relating to its upstream shared node in a manner that maintains the virtual target demand flow of the load node unit. Node pressure may be balanced when the load node unit is maintaining its virtual target demand flow, and all other node units in a node unit grouping with the load node unit are all maintaining their virtual target demand flows.

The load node unit initially receives target flow information that relates to a target demand flow setting from an external third party source, or from a pump control node unit, and it utilizes this information to generate its virtual target demand flow. A load node unit can utilize loop control to maintain its virtual target demand flow, by adjusting the balancing valve of the LLSA connected to the load node unit in accordance with the operation locus of that load node unit. The virtual target demand flow of the load node unit can be equal to the target flow information that the load node unit receives. (If the load node unit is upstream of a junction node of a secondary distribution section, it can also generate virtual target demand flow in accordance with the target flow information it receives from a source, such as a thermal load, or a probe or sensor that is external to the load node unit.) The load node unit can transmit the virtual target demand flow to the upstream node unit in a node unit grouping.

A load node unit can further generate a change report periodically based upon its operation locus. The change report is generated to effect a change to the pressure at the load node unit's upstream shared node. The change report may be any of an INC, DEC or NULL change report, and is related to the alteration of pressure required at its upstream shared node. The change report that the load node unit generates is transferred to the upstream node unit in a node unit grouping (i.e., the shared node in the node unit grouping is upstream of the load node unit).

Load Control Node Unit: Fluid flows from a load node unit to a downstream thermal load, such that 100% of the fluid flow from the load node unit is received by the thermal load. The downstream thermal load may be any of many types of thermal loads, such as thermal loads discussed herein.

The load control node unit may undertake the following functions: (i) monitoring an independent controlled variable; and (ii) utilizing a dedicated loop control module to maintain the independent controlled variable in accordance with the controlled variable information it receives. The independent controlled variable may be the controlled variable setting information that is received by the load control node unit, as discussed herein. The independent controlled variable may be received by the communications port of the LLSA via the electronic communications network (ECN).

The controlled variable information may be a control variable, such as virtual target controlled variable setting information that may be based upon a thermometer reading of actual temperature in an area of the building, or a target temperature that is set by the operator or designer of the system before the system is initiated and begins to function. The controlled variable information is received by the auxiliary port of the I/O Bus of the LLSA. Utilizing the loop control module to maintain the independent controlled variable in accordance with the controlled variable information may be achieved by the load control node unit performing one or more of the following activities—adjusting the balancing valve of the LLSA that is connected thereto in accordance with the operation locus of the load control node unit, and operating the motorized valve of the LLSA.

Through operation of the loop control process to maintain the independent controlled variable in accordance with the controlled variable information, a virtual target demand flow is generated for the load node control unit.

A load control node unit may undertake such functions so that it operates within the fluid distribution system to balance pressure at its upstream shared node in a manner that maintains the virtual target demand flow of the load control node unit.

The load control node unit may further operate to control flow in the conduit of the fluid distribution system, as required by the operation of the downstream thermal load. The load control node unit receives controlled variable information and also receives virtual target controlled variable setting information, and it processes these to produce a result that is a virtual target demand flow. The virtual target controlled variable setting information may be received from a thermostat, or received as a target temperature setting from an operator or designer of the system. The load control node unit operates to maintain the controlled variable information in accordance with the virtual target control variable setting information. The load control node unit can transmit the virtual target demand flow to the upstream node unit in a node unit grouping.

The load control node unit may monitor the virtual target controlled variable setting information and utilize loop control to maintain its virtual target demand flow, by adjusting the balancing valve of the LLSA connected to the load control node unit in accordance with the operation locus of that load control node unit.

A load control node unit can further generate a change report periodically based upon its operation locus. The change report is generated to effect a change to the pressure at the load control node unit's upstream shared node. The change report be any of an INC, DEC or NULL change report, and is related to the alteration of pressure required at its upstream shared node. The change report that the load control node unit generates is transferred to the upstream node unit in a node unit grouping (i.e., the shared node in the node unit grouping is upstream of the load control node unit).

Pump Control Node Unit: A pump control node unit does not necessarily have to be positioned within the conduit of the system. There is generally only one pump control node unit in primary distribution section of a fluid distribution system. The pump control node unit is operable to transmit and receive information between itself and the pump, and between itself and one or more downstream node units. The node that is directly downstream from the pump is considered to be a shared node in a node unit grouping that includes the pump and the one or more node units that are directly downstream of such node, and such one or node units directly downstream of the shared node will transfer information to the pump control node unit via the ECN. Thus, the pump control node unit may receive information from one or more downstream node units in the node unit grouping. The pump control node unit may process the information it receives from one or more downstream node units to effect a change in the speed of the pump. It may achieve this outcome by providing information or signals to the pump variable speed drive that may affect the speed of the pump to be increased, decreased, or remain constant.

Secondary Pump Control Node Unit: A secondary pump control node unit does not necessarily have to be positioned within a conduit section of a secondary distribution section of a fluid distribution system. There is generally only one secondary pump control node unit in each secondary distribution section. If there is a node directly upstream from the secondary pump, this node is considered to be a shared node that the one or more node units that are directly downstream of such node in the secondary distribution section share in a node unit grouping, and such one or more node units directly downstream of the shared node will transfer information to the secondary pump control node unit. The secondary pump control node unit is able to transmit and receive information: (i) between itself and the secondary pump variable speed drive in the secondary distribution section; and (ii) between itself and either the node unit that is directly upstream of the junction node of the secondary distribution section (if there is no shared node in the secondary distribution section), or the upstream node unit of the secondary pump.

In some embodiments of the present invention, the secondary pump control node unit may process the information it receives. It may utilize either the results of its processing function, or the information it receives from one downstream node unit, to effect a change in the speed of the secondary pump in the secondary distribution section. It may achieve this outcome by providing information or signals to the secondary pump variable speed drive that may affect the speed of the secondary pump to be increased, decreased, or remain constant.

Monitoring and Adapting Line Pressure Loss

Node pressure is neither monitored nor measured by the present invention. Node pressure is not set to a specific, fixed or absolute pressure value by the present invention. The present invention monitors and adjusts line pressure losses within the system. Adjustments of the line pressure losses affect the pressure at nodes within the system.

The apparatus of the present invention operates to continuously control line pressure loss throughout the lines within a building. In embodiments of the present invention the liquid may be used for heating or cooling, or for other processes. The present invention incorporates multiple lines within a liquid flow system. The lines incorporate conduit sections that meet at nodes within the system. The invention further incorporates LLSAs that can be used to adjust line pressure loss. A LLSA is utilized to analyze the fluid state existing within the line in the system that runs through the LLSA.

The present invention further incorporates an operation system that is operable in accordance with a network of node units, and that can be computer software based. For example, the software may be in a variety of programming languages, such as C, or C++, or any other programming language that is in compliance with the requirements of the microprocessor instructions, set in relation to the microprocessors integrated in the present invention. The platform and software of the system operates to permit incremental adjustment of the line pressure loss, that may occur so as to be dynamic and in response to real time information generated by the system, to adjust the line pressure loss of each line section that is directly downstream of a node. (The system is operable to adjust each line section that is directly downstream of each of the nodes in this manner.) The network of node units are linked by either or both of the processors and controllers (e.g., microprocessors, communications ports, etc.) in each node unit in the system. The processors and controllers may be incorporated in the LLSA associated with the node unit, as discussed herein. Information can be transferred between node units in the network of node units.

A group node unit may receive information from one or more downstream node units that have a shared node with the group node unit in a node unit grouping. The pump control node unit may receive information from one or more downstream node units that have a shared node with the pump in a node unit groping. The information received by the group node unit or the pump control node unit is processed upon receipt, as described herein.

A group node unit may transfer some or all of the results of its information processing to another upstream group node unit or to a pump control node unit. The group node unit may have a shared node in a node unit grouping with the upstream group node unit to which information is transferred, or a shared node with the pump and it will transfer information to the pump control node unit. The group node unit transfers the results/information upstream to the upstream group node unit or pump control node unit via the ECN.

The pump control node unit utilizes the information it receives to determine whether the pump speed should be altered. The processing of the information by the pump control node unit is discussed herein in more detail. If the pump speed is determined to need to be altered then the pump control node unit will send information to the pump variable speed drive to amend the pump speed.

The node unit network operates to achieve the lowest node pressure at all nodes that is achievable in accordance with the operation locus range of the system. The lowest node pressure at all nodes is created by achieving the required line pressure losses in all lines in the system of lines within a building. This further achieves the desired flow in all lines that extend from a shared node and for each node unit within the system.

The node network may be operable by a combination of hardware and software elements. For example, the hardware elements of the node units may include a microprocessor, communication ports, memory, and input and output Bus (and these elements may be incorporated in the LLSA associated with the node unit). The hardware elements may be of any type that is operable to achieve the required function of the system.

The node network may further be operable in accordance with program elements, such as software or other instructions that may cause the hardware elements to perform specific functions. As an example, the program elements of the present invention may include communication software drivers installed in the processor and assigned to the communication hardware ports. Industry standard drivers may be incorporated in the system and may include those provided with network protocols, such as LON™, BAC.Net™, and Modbus™.

FIG. 2 shows a distribution system that incorporate a variable flow primary distribution section.

The lines may include lines between node units that extend from a shared node. (For example, as shown in FIG. 2 node 201 is a shared node that is between the upstream group node unit and downstream node units. Node 201 is therefore a shared node in a node unit grouping that includes the upstream group node unit and the downstream node units. As another example, node 200 is a shared node between the pump and load node unit 217.

The system is operable to detect a requirement for increased or decreased pressure at each node. The system can operate the node units and associated LLSAs and/or the pump to increase or lower node pressure. The system further can automatically balance the operating pressure at each node to ensure required fluid flow is achieved in the line sections emanating from the nodes. The system also maintains the lowest node pressure possible at all nodes throughout the system in accordance with the operation locus range relating to each node (as determined the collective range determined in accordance with the operation locus relating each node unit having that node as a shared node in a node unit grouping). Additionally, the system does not require any of the following: measurement, monitoring, or setting of node pressure at a specific, fixed or absolute pressure value. The direct adjustment that the system undertakes occurs at the LLSAs. The resulting change affects the upstream node as well as the downstream return line wherein fluid flows after flowing through any of a load node unit or a load control node unit.

Thus, nodes are essentially reference points within the system. The node positions are selected and/or defined by the system designer. The pump will be directly upstream of the node that is furthest upstream of all the nodes in the distribution system. Each node unit that is upstream of a shared node will receive information relating to the node units downstream of such shared node. The pump control node unit will receive information relating to the node units directly downstream of a node that is a shared node of the pump. The node conducts flow from the immediate upstream conduit to the one or more downstream conduits. The node itself does not perform any calculations or other activities.

The node units downstream of a node (i.e., a shared node) will each sense a change in fluid flow resulting from any change in the node pressure that is related to such upstream shared node. The detected change in flow may either be generated by the activities of the node units that have the shared node in a node unit grouping, or by the activities of the node units that are upstream of the shared node, or by a change in pump speed.

Loop Control

The system described herein can incorporate loop control processes. A skilled reader will recognize that the loop control processes may be utilized in other applications as well as with embodiments of the present invention. In particular, the loop control processes and apparatus of the present invention may reposition the balancing valve or other valves of a LLSA. The repositioning may have the effect of altering fluid flow through the LLSA within the lines. Therefore, the loop control may be utilized to assist with achieving and maintaining balanced fluid flow within the system.

The loop control processes may be software based. For example, the software may be in a variety of programming languages, such as C, or C++, or any other programming language that is in compliance with the requirements of the microprocessor instructions, and can be utilized in relation to the microprocessors integrated in the present invention.

Generally, loop control processes act to automatically control a non-virtual, or a virtual, variable (i.e., an essential non-virtual variable within a system that must be maintained at a particular setting for a period of time during the operation of a process, such as an operational HVAC system) to a specific virtual variable target (i.e., as may be defined from time to time during the operation of the loop control process by other elements in the process, or may be defined by the design engineer of the system process). This occurs based on one or both of the following: feedback information that is generated by monitoring the actual state of the non-virtual variable, or virtual variable; and the automatic operation of a virtual transfer function to effect a change of a non-virtual transfer function and thereby effect a change in the state of the non-virtual variable, or virtual variable. A non-virtual transfer function is related to the operation of the actuator in the LLSA. Specific loop control processes of the present invention are discussed herein in more detail.

The loop control processes may be operated by elements of a LLSA. The LLSA may include a processing module incorporated in the program element and/or the microprocessor. The processing module may undertake processing of information, such as the flow of fluid within the flow line between the inlet port and discharge port of the LLSA as determined by the flow sensor, or other information. The processing may include calculations, algorithms and/or other information processing functions to determine the repositioning of the balancing valve and/or other valves of the LLSA that should occur to adjust the line pressure loss within the line to achieve balance at an upstream node within the system. Information received and/or generated by the program module may be stored in the memory of the LLSA. The operational speed of the processing module will be in accordance with the responsiveness required to achieve the balance of the system in a stable, effective and efficient manner.

The loop control apparatus differs from known PID controllers, as described herein. In particular the loop control apparatus differs from known PID controllers in regards to functionality. PID is a linear process that does not include non-linear functions (i.e., linear reactions). Generally, the loop control apparatus identifies and utilizes a combination of non-linear relationships between the input differential error of the virtual variable target less the non-virtual variable, or virtual variable, and the output response of the non-virtual transfer function. The non-linear relationship can take the form of an equation, or a set of equations, for example: Output=M×(Input)×(Input)+C; Output=M×(Input)×(Input)×(Input)+C; using an exponential equation; a set of linear equations, each dedicated to a specific range of "input"; or any combination of the foregoing and other forms to create a non-linear relationship between "Input" and "Output".

The loop control process uses the speed information of the non-virtual transfer function in the determination of the algorithm response (Output) to the differential error (Input). The loop control process generates differential increments of change, rather than an absolute level or fixed value of state as an output to the non-virtual transfer function. The loop control incorporates automatic adjustment of response parameters to eliminate instability and dead band cycling of the controlled non-virtual variable.

The loop control process has a significant impact on the commissioning of on-site control loop performance and set-up. Specifically it: (i) substantially reduces the on-site commissioning time to setup, test and re-adjust control loop performance; and (ii) eliminates the need to re-commission the control loops under new and different operating conditions than existed at the initial commissioning time. The loop control further eliminates the need for actuators (i.e., non-virtual transfer function) to be equipped with electronic converters (that can be costly) that provide conversion of an analog signal input to dry contact output increase and decrease signals.

Benefits

The present invention offers many benefits over the prior art. The present invention is focused upon providing an automated and self-adjusting, dynamic solution to balancing a fluid distribution system. For example, the fluid system may be a hydronic system that is applied to industries such as heating, ventilation and air conditioning (HVAC) systems, and industrial processes (e.g., separating of liquids, or other processes involving the flow of liquids within conduits or channels). Balancing the fluid distribution system may achieve a desired fluid flow at all destinations throughout the system, while maintaining the lowest pumping pressure and the corresponding lowest pumping energy usage. Thus, the present invention can achieve reduced use of energy and related cost-savings.

Prior art systems apply various flow controls to liquid within a system, such as a HVAC system. These prior art systems generally apply devices that limit flow to attempt to balance the system. The result is that the prior art systems are limited in range and require a setting value (e.g., generally a numerical valve that represents a specific, pinpoint setting value—a "pinpoint value") for each valve in the system to be specifically identified herein. Generally valves are set in such systems to a pinpoint value that represents a specific absolute flow high limit value. The present invention does not require the identification of any pinpoint value to adjust elements to achieve a balanced flow of fluid in the system. For example, no pinpoint value is identified to adjust the position of any balancing valve or other valve of the LLSA, or to adjust the pump speed.

Instead the present invention identifies an operation locus range and the fluid flow is balanced within the system in accordance with the operation locus range.

The use of the operation locus range by the present invention has several benefits over the prior art. For example, in many prior art systems the balancing valves are initially set manually, and thereafter the valves may be reset manually. Some prior art permits only automated generation of the pressure settings, and the generated pressure settings are pinpoint values. A skilled reader will recognize that no pinpoint value is required or utilized by the present invention in its automated positioning of balancing valves or adjustment of the pump speed. The present invention is operable to facilitate automation of balancing value positioning and pump speeds in accordance with, and within, an identified operation locus range, and/or within the operation loci of specific node units.

Another benefit of the present invention due to its use of an operation locus range (for the distribution system) and an operation locus (for each individual node unit) is that it avoids costs incurred to operate prior art systems. For example, the need to adjust valves and the pump speed to a pinpoint value can require manual adjustment, or may involve setting valves to pinpoint settings that cause the system not to be able to operate to achieve overall balance within the system, and that consequently leads to system inefficiencies (or failures). Adjustment of the valves in the prior art to pinpoint settings cannot consistently achieve factors required for balancing of the line pressure losses in the system, including achieving: (i) the minimum pump head pressure; (ii) accurate valve settings required for system balance; or (iii) reliable achievement of balanced overall flow. The outcome is that the prior art systems can only achieve a rough balance within a system and may not be readjusted so as to try to create continuous overall balance in the system until an issue occurs in the pressure (such as a drop in pressure or a change in the demands of a thermal load). Thus, the costs to operate the prior art systems can be significant. The labour costs to continually adjust the valves can be sizable. Additionally, as the valve adjustments do not achieve an accurate or consistently reliable balance, the energy expenditure associated with higher speed pumping and other associated costs are higher for the prior art than the present invention.

Instead of allowing deficiencies to build up to the point where labour costs must be incurred to fix elements of the system, as occurs with the prior art, the present invention is operable to achieve early and immediate indications of un-adjustable flow deficiencies. The process of the present invention does not require any measurement or monitoring of actual node pressure or specific valve settings. The direct adjustment that the process undertakes is at the LLSAs and/or the pump. The resulting change is subsequently effected at the nodes as node pressure. Therefore, flow deficiencies are adjusted on an ongoing basis and small flaws are corrected. Thus, the adjustments avoid outcomes of flow deficiencies that require labour costs to be incurred to be rectified.

Another benefit of the present invention is that it is more accurate and consistently reliable than the prior art due to many aspects of its configuration and function. For example, the present invention does not involve identifying any pinpoint absolute pressure value to which it is necessary to set any of the valves, or the pump(s) in the system. The node pressure is automatically balanced with the nearest upstream and downstream node units in a node unit grouping. The node pressure and the dynamic real-time adjustments achieve a balanced fluid flow in the system that creates a minimum node pressure, and does so without any measurement or any setting of node pressure.

Through its function the present invention is operable to achieve dynamic adjustment of the pumping head pressure (e.g., pressure at the pump), and the outcome is the adjustment of pump speed to cause the pump to operate so as to require the lowest energy consumption possible while maintaining balanced fluid pressure throughout the system. The result is that the present invention can achieve a more accurate and consistently reliable pressure throughout the distribution system. This occurs because the present invention is utilizing node pressure to determine required adjustments at various portions of the system, and the adjustments to the system are made to the balancing valve or other valves of the LLSAs in the system, and/or to the speed of the pump in the distribution system. These adjustments are made on an ongoing basis and in an incremental manner, so as to achieve and maintain consistently balanced pressure in the distribution system. This outcome is not achievable by the prior art systems.

Yet another benefit of the present invention is that provides a system for balancing a variable flow system which no prior art system can achieve. For example, the prior art system shown in FIG. 12 modulates the speed of the pump to maintain two or more non-virtual header differential pressure (HDP) measurements at their respective virtual target head differential pressure (THDP) settings. The remaining non-virtual HDP measurements exist above their respective THDP settings. Reduction in the speed of the system pump in this prior art to a speed that is below the maximum setting will change flow and pressure at all nodes, as described herein. This example of a prior art system is configured to operate with constant volume and fixed-flow fluid distribution systems.

Such prior art systems are not capable of operating with variable volume, variable flow fluid distribution systems.

Other benefits of the present invention over the prior art are discussed herein.

Prior Art Examples

Examples of some prior art systems are provided herein to better exemplify the benefits of the present invention.

Figure 12:
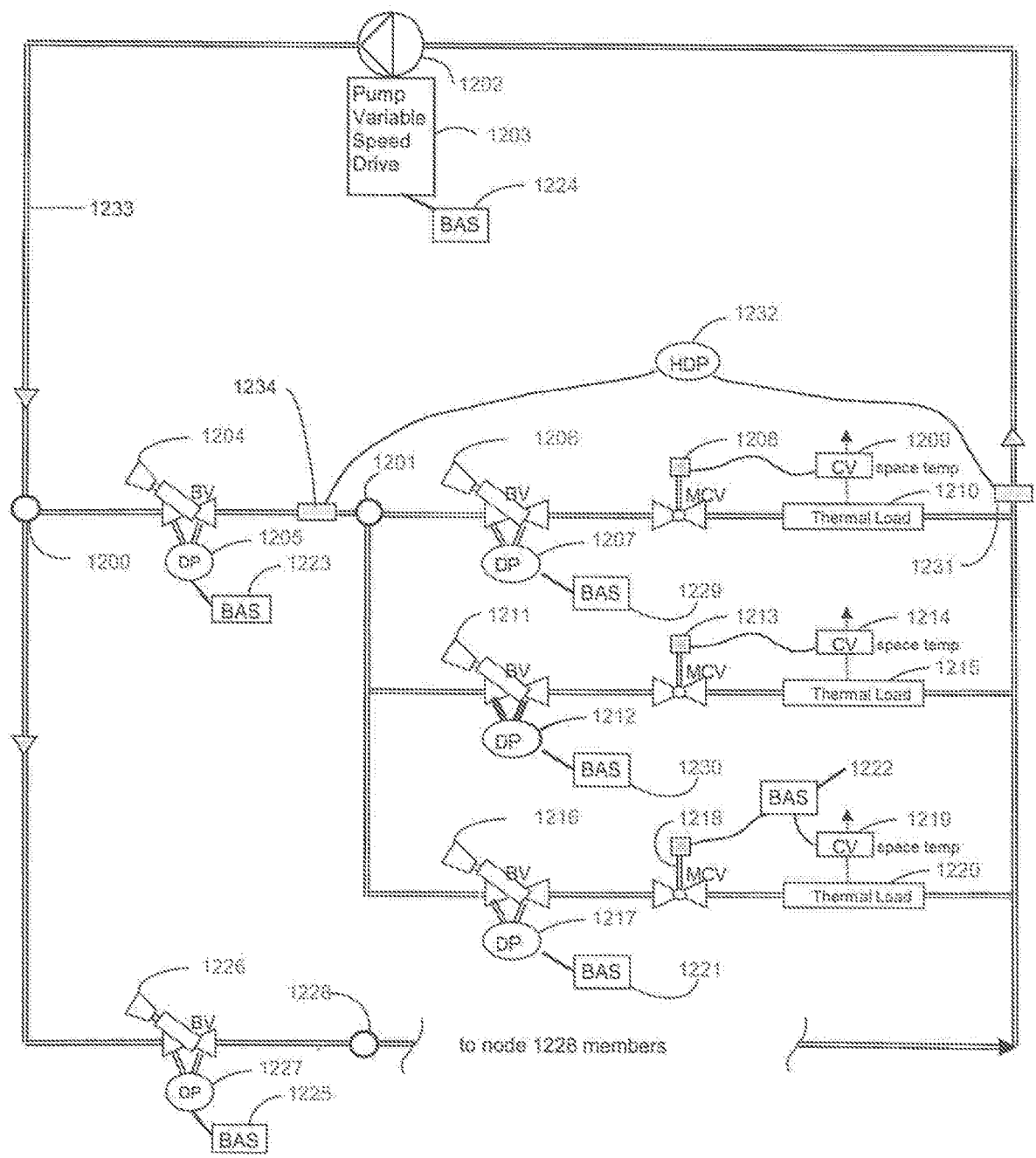
FIG. 12 is a systems drawing showing a prior art fluid distribution system incorporating nodes.

As shown in FIG. 12, prior art systems can incorporate a pump 1202 operable to pump fluid through one or more conduits 1233 in accordance with a speed controlled by a pump variable speed drive 1203 attached to or incorporated in the pump. The pump, and more specifically the pump variable speed drive, are attached to a building automation system (BAS) 1224. The BAS is operable to provide automatic centralized control of a building's heating, ventilation and air conditioning, lighting and other systems. The BAS is a form of distributed control system. The fluid is pumped into the conduit by the pump in the direction indicated by the arrows in FIG. 12.

The prior art system shown in FIG. 12 incorporates multiple nodes 1200, 1201, 1228. Nodes may be separated by balancing valves 1204, 1226, 1206, 1211, 1216. For example, nodes 1200 and 1201 are separated by balancing valve 1204, and nodes 1200 and 1228 are separated by balancing valve 1226. Node 1201 has three conduit lines directly downstream therefrom and each conduit line incorporates one of balancing valves 1206, 1211, 1216, that serve thermal loads 1210, 1215, 1220 respectively. In accordance with the system configuration shown in FIG. 12, the balancing valves do not all directly service thermal loads. For example, balancing valves 1204, 1226, do not directly serve a specific thermal load. Balancing valves 1204, 1226, are operable to provide the line pressure loss pressure drop required between nodes 1200, 1201 and 1200, 1228, respectively. The operation of balancing valve 1204 is based on the total fluid flow of balancing valves 1206, 1211, 1216 that are downstream from node 1201.

Node 1228 may be upstream of additional balancing valves and motorized control valves (not shown in FIG. 12), in the same manner as node 1200.

Prior art systems can incorporate balancing valves and motorized control valves as detailed: with balancing valve 1206, motorized control valve 1208, and thermal load 1210; with balancing valve 1211, motorized control valve 1213, and thermal load 1215; and with balancing valve 1216, motorized control valve 1218, and thermal load 1220. These configurations all involve manual adjustment of the balancing valves. Some of these configurations include controlled variables 1209, 1214, each of which is associated with a thermal load 1210, 1215, respectively. The controlled variables 1209, 1214, are each maintained at a set point by the modulation of motorized control valves 1208, 1213, respectively. The controlled variables are connected to the thermal loads and further connected to the motorized control valve. If a direct connection between the motorized control valve and the controlled variable exists, the controlled variable is maintained at set point by modulation of the motorized control valve.

The controlled variables 1209, 1214 are generally temperature values measured by a thermometer or a thermostat in an area of the building that the fluid distribution system is installed within.

In one prior art configuration, the controlled variable may be connected to a BAS that is connected to a motorized control valve. The BAS may control the motorized control valve. For example, controlled variable 1219 associated with thermal load 1220 is maintained at set point by modulation of motorized control valve 1218 by the BAS 1222.

A header differential pressure (HDP) sensor 1232 may be incorporated in the prior art, and the HDP sensor may have ports connected to sensing points 1234, 1231. The pump variable speed pump may be utilized to reduce the pump speed and corresponding energy consumption when the HDP sensor senses header differential pressures that are above set targets, pinpoint values, or thresholds.

The prior art configuration shown in FIG. 12 is one of the earliest of the configurations to be introduced to the market. Each of the balancing valves is connected to a portable differential pressure (DP) sensor 1205, 1207, 1212, 1217, 1227. The connection may be across each independent and balancing valve. For example, a balancing technician may install such a connection, one at a time, as a step in the manual balancing sequences undertaken by the balancing technician. The balancing technician must know the target design flow required at each independent and balancing valve. The balancing technician must convert the target design flow value to a target differential pressure value.

A chart may be produced by the manufacturer of the balancing valves that provides this calculation or assistance to achieve the calculation of the target differential pressure value. The balancing technician then can proceed to adjust each individual balancing valve till the measured differential pressure is equal to the target differential pressure value. The balancing technician can then disconnect the portable differential pressure sensor, and physically move to the next sensing location in the system and repeat this adjustment process there. During the balancing process the pump variable speed drive is set so that the pumps speed is full speed, 100% corresponding to maximum pump head pressure and maximum pressure at nodes 1200, 1201 and 1228.

As the prior art systems (such as that shown in FIG. 12) incorporate a balancing process that is conducted at maximum flow targets at all balancing valves, the operation of the motorized control valves upset the balance. This upset occurs because the motorized control valves will, on most occasions, operate to keep the flow at a fraction of the maximum level. Hence, as the motorized valves operate at lower flow levels, the balance is destroyed. For example, when motorized control valve 1208 is modulated to deliver only a percentage of the flow level to which the technician balanced balancing valve 1206, the flow through each of the balancing valves 1206, 1204 is reduced. As a consequence, pressure at node 1201 is increased, resulting in flow changes through balancing valves 1211, 1216. In reaction, motorized control valves 1213, 1218 may be modulated to reduce flow, which will cause a similar increase in pressure at node 1201 to occur. The balance is thereby destroyed as the motorized control valves begin to absorb the higher node pressure and absorb the line pressure loss segment that is no longer available at the balancing valves 1206, 1211, 1218. This occurs because they are set to fixed values until they are manually readjusted, or it is possible that they are never readjusted.

In some prior art configurations, a computerized system may be utilized to provide determinations of differential project specific pressure targets for each balancing valve. In such a prior art configuration the balancing technician will not be required to manually convert target design flows to a target differential pressure. For example, the conversion may occur through the use of a chart provided by the manufacturer of the balancing valve.

The prior art technology can attempt to produce an energy efficient means of balancing the pressure of fluid flowing within a system to provide an energy reduction. This is achieved by the prior art by measuring differential pressures between supply and return sensing points at one, or more, locations in the distribution system. This prior art configuration incorporates non-virtual HDP measurements sensed by the HDP sensor 1232 across: (i) the sensing point 1234 that is upstream of the balancing valve 1206 (in relation to supply lines); and (ii) sensing point 1231 that is downstream of thermal load 1210 (in relation to return lines). The HDP sensor may also be across other supply and return locations, or multiple HDP sensors may be incorporated in the configuration across two or more locations.

Once the relevant HDP sensor measurements are obtained a virtual target head differential pressure (THDP) can be calculated and THDP settings can be applied to nodes that an HDP sensor is connected across. These virtual THDP settings may be provided by the project distribution design engineer, or the THDP settings may be set by the building operator. The THDP settings may be set as values that are close to the measured values of HDP at the same nodes. After the THDP settings are initially set the THDP settings may be adjusted upwards as tenant complaints arise. It is often risky for a building operator to lower these setting for fear of generating tenant complaints.

The speed of the pump 1202 is modulated to maintain one or more of the non-virtual HDP measurements at their respective THDP settings, and the remaining non-virtual HDP measurements existing above their respective THDP settings. There is no measurement of information available regarding the flow level through any of the independent or balancing valves, nor comparisons to their respective flow targets collected or generated by the system. This prior art system configuration has been designed to operate with constant volume and fixed-flow, fluid distribution systems, but has not been designed to operate with variable volume, variable flow, fluid distribution systems.

Reduction in the speed of the system pump to a speed that is below the maximum setting will change flow and pressure at all nodes. The cause of this outcome is that the line pressure losses are non-linear functions of flow versus pressure. Reducing the speed in a balanced system (such as a prior art system) will have the impact of destroying the balance due to non-linear issues of line pressure losses versus flow.

Another possible prior art system configuration provides model-based generation of differential pressure settings for the balancing technician to use when adjusting the independent and balancing valves. In this configuration, differential pressure sensors are installed and utilized by the balancing technician, rather than the portable unit used in the previously described prior art configuration. DP sensors 1205, 1207, 1212, 1217, 1227 are positioned across each balancing valve, and are measured by the BAS 1223, 1221, 1229, 1230 and 1225 each of which are connected to a DP sensor. Also the BAS is operable to set the speed of the distribution system pump to full speed, 100% for the manual balancing process.

In this configuration, controlled variable 1219 associated with thermal load 1220 is maintained at set point by modulation of motorized control valve 1218 by the BAS 1222.

The virtual target differential pressure across the balancing valves is calculated using the mathematical model of the balancing valve and virtual design full (100%) flow, required for the thermal load. This is calculated using the thermal information relating to each thermal load associated with each valve. The balancing technician may utilize the value of the virtual calculated target DP to manually adjust the balancing valves to achieve the calculated target DP value.

In this configuration the balancing technician also has the advantage to see, through the BAS communication system, the impact of his adjustments on the non-virtual differential pressure measurements occurring at other balancing valves operating at the same directly upstream node. For example, consider balancing valves 1206, 1211, 1216 operating at node 1201. Once the adjustment is made, with pump 1200 set to full 100% speed, the actual line pressure loss at each balancing valve 106, 1211, 1216 is simultaneously available to review the achieved degree of balance.

The prior art has several significant differences from the present invention. These differences will be described in the examples of embodiments of the present invention discussed herein.

EMBODIMENTS OF THE PRESENT INVENTION

The present invention is a type of fluid distribution system that incorporates a network of pipes, lines, ducts or other conduits through which the fluid is delivered to thermal loads.

The conduit comprises one or more nodes. At some nodes the fluid flow may be redirected into multiple line sections, for example two or more line sections. At such a node the sum total flow entering the node equals the sum total flow entering the downstream node units in the line sections of the conduit, collectively. Embodiments of the present invention may be constant flow systems, variable flow systems, or systems that incorporate a combination of sections that constitute constant and variable flow sections.

In embodiments of the present invention the conduit and nodes therein may be configured such that fluid flows directly through a node unit to its downstream shared node. Each of the node units downstream of a shared node in a node unit grouping may be a specific type of node unit and each is associated with a LLSA 116. Each of the LLSAs may be similar or the same as the LLSA shown in FIG. 1.

As discussed herein, there may be various types of node units and LLSAs incorporated in embodiments of the present invention, and more than one type of LLSA may be incorporated in a single embodiment of the present invention. For example the forms of node units may include a group node unit (BNU), a load node unit (LNU), a load control node unit (LCNU), and a pump control node unit (PCNU) in a primary distribution section, and a secondary pump control node unit (SPCNU) in a secondary distribution section, and other types of node units in either the primary or secondary distribution sections. The different types of LLSAs incorporated in the present invention may each have elements and functions compatible with the type of node unit that the LLSA is associated with, the pump control node unit being the exception in that it is not associated with any LLSA.

The present invention may further incorporate an operation system incorporating a node unit network that is an electronic communications network (ECN). The ECN may be operable to receive and send information between node units and between the pump control node unit and the pump (via the pump variable speed drive), and thereby is to share information between all forms of node units/LLSAs incorporated in the present invention. The ECN may be a separate entity that is located remotely from the conduit but is in communication with the node units. Alternatively, the ECN may be integrated with the conduit and otherwise located locally to the conduit. A remotely located ECN may be operation to receive and send information wirelessly from and to the node units/LLSAs and to process information in a remote processor and store information in a information base in a remote servicer.

One or more displays or man machine interface units (HMIs) may be integrated with or otherwise connected to the ECN, through a wired or wireless connection, whereby a user may view information, reports or other information related to the system of the present invention. In some embodiments of the present invention such information, reports or other information may be viewable by a user on an electronic device, such as a laptop, personal computer, smart phone, tablet or other device.

LLSA Elements & Configuration Examples

An embodiment of a LLSA is shown in FIG. 1. A skilled reader will recognize that this is an example of a LLSA incorporated in the present invention, and that the LLSAs of the present invention may incorporate one or more of the elements and functions of the LLSA shown in FIG. 1, and may further incorporate additional elements and functions, or may incorporate the elements in a different configuration than is shown in FIG. 1.

Fluid flowing within the conduit of the present invention passes through the LLSA, and the flow of the fluid within the LLSA is indicated by flow line 103. The arrows incorporated in the flow line indicate the direction of the flow of the fluid. The fluid enters inlet port 100 and exits at discharge port 102. The inlet port and discharge port are attached to a conduit through which the fluid is flowing, such that the fluid continues its flow from a section of conduit, through the LLSA and back into another section of the conduit, or the LLSA may be configured to encompass the conduit.

The LLSA may generate line pressure loss based upon the operation locus range and/or operation locus of a specific node unit. As described herein, the operation locus range is determined by the system and represents a range wherein the line pressure loss will be balanced to meet the operational needs of the whole of the system. Identification and generation of the operation locus range may occur in accordance with a number of steps. For example, the LLSA may receive information from downstream node units via the ECN. The received information may be processed by the LLSA to generate line pressure loss information, represented as an operation scale relevant to the LLSA and related node unit. The balancing valve or other valves of the LLSA may be adjusted in accordance with the operation locus of the operation scale that the LLSA generates. The outcome of the adjustment of the balancing valve or other valves in the LLSA may affect the flow line such that the adjustment is experienced by the flow line as line pressure loss.

In some embodiments of the present invention, the LLSA incorporates a pipe section 101 that may extend between the balancing valve 109 and valve 112. In other embodiments of the present invention, the LLSA may incorporate a pipe section that extends between the balancing valve and flow sensor, and/or the between flow sensor 113 and inlet port, or between any of the inlet port, discharge port, or any other combination of the components therebetween, including the flow sensor, the fluid temperature sensor 117, the valve 112, and/or balancing valve 109.

The flow sensor is operable to generate information relating to the flow of the fluid from the inlet port to the discharge port. The information generated by the flow sensor is transmitted to the I/O Bus. The fluid temperature sensor is operable to generate information relating to the temperature of the fluid flowing from the inlet port to the discharge port. The information generated by the fluid temperature sensor is transmitted to the I/O Bus.

The inlet port and discharge port may be configured to be attachable or otherwise connectable to the conduit. For example, the intake port and/or the discharge port may incorporate connections, such as threaded, sweat, compression, or union connections, whereby the LLSA is attachable to the conduit.

The LLSA further incorporates a microprocessor 104 that is connected to a number of components, including a program element 105, a memory 115, a communications port 114 and an input and output Bus (I/O Bus) 107. Information may be transferred bi-directionally between the microprocessor and any of the connected components.

The connection to the program element in particular achieves a reliable independent operation of the LLSA based on the program content that may be a software application or another program that incorporates computer or digital instructions, algorithms, calculations, information content, information generation or other functions.

The connection to the memory enables the LLSA to retain information relating to the recent performance of the LLSA unit. The memory may arrange information into an organized storage configuration, such as storage within an information-based structure. The connection to the memory is operable to achieve detection of instability in the system occurring during the recent past operating period of time. This information can be analyzed by the program to determine the appropriate corrective action. Performance stability in the present invention is a vital performance issue that may be addressed by the loop control process of the present invention, as described herein.

The connection to a communications port is operable to transfer information from one or more node units that are directly downstream of a shared node, to a node unit that is directly upstream of the shared node operating on the ECN. The information shared in this manner between the downstream and upstream node units and LLSAs having a shared node in a node unit grouping is utilized by the program to determine how and where the pressure of the shared node needs to be adjusted.

The I/O Bus is connected to an element operable to determine the actual real time shaft position of the balancing valve, such as a potentiometer 108. For example, the potentiometer may be a multi-turn potentiometer. The connection between the I/O Bus and such an element provides the LLSA with information regarding the actual real time shaft position of the balancing valve. This information of the potentiometer is generated by the operation of the motor & gear box assembly 110. The I/O Bus 107 connection to the motor & gear box assembly 110 is further utilized to reposition the balancing valve. Repositioning of the balancing valve imposes the changes in the line pressure loss associated with loop control process that operates to maintain the target fluid flow at the LLSA.

The I/O Bus connection to the motor 111 can be utilized to open and close the valve 112. The valve provides a higher close-off pressure than the balancing valve 109 can provide. In some embodiments of the present invention, the following elements are combined into a single assembly: motor & gear box assembly and balancing valve. In such embodiments, the balancing valve will produce a higher close-off pressure than in embodiments wherein it is not combined with these other elements into a single assembly. In some embodiments of the present invention, the motor may be a solenoid and the valve may be a solenoid-actuated valve or a motor-actuated valve.

Figure 3:
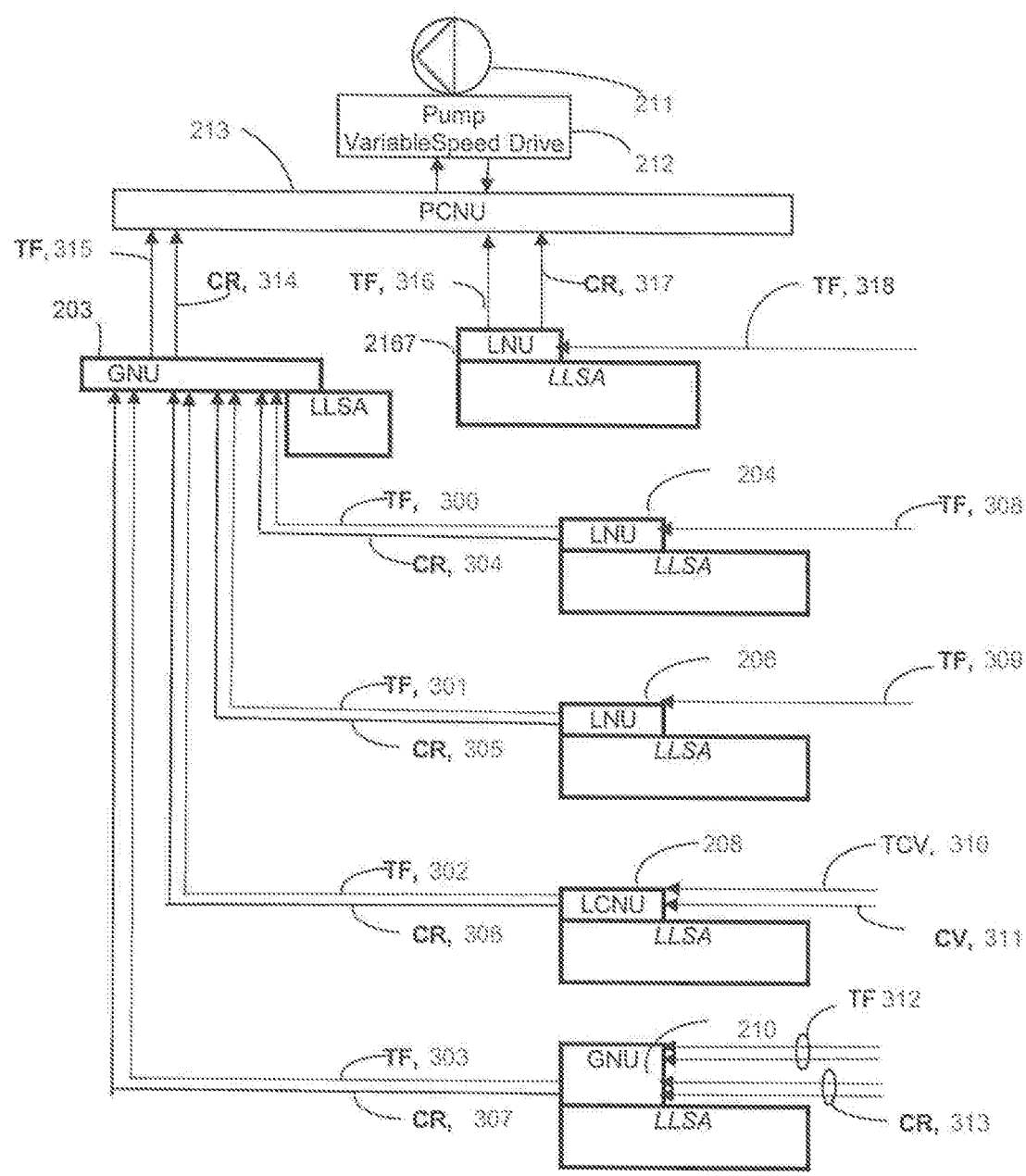
FIG. 3 is a systems drawing showing information sharing in a distribution system (configured in accordance with FIG. 2), between the node units by way of an electronic communication network in accordance with an embodiment of the present invention.

The I/O Bus 107 is further connected to an auxiliary input and output port 106 operable to perform optional operations incorporating additional devices, such as a temperature probe, and control devices such as a relay output device, etc., which may be used in some embodiments. An embodiment of the present invention wherein the auxiliary input and output port connects to a temperature probe is shown in FIG. 3, wherein the controlled variable 312 incorporates information obtained from such a temperature probe device.

System Elements & Configuration Examples

As shown in FIG. 2, the present invention may incorporate a pump control node unit 213. The pump control node unit is operable to receive information from the one or more downstream node units that have a shared node with the pump in a node unit grouping, and to send information and instructions to the pump variable speed drive 212 to alter the speed of the pump 211. The pump control node unit receives information from the downstream node unit(s). The shared node of the pump and the one or more downstream node units is the node that is the most upstream in the system (i.e., the node that is directly downstream of the pump).

FIG. 2 shows an example of a portion of a fluid distribution system, and in particular a configuration of line sections of a system that are ultimately connected to the pump of the system. Embodiments of the present invention may incorporate multiple shared nodes within a system that may have similar configurations to any of the shared node configurations shown in FIG. 2. For example, the shared node configuration that incorporates shared node 201. All node units may transmit information in a similar manner to the node units shown in FIGS. 2, 3, 31, 32, 35, 36, 39, 40. (FIGS. 2, 3, 31, 32, 35, 36, 39 and 40 show node units of primary distribution sections and secondary distribution sections of a distribution system.)

Generally, information of a node unit of the system will be transferred to the upstream node unit that has a shared node with the node unit transferring the information in a node unit grouping. An upstream node unit that receives information from one or more downstream node units will generally consolidate the information it receives with any information it has generated in relation to the operation of its LLSA. The consolidated information will be transferred to an upstream node unit in a node unit grouping that includes the node unit that is transferring the consolidated information. The final upstream node unit (i.e., the further upstream node unit), namely a pump control node unit, will receive such consolidated information from one or more downstream node units (and it will process the information it receives and/or consolidate that information). The pump control node unit will utilize the information to determine whether any alteration in the speed of the pump is required in the system.

As shown in FIG. 2, a fluid distribution system 214 of the present invention can include a conduit 216 that may be a line, pipe, tube, or other enclosed conduit wherein the fluid can flow. The conduit can have multiple sections within the fluid distribution system. The fluid distribution system also incorporates one or more nodes 200, 201.

A node may be positioned upstream from one or more node units. For example, node 200 may be positioned upstream from LLSA 116f that is connected to load node unit 217. Thermal load 218 is downstream from load node unit 217. As another example, node 200 may be positioned upstream of LLSA 116a that is connected to group node unit 203.

Figure 31:
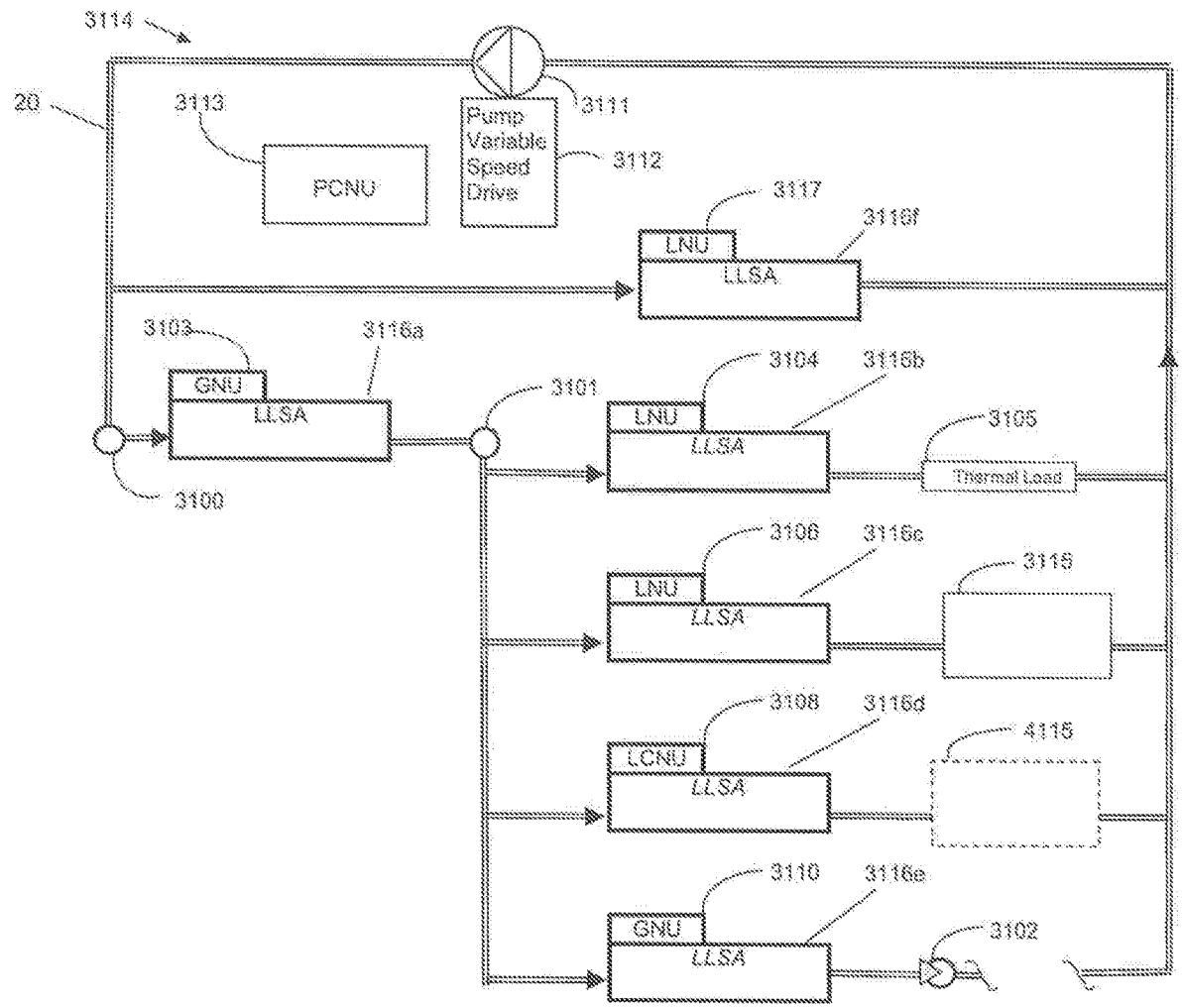
FIG. 31 is a systems drawing showing a distribution system incorporating at least two node unit groups, and at least two secondary distribution sections, in accordance with an embodiment of the present invention.

There are multiple possible configurations of the present invention, and the nodes, node units and the pump within such distribution systems. Not all embodiments of the present invention are configured such that a node is positioned upstream from all node units. In one embodiment of the present invention, a node unit may not have a node between it and the pump. For example, as shown in FIG. 31, load node unit 3117 may be positioned directly downstream of the pump 3111, and there is no node between the load node unit 3117 and the pump 3111.

As shown in FIG. 2, in embodiments of the present invention a node 201 may have multiple LLSAs 116b, 116c, 116d, 116e connected to node units positioned downstream from the node. The LLSAs incorporated in the fluid distribution system may have various node units attached thereto or otherwise associated therewith. For example, a LLSA 116a positioned between two nodes 200, 201 may be connected to a group node unit 203 or otherwise have a group node unit incorporated with the LLSA. This same configuration of incorporating a group node unit 210 is shown for LLSA 116e positioned downstream of node 201 and upstream of additional downstream node units 207.

The additional downstream node units 207 may incorporate any configuration of nodes and node units. For example, one or more node units may be downstream of a node. All of the downstream node units are connected to the conduit that returns liquid flow to the pump, which is the return conduit.

A load node unit or a load control node unit may be upstream of a thermal load (that may be a secondary distribution section). For example, load node unit 204 is upstream of thermal load 205. As another example, load control node unit 208 is upstream of thermal load 209. As yet another example, load node unit 206 is upstream of a secondary distribution section 215 (as shown in detail in FIG. 35).

The group node unit that is directly upstream of a shared node may receive information from one or more node units directly downstream of such shared node. The group node unit may further transfer information to any upstream group node unit that it has a shared node with in a node unit grouping, or to a pump control node unit if the group node unit has a shared node with the pump. The transfer of information is discussed in more detail in reference to the ECN herein.

As shown in FIG. 2, there may not be a group node unit either upstream or downstream of a shared node in a particular conduit line section. Moreover, there may only be a single node unit upstream and downstream of a shared node in a particular conduit line section. For example, load node unit 217, downstream of node 200, is not a group node unit. The same system may incorporate shared nodes that have a group node unit upstream and/or downstream thereof. For example, group node unit 203 is upstream of node 201 that is a shared node in a node unit grouping with and downstream node units including node load units 204, 206, load control node unit 208 and group node unit 210.

An embodiment of the present invention may further incorporate one or more secondary distribution sections. Examples of the configuration of secondary distributions sections are discussed in more detail herein.

As shown in FIG. 3, any downstream group node unit, load node unit, or load control node unit that has a shared node with the pump in a node unit grouping (i.e., the shared node is the most upstream node in the system) may transfer information upstream to the pump control node unit. For example, group node unit 203 may transfer change report information 314 and target flow information 315 to the pump control node unit 213. As another example, load node unit 217 may transfer change report information 317 to the pump control node unit 213 and may receive target flow information 316 from the pump control node unit. The transfer of information is discussed in more detail in reference to the ECN herein.

Embodiments of the present invention may also incorporate one or more conduit sections extending between the pump and a return conduit (wherein fluid flows directly to the pump). Each conduit section may incorporate one or more node units. For example, as shown in FIG. 2 a conduit section may incorporate a single node unit, such as load node unit 217. As another example, a conduit section may incorporate multiple node units between a pump and a return conduit that flows directly to the pump, such as group node unit 203 and load node unit 204, group node unit 203 and load node unit 206, group node unit 203 and load control node unit 208, group node unit 203 and group node unit 210 and downstream node units 207. The discussion and drawings referenced herein further show other configurations of one or more node units positioned in one or more conduit sections within a distribution system. A skilled reader will recognize that other configurations of one or more node units and one or more conduit sections are possible within a distribution system of the present invention.

There are multiple possible configurations of the system. As an example, as shown in FIG. 2, group node unit 203 is upstream of node 201. Load node units 204, 206, load control node unit 208 and group node unit 210 are downstream of node 201. Therefore, node 201 is a shared node of upstream group node unit 203 and node units 204, 206, 208, 210. (Node units 203, 204, 206, 208, 210 have shared node 201 and form a node unit grouping.) The information transmitted by node units within the system flows from each node unit that is downstream of a shared node to the node unit that is upstream of the shared node. Therefore, information transmitted by node units 204, 206, 208 and 210 is received by node unit 203.

In particular, downstream node units having a shared node in a node unit grouping each generate change reports. Such change reports are transferred to the node unit upstream of the shared node. The node unit that receives the one or more change report from the one or more downstream node units may process such change reports, as described herein. The results of the processing by a node unit may be sent to an upstream node unit that has a shared node with the processing node unit in a node unit grouping, or to a pump control node unit if the node unit has a shared node with the pump. For example, if group node unit processes change reports received from downstream node units 204, 206, 208 and 210, the processing results may be sent to pump control node unit 213. The pump is upstream of node 200 that is the shared node upstream of group node unit 203. The transfer of information is discussed in more detail in reference to the ECN herein.

Moreover, a shared node will be affected by the function, operation, and functional operation of all of the downstream node units that have the same shared node in a node unit grouping. For example, node 201 will be affected by the function of node units 204, 206, 208 and 210. This is because the information received by group node unit 203 may cause adjustments of the valves within LLSA 116a that create a line pressure loss adjustment that is experienced as a pressure change relating to node 201.

An example of the positioning of each type of node unit is provided below. This example is provided in reference to FIG. 2, and a skilled reader will recognize that other possible positioning options can be implemented for various types of node units.

Group node unit: A LLSA having a group node unit incorporated therein provides a fluid supply to a downstream shared node that is in a node unit grouping with the group node unit and other node units directly downstream of the shared node. Each downstream node unit in the node unit grouping receives a portion of the fluid supply provided by the LLSA of the group node unit. For example, a LLSA connected to group node unit 203 provides a fluid supply to downstream shared node 201 that is in a node unit grouping with node units 204, 206, 208 and 210, each of said node units receive a portion of the fluid supply provided by the LLSA connected to the group node unit 203.

Each group node unit may have multiple shared nodes. As an example of the relation of shared nodes to a group node unit, as shown in FIG. 2, group node unit 203 is between nodes 200, 201, and group node unit 210 is downstream of node 201.

Load Node Unit: A LLSA having a load node unit incorporated therein provides a fluid supply to a downstream thermal load that receives 100% of the fluid supply provided by the LLSA connected to the load node unit. For example, the LLSAs 116b, 116c, 116f that are connected to load node units 204, 206, 217 each provide a fluid supply to the downstream thermal load 205, 207, 218 such that each thermal load receives 100% of the fluid supply provided by the LLSA connected to the load node unit.

The position of the LLSA, load node units and thermal loads in the distribution system may be such that LLSAs 116b, 116c that are connected to load node units 204, 206, respectively, are positioned so that each has a thermal load 205, 207 downstream of the LLSA.

Load Control Node Unit: Alternatively, a LLSA having a load control node unit incorporated therein provides a fluid supply to a downstream thermal load that receives 100% of the fluid supply provided by the LLSA connected to the load control node unit. For example, a LLSA 116d that is connected to a load control node unit 208 provides a fluid supply to the downstream thermal load 209 such that the thermal load receives 100% of the fluid supply provided by the LLSA connected to the load control node unit.

The position of the LLSA, load control node units and thermal loads in the distribution system may be such that a LLSA 116d is positioned so that a thermal load 209 is downstream of the LLSA, and the LLSA may incorporate a load control node unit 208.

In the embodiment of the present invention shown in FIG. 2, node 201 is a shared node of one upstream LLSA 116a and four downstream LLSAs 116b, 116c, 116d, 116e. Each of these LLSAs function with a node unit to produce a specific type of node unit function.

Downstream of node 201 there are four line sections, each line section incorporates one of the downstream LLSAs and associated node units. The node units incorporated with each of the LLSAs 116b, 116c, 116d, 116e in the conduit line sections operation in the fluid distribution system as follows: load node unit 204 (connected to LLSA 116b) provides fluid to thermal load 205; load node unit 206 (connected to LLSA 116c) provides fluid to thermal load 215 which may be a secondary distribution section; load control node unit 208 (connected to LLSA 116d) provides fluid to thermal load 209; and group node unit 210 (connected to LLSA 116e) provides fluid to one or more downstream node units 207. As shown in the drawings and discussed herein other configurations and fluid flows in the distribution system of the present invention are possible.

Figure 35:
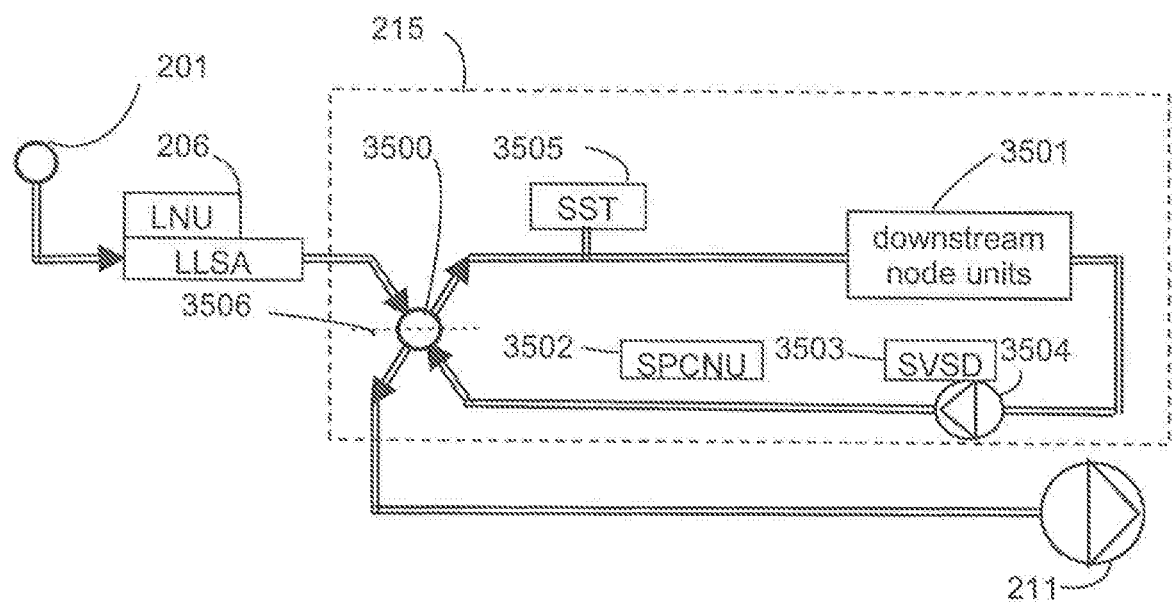
FIG. 35 is a systems drawing showing a portion of a distribution system incorporating a secondary distribution section configuration that is downstream of a load node unit (such as is shown in FIG. 2) in a primary distribution section, in accordance with an embodiment of the present invention.

As indicated in FIG. 2, downstream of group node unit 210 there may be multiple additional sections of the line integrated with shared nodes. For example, a shared node having downstream LLSAs corresponding to one or more load node units, one or more load control node units, and/or one or more group node units in a similar configuration to that shown in FIG. 2. Alternatively, a shared node may only have one downstream node unit (e.g., downstream load node unit 217 of node 200 that is a shared node), or one or more downstream secondary distribution systems 215, as shown in FIG. 35. A skilled reader will recognize that a shared node could have other combinations of one or more downstream node units of varying types, as required for the configuration of a specific system.

Additionally, a skilled reader will recognize that the type and number of node units downstream of shared nodes within a system may differ, as shown in FIG. 31. A fluid distribution system 3114 of the present invention can include a conduit 3120 that may have multiple line sections. The fluid distribution system also incorporates one or more nodes 3100, 3101, 3102.

A load node unit 3117 connected to LLSA 3116f may be positioned directly downstream from the pump 3111. The load node unit 3117 may not have any thermal load downstream of it and further may not have any node positioned between it and the pump 3111. The embodiment of the present invention shown in FIG. 31 therefore incorporates a bypass section, shown as the line section that incorporates load node unit 3117.

The pump 3111 may be connected to a pump variable speed drive 3112. A pump control node unit 3113 may be incorporated in the distribution system, but not positioned within any line section. (The connection between the pump control node unit and the pump, and the connection between the pump control node unit and one or more other node units is described herein in reference to FIG. 32.)

In the embodiment of the present invention shown in FIG. 31, node 3100 may be positioned upstream of LLSA 3116a that is connected to group node unit 3103. Moreover, in the same embodiment of the present invention node 3101 may have multiple LLSAs 3116b, 3116c, 3116d, 3116e connected to node units that are positioned downstream from the node. The LLSAs incorporated in the fluid distribution system may have various node units attached thereto or otherwise associated therewith. For example, a LLSA 3116a positioned between two nodes 200, 201 may be connected to a group node unit 3103 or otherwise have a group node unit incorporated with the LLSA. This same configuration of incorporating a group node unit 3110 is shown for LLSA 116e positioned between nodes 3101 and 3102. Additional downstream node units and nodes may be positioned downstream of node 3102 in any configuration of nodes and node units. For example, one or more node units may be downstream of node 3102. All of the downstream node units are connected to the conduit that returns liquid flow directly to the pump, which is the return conduit.

Other examples of node units that may be connected to the LLSAs in the embodiment of the present invention shown in FIG. 31 include the following, LLSA 3116b may be connected to load node unit 3105, LLSA 3116c may be connected to load node unit 3106, and LLSA 3116d may be connected to load control node unit 3108.

Figure 41:
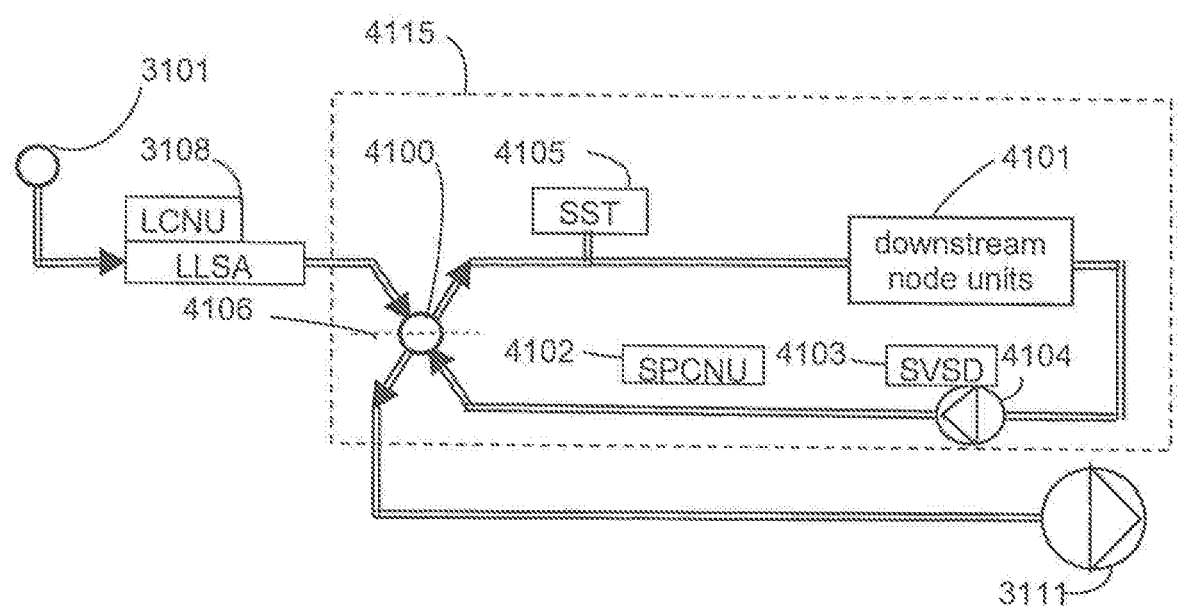
FIG. 41 is a systems drawing showing a portion of a distribution system incorporating a secondary distribution section configuration that is downstream of a load control node unit (such as is shown in FIG. 31) in a primary distribution section, in accordance with an embodiment of the present invention.

A load node unit or a load control node unit may be upstream of a thermal load (and the thermal load may be a secondary distribution section). For example, load node unit 3104 is upstream of thermal load 3105. As another example, load node unit 3106 is upstream of secondary distribution section 4115. A yet another example, load control node unit 3108 is upstream of secondary distribution section 4115 (as shown in FIG. 41). The flow (being non-virtual flow) conveyed by each load node unit to any downstream thermal load will be a 100% portion of the flow from the load node unit.

Figure 39:
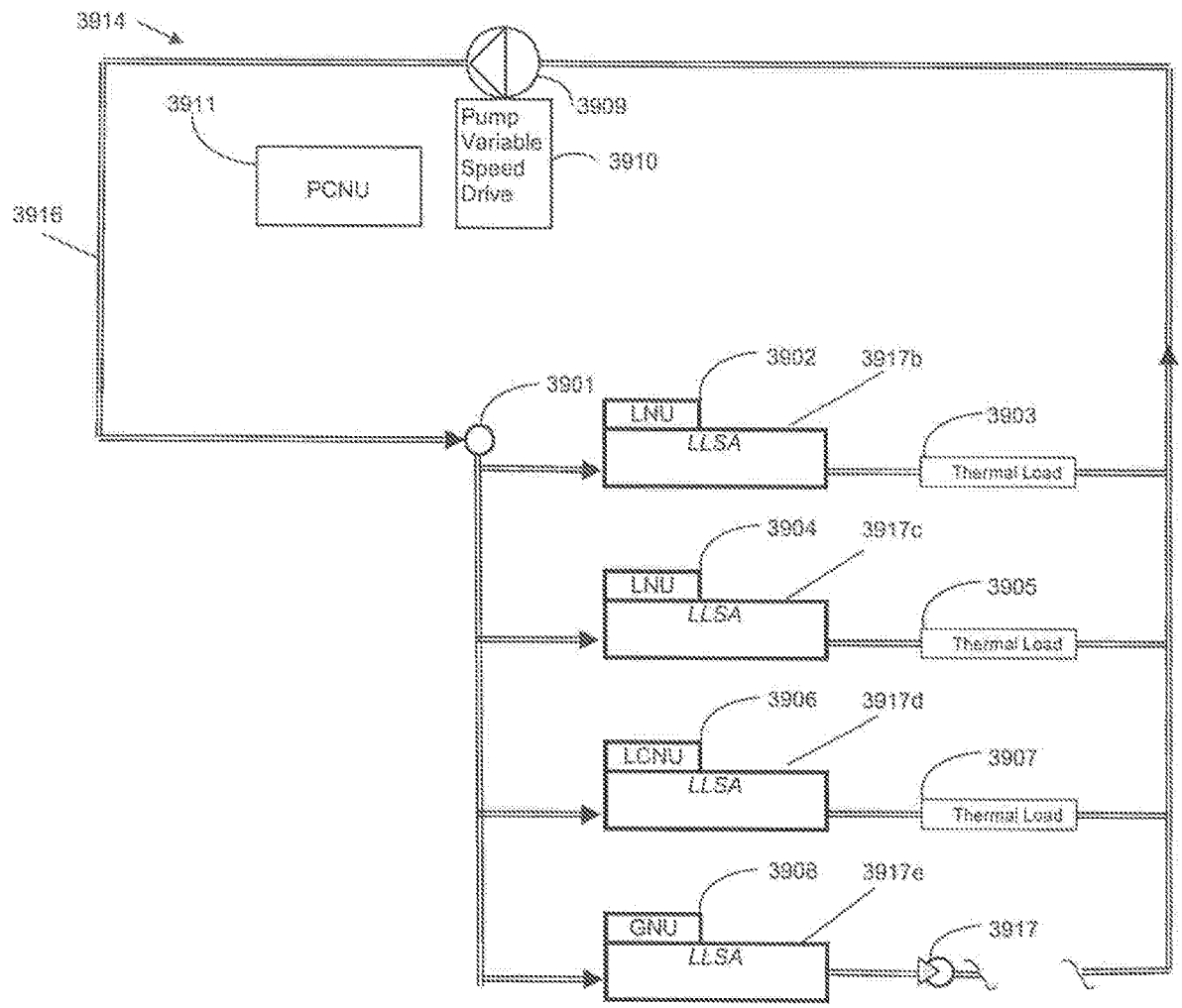
FIG. 39 is a systems drawing showing a distribution system incorporating at least one node unit groups, in accordance with an embodiment of the present invention.

A skilled reader will further recognize that an embodiment of the present invention may be configured as shown in FIG. 39. A fluid distribution system 3914 of the present invention can include a conduit 3916 that may have multiple sections within the fluid distribution system. The fluid distribution system also incorporates one or more nodes 3901, 3917.

The pump 3909 may be connected to a pump variable speed drive 3910. A pump control node unit 3911 may be positioned such that it is incorporated in the distribution system, but is not incorporated within any conduit. (The connection between the pump control node unit and the pump, and the connection between the pump control node unit and one or more other node units is described in more detail herein in reference to FIG. 40.)

In the embodiment of the present invention shown in FIG. 39, node 3901 may have multiple LLSAs 3917a, 3917b, 3917c, 3917d connected to node units that are positioned downstream from node 3901 in any configuration of nodes and node units. All of the downstream node units are connected to the conduit that returns liquid flow to the pump, which is the return conduit. Examples of node units that may be connected to the LLSAs in the embodiment of the present invention shown in FIG. 39 include the following, LLSA 3917a may be connected to load node unit 3902, LLSA 3917b may be connected to load node unit 3904, LLSA 3917c may be connected to load control node unit 3906, and LLSA 3917d may be connected to group node unit 3908.

A load node unit or a load control node unit may be upstream of a thermal load. For example, load node unit 3902 is upstream of thermal load 3903. As another example, load node unit 3904 is upstream of a thermal load 3905. As yet another example, load control node unit 3906 is upstream of thermal load 3907. The flow (being non-virtual flow) conveyed by each load node unit or load control node unit to any downstream thermal load will be a 100% portion of the flow from the load node unit.

Additional downstream node units and nodes may be positioned downstream of node 3917 in any configuration of nodes and node units. For example, one or more node units may be downstream of node 3917. All of the downstream node units are connected to the conduit that returns liquid flow to the pump, which is the return conduit.

As shown in FIGS. 2, 31 and 39, the system may incorporate multiple shared nodes. As shown in FIGS. 31 and 49, it is possible for each of nodes 3102, 3917 to be a shared node for one or more downstream node units in a node unit grouping, and for other shared nodes to be incorporated downstream of such node units, and so on. There may be one shared node or any number of shared nodes within embodiments of the present invention. The number of shared nodes and node units upstream or downstream of each shared node within the system will be determined by the configuration of the system to achieve the specific purpose for which it is developed. For example, the number of shared nodes, the number of node units, and the configuration of node units in relation to shared nodes, in the system may depend on the size, shape and other parameters of a building wherein the fluid distribution system is installed.

As shown in FIG. 2, the group node unit 203 is associated with a LLSA and is positioned upstream of the node 201. The node 201 is positioned upstream of multiple line sections (e.g., where the conduit splits into multiple line sections that may be parallel sections in some embodiments of the present invention). The group node unit 203 serves node 201 positioned downstream of it. The group node unit provide a line pressure loss, in accordance with the operation locus of the group node unit, and/or the operation locus range of the system, as is appropriate to maintaining the total demand fluid flow required by the node units positioned in the conduit line sections downstream of node 201: load node units 204, 206, load control node unit 208, and group node unit 210. Other embodiments of the present invention also function in a similar manner.

Electronic Communications Network

In embodiments of the present invention, information is shared between elements and such information flows along the electronic communications network (ECN). The ECN may be achieved by wired or wireless connections between node units and other elements of the present invention, such as elements that generate information that is provided to a node unit of the present invention, the pump variable speed drive and the pump. Sections of the ECN are positioned between the LLSAs of the system and between the one or more most upstream LLSA(s) and the pump control node unit, and the pump control node unit and the pump via the pump variable speed drive. Multiple forms of information may be transferred along the ECN. There are a variety of configurations for the ECN and the multiple types of information being transferred between elements of the system as individual information streams along the ECN.

An example of one configuration of an ECN of an embodiment of the present invention is shown in FIG. 3 wherein, the flow information is transferred to the pump control node unit 213 by the downstream node unit that has a shared node with the pump in a node unit grouping. For example, the pump control node unit receives information generated by the LLSAs and associated node units that is delivered to the group node unit 203 that has shared node shared node 201 with other downstream node units in a node unit grouping (as shown in FIG. 2). The group node unit processes the information it receives and the processed information is sent to the pump control node unit.

As another example, load unit 217 sends information generated by it and its associated LLSA to the pump control node unit as the pump has a shared node that is node 200 with the downstream load node unit in a node unit grouping (as shown in FIG. 2). The pump control node unit utilizes the received information to analyze such information and perform calculations and assessments to determine how to maintain total target demand flow within the fluid distribution system. Target demand flow may be maintained through the operation of the control loop process that may operate to adjust the position of the balancing valves and other valves of the LLSAs, and to adjust the pump speed.

The service between node units that have a shared node in a node unit grouping is achieved through the transmission of information from the one or more downstream node units to the upstream node unit. As shown in FIG. 2, all of the following node units that are downstream of node 201, that is a shared node, send information to group node unit 203 that is upstream of node 201, namely, load node units 204, 206, load control node unit 208, and group node unit 210.

Examples of the ECN activities of each type of node unit are provided below.

Load Node Units: A load node unit may generate a change report. As shown in FIG. 3, a change report generated by a load node unit may be transmitted to the upstream node unit in the node unit group. For example, load node unit 204 may generate a change report 304 to effect a change to the pressure at the node that is directly upstream of the load node unit (i.e., node 201 that is the shared node in the node unit grouping, as shown in FIG. 2).

The change report generated by a load node unit is based on the then current operation of the load node unit, and specifically the operation locus of the LLSA connected to the load node unit. The change report reflects a need for either; an increase, or a decrease, or a null change,
to the pressure at the node that is directly upstream of the load node unit. The load node unit, as is discussed herein, may transmit its change report to the node unit that is directly upstream of the load node unit and in the node unit group (with a shared node).

For example, load node units 204, 206 may each generate a change report 304, 305 respectively, and each change report is transmitted to group node unit 203. As another example, load node unit 217 may generate a change report 317 that is transmitted to the pump control node unit 213.

Figure 32:
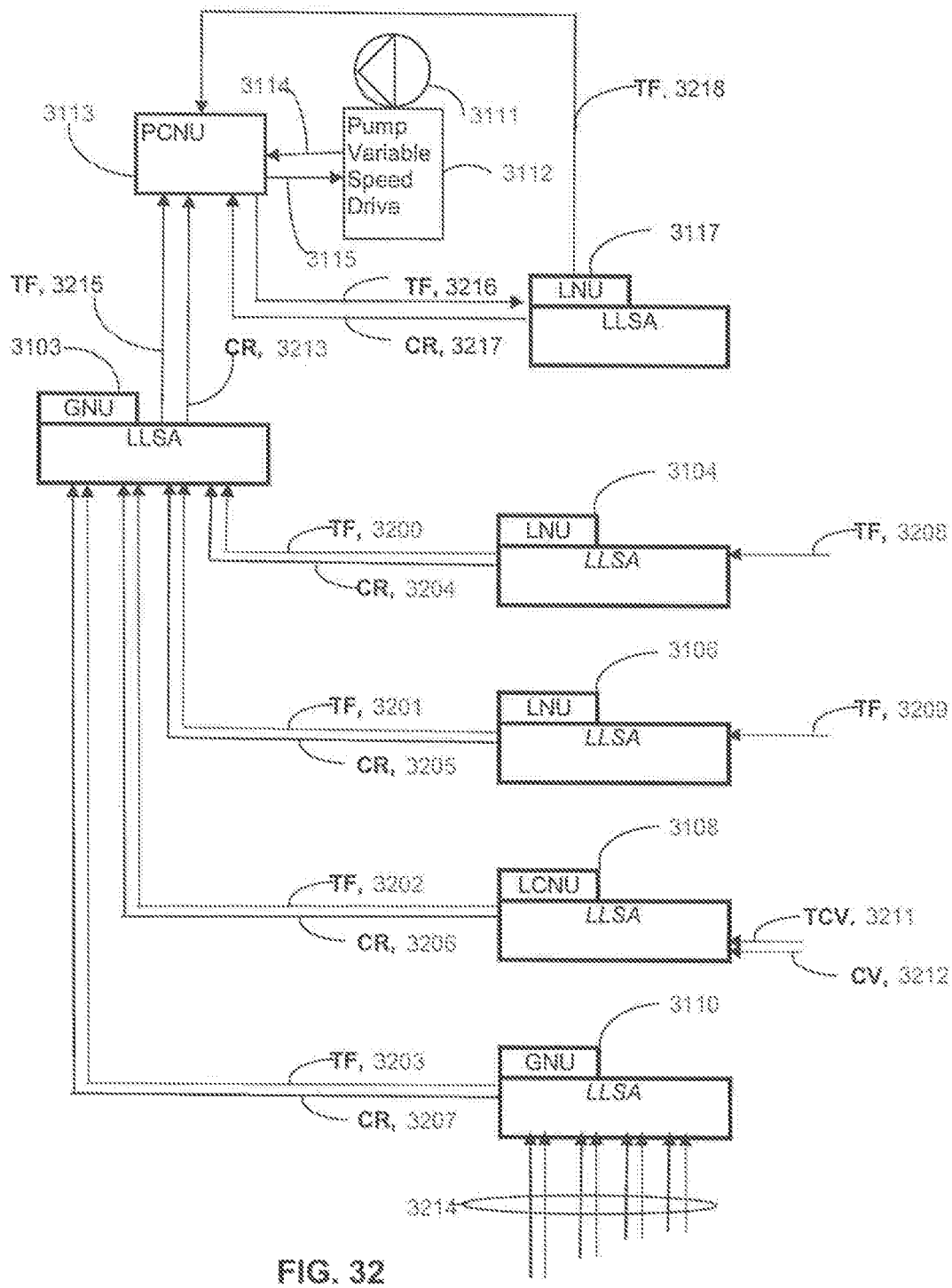
FIG. 32 is a systems drawing showing information sharing in a distribution system (configured in accordance with FIG. 31), between the node units by way of an electronic communication network, in accordance with an embodiment of the present invention.
Figure 40:
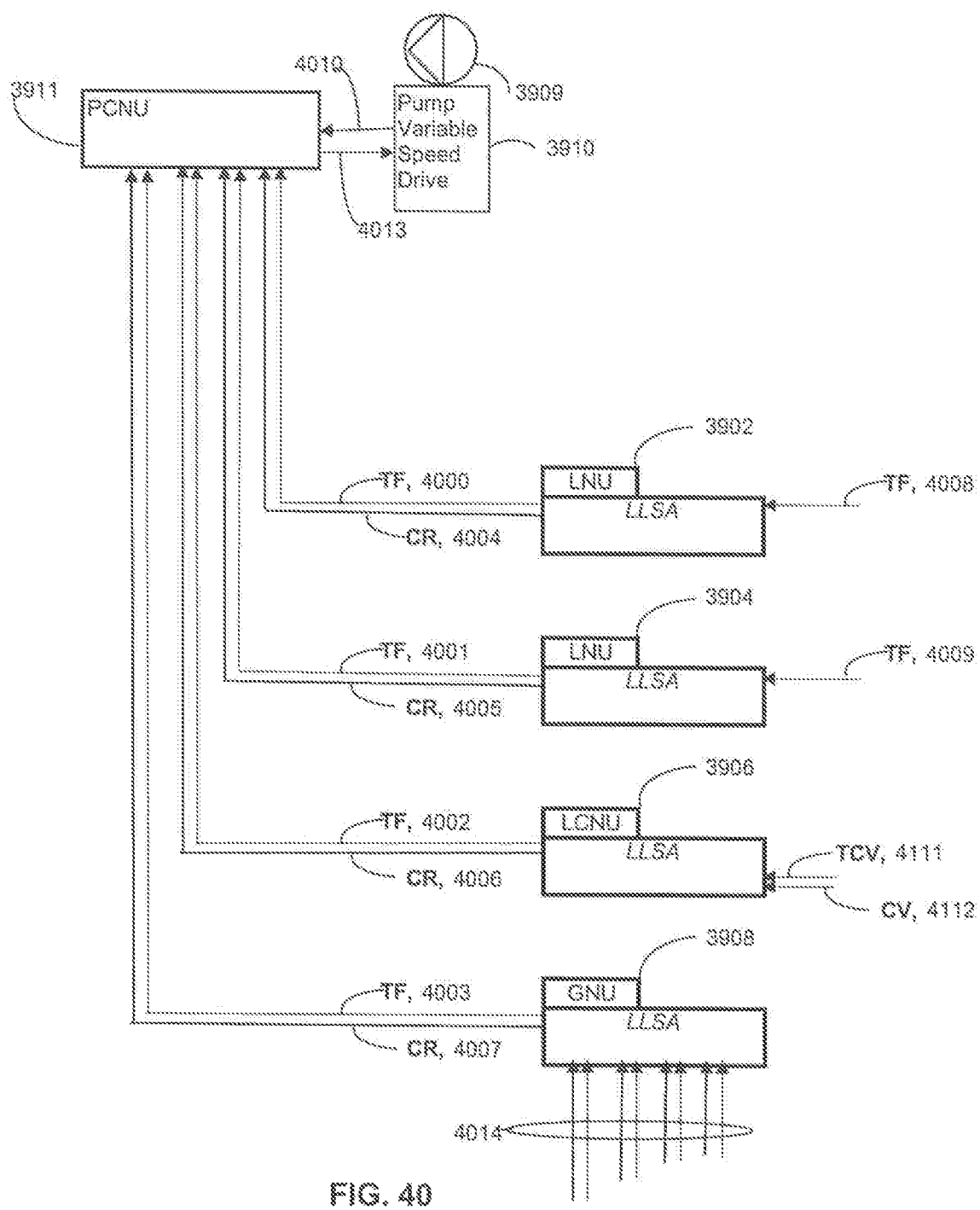
FIG. 40 is a systems drawing showing information sharing in a distribution system (configured in accordance with FIG. 39), between the node units by way of an electronic communication network, in accordance with an embodiment of the present invention.

An another example, as shown in FIG. 32, load node units 3104, 3106 may each generate a change report 3204, 3205, respectively, and each change report is transmitted to group node unit 3103. As another example, load node unit 3117 may generate a change report 3217 that is transmitted to the pump control node unit 3113. An yet another example, as shown in FIG. 40, load node units 3902, 3904 may each generate a change report 4004, 4005, respectively, and each change report is transmitted to pump control node unit 3911.

The load node unit will receive target flow information that is generated as any of the following: a setting provided by the system thermal designer; a target setting or an active virtual variable from another node unit in a secondary distribution section; a target setting or an active virtual variable from a pump control node unit in a primary distribution section; a setting provided by an external third party (such as the operator of the system, the designer of the system, or some other third party who inputs information in the distribution system before the system is initiated and use of the system begins). Target flow information is set based on the target flow that can best serve the system in accordance with the design of the distribution system. Generally the target flow information setting will not be changed unless the operator changes the design of the system. Target flow information is measured in gpm.

The target flow information is necessary for the operation of a load node unit and associated LLSA. The target flow information is transmitted upstream, as discussed herein, and is received by the load node unit, and if received by a group node unit may be utilized by the upstream group node unit to adjust the balancing valve or one or more other valves of its LLSA. The target flow information can also be utilized by the LLSA associated with the load node unit to adjust one or more valves in its LLSA.

The load node unit transmits to the upstream group node unit, or upstream pump control node unit, information relating to target flow that is equal to the target flow information that the load node unit receives. For example, in one embodiment of the present invention the target flow information 308 provided to load node unit 204 is equal to the virtual target demand flow 300 provided to group node unit 203, and target flow information 309 provided to load node unit 206 is equal to the virtual target demand flow 301 provided to group node unit 203. Target flow information 318 is received by load node unit 217 and the load node unit sends virtual target demand flow 316 to pump control node unit 213.

A load node unit may operate within the fluid distribution system to balance the pressure at the directly upstream node. As an example, as shown in FIG. 2, load node unit 204 may operate within the fluid distribution system to balance the node pressure at the directly upstream node 201. The balance of pressure at the directly upstream node will be based on maintaining the virtual target demand flow of the load node unit. For example, as shown in FIG. 3, the balance of pressure at the node directly upstream of load node unit 204 will be based on maintaining the virtual target demand flow 300. Pressure at a node may be balanced when the directly downstream node unit is maintain its virtual target demand flow and all other node units that have the same node as a shared node in a node unit grouping are all maintaining their virtual target demand flow or target flow information, as applicable.

As an example, pressure at node 201 may be achieved when load node unit 204 is maintaining its' virtual target demand flow 300, and all other node units 206, 208, 210 in the node unit group (for which node 201 is a shared node) are all maintaining their virtual target demand flow 301 or target flow information 302, 303 respectively as applicable.

As another example, pressure at node 201 may be achieved when load node unit 206 is maintaining its' virtual target demand flow 301, and all other node units 204, 208, 210 in the node unit group (for which node 201 is a shared node) are all maintaining their virtual target demand flow 300, or target flow information 302, 303 respectively as applicable.

As yet another example, pressure at node 200 may be achieved when load node unit 217 is maintaining its' virtual target demand flow 318.

A load node unit will receive its' target flow information from an external third party source, or from a pump control node unit. For example, as shown in FIG. 3, load node unit 217 receives its target flow information 318 from a thermal load. As another example, load node units 204, 206 receive their target flow information 308, 309 respectively from thermal loads (that may be thermal loads that are secondary distribution sections). As another example, as shown in FIG. 32, load node unit 3117 receives its target flow information 3216 from the pump control node unit 3113.

The load node unit transmits the target flow information upstream. For example, as shown in FIG. 3, the virtual target demand flow 300 of the load node unit 204 is set equal to the received target flow information 308 and is transmitted to the immediate upstream group node unit 203. (As shown in FIG. 2, load node unit 204 and group node unit 203 are in a node unit group with shared node 201.)

Figure 36:
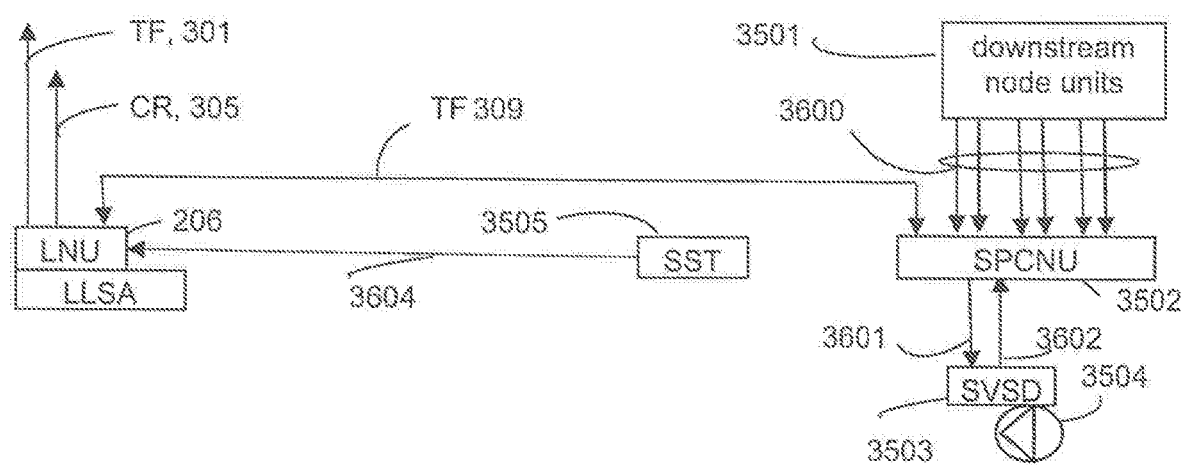
FIG. 36 is a systems drawing showing information sharing in a portion of a distribution system (configured in accordance with FIG. 35), between the node units by way of an electronic communication network, in accordance with an embodiment of the present invention.

As another example, the virtual target demand flow 301 of the load node unit 206 is set equal to the received target flow information 309 and is transmitted to the immediate upstream group node unit 203. (As shown in FIG. 2, load node unit 206 and group node unit 203 are in a node unit group with shared node 201.) The target flow information received by load node unit 206 may be generated by the secondary pump control node unit 3502 in secondary distribution section 215 (as shown in FIG. 36).

As shown in FIG. 32, load node units 3104, 3016 may receive target flow information 3208, 3209 and may generate virtual target demand flows 3200, 3202 that are transmitted to group node unit 3103, in a manner similar to that discussed herein in relation to FIG. 3.

As shown in FIG. 40, load node units 3902, 3904 may receive target flow information 4008, 4009 and may generate virtual target demand flows 4000, 4001 that are transmitted to group node unit 3911, in a manner similar to that discussed herein in relation to FIG. 3.

Load node units convey flow to thermal loads, and provide a line pressure loss to the thermal loads, in accordance with the operation locus of each load node unit and/or the operation locus range of the system, as is appropriate to maintaining the flow indicated by the target flow information required by each of the thermal loads. Actual flow parameters and information is sensed by the flow sensor of the LLSA. The virtual target demand flow that is indicated by the target flow information is maintained through operation of loop control that is operable to reposition the balancing valve and/or other valves of the LLSAs 116b, 116c in accordance with the operation locus of the load node unit.

A load node unit may further be connected to local or remote sensors or probes. For example, an off-board temperature sensor or probe may be connected to the load node unit through a remote conduit or other connection means. (As shown in FIGS. 35 and 36, the sensor or probe, such as a secondary supply temperature (SST) sensor, may be incorporated in a secondary distribution system.) The I/O bus of the LLSA connected to the load node unit may facilitate information gathering from the probe or sensor, and the processor and other elements of the LLSA may undertake processing of such information received from the probe or sensor.

If the sensor or probe provides information that a sensor incorporated in the LLSA also is operable to sense, such as the temperature of the fluid flowing in the conduit, then the results of the sensor in the LLSA and the results of the probe or sensor external to the LLSA may be compared in accordance with the function of the elements of the LLSA, such as the processor. This comparison may be utilized for verification purposes by the system. For example, if the probe or sensor is a temperature probe (such as a SST sensor), the results of the temperature probe (such results being sent as information to the LLSA) may be compared to the results of the temperature sensor in the LLSA. This comparison has the purpose of verifying the operations of the thermal energy transfer between the primary distribution section of the distribution system (where the LLSA is positioned) and the secondary distribution system (where the probe or sensor is connected). This is discussed in more detail in relation to secondary distribution sections herein.

Load Control Node Unit: A load control node unit may generate a change report to effect a change to the pressure at the node that is directly upstream of the load control node unit. The change report generated by the load control node unit is based on the then current operation and the operation locus of the load control node unit. The change report reflects a need for either an increase, a decrease, or a null change to the pressure at node that is directly upstream of the load control node unit. The load control node unit may transmit the change report to the group node unit that is directly upstream of an upstream shared node of the load control node unit in a node unit grouping. For example, load control node unit 208 may generate a change report 306 to effect a change to the pressure at node 201 (as shown in FIG. 2 to be directly upstream of the load control node unit 208). The change report generated by the load control node unit 208 is based on the then current operation and the operation locus of the load control node unit 208. The change report reflects a need for either an increase, a decrease, or a null change to the pressure at node 201 that is directly upstream of the load control node unit 208. As shown in FIG. 3, the load control node unit 208 may transmit the change report 306 to the group node unit 203 that is directly upstream of the load control node unit in a node unit group has a shared node (i.e., node 201 as shown in FIG. 2).

As another example, as shown in FIG. 32, load control node unit 3108 may generate a change report 3206 to effect a change to the pressure at node 3101 (as shown in FIG. 31 to be directly upstream of the load control node unit 3108), and send the change report to group node unit 3103. As yet another example, as shown in FIG. 40, load control node unit 3906 may generate a change report 4006 to effect a change to the pressure at node 3901 (as shown in FIG. 39 to be directly upstream of the load control node unit 3906), and send the change report to pump control node unit 3911.

Virtual target controlled variable setting information and/or controlled variable information is sent to a load control node unit. The load control node unit utilizes the virtual target controlled variable setting information and/or the controlled variable information to produce target flow information, as is discussed herein.

The load control node unit transmits the target flow information to the upstream group node unit, or to the pump control node unit.

For example, as shown in FIG. 3, virtual target controlled variable setting information 310 and/or controlled variable information 311 is transferred to load control node unit 208. (As shown in FIG. 2, group node unit 203 has a shared node 201 with load control node unit 208 in a node unit group.) The virtual target controlled variable setting information 310 and/or controlled variable information 311 is utilized by the load control node unit 208 to produce target flow information 302. The load control node unit 208 sends target flow information 302 to group node unit 203.

As another example, as shown in FIG. 32, virtual target controlled variable setting information 3211 and/or controlled variable information 3212 is transferred to load control node unit 3108. (As shown in FIG. 31, group node unit 3103 has a shared node 3101 with load control node unit 3108 in a node unit group.) The virtual target controlled variable setting information 3211 and/or controlled variable information 3212 is utilized by the load control node unit 3108 to produce target flow information 3202. The load control node unit 3108 sends target flow information 3202 to group node unit 3103.

As another example, as shown in FIG. 40, virtual target controlled variable setting information 4011 and/or controlled variable information 4012 is transferred to load control node unit 3906. (As shown in FIG. 39, pump 3909 has a shared node 3901 with load control node unit 3906 in a node unit group.) The virtual target controlled variable setting information 4011 and/or controlled variable information 4012 is utilized by the load control node unit 3906 to produce target flow information 4002. The load control node unit 3906 sends target flow information 4002 to pump control node unit 3911.

The load control node unit may monitor the controlled variable information it receives and utilize a dedicated loop control module or a loop control process to maintain the controlled variable information at the virtual target controlled variable setting information by adjustment of the balancing value of the LLSA attached to the load control node unit, in accordance with the operation locus of the load control node unit and the operation of the valve of the LLSA (that may be a motorized valve). Specifically, the output port of the LLSA that is connected to the I/O Bus receives the controlled variable information. The virtual target controlled variable setting information may be provided by the building operator, system designer, or another party. The communication port of the LLSA receives the virtual target controlled variable setting information. Through operation of loop control to maintain the controlled variable information at a setting that is consistent with the virtual target controlled variable setting information the target flow information is generated.

As an example, as shown in FIG. 3, load control node unit 208 may monitor the controlled variable information 311 it receives and utilize a dedicated loop control module or loop control process to maintain the controlled variable information at the virtual target controlled variable setting information. The balancing value 109 (as shown in FIG. 1) of the LLSA attached to the load control node unit 208 is adjusted in accordance with the operation locus of the load control node unit 208 and the operation of the valve 112 (as shown in FIG. 1) of the LLSA (that may be a motorized valve).

As shown in FIG. 1 the output port 106 of the LLSA connected to the I/O Bus 107 receives the controlled variable information from the load control node unit. The virtual target controlled variable setting information may be provided by the building operator or another party. The communication port 114 of the LLSA receives the virtual target controlled variable setting information. Through operation of loop control processes to maintain the controlled variable information at a setting that is consistent with the virtual target controlled variable setting information, the target flow information is generated.

As an example, as shown in FIGS. 2 and 3 a load control node unit 208 may operate within the fluid distribution system to balance the node pressure at node 201 that is directly upstream of the load control node unit 208, based on maintaining the target flow information 302 of the load control node unit 208. Pressure at node 201 will be balanced when the load control node unit is maintaining its' target flow information 302, and all other node units 204, 206, 210 in the node grouping (that have node 201 as a shared node) are all maintaining their virtual target demand flows 300, 301, and target flow information 303, respectively, as applicable. The load control node unit 208 generates its' target flow information 302. A load control node unit 208 utilizes loop control, to maintain the target flow information 302 by adjustment of the balancing valve of the LLSA within the operation locus of the load control node unit 208. The target flow information 302, of the load control node unit 208 is transmitted to the directly upstream group node unit 203 in the node unit grouping that has node 201 as a shared node (as shown in FIG. 2). This transmission is performed via the ECN.

A load control node unit may have an optional feature that provides a measurement of temperature of the fluid flow passing through the LLSA attached to the load control node unit (i.e., along flow line 103 as shown in FIG. 1). For example, a temperature probe 117 and the I/O Bus 107 facilitate the measurement of the temperature of the fluid. This measured temperature is of value in some embodiments of the present invention.

A load control node unit may have an optional feature that provides to it measurement of an off-board independent temperature of the fluid flow through a remote conduit of the distribution system, or measurement of an independent temperature probe that monitors temperature of a medium related to the performance of the thermal load. An independent temperature probe may be measured via the I/O bus of the LLSA to information such a measurement. This measured temperature is of value in some embodiments of the present invention.

The load control node unit will utilize one or both of the following:

(a) A thermostat reading—the virtual target controlled variable setting information being based upon a thermostat reading. The thermostat will generate a control variable that is the actual temperature, a set target temperature that is the virtual target temperature, and a differential signal that relating to the difference between the actual temperature and the target temperature. The differential signal is sent as the virtual target controlled variable setting information to the LLSA connected to the load control node unit, and it is received in accordance with the function of the output port connected to the I/O Bus of the LLSA.

The virtual target controlled variable setting information is utilized by the LLSA and the load control node unit connected thereto, to reposition the balancing valve and/or other valves of the LLSA to adjust the flow. Thermostats are not specifically shown in the drawings herein, but a skilled reader will recognize that there may be one or more thermostats in a building operable to transmit information to one or more of the node units in the system. Virtual target controlled variable setting information is a percentage of the virtual target design flow and indicates the percentage of flow based on the virtual target design flow required to keep the flow within the system balanced, based on operating conditions (e.g., warmer weather, etc.). The virtual target controlled variable setting information may be less than the virtual design target flow. The differential signal indicates the volts required that represent the percentage of the total design flow; or (b) A control variable—the control variable being controlled variable information, such as may be based upon a thermometer reading of actual temperature in an area of the building, and a target temperature that is set by the operator or designer of the system before the system is initiated and begins to function. The controlled variable information indicates the difference between the actual and target temperatures.

The LLSA utilizes the virtual target controlled variable setting information and/or the controlled variable information to produce target flow information. The target flow information will always be equal to or less than target design flow. The load control node unit further operates to maintain the controlled variable information to be consistent with the virtual target controlled variable setting information by adjustment of the balancing valve of the LLSA of the load control node unit, and operation of the motorized valve of the LLSA, by way of a control loop process. This operation of the load control node unit has the effect of balancing pressure at the node directly upstream of the load control node unit. The pressure at that node may be balanced when the load control node unit is maintaining its target flow information, in accordance with the operation locus of the load control node unit.

A load control node unit may further receive information from a probe or sensor that may be located within or outside of the building wherein the fluid distribution system is located. The probe or sensor may be related to the performance of the thermal load that is downstream of the load control node unit. (The thermal load downstream of the load control node unit may be a secondary distribution section, as shown in FIG. 41.) The information may be received from the probe or sensor by the function of the I/O Bus of the LLSA that is connected to the load control node unit. The information received by the probe or sensor may be processed by the load control node unit and utilized in the generation of the target flow information by the load control node unit, and/or the adjustment of the balancing valve or other valves of the LLSA connected to the load control node unit.

Group node units: A group node unit may generate an internal change report to effect a change to the pressure at the node directly upstream of the group node unit. The internal change report generated by the group node unit may be based on its operation locus. The change report will indicate a need for an increase, a decrease, or a null change to the pressure at the node that is immediately upstream of the group node unit. The group node unit receives change reports from the downstream nodes units in the node unit grouping. The group node unit processes the received change reports and the internal change report it generates to produce a net change report that is transmitted upstream as a change report. (For example, the group node unit may consolidate the change reports received from the downstream node units in the node unit grouping with its own internal change report to produce the net change report that it will transmit upstream as a change report.) The group node unit processes information and transmits such information to an upstream node unit via the ECN.

As an example, group node unit 203 may generate an internal change report to effect a change to the pressure at node 200 (that is directly upstream of the group node unit 203). The internal change report generated by group node unit 203 may be based on its operation locus. The change report will indicate a need for an increase, a decrease, or a null change to the pressure at node 200 (that is immediately upstream of the group node unit 203). Group node unit 203 receives change reports 304, 305, 306, 307 from the downstream nodes in the node unit grouping with the group node unit (i.e., load node units 204, 206, load control node unit 208, and group node unit 210). Group node unit 203 processes the change reports it receives and the internal change report it generates to produce a change report 314 to be transmitted upstream to the pump control node unit 213.

As another example, group node unit 210 may generate an internal change report to effect a change to the pressure at node 201 (that is directly upstream of the group node unit 210). The internal change report generated by the group node unit 210 may be based on the operation locus of group node unit 210. The change report will indicate a need for an increase, a decrease, or a null change to the pressure at node 201 (that is immediately upstream of the group node unit 210). The group node unit 210 receives change reports 313 from the downstream nodes in the node unit group with the group node unit. The group node unit 210 processes the change reports 313 it receives and the internal change report it generates to produce a change report 307 (that is a net change report) to be transmitted upstream to group node unit 203.

As yet another example, as shown in FIG. 32, group node units 3103, 3110 may generate internal change reports as well as change reports 3213, 3207, respectively, to be sent upstream to pump control node unit 3113 and group node unit 3103, respectively. The change report 3207 generated by group node unit 3110 may be based upon its internal change report and the change reports in the information 3214 it receives from one or more downstream node units that are in a node unit grouping with group node unit 3110.

As still another example, as shown in FIG. 40, group node unit 3908 may generate an internal change report. It may also generate a change report 4007 based upon its internal change report and the change reports in the information 4014 it receives from one or more downstream node units that are in a node unit grouping with group node unit 3908. Change report 4007 is sent upstream to pump control node unit 3911.

Virtual target demand flow and/or target flow information may be transferred to a group node unit from the one or more downstream node units that have a shared node with the group node unit in a node unit grouping. The virtual target demand flow and/or target flow information received by the upstream group node unit from the one or more downstream node units is processed by the upstream group node unit to product target flow information that will be sent upstream by the group node unit.

For example, as shown in FIG. 3, virtual target demand flow 300, 301, and/or target flow information 302, 303 is transferred to upstream group node unit 203 from the downstream load node unit 204, load node unit 206, load control node unit 208 and group node unit 210 respectively. (All of load node units 204, 206, load control node unit 208, and group node units 210 have shared node 201 with the group node units 203 in a node unit grouping.) Group node unit 203 processes the virtual target demand flow and/or target flow information it receives from each of the downstream node units and it send the target flow information that is the result of such processing upstream to the pump control node unit 213. (Group node unit 203 has shared node 200 with the pump in a node unit grouping.)

Flow (i.e., flow of fluid in the lines) is conveyed from a group node unit to the node units that are directly downstream of the group node unit, such that each downstream node unit receives a portion of the flow emitted by the group node unit. For example, as shown in FIG. 2, group node unit 203 conveys flow (that is non-virtual flow) through node 201 and to load node units 204, 206, load control node unit 208, and group node unit 210 that are each downstream of group node unit 203. Each of load node units 204, 206, load control node unit 208, and group node unit 210 receives a portion of the flow from group node unit 203. A skilled reader will recognize that group node unit 210 may convey flow to one or more node units that are downstream of group node unit 210, and any group node units downstream of group node unit 210 may further convey flow to other downstream node units, and so on through the configuration of the node units in the distribution system.

A group node unit may operate within the fluid distribution system to balance the node pressure at the node that is directly upstream of the group node unit, as required to maintain the target flow information that is generated by the group node unit based upon the virtual target demand flow and/or target flow information received by the group node unit from downstream node units. Node pressure may be balanced when the group node unit is maintaining its target flow information and any load node unit that has a shared node that is upstream of the group node unit is maintaining its virtual target demand flow.

For example, as shown in FIG. 3, group node unit 203 may operate within the fluid distribution system to balance the node pressure at node 200 that is directly upstream of the group node unit 203, as required to maintain the target flow information 315 that is generated by the group node unit 203 based upon the virtual target demand flow 300, 301 and/or target flow information 302, 303 received by the group node unit 203 from node units that are downstream of group node unit 203 (i.e, load node units 204, 206, load control node unit 208, and group node unit 210). Pressure at node 200 may be balanced when the group node unit 203 is maintaining its target flow information 315 and load node unit 217 that has node 200 as a shared node is maintaining its virtual target demand flow 316.

As another example, group node unit 210 may operate within the fluid distribution system to balance the node pressure at node 201 that is directly upstream of the group node unit 210, as required to maintain the target flow information 303 that is generated by the group node unit 210 based upon the virtual target demand flow/target flow information 312 received by group node unit 210 from node units that are downstream of group node unit 210 and in a node unit group with group node unit 210. Pressure at node 201 may be balanced when the group node unit 210 is maintaining its target flow information 303, and load node units 204, 206, and load control node unit 208 (i.e., all the other node units that have node 201 as a shared node) are maintaining their virtual target demand flow 300, 301 and target flow information 302, respectively as applicable.

A group node unit may generate its target flow information as equal to the sum total of all of the virtual target demand flow and/or target flow information that it receives from downstream node units in its node unit grouping. The target flow information generated by the group node unit is transmitted via the ECN by the group node unit to an upstream node unit that is in a node unit group with the group node unit and has a shared node that is upstream of the group node unit. The group node unit utilizes loop control to maintain the target flow information of the group node unit by adjusting the balancing valve of the LLSA connected to the group node unit in accordance with the operation locus of the group node unit.

For example, as shown in FIG. 3, group node unit 203 generates its target flow information 315 as equal to the sum total of all the virtual target demand flows 300, 301 and target flow information 302, 303 it receives from the downstream node units in the node unit grouping with the group node unit. The target flow information 315 generated by the group node unit 203 is transmitted to the upstream pump control node unit 213 that is in the node unit grouping with the group node unit. The group node unit 203 utilizes loop control to maintain its target flow information, by adjusting the balancing valve of the LLSA connected to the group node unit in accordance with the operation locus of group node unit 203.

As another example, group node unit 210 generates its target flow information 303 as equal to the sum total of all the virtual target demand flows/target flow information 312 it receives from the downstream node units in the node unit grouping with the group node unit. The target flow information 303 generated by the group node unit 210 is transmitted to the upstream group node unit 203 that is in the node unit grouping with the group node unit 210. The group node unit 210 utilizes loop control processes to maintain its target flow information, by adjusting the balancing valve of the LLSA connected to the group node unit in accordance with the operation locus of group node unit 210.

As yet another example, as shown in FIG. 32, group node unit 3103 may generate target flow information 3215, as equal to the sum total of all the virtual target demand flows 3200, 3201 and/or target flow information 3202, 3203 it receives from the downstream node units in the node unit grouping with group node unit 3103. The target flow information 3215 generated by the group node unit 3103 is transmitted to the upstream pump control node unit 3113. Group node unit 3110 may generate target flow information 3203, as equal to the sum total of all the virtual target demand flows and/or target flow information it receives as information 3214 from the downstream node units in the node unit grouping with group node unit 3110. The target flow information 3203 generated by the group node unit 3110 is transmitted to the upstream group node unit 3103. The group node units 3103, 3110 each utilize loop control processes to maintain its target flow information, by adjusting the balancing valve of the LLSA connected to the group node unit in accordance with the operation locus of the group node unit.

As still another example, as shown in FIG. 40, group node unit 3908 may generate target flow information 4003, as equal to the sum total of all the virtual target demand flows and/or target flow information it receives as information 4014 from the downstream node units in the node unit grouping with group node unit 3908. The target flow information 4003 generated by the group node unit 3908 is transmitted to the upstream pump control node unit 3911. The group node unit 3908 utilizes loop control processes to maintain its target flow information, by adjusting the balancing valve of the LLSA connected to the group node unit in accordance with the operation locus of the group node unit.

Pump Control Node Unit: The pump control node unit may receive information from the pump variable speed drive, such as information relating to the speed at which the pump is operating, as pump signals. As an example, as shown in FIG. 32, the pump control node unit 3113 may receive pump signals 3114 from the pump variable speed drive 3112 that is connected to the pump 3111. As another example, as shown in FIG. 40, the pump control node unit 3911 may receive pump signals 4010 from the pump variable speed drive 3910 that is connected to the pump 3909.

Target flow information is transferred to a pump control node unit from the one or more downstream node units that have a shared node with the pump in a node unit grouping. For example, as shown in FIG. 3, target flow information 315 is transferred to pump control node unit 213 from the downstream group node unit 203, and target flow information 316 is transferred to pump control node unit 213 from the downstream load node unit 216. (Both group node unit 203 and load node unit 217 have a shared node 200 with the pump 211 in two separate node unit groupings.)

There are two methods whereby target flow information may be utilized by a pump control node unit, as follows:

1) a pump control node unit may compare all of the target flow information and/or virtual target demand flow that it receives from one or more downstream node units with the virtual target flow setting that the designer of the distribution system, or another third party, provided for the pump control node unit, as discussed herein. The differential between the virtual target flow setting (provided by the system designer or other third party) and the target flow information (that the pump control node unit receives) may be determined by the pump control node unit. The differential may be sent as target flow information to a load node unit that is directly downstream of the pump. The load node unit that receives the target flow information from the pump control node unit may utilize this to generate a required flow differential.

For example, as shown in FIG. 32, pump control node unit 3113 may receive target flow information 3215 from group node unit 3103 (group node unit 3103 has shared node 3100 with the pump 3111 in a node unit grouping), and virtual target demand flow 3218 from load node unit 3117 (load node unit 3117 is directly downstream of the pump 3111).

The pump control node unit may compare the target flow information and/or the virtual target demand flow it receives with the virtual target flow setting provided by the designer or another third party. In some embodiments of the present invention the pump control node unit may process the sum of the target flow information and/or virtual target demand flow it receives and compare this sum with the virtual target flow setting provided by the designer or another third party. Based upon the comparison of the either the target flow information and/or virtual target demand flow, or a sum of the target flow information and/or virtual target demand flow, with the virtual target flow setting, the pump control node unit will generate a differential that is target flow information.

For example, the pump control node unit 3113 sends target flow information 3216 to load node unit 3117. Load node unit 3117 will utilized the target flow information 3216 to generate a fluid flow differential.

2) a pump control node unit generates a differential flow target setting equal to the maximum virtual target flow setting (defined by the designer of the distribution system or some other third party, as discussed herein), less the sum of the target flow information and/or virtual target demand flow that the pump control node unit receives (via the ECN) from the one or more node units that are either directly downstream of the pump or that have a shared node with the pump. The differential flow target setting may be transmitted to a load node unit operating in a primary distribution section of the distribution system (that is a constant flow primary distribution section) and may provide a bypass flow path when the primary distribution section is for some valid reason less than the virtual target flow setting (defined by the designer or some other third party, as discussed herein). Within the distribution system the primary distribution section may be constant flow, while one or more secondary distribution sections are variable flow.

In another embodiment of the present invention, the differential flow target setting may be transmitted to a load node unit operating in a primary distribution section that is variable flow and may provide a bypass flow path when the flow of the primary distribution section is less than a minimum virtual target flow setting defined by the designer of the distribution system (or another third party, as discussed herein).

As an example, as shown in FIG. 32, a pump control node unit 3113 generates a differential flow target setting as target flow information 3216, the differential flow target setting is equal to the maximum virtual target flow setting less the sum of the target flow information and/or the virtual target demand flow that the pump control node unit receives (via the ECN) from load node unit 3117 that is directly downstream of the pump 3111 and group node unit 3103 that is downstream of node 3100 that is a shared node with the pump in a node unit grouping. The differential flow target setting may be transmitted to a load node unit 3117 as target flow information 3216, and as load node unit 3117 is operating in a primary distribution section that is constant flow, the target flow information 3216 may provide a bypass flow path when the flow of the primary distribution section is, for some valid reason, less than the virtual target flow setting defined by the designer (or some other third party, as discussed herein).

The target flow information 3216 may be further transmitted to a load node unit 3117 operating in a primary distribution section that is variable flow, and load node unit 3117 may provide a bypass flow path when the flow of the primary distribution section is less than a minimum virtual target flow setting (defined by the designer of the distribution system or some other third party, as discussed herein).

The pump control node unit is operable to generate and transmit target flow settings via the ECN to the pump variable speed drive. The pump variable speed drive utilizes this information to adjust the speed of the pump. The pump control node unit receives a maximum virtual target flow setting (that is defined by an operator, such as the designer of the fluid distribution system or another third party, as discussed herein). The maximum virtual target flow setting is generally set before the system begins to function, and is generally not altered once the system is functioning.

The pump control node unit receives virtual target demand flow and/or target flow information from the one or more node units that are either directly downstream of the pump, or that have a shared node with the pump. For example, as shown in FIG. 3, pump control node unit 213 receives virtual target demand flow 316 from load node unit 217, and target flow information 315 from group node unit 203. (Load node unit 217 and group node unit 203 each have node 200 as a shared node with the pump in separate node unit groupings.) The pump control node unit 213 is operable to transmit information to the pump variable speed drive 212 that is connected to the pump 211.

As another example, as shown in FIG. 32, pump control node unit 3113 receives virtual target demand flow 3218 from load node unit 3117 and target flow information 3215 from group node unit 3103. (Group node unit 3103 has node 3100 as a shared node with the pump, and load node unit 3117 is directly downstream of the pump 3111.) The pump control node unit 3113 is operable to transmit information, such as target flow setting 3115, to the pump variable speed drive 3112 that is connected to the pump 3111.

As yet another example, as shown in FIG. 40, pump control node unit 3911 receives virtual target demand flow 4000, 4001 from load node units 3902, 3904, respectively, target flow information 4002 from load control node unit 3906, and target flow information 4003 from group node unit 3908. (Each of load node units 3902, 3904, load control node unit 3906, and group node unit 3908 have node 3901 as a shared node with the pump 3909 in a node unit grouping.) The pump control node unit 3911 is operable to transmit information, such as target flow setting 4013 to the pump variable speed drive 3910 that is connected to the pump 3909.

A pump control node unit may receive change reports from one or more node units that are either directly downstream of the pump, or that have a shared node with the pump in a node unit grouping, such as a downstream group node unit and/or load node unit. The pump control node unit may incrementally adjust the target speed setting of the pump based on the change reports it receives.

For example, as shown in FIG. 3, the pump control node unit 213 may receive a change report 314 from group node unit 203, and a change report 317 from load node unit 217. The pump control node unit 213 may transmit information to incrementally adjust the target speed setting of the pump to the pump variable speed drive 212 that is connected to the pump 211.

As another example, as shown in FIG. 32, the pump control node unit 3113 may receive a change report 3213 from group node unit 3103, and a change report 3217 from load node unit 3117. The pump control node unit 3113 may transmit information to incrementally adjust the target speed setting of the pump to the pump variable speed drive 3112 that is connected to the pump 3111.

As yet another example, as shown in FIG. 40, the pump control node unit 3913 may receive change reports 4004, 4005, 4006, 4003, from load node units 3902, 3904, load control node unit 3906, and group node unit 3908, respectively. The pump control node unit 3911 may transmit information to incrementally adjust the target speed setting of the pump to the pump variable speed drive 3910 that is connected to the pump 3909.

All Node Units: Node units of the present invention are also operable to generate change reports and to transfer change reports via the ECN to upstream node units of the system that have a shared node with the transmitting node unit in a node unit grouping, or directly to the pump control node unit if there is no upstream shared node. The change reports are generated by each LLSA and node unit associated therewith.

For example, as shown in FIG. 1, an LLSA and the node unit associated therewith may generate a change report based on the real-time current operation of the balancing valve 109 and the balancing valve position 108, the current differential in flow between the target flow settings information received by a node unit, and the actual flow that is measured by the flow sensor 113 of the LLSA.

There are three types of change reports that can be generated: a change report with CR-change set to INC and CR-value set to a numeric value that reflects the present status of the line pressure loss (in accordance with the operation locus); a change report with CR-change set to DEC and CR-value set to a numeric value that reflects the present status of the line pressure loss; and a change report with CR-change set to NULL and CR-value (i.e. the locus position) set to a numeric value that reflects the present status of the line pressure loss relating to the operation locus. An INC report indicates that an increase in pressure is required, a DEC report indicates that a decrease in pressure is required, and a NULL report indicates that no change in pressure is required at the node that is upstream from the node unit that generates the change report.

As an example, as shown in FIG. 3, change report information 304, 305, 306, 307 from downstream node units (e.g., load node units 204, 206, load control node unit 208, and group node unit 210, respectively) can be transferred from the LLSAs connected to each of such node units, to an upstream LLSA and associated node unit, such as a group node unit 203. The group node unit that receives the change reports may also generate a change report relating to itself. The group node unit will consolidate the received change reports with its own change report, as discussed in more detail herein, to generate a change report that is a net change report reflecting its own change report information and that of each of the downstream node units with which it has a shared node in a node unit grouping. The group node unit can then transfer the change report that is a net change report to the upstream node unit that has an upstream shared node with the group node unit in a node unit grouping. For example, group node unit 203 transfers the change report 313 that it generates (that is a net change report) to upstream pump control node unit 213.

The upstream node unit to which the change report (that is a net change report) is sent by a group node unit may be another group node unit or the pump control node unit.

As an example of the transfer of change report information, group node unit 210 generates change report information 307 and transfers the change report information to the LLSA directly upstream from group node unit 210 and the change report information is thereby provided to the group node unit 203 and associated LLSA. Group node unit 203 generates change report information 313 and transfers this change report information 313 to the pump control node unit 213. The pump control node unit will act upon the change report information 313 it receives by sending a pump control node unit signal 215 (a "PCNU signal") that is either NULL signal or INC/DEC signal to the pump variable speed drive 212. The pump variable speed drive will react to the PCNU signal by altering the speed of the pump 211 or keeping the pump speed constant. If the change report information 313 contains a CR-change set to INC or DEC the INC/DEC signal is sent to the pump variable speed drive 212 and the speed of the pump 211 is altered in accordance with the change information in the signal. If the change report information 313 contains a CR-change set to NULL the NULL signal is sent to the pump variable speed drive 212 and the speed of the pump 211 is not altered.

The pump variable speed drive may send a pump signal or other information relating to the pump function to the pump control node unit.

The pump of the primary distribution section of the fluid distribution system, generates the pressurization of the fluid within the fluid distribution system. A variety of pumps may be incorporated in embodiments of the present invention, as the pump may be selected to accommodate the maximum total design flow for the fluid distribution system. The function of the pump may be controlled by a pump variable speed drive that provides conditioned operating power to the pump and is connected to the pump. The pump variable speed drive may permit variations of the speed of the pump in accordance with externally sourced signals. Variation of the pump speed alters the pressure at the nodes in the fluid distribution system. The pump control node unit provides the externally sourced signals to the pump variable speed drive, such as target flow information, and the signals are utilized to determine the speed to which the pump speed should be varied in accordance with a manual setting, or in accordance with an automatic adjustment by the node balancing system based upon the change reports.

Figure 15:
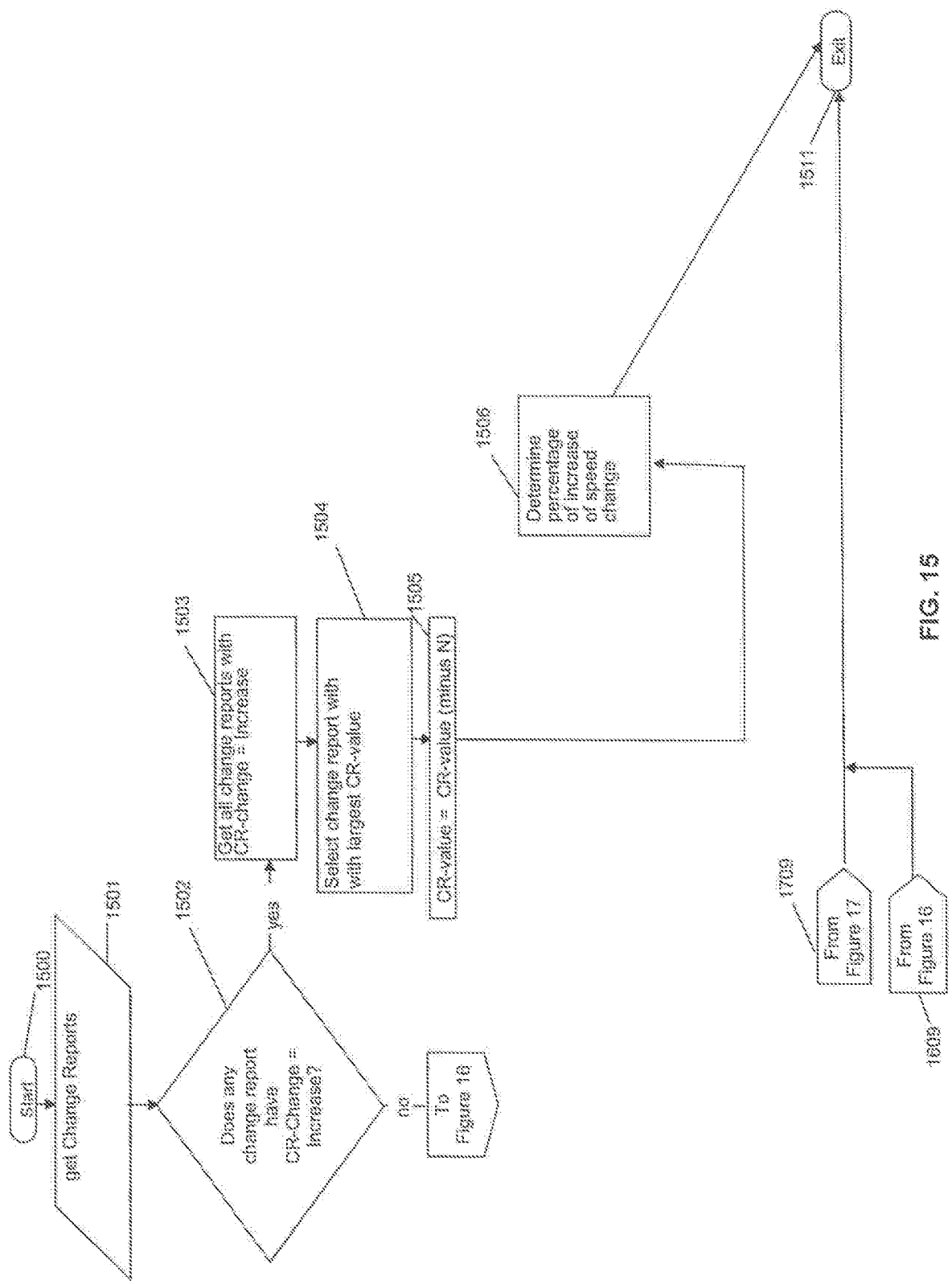
FIG. 15 is a flow chart of a pump control node unit speed change process, in accordance with an embodiment of the present invention.
Figure 16:
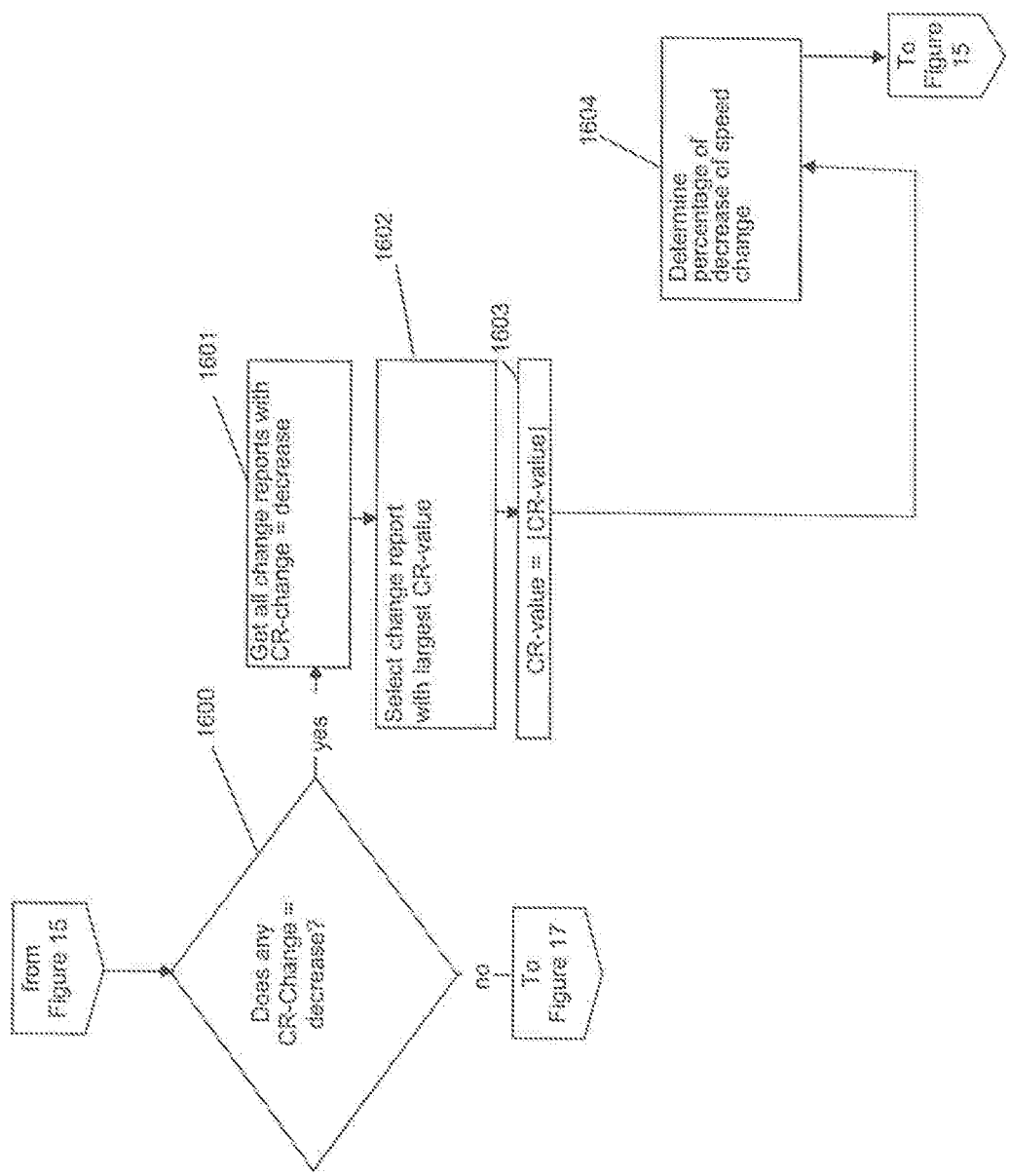
FIG. 16 is a flow chart of a pump control node unit speed change process continuing from FIG. 15, in accordance with an embodiment of the present invention.
Figure 17:
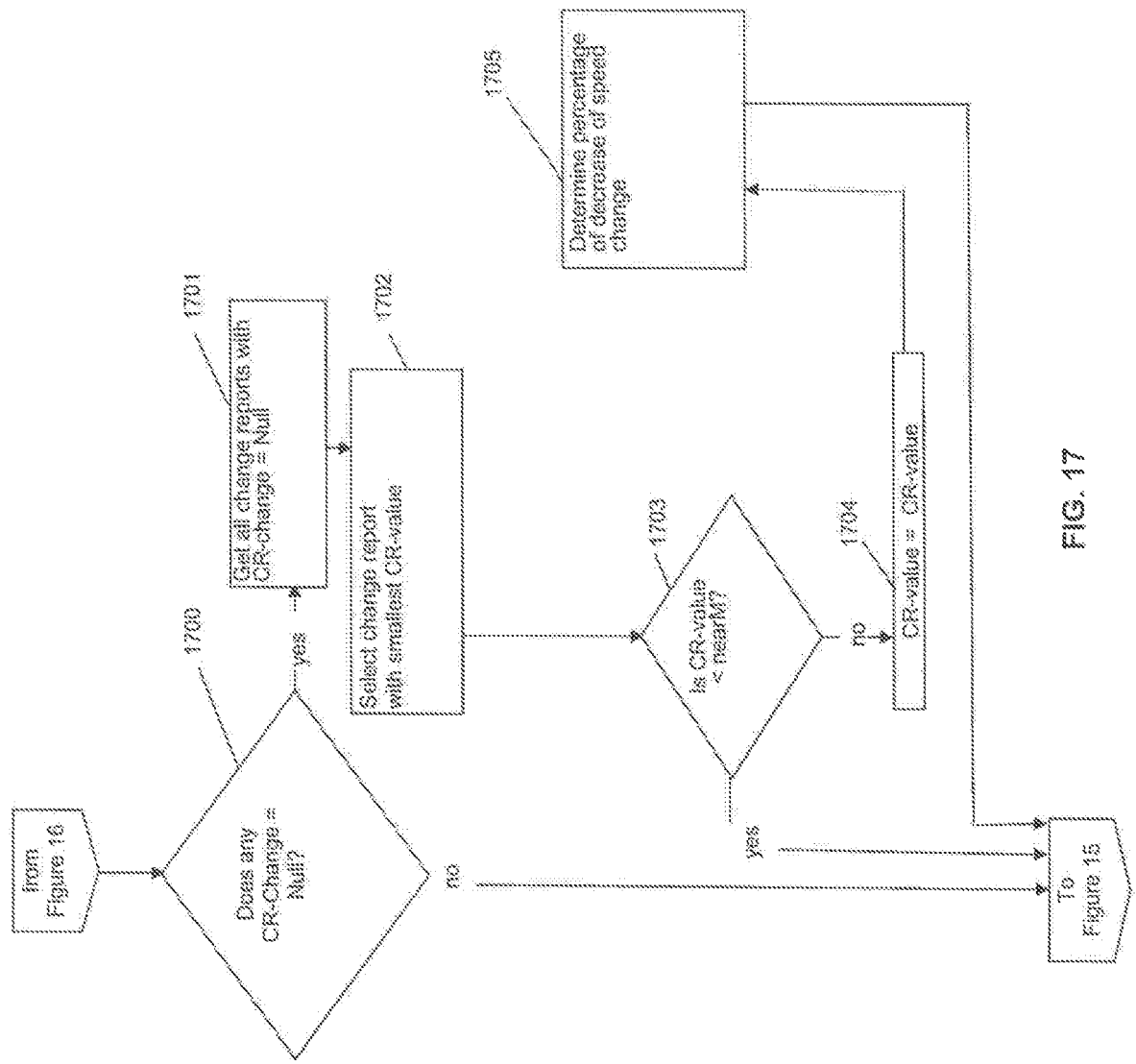
FIG. 17 is a flow chart of a pump control node unit speed change process continuing from FIG. 16, in accordance with an embodiment of the present invention.

Processes to adjust the pump speed are shown in FIGS. 15, 16 and 17, and discussed herein. The present system can be considered as being analogous to a voting system, in that each node unit produces information that essentially represents a vote for any of the following: an increase in pressure of the fluid flow; a decrease in pressure of the fluid flow; or no change (null change) to the pressure of the fluid flow. The operation locus range determined by the system represents a range wherein the pressure of the fluid flow will meet the operational needs of the whole of the system. Essentially the operation locus range represents consensus between the votes of the node units. The operation locus range is the "sweet spot range" for operation of the system. This is the range wherein the system will function to perform a balanced servicing of all the various areas in a building, and all of the nodes and node units therein, and thereby function in an effective and efficient manner.

The operation locus range may also be determined for a node unit grouping, to represent a range wherein the pressure of the fluid flow will meet the operation needs of the node unit grouping.

Figure 34:
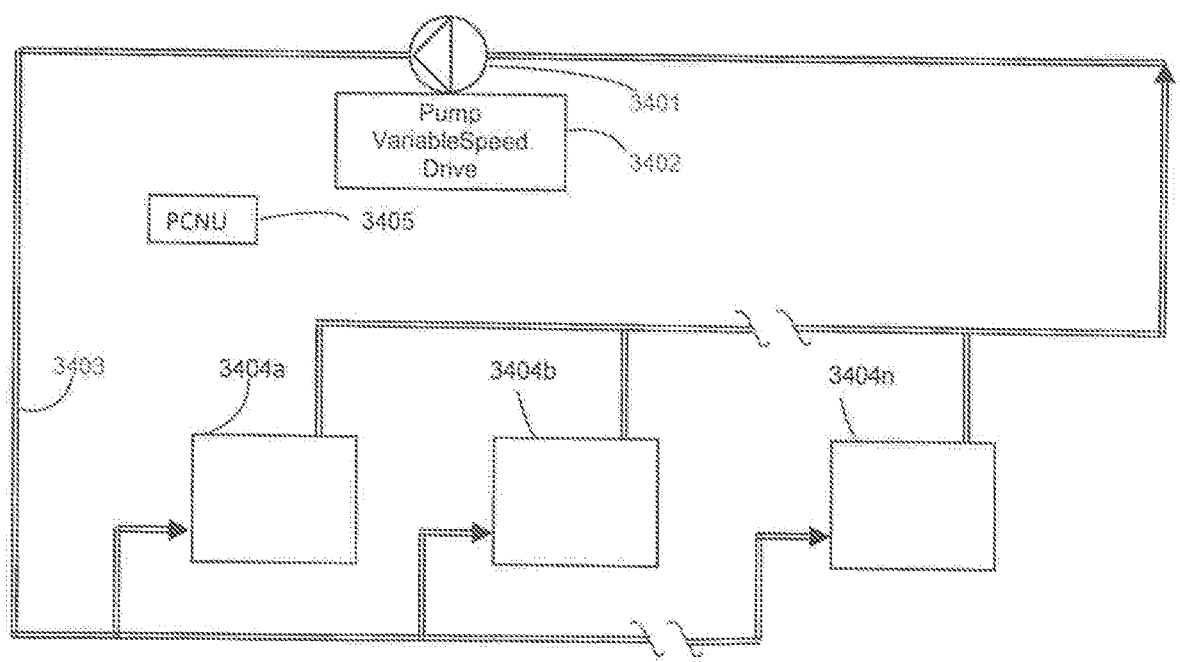
FIG. 34 is a systems drawing showing a configuration of a distribution system incorporating multiple portions (such as multiple portions configured in accordance with FIG. 33), in accordance with an embodiment of the present invention.

There are many different configurations of embodiments of the present invention. The configuration of embodiments of the present invention may be determined in accordance with requirements for the fluid distribution system that can service a particular type, size, and shape of building. For example, one possible configuration of an embodiment of the present invention, as shown in FIG. 34, incorporates a pump 3401, pump variable speed drive 3402, and pump control node unit 3405. A line from the pump connects with one or more distribution segments (i.e., line sections). For example, in an embodiment of the present invention a line 3403 from the pump may connect with any number of multiple distribution segments 3404a, 3404b . . . 3404n.

Figure 33:
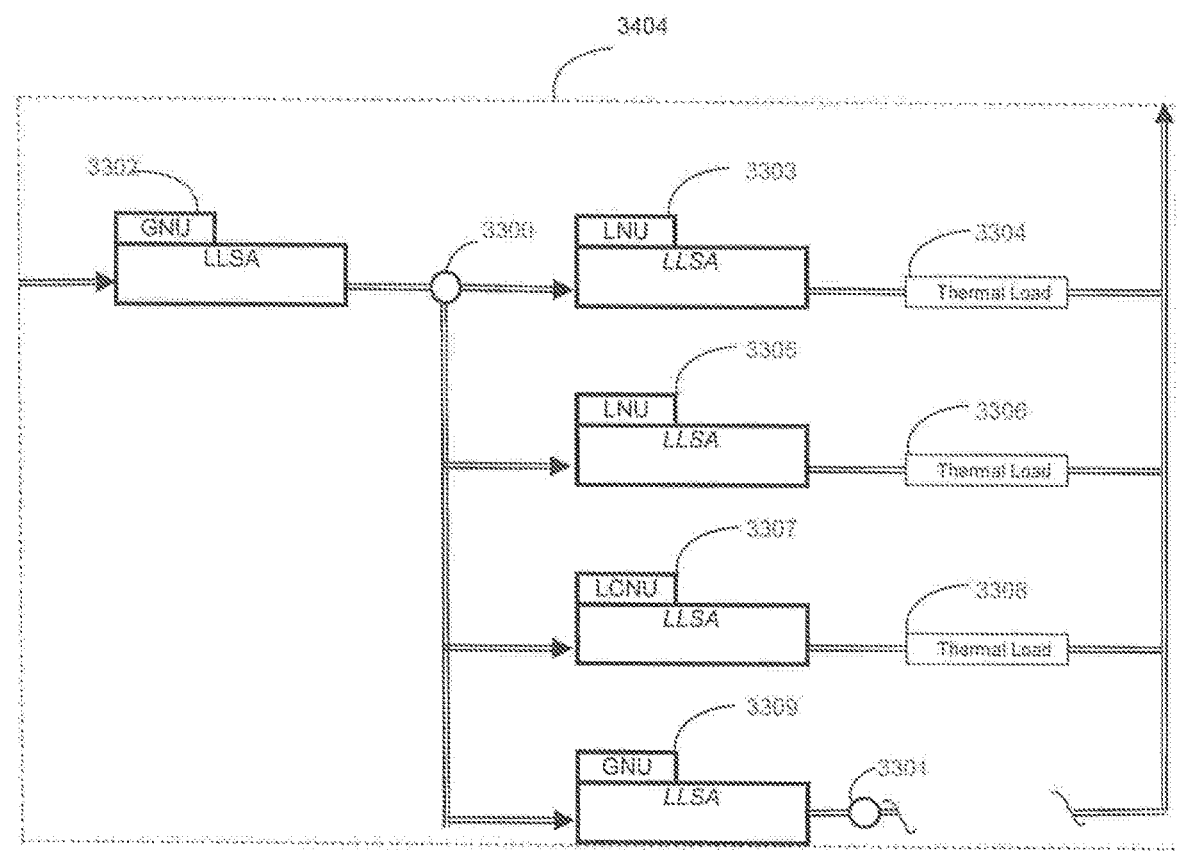
FIG. 33 is a systems drawing highlighting a portion of a distribution system, in accordance with an embodiment of the present invention.

Each distribution segment may incorporate one or more shared nodes in node unit groups with varying types of node unit(s). For example, as shown in FIG. 33, in an embodiment of the present invention a distribution segment 3404 may incorporate shared nodes 3300, 3301 and related upstream/downstream node units in node unit groupings, such as group node units 3302, 3309, load node units 3303, 3305, and load control node unit 3307. One or more of the load node units and/or load control node units in a distribution segment may have a thermal load positioned downstream of the load node unit and/or load control node unit. As discussed herein the thermal load may be a secondary distribution section. As an example, thermal loads 3304, 3306, 3308 are downstream of load node units 3303, 3305 and load control node unit 3307, respectively. One or more additional nodes and one or more additional node units may be downstream of node 3301, and such nodes and node units may be configured into node unit groupings.

A skilled reader will recognize that other configurations of one or more shared nodes and related upstream/downstream node units may be incorporated in a distribution segment and that not all of the distribution segments in a distribution system need be identical. Each distribution segment has a supply line directly from the pump connected to the distribution segment, whereby fluid flows into the distribution segment. Each distribution segment further has a return line extending therefrom, whereby fluid flows from the distribution segment to the pump.

Operation Scale, Operation Locus & Operation Locus Range

Figure 4:
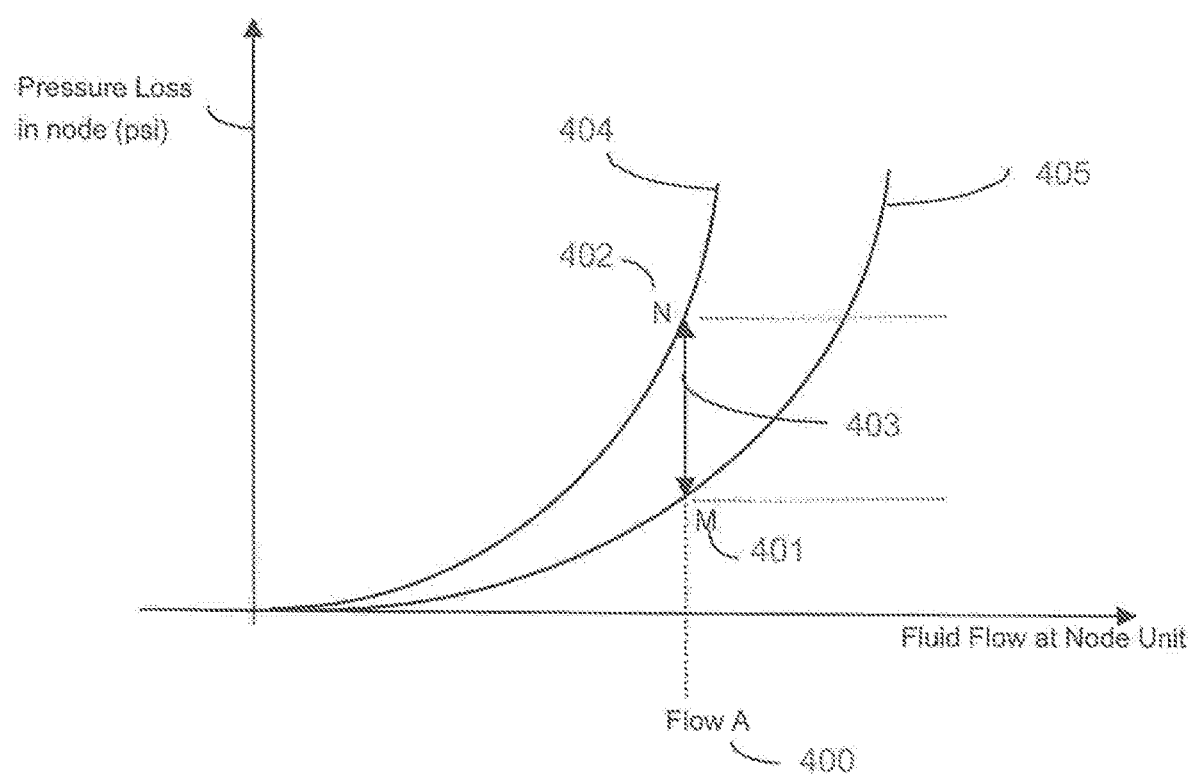
FIG. 4 is a table showing pressure loss relating to a downstream load node unit operation as a function of flow, in accordance with an embodiment of the present invention.

A graph shown in FIG. 4 represents in graph-form the effect of pressure and flow in the system. The vertical axis of the graph plots node pressure loss in a node (psi) and the horizontal axis plots flow of fluid through a load node unit.

In the graph of FIG. 4 loss indicator 405 shows the effect of pressure loss in two components of the system related to a load node unit, namely, pressure loss in the distribution lines serving the load node unit, and pressure loss in the thermal load that the load node unit serves.

For example, as shown in FIG. 2, the load node unit may be load node unit 204, the node may be the upstream node 201.

A skilled reader will recognize that changes in the flows attributable to one or more downstream load node units having a shared node in a node unit grouping will shift a loss indicator vertically, indicating increased or decreased node pressure. This impact occurs in the distribution lines shared with other node units that have the shared node in a node unit grouping. However, this impact is not significant for the present invention because the present invention is not concerned with the absolute values, fixed values, or specific numeric values being identified to be used to set the node pressures in the system. Therefore, as shown in FIG. 4, minimum loss indicator 405 is a reasonable base as it represents the minimum levels of line pressure loss generated by the LLSA of a load node unit that are required for the LLSA and associated node unit to operate in an efficient and effective manner.

The graph of FIG. 4 further shows maximum loss indicator 404 that is the maximum line pressure loss generated by the LLSA of the load node unit at all values of flow sensed by the flow sensor of the LLSA. Notably, when the maximum line pressure loss is generated by a node unit and associated LLSA, and flow is at a level represented by Flow A, the minimum line pressure loss required is indicated where Flow A 400 intersects with minimum loss indicator 405 at intersection M 401. The maximum line pressure loss required for Flow A is indicated where Flow A intersects with maximum loss indicator 404 at intersection N 402. The vertical distance between maximum loss indicator 404 and minimum loss indicator 405 as is between intersections M and N, represents the range of line pressure loss that is generated by the LLSA of the load node unit, at the selected flow value of Flow A. This line pressure loss range 403 indicates the range of pressure levels wherein the load node unit and its corresponding LLSA can function effectively.

The discussion of intersections L, M, N, and P herein should be understood to indicate that a value is indicated at each intersection, and therefore a range of values exists between the intersections. The present invention utilizes the ranges between the intersections. The range between intersection M and N for each node unit is referenced herein as the operation locus of the node unit. The range between intersections L and P for each node unit is referenced herein as the operation scale of the node unit.

References to L, M. N and P herein will be recognized as references to positions and/or values upon an operation locus scale (i.e., locus positions). For example, such as positions and/or values upon an operation locus scale of a node unit.

The line pressure loss range 403 is the differential between the intersections of M and N and indicates the range between the higher (N) and lower (M) line pressure losses of optimum function for the load node unit. Thus, the range of line pressure loss between intersections N and M (at Flow A) represents the operation locus (a section in the operation scale) for the node unit. The operation locus of each node unit in the system are utilized to generate the operation locus range for the system, as described herein. The vertical distance between the maximum loss indicator 404 the minimum loss indicator 405 at all flows represents the contribution of the LLSA at such a flow.

Flow A is merely presented herein as one example of a flow (i.e., a fluid flow), other flows are also possible. The flow of a node unit will be the flow identified (i.e., measured) by the flow sensor of the LLSA and associated node unit. For example, the minimum differential pressure loss may be zero (0.0) occurring at intersection M 401 and the maximum differential pressure loss may be nine (9.0) occurring at intersection N 402. A skilled reader will recognize that the values of zero and nine are merely examples, as the values at the intersections M and N could be any value that corresponds with the maximum and minimum ends of the range line pressure loss at effective operation of the load node unit at a particular flow. A skilled reader will also realize that zero is used as an example herein to indicate a minimum for ease of discussion, although in practice there is a minimum offset applied to the lower range of an operation locus, as described herein. The present invention will utilize the range between M and N, the operation locus, rather than the specific pinpoint values at M and N, as described herein.

To provide context to the line pressure loss, as shown in the graph of FIG. 4, the operation scale can be attributed to one of the load node units shown in FIGS. 2 and 3. For example, load node unit 204 operates in relation to a downstream thermal load 205 to provide a line pressure loss appropriate to maintain the target flow information 308 that indicates the target flow setting required by the thermal load 205, in accordance with the target flow information 308 received by the load node unit 204. The variation in the line pressure loss occurs as the pressure changes at the node 201 that is directly upstream of the load node unit. The virtual target demand flow 300 generated by the load node unit 204 is maintained by the loop control process that may adjust the position of the balancing valve and/or other valves in the LLSA, in accordance with the operation locus of the load node unit 204 (i.e., as shown in FIG. 4 as extending from intersection M 401 to intersection N 402), as indicated by line pressure loss range 403, as shown in FIG. 4.

Figure 5:
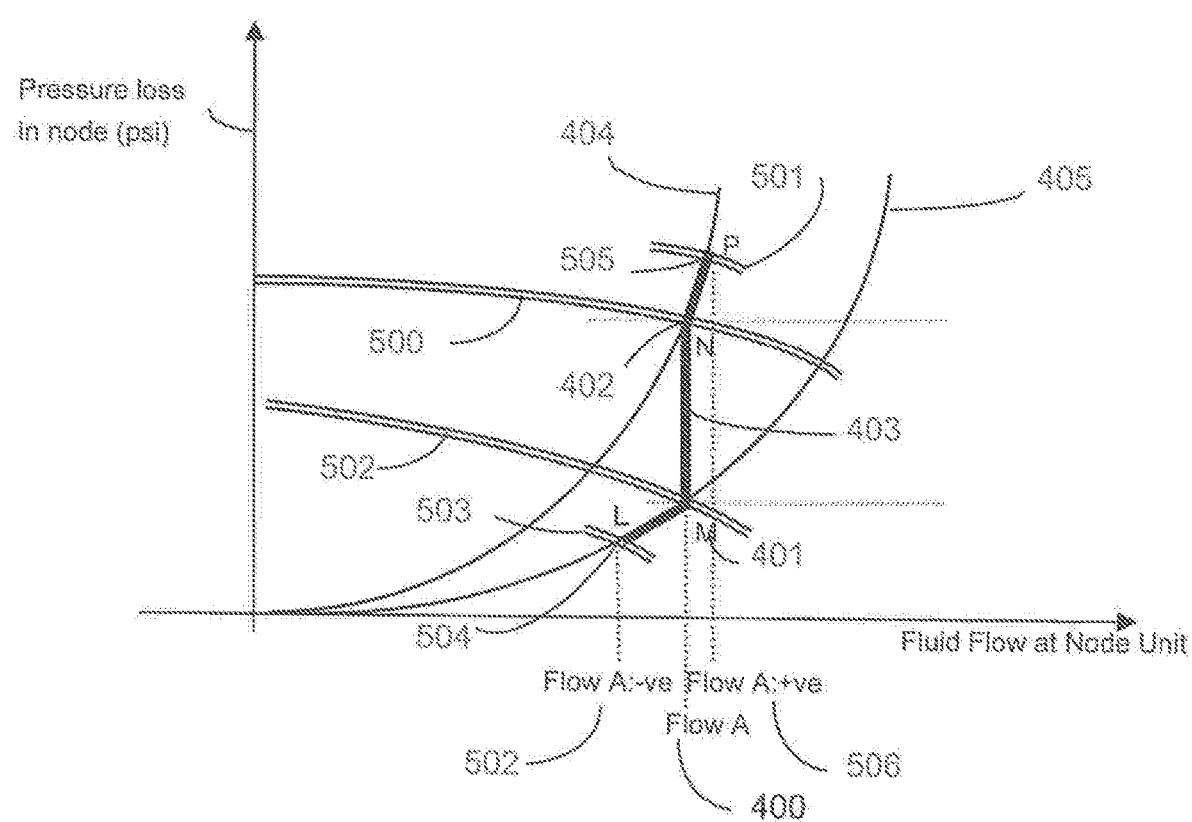
FIG. 5 is a table showing the operations occurring when external pressure is applied to a node in relation to the operation locus and operation scale of a load node unit, in accordance with an embodiment of the present invention.

The graph shown in FIG. 5 displays the effect of the applied pressure that the pump pressure (e.g., of the pump of the primary distribution section operating in the fluid distribution system) generates at a remote node downstream from the pump. The vertical axis of the graph plots pressure loss in a node (psi) and the horizontal axis plots flow of fluid through a node unit, such as a load node unit. Four possible effects of the response of a load node unit to the application of pump generated pressure changes occurring at the shared node upstream of the load node unit are shown.

High pump pressure indicator 500 indicates the line pressure loss that occurs to achieve the line pressure loss level at intersection N 402 at Flow A 400. Low pump pressure indicator 502 indicates the line pressure loss that occurs to achieve the line pressure loss level at intersection M 401 at Flow A. At intersection M the LLSA associated with the load node unit is at its minimum pressure drop capacity and the flow that is sensed by the flow sensor of the load node unit remains at the target flow setting Flow A 400.

If the flow is increased at the load node unit, such as to Flow A:+ve 506, the intersection between the increased flow and the maximum loss indicator 404 occurs at intersection P 505. Intersection P further is the intersection between higher pump pressure indicator 501 and the maximum loss indicator 404. Higher pump pressure indicator 501 is an example of the line pressure loss that occurs upon pump pressure being increased above the pump pressure reflected at high pump pressure indicator 500. The line pressure loss value at P represents a line pressure loss that is greater than the line pressure loss value at N. As the range of line pressure loss between N and M represent the maximum and minimum line pressure losses of a node unit at a particular flow (the operation locus), the range of line pressure loss between N and P represents a range that is higher than that which is achievable when the load node unit is functioning effectively. At intersection P the LLSA is beyond its maximum pressure loss capacity and flow, indicated as Flow A:+ve 506, that is sensed by the flow sensor of the LSSA associated with the load node unit, and is above the target flow represented by Flow A 400. In this circumstance the actual flow at the load node unit is not being maintained at its target flow setting.

If the flow is decreased, such as to Flow A:−ve 502, the intersection between the decreased flow and the maximum loss indicator 404 occurs at intersection L 504. This exemplifies pump pressure being lowered to below the operation locus, which is below the minimum line pressure loss range. This is also below the pressure operable to maintain Flow A, as reflected at low pump pressure indicator. Intersection L further is the intersection between lower pump pressure indicator 503 and the minimum loss indicator 405. Lower pump pressure indicator 503 is an example of the line pressure loss that occurs upon pump pressure being decreased below the pump pressure reflected at low pump pressure indicator 502. The line pressure loss value L represents a line pressure loss that is less than the line pressure loss value M. As the range of line pressure loss between N and M represent the operation range which is the maximum and minimum line pressure losses of a node unit at a particular flow, the range of line pressure loss between M and L represents a range that is lower than that which is achieved when the load node unit is functioning effectively. At L the LLSA that the load node unit is incorporated with is beyond its minimum pressure loss capacity and the flow, indicated by Flow A:−ve 502, that is sensed by the flow sensor of the load node unit is below the target flow represented by Flow A 400. In this circumstance the actual flow at the load node unit is not being maintained at target flow setting.

The above defines the operation scale of the load node unit as includes all of the range L to P (i.e., collectively all of from L 504 to M 401 to N 402 and to P 505). The operation scale indicates effects of pressure changes on the upstream node occurring between the pump pressures indicated by decreased pump pressure indicator 503 and increased pump pressure indicator 501. However, when the node unit is functioning at an effective pressure at a particular flow it will function within its operation locus (between N and M).

The LLSAs incorporated with each of the node units in the fluid distribution system, including in each group node unit, load node unit, and load control node unit, is operable to detect operations in three ranges of fluid flow within an operation scale: the fluid flow indicated between intersections L and M; the fluid flow indicated between intersections M and N; and the fluid flow indicated between intersections N and P. The three ranges of fluid flow are collectively indicated in the graph of FIG. 5 as a S-shaped or Z-shaped range, the S-shaped or Z-shaped range is the operation scale of the immediate upstream mode pressure (pump applied pressure) relating to a node unit, such as a load node unit. Fluid pressure is not measured and no pressure setting is undertaken by the present invention.

The accurate identification of the operating position of each LLSA, as shown in FIG. 1, is based on: precise measurement of non-virtual flow of the fluid by the LLSA, as sensed by the flow sensor 113; receipt of the virtual target demand flow setting information from the downstream LLSA, or from an external source, as discussed herein; and precise measurement of the non-virtual balancing valve position 108. The identification of the operating position of each LLSA eliminates any need to measure an absolute or differential pressure at the nodes upstream of the node units or elsewhere in the system.

Figure 6:
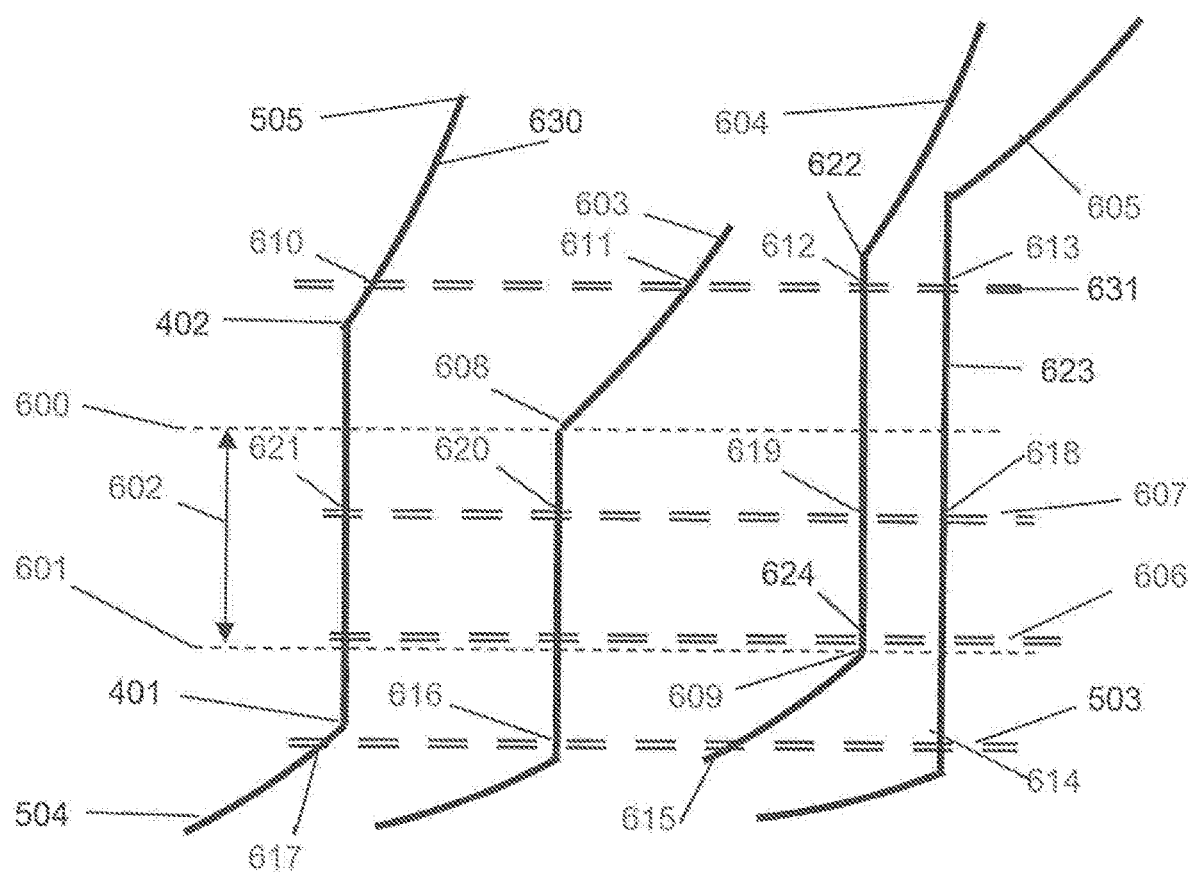
FIG. 6 is a graph of operation scales of multiple node units and the identification of the operation locus range for the node units collectively, in accordance applications of an embodiment of the present invention.

As shown in FIG. 6, the operation range of various node units to pump variations in the system can differ. For example, if the upstream node is node 201, as shown in FIG. 2, the four operation scales shown in FIG. 6 exemplify operation scales that relate to node 201 in the role of a shared node, such that the downstream node units in a node unit grouping with the shared node include load node units 204, 206, load control node unit 208, and group node unit 210. Thus, in this context, the operation scale 630, as shown in FIG. 6, may exemplify that of load node unit 204 (this operation scale is the same as that shown in FIG. 5). The operation scale 603 may exemplify that of node lode unit 206. The operation scale 604 may exemplify that of node lode control unit 208. The operation scale 605 may exemplify that of group node unit 210. A skilled reader will recognize that this example, that relates the graph of FIG. 6 to a node unit grouping shown in FIG. 2, is provided to give the reader context and a frame of reference, and is discussed only as one example of how an operation locus is determined in relation to multiple node units.

The four operation scales 630, 603, 604, 605 of four node units that are downstream of a shared node, are shown in close proximity along a horizontal flow axis. This display of the four operation ranges in proximity allow for a visualization of the differences between each of the four operation locus (collectively the operation loci). It further allows for a visualization of the common sections of the four operation loci. The common sections are delineated by maximum pressure line 600 that indicates the maximum applied pressure at which all of the node units can operate while maintaining their respective target demand flow. The common sections are further identified by minimum pressure line 601 that indicates the minimum applied pressure at which all of the node units can operate while maintaining their respective target demand flow. The range between maximum pressure line 600 and minimum pressure line 601 is the operation locus range 602. The operation locus range is the range between the minimum and maximum applied pressures at which all of the node units can operate while maintaining their respective target demand flow.

The identified operation locus range is utilized within the system to cause the system to function to produce a target flow throughout the whole system whereby the whole of the system functions effectively at the target flow settings throughout the system. Thus, the system of the present invention operates in accordance with the operation locus range (which may incorporate the common sections of the operation locus of each of multiple node units, such as the node units downstream of a shared node), and the individual node units may each operate in accordance with its own individual operation locus. The outcome is that the present invention is not adjusted in accordance with specific pinpoint value settings, but instead is adjusted in accordance with the operation locus range and the operation locus, which are both ranges wherein particular effective functions of the system and the individual node units is achieved. In this manner constant flow is maintained by the system over a range of pressures, such as the pressures indicated as existing at intersections 401, 402 (as consistent with such intersections in FIG. 5).

As shown in FIG. 6, at the maximum node pressure 600 the limiting factor, stopping any further opportunity to raise the pressure, relates to operation locus identified between intersections 608 and 616. If the pressure increases from the point of intersection 608 the node unit of operation scale 603 cannot maintain control of the flow. This node unit will lose control of the flow if the applied pressure increases to a higher level than that indicated by maximum node pressure line 600. Therefore, the maximum of the operation locus range (that reflects the effective function range for all of the node units) cannot exceed intersection 608, and maximum node pressure line 600 is therefore set to be equal to intersection 608.

At the minimum node pressure 601 the limiting factor, stopping any further opportunity to lower the pressure, relates to operation locus identified between intersections 622 and 609. If the pressure decreases from the point of intersection 609 the node unit of operation scale 604 cannot maintain control of the flow. This node unit will lose control of the flow if the applied pressure decreases to a lower level than that indicated by minimum node pressure line 601. Therefore, the minimum of the operation locus range (that reflects the effective function range for all of the node units) cannot be lower than intersection 609, and minimum node pressure line 601 is therefore set to be equal to intersection 609.

Thus, the node pressure region between maximum node pressure line 600 and minimum node pressure line 601 is the operation locus range 602 representing the range of pressures at which all four node units can operate and continue to maintain their respective target demand flow settings.

The operation locus range is determined by the system for one or more node units that are directly downstream of a shared node. The operation locus range is therefore determined by a group node unit that is directly upstream of a shared node, or a pump control node unit if the upstream shared node is shared with the pump. If the operation locus range is determined by a group node unit then the results of processing undertaken in accordance with the operation locus range is transferred upstream in the change report generated by that group node unit (that is the net change report).

For example, if a load node unit (such as load node unit 206, as shown in FIG. 2) operates outside of (i.e., above) intersection 608 of its operation locus, it will generate a change report that requests that the pressure at the upstream shared node be decreased, and this change report will be transmitted to the group node unit if there is an upstream group node unit in its node unit group, or otherwise to the pump. As another example, if a load control node unit (such as load control node unit 208, as shown in FIG. 2) operates below intersection 609 of its operation locus, it will generate a change report that requests that the pressure at the upstream shared node be increased, and this change report will be transmitted to the group node unit if there is an upstream group node unit in its node unit group, or otherwise to the pump.

The operation locus range of the node units that are directly downstream of the shared node in a node unit grouping will be determined by a comparison of the operation loci of all of the node units in the node unit grouping to identify the sections of all of the operation loci that are common to all of the node units. For example, these are the sections of the operation loci of all of the node units that are between maximum node pressure line 600 and minimum node pressure line 601, that represent the operation locus range for the node units collectively. As the change reports generated in relation to each of the node units that are downstream of a shared node in the node unit group will be sent to the upstream group node unit, or to the upstream pump if there is no upstream group node unit in the node unit group, the collective review of the change reports will result in an indication of changes to pressure at the shared node (of the node unit grouping) in relation to the operation locus range. More details of the use of the operation locus range are provided herein.

A skilled reader will recognize that an objective of the present invention is for all downstream node units to maintain their respective actual fluid flows at their respective virtual target demand flow settings. A simultaneous second objective is for one or more node units to operate at a fluid flow pressure that is very close to the minimum pressure in the operation locus range (as is identified for all of the downstream node units having a shared node in a node unit grouping), for example, such as that indicated by minimum node pressure line 601, while other node units operate within the operation locus range (i.e., between the minimum node pressure and the maximum node pressure identified as common to the operation locus of all of the node units directly downstream of the same shared node), for example, such as within the range between the minimum node pressure line 601 and the maximum node pressure line 600.

The following provides examples as to how various pressures can affect the system:

A. The circumstance that the fluid pressure in the fluid distribution system is the pressure relating to applied node pressure line 631 affects each of the four node units represented in FIG. 6 as follows: the node unit relating to operation scale 630 is operating at intersection 610 at an actual fluid flow that is increased above its operation locus and target flow setting (for example, if the node unit is load node unit 204, as shown in FIG.

2, it is operating at an actual fluid flow that is increased above its target flow setting as is indicated by virtual target demand flow 300, as shown in FIG. 3); the node unit relating to operation scale 603 is operating at intersection 611 at an actual fluid flow that is increased above its operation locus and target flow setting (for example, if the node unit is load node unit 206, as shown in FIG. 2, it is operating at an actual fluid flow that is increased above its target flow setting as is indicated by virtual target demand flow 301, as shown in FIG. 3); the node unit relating to operation scale 604 is operating at intersection 612 at an actual fluid flow that is maintained within its operation locus and target flow setting (for example, if the node unit is load control node unit 208, as shown in FIG. 2, it is operating at an actual fluid flow that is maintained at its target flow setting as is indicated by target flow information 302, as shown in FIG. 3); and the node unit relating to operation scale 605 is operating at intersection 613 at an actual fluid flow that is maintained within its operation locus and target flow setting (for example, if the node unit is group node unit 210, as shown in FIG. 2, it is operating at an actual fluid flow that is maintained at its target flow setting as is indicated by target flow information 303, as shown in FIG. 3).

B. The circumstance that the fluid pressure in the fluid distribution system is the pressure relating to applied node pressure line 503 affects each of the four node units represented in FIG. 6 as follows: the node unit relating to operation scale 630 is operating at intersection 617 at an actual fluid flow that is decreased below its operation locus and target flow setting (for example, if the node unit is load node unit 204, as shown in FIG. 2, it is operating at an actual fluid flow that is decreased below its target flow setting as is indicated by virtual target demand flow 300, as shown in FIG. 3); the node unit relating to operation scale 603 is operating at intersection 616 at an actual fluid flow that is maintained within its operation locus and target flow setting (for example, if the node unit is load node unit 206, as shown in FIG. 2, it is operating at an actual fluid flow that is maintained at its target flow setting as is indicated by virtual target demand flow 301, as shown in FIG. 3); the node unit relating to operation scale 604 is operating at intersection 615 at an actual fluid flow that is decreased below its operation locus and target flow setting (for example, if the node unit is load control node unit 208, as shown in FIG. 2, it is operating at an actual fluid flow that is decreased below its target flow setting as is indicated by target flow information 302, as shown in FIG. 3); and the node unit relating to operation scale 605 is operating at intersection 614 at an actual fluid flow that is maintained within its operation locus and target flow setting (for example, if the node unit is group node unit 210, as shown in FIG. 2, it is operating at an actual fluid flow that is maintained at its target flow setting as is indicated by target flow information 303, as shown in FIG. 3).

The two examples of the effect of pressure levels represented by applied node pressure above the maximum node pressure line 600 and below the minimum node pressure level 601 discussed above show that at the pressure levels represented each downstream node unit (having a shared node in a node unit grouping) can experience either an excess or a deficiency in fluid flow, or a maintained target flow setting. Thus changes in pressure levels can affect fluid flow at different node units in different ways. Therefore, to maintain all node units at the target flow of each node unit, the operation locus range must be determined and all node units should be caused to function within the operation locus range.

In the examples discussed above, only one downstream unit node was able to maintain its target flow setting at both the pressure levels represented by node pressure lines 503, 631. The particular unit node is a group node unit, and generally the target demand flow of a group node unit would be significantly higher than other types of node units directly downstream of a shared node. It is for this reason that the operation locus 623 (being the simulated pressure drop) of operation scale 605, is much larger than the operation locus of each of the other node units shown in FIG. 6. The higher target demand flow of a group node unit represents a larger pressure range of operability at a target flow than is achievable by the other types of node units. A skilled reader will recognize that other factors may also affect the function of a group node unit, and such factors may diminish the difference between the target demand flow of a group node unit and other types of node units.

As another example, the circumstance that the fluid pressure in the fluid distribution system is the pressure relating to applied node pressure line 607 affects each of the four node units represented in FIG. 6 as follows: the node unit relating to operation scale 630 is operating at intersection 621 at an actual fluid flow that is maintained within its operation locus and target flow setting (for example, if the node unit is load node unit 204, as shown in FIG. 2, it is operating at an actual fluid flow that is maintained at its target flow setting as is indicated by virtual target demand flow 300, as shown in FIG. 3); the node unit relating to operation scale 603 is operating at intersection 620 at an actual fluid flow that is maintained within its operation locus and target flow setting (for example, if the node unit is load node unit 206, as shown in FIG. 2, it is operating at an actual fluid flow that is maintained at its target flow setting as is indicated by virtual target demand flow 301, as shown in FIG. 3); the node unit relating to operation scale 604 is operating at intersection 619 at an actual fluid flow that is maintained within its operation locus and target flow setting (for example, if the node unit is load control node unit 208, as shown in FIG. 2, it is operating at an actual fluid flow that is maintained at its target flow setting as is indicated by target flow information 302, as shown in FIG. 3); and the node unit relating to operation scale 605 is operating at intersection 618 at an actual fluid flow that is maintained within its operation locus and target flow setting (for example, if the node unit is group node unit 210, as shown in FIG. 2, it is operating at an actual fluid flow that is maintained at its target flow setting as is indicated by target flow information 303, as shown in FIG. 3).

This example, relating to applied node pressure line 606, indicates a pressure level at which all one or more downstream node units of a shared node are able to maintain fluid flow within their respective operation locus and target demand flow settings. However, in some embodiments of the present invention a load control node unit, indicated by operation scale 604, can operate at the lowest pressure level, as shown at intersection 624. When the applied pressure level is lowered from the pressure level indicated at applied node pressure line 607 to the pressure level indicated at applied node pressure line 606, the load control node unit is within its target demand flow setting. Furthermore, at the pressure level indicated at applied node pressure line 606 the node units downstream of a shared node can also maintain their target demand flow settings, and operate at a corresponding lower level of line pressure loss (whereby each node unit operates within its operation locus). This reduction in applied pressure, from the pressure level indicated at applied node pressure line 607 to the pressure level indicated at applied node pressure line 606, is an example of the function of the present invention, and that it provides significant reduction in energy consumption by the pump.

Node pressure balance is dependent upon accurate monitoring of three real time measurements, including: actual flow through an LLSA (for example, as shown in FIG. 1, as can be measured by the flow sensor 113 of the LLSA), virtual target demand flow setting, and non-virtual balancing valve position in the LLSA (for example the position of potentiometer 108). However, in order to facilitate communications between the node units having a shared node in a node unit grouping, a standard measurement is used to arrive at the operation locus component of the change report for each node unit.

Figure 7:
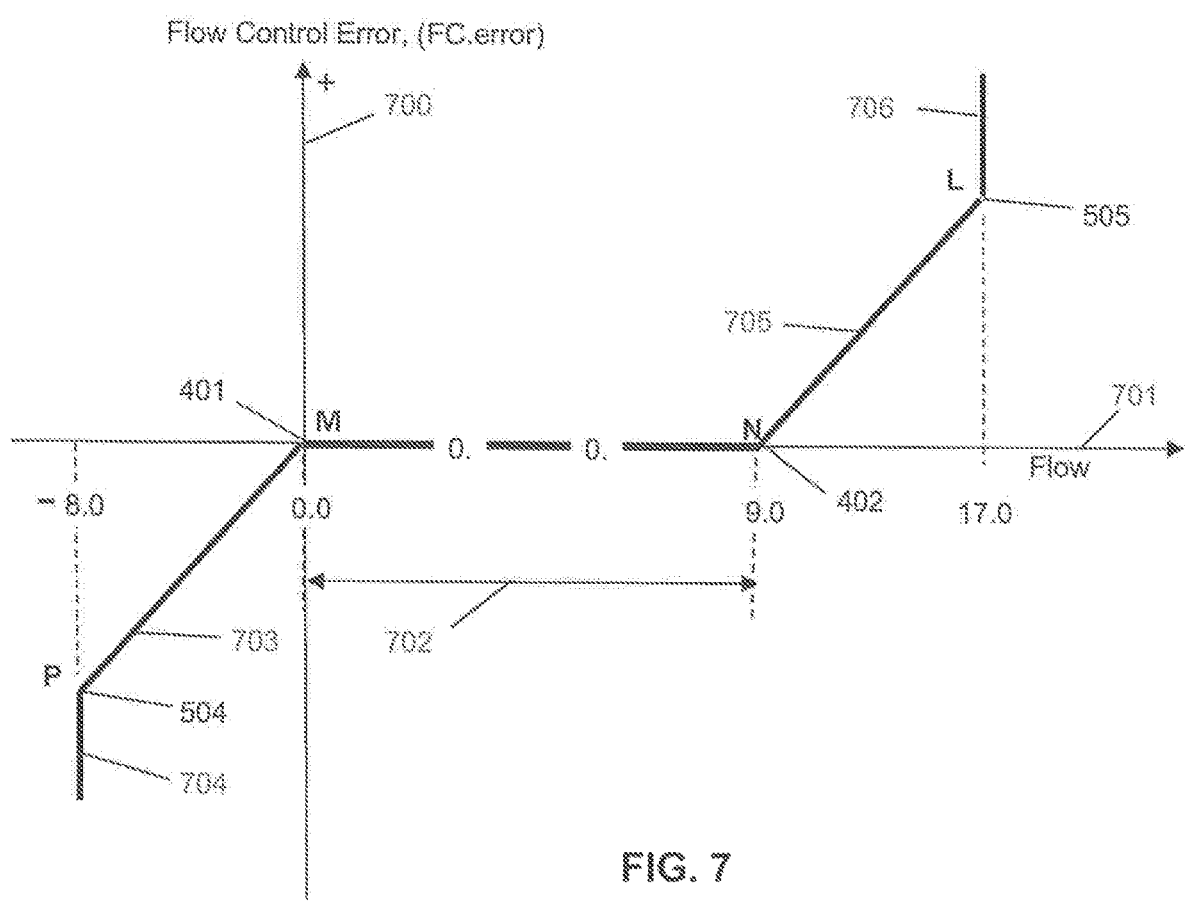
FIG. 7 is a report showing the generation of CR-value changes based on an operation locus and operation scale of one node unit, in accordance with an embodiment of the present invention.

The horizontal axis of the graph, as shown in FIG. 7, plots flow 701, and this indicates a range of flows wherein a specific range that is an operation locus is identified as a portion of the horizontal axis relating to an individual node unit, The operation locus relates to the line pressure loss to be applied to the node unit to achieve effective and efficient function of the node unit. The operation locus is between intersection M 401 and intersection N 402 on the horizontal axis. As discussed herein, intersections M and N relate to flow values (herein referenced as intersection M, or as M, and as intersection N, or as N).

The vertical axis, as shown in FIG. 7, plots flow control error "FC.error" 700. This FC.error represents an error value that has either a positive or a negative value, and also can be a zero value. The following equation is used to define FC.error by the microprocessor of each LLSA:

virtual FC.error=Non-virtual flow minus virtual target demand flow setting

Solely for the purpose of providing examples, the numeric value of 0 is shown as M and numeric value 9 is shown as N in FIG. 7, and the range between M and N is the operation locus 702. The operation locus represents the balancing valve position which will achieve maximum simulated pressure loss generated by the LLSA associated with the node unit, such as a load node unit. The M corresponds to the position of minimum line pressure loss of the LLSA, and N corresponds to the position of maximum line pressure loss of the LLSA.

A skilled reader will recognize that the specific pinpoint values discussed herein, such as any pinpoint values for intersections L, M, N, or P are just examples of values that may relate to a particular determination of a operation locus of a node unit at a point in time. The skilled reader will recognize that other values may be related to determinations of other operation locus by the system, depending on the function of the system and the environment within the building affecting the system (e.g., weather affecting the building, thermostat settings within the building, etc.). The pinpoint values are referenced herein by way of example for the purpose of the discussion of embodiments of the present invention. However, the present invention does not function in accordance with the pinpoint values, but in accordance with the operation locus and operation locus range determined by the present invention.

The intersection L 505 is shown to represent a flow value of 17.0 (as does segment 706). When FC.error is positive, and in the range shown at segment 705 between intersection N 402 and intersection L 505, then segment 705 represents a range of values that are more or equal to 9.0 and less or equal to 17.0. At L the virtual flow control error, FC.error, has a value of 10% of the virtual target demand flow. Since virtual target demand flow can vary for each LLSA and associated node unit in the fluid distribution system the percentage of virtual target demand flow may not be 10% for each LLSA. When virtual flow control error, FC.error, is greater than 10% of the virtual target demand flow, then L and segment 706 remains at value 17.0.

Segment 705 indicates an excess node pressure condition, meaning a pressure condition that is beyond the upper end of the operation locus. The operation locus is represented by segment 702 (between M and N). As an example, the operation locus may be between 0 and 9.0, with N being value 9.0 which is the upper end of the operation locus. Therefore, a value of 17.0 is beyond that upper end of the operation locus.

Segment 703 is below the lower end of the operation locus. To operate in an effective and efficient manner each node unit should not operate below the lower end of its operation locus (this prevents the system from operating below the lower end of the operation locus). Moreover, it is preferable that a node unit (and the system) does not operate at the very lowest value within the operation locus. The node unit (and the system) should only operate to a value that is near to, but above the lower end of the operation locus. As an example, if the lowest value in the operation locus is zero (0.0), the node unit (and the system) should only operate to the value of 1.5 that is near to but above the value of zero. In other words, if the lowest value in the operation locus is at M then the node unit (and the system) should function at nearM, which is a value just above M. The range between M and nearM is the float zone.

The reason that the node unit should not operate in the float zone is because it is preferable for the node unit (and the system) not to function at the value that is the lowest value in the operation locus, which is M. Therefore, if the node unit (and the system) is to function at the lower end of the operation locus it should function slightly above the lowest value—at nearM. For example, if the lowest value in the operation locus M is zero (0.0) the node unit may function at 1.5 which is near to, but above the lowest value, and is recognized as being nearM. The range of values between the lowest value (M) and the value near to the lowest value that the system actually runs at (nearM) is the float zone. The float zone is recognized by the system as providing a float (or drift) zone where no corrective actions need to be taken because it can be difficult to achieve and maintain balance within the system if the node unit operates at the lowest value in the operation locus (M). Therefore, the float zone creates a recognized buffer to prevent operation at the lowest value on the operation locus from occurring.

The values of segment 703 indicate insufficient pressure to balance the nodes of the system. In other words should node unit (and the system) operation be within any of the values of segment 703, or at any value below the lowest value of the operation locus (M) it will be operating with pressure that is too low to permit maintenance of the target flow setting of the LLSA of the node unit.

A P 504 and segment 704 the flow value is indicated as −8.0 (negative eight). When FC.error is negative and in the range shown at segment 703 it is between M and P (for example, between values of 0.0 and −8.0, respectively). At P the virtual flow control error, FC.error, has a value of −10% of the virtual target demand flow. Since virtual target demand flow can vary for each LLSA in the fluid distribution system the negative percentage setting may not be −10% for each LLSA. When virtual flow control error, FC.error, is greater than −10% of the virtual target demand flow, then flow remains consistent at −8.00 along the segment 704.

A converter element (that may be incorporated in one or more of the LLSAs associated with node units in the present invention) can process the one or more sections of an operation scales, such as the section between P and L, to generate a linear quantified value. The linear quantified value can be transferred between two or more LLSAs in the system as a component of the change report generated by each node unit. The linear quantified value can thereby be utilized to implement the balancing of all nodes in the fluid distribution system. Thus, the linear quantified value may be applied to adjustments to the node pressure (such as may be caused by the repositioning of a balancing valve or other valves with the LLSA), and as is applied through change reports to other directly upstream node units. (As described herein, such balancing can be achieved by either or both of the following: repositioning of the balancing valve or other valves within node units; and adjusting the pump speed.)

Load Node Unit & Load Control Node Unit Change Report Generation

Figure 8:
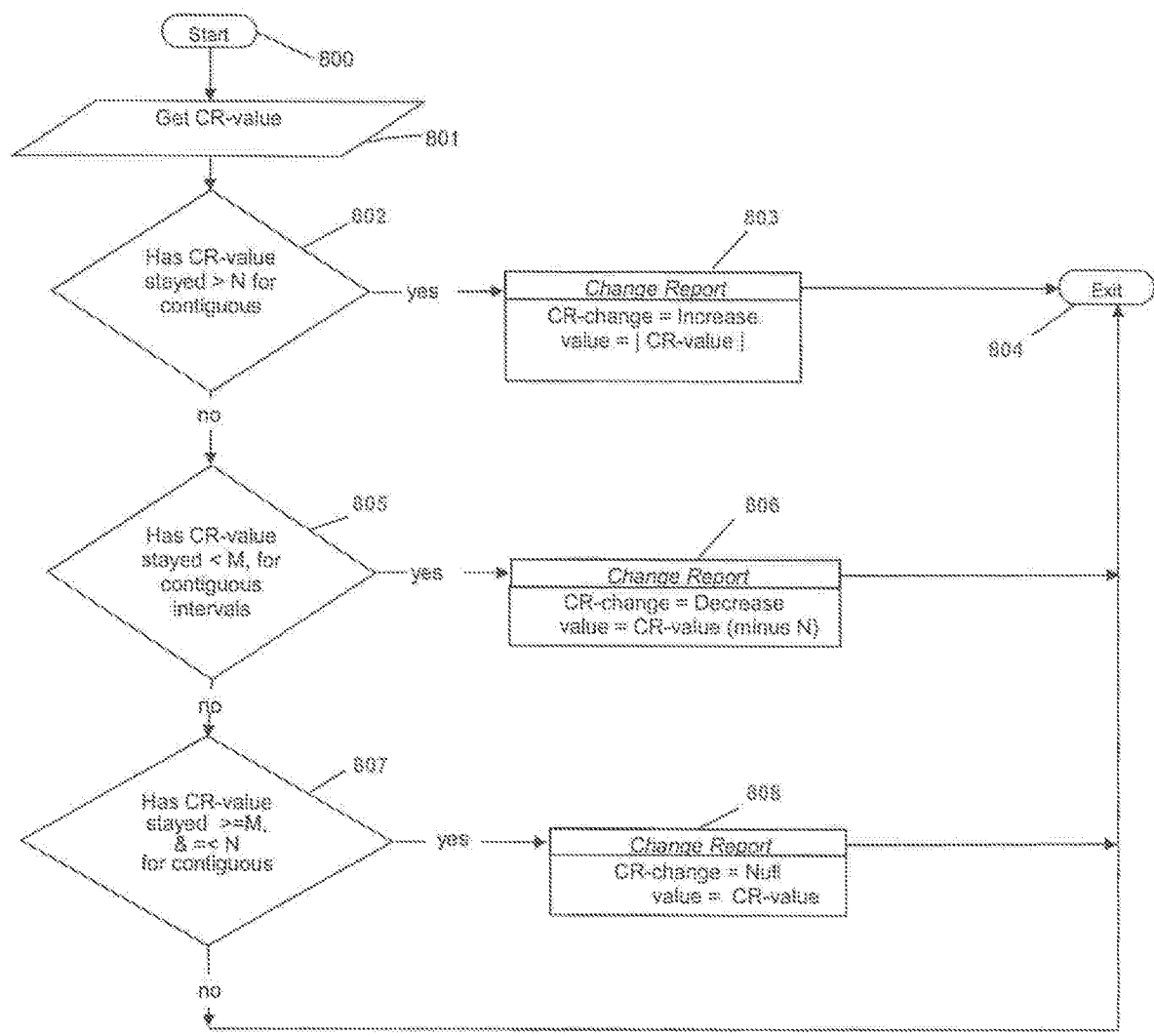
FIG. 8 is a flow chart of the change report steps for a load node unit, in accordance with an embodiment of the present invention.

As shown in FIG. 8, there are a number of steps involved in generating a change report at a node unit, such as a load node unit, or a load control node unit. Three possible change reports can be generated by each LLSA and associated node unit based on the real-time current operation position of the balancing valve of the LLSA, and the actual flow that is measured by the flow sensor of the LLSA. As an example, as shown in FIG. 2, load node units 204, 214 and load control node unit 208 may undertake the steps of FIG. 8.

Generally the change report steps involve obtaining information relating to the real-time operation of the node unit and associated LLSA. This information is compared to the operation locus identified for that node unit to determine whether the current (present) operational status of the node unit is within its operation locus.

The change report steps are applied on an ongoing basis, such as on a fixed time interval basis, or some other basis. The steps process the current operating state of the node unit to generate a change report for that node unit. The first step is to start 800. After starting, the CR-value of the node unit is obtained at step 801. The CR-value is the present pressure loss value of the node unit, which is understood as existing within a section of the operating scale of the node unit (i.e., from L to N to M to P). N and M on the operating scale of the node unit are also utilized in these steps.

A series of queries can be posed as the next steps. A query as to whether the prior CR-value for the node unit has stayed greater than N for a contiguous period of review intervals is posed at step 802. The contiguous period of review intervals may be two intervals, or any number of intervals. The period of intervals can be set in the system, and may be changed in the system. This review is applied to determine whether there is a verification that the measurement of the CR-value has been stable over time.

If the answer to the query of 802 is "yes" then two activities occur at step 803. Firstly, the change report that is generated indicates CR-change as INC. CR-value is set to an absolute value that is the CR-value. The CR-value represents the magnitude of the increase that should be applied by the system to cause the node unit to operate within its operation locus. After the change report is generated exit occurs at step 804.

If the response to the query of step 802 is "no", such that the CR-value has not been less than N for a contiguous period of review intervals, a new query is posed. The query at step 805 asks if the CR-value has stayed less than M for a contiguous period of review intervals. The contiguous period of review intervals may be two intervals, or any number of intervals. The period of intervals can be set in the system, and may be changed in the system. This review is applied to determine whether there is a verification that the measurement of the CR-value has been stable over time.

If the answer to the query of step 805 is "yes" then two activities occur at step 806. Firstly, the change report that is generated indicates CR-change as DEC. Secondly, N will be subtracted from CR-value to generate a new CR-value that will be the CR-value of the change report that is generated at step 806. As an example N may be 9.0 and the CR-value may be 17.0. The new CR-value that is generated may be 8.0. The new CR-value represents the magnitude of the decrease that should be applied by the system to cause the node unit to operate within its operation locus. After the change report is generated exit occurs at step 804.

If the response to the query of step 805 is "no", such that the CR-value has not stayed less than M for a contiguous period of review interval, a new query is posed at step 807. The query at step 807 asks if the CR-value has stayed greater than or equal to M and less than or equal to N for a contiguous period of review intervals. The contiguous period of review intervals may be 2 intervals, or any number of intervals. The period of intervals can be set in the system, and may be changed in the system. This review is applied to determine whether there is a verification that the measurement of the CR-value has been stable over time and if it has stayed within the operation locus over time. If the CR-value is in the range of being greater than or equal to M and less than or equal to N for the review interval then at step 808 a NULL change report is generated. The NULL change report reflects a CR-change of NULL. CR-value is not altered, but is the present pressure loss of the node unit. The CR-value represents the magnitude of the increase that should be applied by the system to cause the node unit to operate within its operation locus. After the change report is generated exit occurs at step 804.

The change report that is generated by each of the one or more downstream node units that have a shared node in a node unit grouping will be any of the following: a DEC report, an INC report, or a NULL report. The change report of each downstream node unit having a shared node in a node unit grouping is delivered to the group node unit directly upstream of the shared node (the "upstream node unit"), or to the pump control node unit if the downstream node unit has a shared node with the pump in a node unit grouping.

Group Node Unit Change Report Processing

A group node unit that receives one or more change reports processes the one or more change reports that are transferred to it, and based upon the processing generates a change report that is either an INC report, a NULL report, or a DEC report. In some embodiments of the present invention, the group node unit may generate a change report relating to itself and this change report may be processed with the change reports it receives from downstream node units. The change report generated by the group node unit is transferred to the upstream node unit that has a shared node with the group node unit in a node unit grouping. The change report generated by the group node unit indicates that pressure of its upstream shared node is required to be increased, decreased or unchanged (null change) to balance the pressure in the fluid distribution system. The magnitude of the pressure change is defined by the numeric value of CR-value reported in the change report. The change report also incorporates specific information that is reported to the node unit upstream of the shared node.

Figure 9:
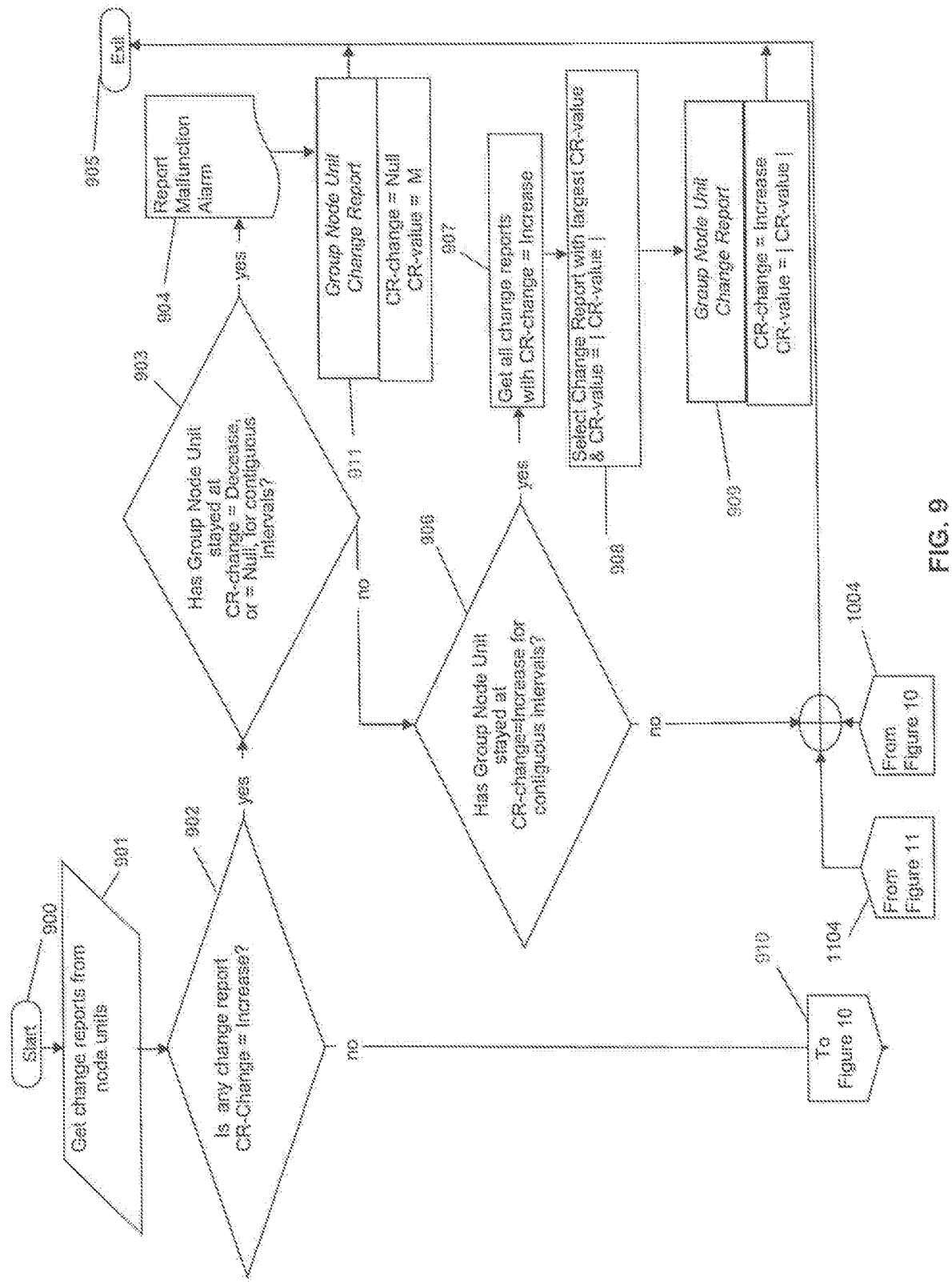
FIG. 9 is a flow chart of the change report steps for a group node unit, in accordance with an embodiment of the present invention.
Figure 10:
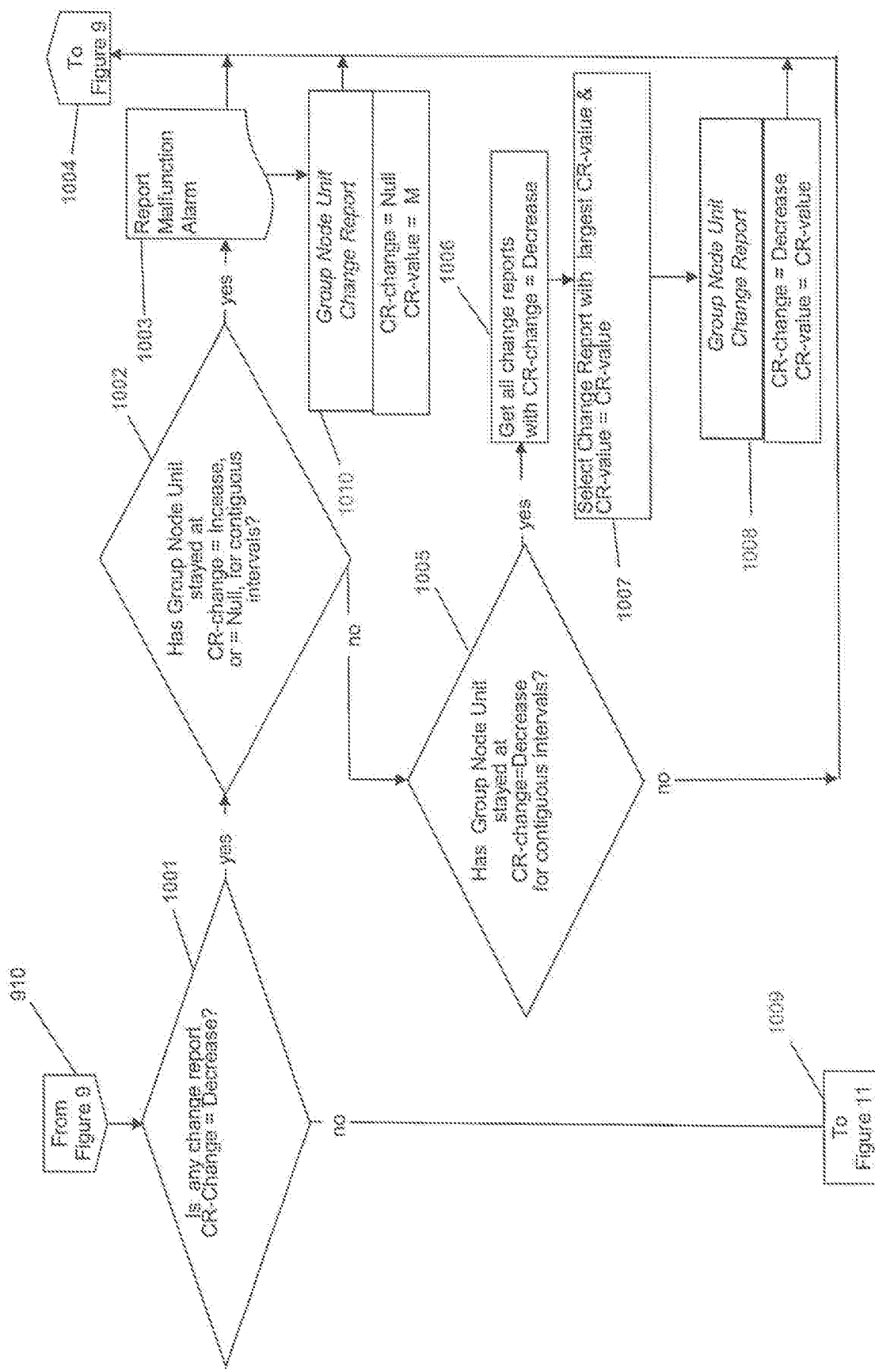
FIG. 10 is a flow chart of group node unit change report steps continuing from FIG. 9, in accordance with an embodiment of the present invention.
Figure 11:
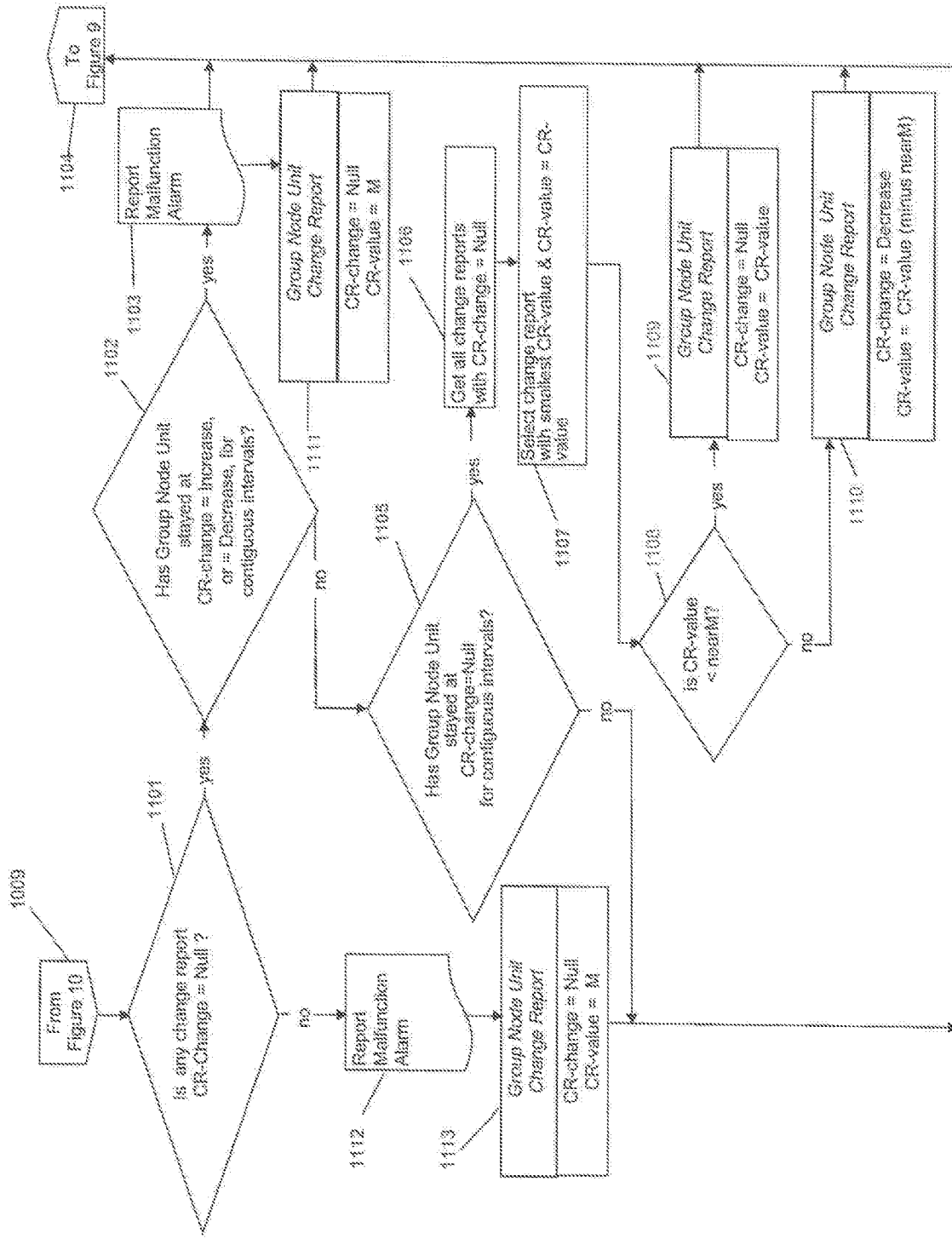
FIG. 11 is a flow chart of group node unit change report steps continuing from FIG. 10, in accordance with an embodiment of the present invention.

A group node unit is operable to perform the processes and methods shown in FIGS. 9, 10 and 11.

(Notably, a pump control node unit is operable to perform the processes and methods shown in FIGS. 15, 16 and 17, as discussed herein. A pump control node unit that receives a change report from one or more downstream node units that have a shared node with the pump in a node unit grouping will not undertake any steps that involve generating a change report, but it may undertake steps to process the change reports from the one or more node units that send it change reports that are not group node units. This processing by the pump control node unit is for the purpose of identifying whether a change of INC, DEC or NULL is required by such node units.)

The following steps as shown in FIGS. 9-11 can be undertaken by a group node unit that receives a change report from one or more downstream node units that have a shared node with the group node unit in a node unit grouping.

As an example, the steps reflect steps that could be applied to the generation of a change report relating to the node 200, as shown in FIG. 2, generated by group node unit 203 that is upstream of node 201. In such an example, group node unit 203 fulfills a dual role, it processes information transferred to it from node units that are downstream of node 201, and it sends the processed results to the node pump control node unit, as the pump is upstream of node 200. The group node unit and associated LLSA may generate a change report that is sent to the same upstream node unit to which the processed results are sent.

A skilled reader will recognize that group node units in a variety of locations within the fluid distribution system may function with such dual roles in relation to the transfer of change reports and processing of change report results sent from downstream node units that have a shared node with the group node unit in a node unit grouping.

In each of its dual roles the group node unit may undertake different steps relating to generating processing results and generating a change report, in accordance with the steps of FIGS. 9, 10 and 11. As examples, at steps 902, 1001 and 1101 the group node unit may function to undertake processing and generate processed results, whereas at steps 903, 1002 and 1102 it generates a change report. It is possible that the steps to generate a change report may occur immediately following processing steps undertaken by the group node unit, such that processing and change report generation activities are undertaken by the group node unit consecutively.

The change report processing steps are applied on an ongoing basis, such as on a fixed time interval basis, or some other basis. The processing starts at step 900, as shown in FIG. 9. The group node unit will identify its operating scale and N and M on the operating scale in particular (i.e., its operation locus), as N and M are utilized in the steps.

Change reports are collected from the one or more downstream node units have a shared node with the group node unit in a node unit grouping at step 901. The change reports are reviewed to identify any change reports that are INC reports (i.e., the CR-change is set to INC) at step 902. The first priority of this process is to service those change reports with CR-change set to INC If the answer to the query at step 902 is "yes" the group node unit then reviews its internal information to determine if its CR-change has remain DEC or NULL for contiguous review intervals at step 903. The contiguous period of review intervals may be two intervals, or any number of intervals. The period of intervals can be set in the system, and may be changed in the system. This review is applied to determine whether there is a verification that the measurement of the CR-value of the group node unit has been stable over time.

If the group node unit CR-change has remained at DEC or NULL for contiguous review intervals then a report malfunction alarm is engaged at step 904. This alarm is engaged due to the contradiction in the INC report received by the group node unit in the change reports and the prior review intervals indicating that the CR-change for the group node unit as being DEC or NULL. This contradiction indicates a significant alteration in the CR-change of at least one of the downstream node units that is indicating a CR-change of INC. An INC report received by the group node unit indicates a need for an increase in node pressure, this is inconsistent with the state of the group node unit function over the review intervals that has indicated either a NULL change or a need for a decrease in node pressure. The INC report from at least one of the downstream node units that have a shared node in a node unit grouping is not reconciled to the recent CR-change generated by the group node unit that indicates a NULL change or a need for a decrease in node pressure. Thus, the alarm is engaged to indicate this inconsistency.

If a report malfunction alarm occurs then a change report indicating that no change to the node pressure (a NULL change) is generated for the group node unit at step 911. The change report is a NULL report and it incorporates a CR-change of NULL and a CR-value of M. After the NULL change report is generated exit occurs at step 905.

If the answer to the query of step 903 is "no", the group node unit information will be reviewed to determine if it has stayed at a CR-change of INC for contiguous review intervals at step 906. The contiguous period of review intervals may be two intervals, or any number of intervals. The period of intervals can be set in the system, and may be changed in the system. This review is applied to determine whether there is a verification that the measurement of the CR-value of the group node unit has been stable over time.

If the answer to the query in step 906 is "yes" the group node unit will review the change reports it received from the downstream node units to identify any that indicate a CR-change of INC at step 907. Of the change reports that indicate the CR-change INC the change report that has the largest (highest) CR-value will be identified, and that absolute CR-value will be set as the new CR-value of the group node unit at step 908. A change report that is an INC report will be generated at step 909. The generated change report will have a CR-change of INC and a report CR-value that is equal to the absolute CR-value. The change report that is generated will indicate that an increase in node pressure is required for the system to function in an effective and efficient manner, and the magnitude of the increase is indicated by the report CR-value. After the INC change report is generated exit occurs at step 905.

If the response to the query at step 906 is "no" exit occurs at step 905.

If the answer to the query at step 902 is "no" the process continues to step 910, as shown on FIG. 9. The change reports received by the group node unit are reviewed to identify any that have a CR-change of DEC at step 1001, as shown in FIG. 10. If the answer to the review at step 1001 is "yes" the group node unit then reviews its internal information to determine if its CR-change has remain INC or NULL for contiguous review intervals at step 1002. The contiguous period of review intervals may be two intervals, or any number of intervals. The period of intervals can be set in the system, and may be changed in the system. This review is applied to determine whether there is a verification that the measurement of the CR-value of the group node unit has been stable over time.

If the answer to the query of step 1002 is "yes" then a report malfunction alarm is engaged at step 1003. This alarm is engaged due to the contradiction in the DEC report received by the group node unit in the change reports and the prior review intervals indicating that the CR-change for the group node unit as being INC or NULL. This contradiction indicates a significant alteration in the CR-change of at least one of the downstream node units that is indicating a CR-change of DEC. A DEC report received by the group node unit indicates a need for a decrease in node pressure, this is inconsistent with the state of the group node unit function over the review intervals that has indicated either a NULL change or a need for an increase in node pressure. The DEC report from at least one of the downstream node units that have a shared node in a node unit grouping is not reconciled to the recent CR-change generated by the group node unit that indicates a NULL change or a need for an increase in node pressure. Thus, the alarm is engaged to indicate this inconsistency.

If a report malfunction alarm occurs at step 1003 then a NULL change report is generated for the group node unit at step 1010. The NULL change report will reflect a CR-change of NULL and a CR-value of M. After the NULL change report is generated the process progresses through step 1004 and exits at step 905.

If the answer to the query of step 1002 is "no" then the group node unit information will be reviewed to determine if it has stayed at a CR-change of DEC for contiguous review intervals at step 1005. The contiguous period of review intervals may be two intervals, or any number of intervals. The period of intervals can be set in the system, and may be changed in the system. This review is applied to determine whether there is a verification that the measurement of the CR-value of the group node unit has been stable over time.

If the answer to the query of step 1005 is "yes" the group node unit will identify all of the change reports it received that are DEC reports (i.e., change reports with a CR-change of DEC) at step 1006. The DEC report that has the largest (highest) CR-value of all of the DEC reports identified at step 1006 will be identified at step 1007, and the CR-value of the group node unit will be set to be equal with the CR-value of the of the report that has the lowest CR-value. A DEC report will be generated as the change report of the group node unit at step 1008 and the change report will include a CR-change of DEC and a CR-value that is equal to the CR-value set for the group node unit in step 1008.

The DEC report generated at step 1008 is based upon the results of a review of the group node unit information at steps 1002 and 1005, and the results of a review of the change reports received by the group node unit from the downstream node units that have a shared node in a node unit grouping at steps 1001 and 1006. These reviews result in an indication that there is a need to decrease node pressure in order for the system to function in an efficient and effective manner. Therefore, the change report generated for the group node unit indicates the need for a decrease by incorporating a CR-change that is DEC. The CR-value indicates the magnitude of the decrease that is required. This magnitude of decrease is consistent with the magnitude of decrease required by the downstream node unit(s) (that have a shared node in a node unit grouping) that require the most significant magnitude of decrease. (There may be one or more than one direct downstream node unit having an equal magnitude of decrease.)

The process progresses through step 1004 to exit at step 905.

If the answer to the review at step 1005 is "no" the process progresses through step 1004 to exit at step 905.

If the response to the review at step 1001 is "no" the process continues to step 1009, as shown on FIG. 11. The change reports received by the group node unit from the downstream node units (that have a shared node in a node unit grouping) are reviewed to identify change reports that have a CR-change of NULL at step 1101. If the answer to the review at step 1101 is "yes" the group node unit information is reviewed to determine if the group node unit has stayed at a CR-change of INC or DEC for contiguous review intervals at step 1102. The contiguous period of review intervals may be two intervals, or any number of intervals. The period of intervals can be set in the system, and may be changed in the system. This review is applied to determine whether there is a verification that the measurement of the CR-value of the group node unit has been stable over time.

If the answer to the review at step 1102 is "yes" then a report malfunction alarm is engaged at step 1103. This alarm is engaged due to the contradiction between the NULL report received by the group node unit in the change reports and the prior review intervals indicating that the CR-change for the group node unit as being INC or DEC. This contradiction indicates a significant alteration in the CR-change of at least one of the downstream node units that is indicating a CR-change of NULL. A NULL report received by the group node unit indicates that there is not a need for either a decrease or an increase in node pressure, this is inconsistent with the state of the group node unit lox function over the review intervals that has indicated either a need for a decrease or a need for an increase in node pressure. The NULL report from at least one of the downstream node units (that have a shared node in a node unit grouping) is not reconciled to the recent CR-change generated by the group node unit that indicates a need for a decrease or a need for an increase in node pressure. Thus, the alarm is engaged to indicate this inconsistency.

If a report malfunction alarm occurs then a NULL report is generated as the change report of the group node unit at step 1111. The NULL change report will reflect a CR-change of NULL and a CR-value of M. The process progresses through step 1104 to exit at step 905.

If the answer to the review at step 1102 is "no" then the group node unit information will be reviewed to determine if it has stayed at a CR-change of NULL for contiguous review intervals at step 1105. The contiguous period of review intervals may be two intervals, or any number of intervals. The period of intervals can be set in the system, and may be changed in the system. This review is applied to determine whether there is a verification that the measurement of the CR-value of the group node unit has been stable over time.

If the answer to the query at step 1105 is "yes" the group node unit will identify all of the change reports it received that are NULL reports (i.e., change reports with a CR-change of NULL) at step 1106. The NULL report that has the smallest (lowest) CR-value of all of the NULL reports identified at step 1105 will be identified at step 1107, and the CR-value of the group node unit will be set to be equal with the CR-value of the report that has the lowest CR-value. The CR-value set in step 1107 will be reviewed at step 1108 to determine if it is less than nearM. If the response to the review at step 1108 is "yes" a NULL report will be generated as the change report of the group node unit at step 1109 and the change report will include a CR-change of NULL and a CR-value that is equal to the CR-value set for the group node unit in step 1107.

A NULL change report will be generated in accordance with step 1109 based upon the results of a review of the group node unit information at steps 1102 and 1105, and the results of a review of the change reports transferred to the group node unit from downstream node units (that have a shared node in a node unit grouping) at steps 1101 and 1107. These reviews result in an indication that there is not a need to either increase or decrease node pressure in order for the system to function in an efficient and effective manner. Therefore, the change report generated for the group node unit indicates that there is no need to increase or decrease node pressure by incorporating a CR-change that is NULL.

If the answer to the query at step 1108 is "no" a DEC report will be generated as the change report of the group node unit at step 1110. The DEC report will include a CR-change of DEC and a CR-value of that is equal to the CR-value (representing a value that relates to a position on the operation locus, namely a locus position) set for the group node unit in step 1107 minus nearM. The process progresses through step 1104 to exit at step 905.

The DEC report generated at step 1110 is based upon the results of a review of the group node unit information at steps 1002 and 1005, and the results of a review of the change reports received by the group node unit from the downstream node units (that have a shared node in a node unit grouping) at steps 1101 and 1107. These reviews result in an indication that there is a need to decrease node pressure in order for the system to function in an efficient and effective manner, at the lowest possible level of energy consumption at the pump in the section that the group node unit is located within. Change report generated at step 1110, indicates the need to for the pressure at all nodes in the distribution system to be the lowest possible. Therefore, the change report generated for the group node unit indicates the need for a decrease by incorporating a CR-change that is DEC. The CR-value indicates the magnitude of the decrease that is required. This magnitude of decrease is consistent with the magnitude of decrease required by the downstream node unit that have a shared node in a node unit grouping that requires the most significant magnitude of decrease.

If the answer to the query at step 1105 is "no", the process progresses through step 1004 to exit at step 905.

If there response to the query at step 1101 is "no", a report malfunction alarm will result at step 1112 that indicates a failure. A change report will be generated for the group node unit at step 1113 that indicates a CR-change of NULL and a CR-value equal to M. After step 1113 the process progresses through step 1104 to exit at step 905.

If a change report for the group node unit is generated at any of steps 911, 909, 1010, 1008, 1111, 1109, or 1110 the change report is transferred upstream from the group node unit to the upstream node unit having a shared node with either the group node unit in a node unit grouping or with an upstream pump control node unit. For example, the change report may not be transferred to either a load node unit or to a load control node unit. The change report will indicate to the system that fluid pressure at the node that is upstream of the group node unit that generated the change report should be decreased if the change report is a DEC report, increased if the change report is an INC report, or not increased nor decreased if the change report is a NULL report.

For example:
if the change report is a DEC report the node pressure may be lowered in accordance with the CR-value that indicates the magnitude of the decrease that is required for the node pressure to be such that it effects an efficient and effective function of the system. The result of the decrease of node pressure is decreased energy consumption by the pump of the fluid distribution system. Decreased energy consumption further translates into monetary cost savings as the cost of energy is based upon the amount of energy consumed.
if the change report is an INC report the node pressure may be raised in accordance with the CR-value that indicates the magnitude of the increase that is required for the node pressure to be such that it effects an efficient and effective function of the system. The result of the increase of node pressure is increased energy consumption by the pump of the fluid distribution system.
if the change report is a NULL report the node pressure is not changed and energy consumption by the pump of the fluid distribution system is unchanged.

If a change report for the group node unit is not generated based on the steps of FIGS. 9-11, then the values of the previous change report transferred upstream from the group node unit to the upstream node unit having a shared node with the group node unit in a node unit grouping will be utilized by the upstream node unit. The group node unit will continue to process the change reports that it receives in accordance with the steps of FIGS. 9-11 and the next change report it generates will be transferred upstream.

Prior Art Systems Functions

The prior art systems, such as that discussed herein in relation to FIG. 12, do not include the generation of change reports that reflect the operation locus of node units or the operation locus range of multiple node units of the system. Therefore, the prior art systems do not function in accordance with an operation locus range that ensures efficient and effective operation by all node units in the system. The result is that the prior art cannot achieve the balancing of the pressure in a fluid distribution system as effectively as the present invention and consequently such systems cannot provide consistent heating and/or cooling throughout a building. The prior art systems are also less energy efficient than the present invention and therefore are more costly to implement than the present invention.

Figure 13:
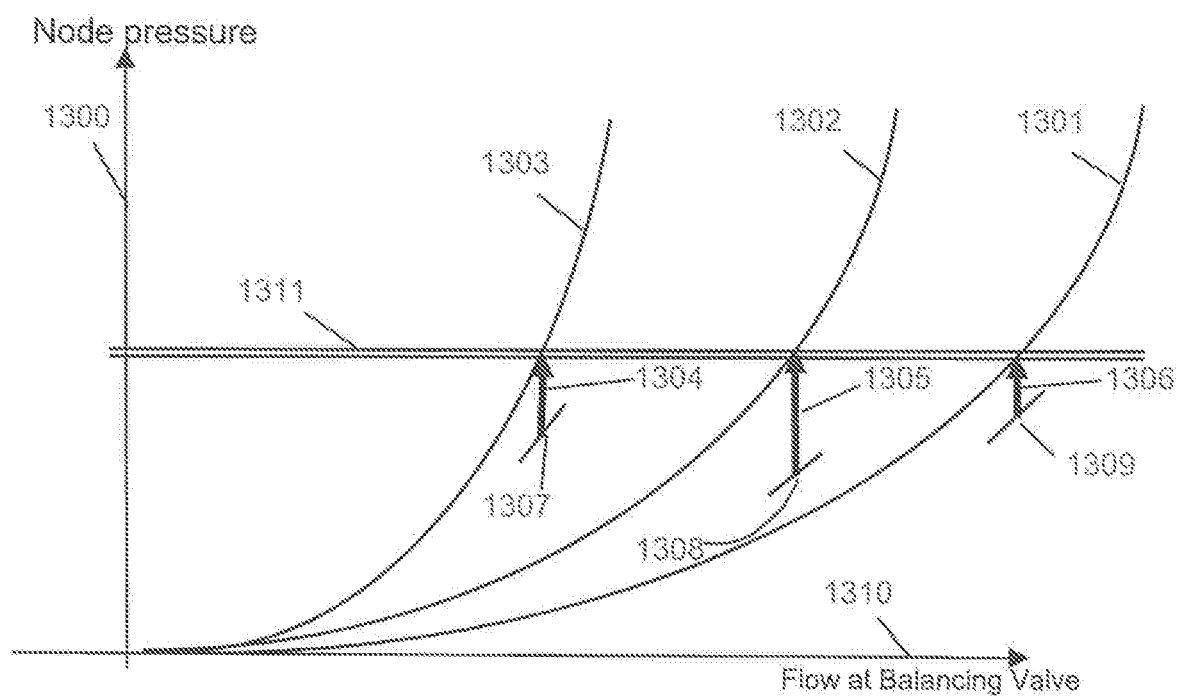
FIG. 13 is a table showing pressure loss for three balancing valves operating in parallel on the same node of a prior art system.

FIG. 13 is a graph showing results of the function of a prior art system, such as the prior art system shown in FIG. 12 and as is discussed herein. In particular, FIG. 13 relates to a prior art system with manually adjusted balancing valve operations of three balancing valves that all are downstream of a node. There is an applied pressure at the node.

The curves 1303, 1302, 1301 in FIG. 13 each relate to one of three balancing valves, such as the balancing valves shown in FIG. 12. For example, curve 1303 represents a balancing valve (such as balancing valve 1206 shown in FIG. 12), curve 1302 represents a balancing valve (such as balancing valve 1211 shown in FIG. 12), curve 1301 represents a balancing valve (such as balancing valve 1216 shown in FIG. 12).

The horizontal axis 1310 of the graph indicates flow at the balancing valve, and the vertical axis 1300 indicates node pressure If the pump of the prior art system (such as pump 1202 shown in FIG. 12) is set to full speed, this generates 100% node pressure (such as the node pressure existing at node 1201 shown in FIG. 12) as indicated by line 1311, as shown in FIG. 13.

Should a technician manually adjust the balancing valve related to curve 1303 to a pressure setting 1307 the result may be the addition of line pressure loss (as indicated by line pressure loss indicator 1304) to the line pressure loss. The line pressure loss indicator shows the total line pressure loss drop of all other lines in series with the balancing valve in the prior art system.

Should a technician manually adjust the balancing valve related to curve 1302 to a pressure setting 1308 the result may be the addition of line pressure loss (as indicated by line pressure loss indicator 1305) to the line pressure loss. The line pressure loss indicator shows the total line pressure loss drop of all other line elements in series with the balancing valve in the prior art system.

Should a technician manually adjust the balancing valve related to curve 1301 to a pressure setting 1309 the result may be the addition of line pressure loss (as indicated by line pressure loss indicator 1306) to the line pressure loss. The line pressure loss indicator shows the total line pressure loss drop of all other line elements in series with the balancing valve in the prior art system.

In the prior art, each balancing valve is adjusted to a different pressure setting that is a line resistance level adjustment, and this results in a line pressure drop. The vertical length of line pressure loss indicators 1304, 1305, 1306 represent the different amount of line pressure loss resistance the technician had to add when manually adjusting the balancing valves to achieve the target flow through the balancing valve in response to the applied pressure.

All three balancing valves are adjusted by the technician to a fixed level, which is the level that is required to achieve the node pressure indicated by line 1311.

Figure 14:
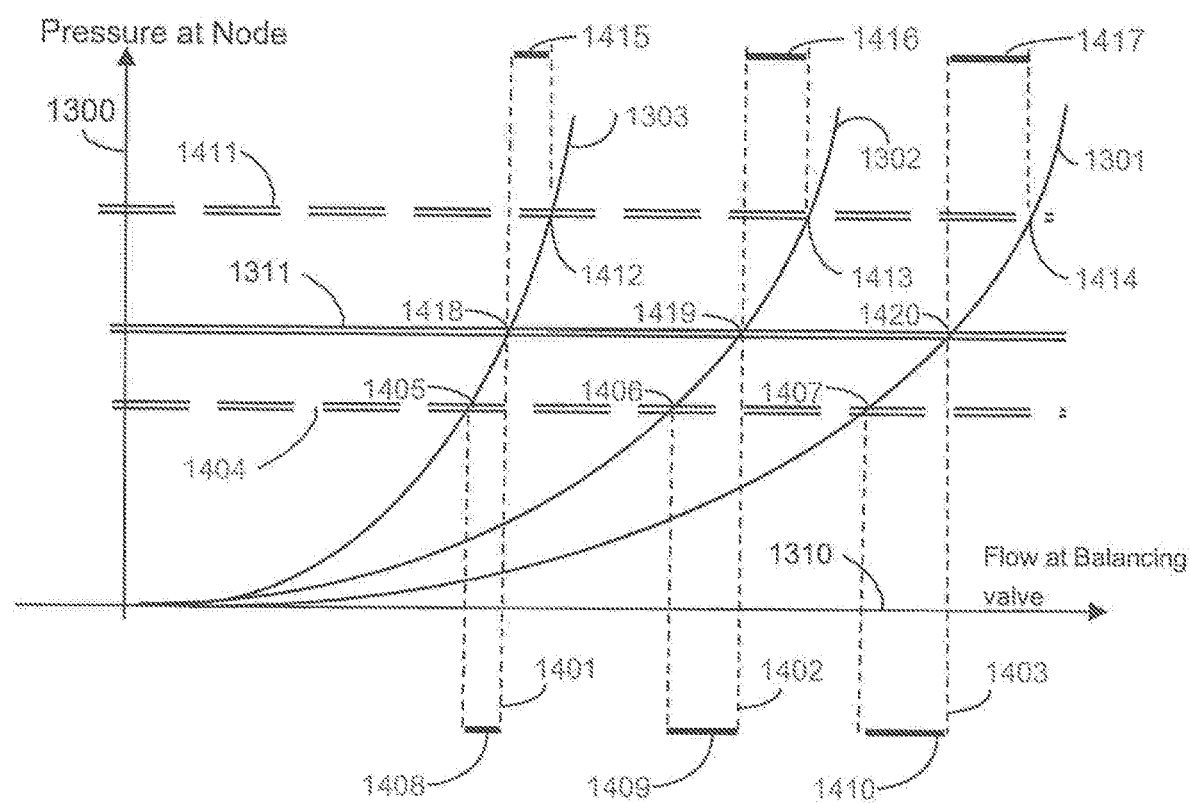
FIG. 14 is a table showing pressure loss of three balancing valves operating in parallel on the same node in a prior art system.

A balancing of the nodes may occasionally occur in practice of the prior art. However, a change in the applied node pressure cannot be accommodated in the prior art, as is shown in FIG. 14. The present invention can achieve accommodation of a change in applied node pressure. Moreover, the present invention does not require a technician to manually adjust the node pressure, and further does not require that node pressure be set to a specific level or any other set numeric value.

FIG. 13 shows a completely balanced node wherein all three balancing valves in the system are adjusted to a fixed resistance level, at an applied pressure indicated by line 1311. FIG. 14 shows how a change in the applied node pressure indicated by line 1311 cannot be accommodated by the prior art. The horizontal axis 1310 indicates the flow at the balancing valve, and the vertical axis 1300 indicates the pressure at the node.

Lowering, or decreasing, the applied pressure, which may occur in the system as an operational occurrence and also when the flow demands of thermal loads decrease, by manually adjusting other balancing valves to a level of pressure indicated by line 1404, will intersect the curves 1303, 1302, 1301 at intersections 1405, 1406 and 1407 respectively. This indicates a corresponding reduction in flow, as is indicated by flow indicators 1408, 1409, 1410 respectively. The reduction in flow causes the flow to be below the target flow that is indicated by target flow indicators 1401, 1402, 1403 respectively. A result of manually adjusting and setting the balancing valves at a fixed setting in this manner is that the target flows in all three balancing valves are reduced in a disproportionate manner as a result of the unequal slope of the segments between intersections 1418 and 1405, 1419 and 1406, and 1420 and 1407. This differing slope issue reflects the non-linearity that defeats the apparent balancing process of the prior art.

Also, where the target design flow, indicated by target flow indicators 1401, 1402, 1403 respectively, is greater the reduction in flow, as indicated by the flow indicators 1408, 1409, 1410 respectively, is greater at the same node pressure indicated by line 1404.

Raising the applied pressure, which may occur in the system as an operational occurrence (such as a manual adjustment) and also when the flow demands of thermal loads increase, to a pressure level indicated by line 1411 will cause the pressure level to intersect the curves 1303, 1302, 1301 at intersections 1412, 1413, 1414 respectively. This reflects a corresponding increase in flow, as indicated by flow increase indicators 1415, 1416, 1417 respectively, above the target flow. The reduction in flow causes the flow to be below the target flow that is indicated by target flow indicators 1401, 1402, 1403, respectively. A result of manually adjusting and setting the balancing valves at a fixed setting in this manner is that the target flows in all three balancing valves are reduced in a disproportionate manner as a result of the unequal slope of the segments between intersection 1412 and 1418, 1413 and 1419, 1414 and 1420. This differing slope issue reflects the non-linearity that defeats the apparent balancing process of the prior art. With the fixed line pressure loss resistance level of the balancing valve setting, an increase in the applied pressure to the level indicated by line 1411 results in an increase in flow in each example.

Due to the non-linearity of the line pressure loss drop, increases in flow relating to each of the balancing valves are not of the same magnitude and do not result in the same node pressure. Also, where the target design flow is greater, the increase in flow, as indicated by flow increase indicators 1415, 1416, 1417 respectively, is greater at the same node pressure.

Thus, the fixed line pressure loss resistance setting of balancing valves of the prior art is not capable of regular pressure adjustments to achieve node balancing throughout the system. The prior art is further not able to address changes in node pressure to maintain the design flow capacity level. For example, in the prior art to ensure that all balancing valves receive their design flow capacity level, as a minimum or above the minimum, the node pressure must be kept equal to, or above, the node pressure used at time of the manual balancing procedure.

If the speed of the pump is reduced in prior art systems, node pressures are reduced at all balancing valves in the fluid distribution system. This will result in flows through the balancing valves being reduced below the design flow capacity levels. This is not advisable with HVAC systems in particular, where reductions to varying degrees in capacity demand flow levels represent a significant disturbance and reduction in effectiveness of the distribution system capacity to maintain the desired conditions in the building.

The present invention addresses these limitations of the prior art. The present invention is operable to achieve node balancing without any requirement that any nodes be manually adjusted, or otherwise set, to any specific identifiable pressure level. The present invention operates to identify the adjustments to pressure that need to be made to cause all of the nodes to be balanced and to provide heating and cooling consistently to all areas in a building. The present invention does not identify any specific identifiable level that any node must be set to, but rather collects information relating to the function of the node units (which may be related to the pressure at the shared node that is upstream of the node unit) and utilizes this information to adjust the function of the pump to increase or decrease the pump speed, or to make a NULL change to the pump speed. The collected information incorporates the operation scale and the operation locus for each node unit, as well as the operation locus range for multiple node units in the system (in node unit groupings). The outcome is: balanced nodes in the fluid distribution system; energy efficiency; cost savings; and the whole of the building is consistently serviced with heating and cooling as required.

Adjustment of Pump Speed

The steps in the process of the present invention whereby a pump control node unit adjusts the speed of the pump of the fluid distribution system of the present invention are set out in FIGS. 15, 16 and 17. These steps are performed by the pump control node unit. Generally the pump control node unit is connected to the pump variable speed drive which is attached to the pump. The pump control node unit is operable to receive one or more change reports from one or more node units that are directly downstream of the pump, or one or more downstream node units that have a shared node with the pump in a node unit grouping. The pump control node unit reviews the one or more change reports it receives and determines whether the speed of the pump should be altered. If the speed of the pump should be altered the pump control node unit sends instructions to the pump variable speed drive. Upon receipt of such instructions the pump variable speed drive will vary the speed of the pump in accordance with the instructions it has received.

For example, in the configuration of an embodiment of the present invention as is shown in FIG. 2, the pump 211 is upstream of node 200 that is a shared node of: a node unit grouping including the pump 211 and the load node unit 217, as well as a node unit grouping including the pump 211 and the group node unit 203. As shown in FIG. 3, the load node unit 217 and the group node unit 203 are operable to transmit information including change reports to the pump control node unit 213. The pump control node unit is further connected to the variable speed drive 212 that is operable to set the speed of the pump 211. The speed of the pump is set in accordance with the CR-change indicated in the one or more change reports received by the pump control node unit (generated by one or more node units in a node unit grouping with the pump, for example, the node unit(s) may be directly downstream of the pump (such as load node unit 3117, as shown in FIG. 31), or the node unit(s) may have a shared node with the pump (such as node 200 as a shared node as shown in FIG. 2 in relation to load node unit 217 and group node unit 203)).

The one or more change reports received by the pump control node unit are reviewed and utilized in accordance with the steps of FIGS. 15, 16 and 17 to determine whether the speed of the pump should be altered. The one or more change reports received by the pump control node unit will each indicate a CR-change that is INC, DEC, or NULL. A CR-change that is INC indicates that the pump speed should be increased to achieve balancing of the pressure at the nodes in the fluid distribution system. A CR-change that is DEC indicates that the pump speed should be decreased to achieve balancing of the pressure of the nodes in the fluid distribution system. A CR-change that is NULL indicates that the pump speed should not be changed to achieve balancing of the pressure of the nodes in the fluid distribution system. Whether there is a requirement for any alteration of the speed of the pump will be determined in accordance with the process shown in FIGS. 15, 16 and 17.

An alteration of pump speed will affect the pressure at the nodes throughout the system, and will change the pressure of the fluid within the system. Essentially there is a trickledown effect as the fluid is pumped through the system at an altered pump speed. As the fluid pumped at the altered pump speed flows through the system the measured flow and change reports generated by the node units will be altered in accordance with the change in the pressure caused by the change of the pump speed.

The pump control node unit receives change reports from the one or more node units that are either directly downstream of the pump, or downstream and have a shared node with the pump in a node unit grouping. The one or more change reports received by the pump control node unit include information relating to the current operating state of each node unit from which it receives a change report. Notably, some change reports may indicate information that is collected from other not directly downstream nodes, such as change reports from group node units, load node units and load control node units that reflect information based upon a review of change reports from the most remote downstream node units. However, the pump control node unit receives change reports for the one or more node units that are directly downstream and that have a shared node.

Change reports are utilized by the system to ultimately adjust the pump speed.

The priority of the steps of the process implemented by the pump control node unit is to service (i.e., process) the change reports that indicate a CR-change that is set to INC (i.e., change reports that are INC reports).

The pump control node unit operates without an integral LLSA and therefore does not engage in any of the processes related to LLSA operation to maintain flow and to generate information related to change reports. However, the pump control node unit receives one or more change reports that are from one or more of any of the following node units that are immediately downstream of the pump or have a shared node with the pump: group node units, load node units, or load control node units. The pump control node unit also receives one or more demand target flow settings from one or more of any of the following node units that are immediately downstream of the pump or have a shared node with the pump: group node units, load node units, or load control node units.

The group node unit transmits pump speed change demand to the variable speed drive operating with the pump that is based upon the change report processing it undertakes. The group node unit receives pump speed information from the variable speed drive operating with the pump. The pump control node unit transmits one or more demand target flow settings that it receives to one or more for any of the following node units: group node units, load node units, or load control node units.

If the pump control node unit receives one or more change reports that are from one or more node units that are any of: group node units, load node units, and/or load control node units that have a shared node with the pump or are directly downstream of the pump, the pump control node unit will undertake the steps of FIGS. 15, 16 and 17.

The process is applied on an ongoing basis, such as on a fixed time interval basis. The process starts at step 1500, as shown in FIG. 15. The change reports are received by the pump control node unit at step 1501 from either node units that have a shared node with the pump or node units that are directly downstream of the pump.

The change reports are reviewed by the pump control node unit to identify any change reports that are INC reports (i.e., include a CR-change of INC) at step 1502. If the response to the query at step 1502 is "yes" the pump control node unit will identify all of the change reports that are INC reports at step 1503. The INC reports will be reviewed to identify the INC report that has the largest (highest) CR-value at step 1504. At step 1505 The CR-value of the pump control node unit will be set to be equal to the CR-value minus N of the INC report identified at step 1504.

This re-setting of the CR-value of the pump control node unit isolates the node pressure deficiency component. (As an example, the node pressure deficiency component relates to a segment of the operation scale of load node units, load control node units and group node units (and not the pump control node unit) that is below M (such as segment 703, as shown in FIG. 7). The segment of the operation scale that extends below M represents a range that is lower than the operation locus wherein the LLSA of the node unit can function to maintain the target flow setting, and thereby create an efficient and effective system that has balanced pressure at the nodes in the system.)

The pump control node unit will function at step 1506 to convert the CR-value of the pump control node unit (that represents any magnitude of any alteration to increased pressure required to balance the system) to a speed change increment that is a percentage of the full speed of the pump. The speed change increment will be a differential increase value in pump speed that is a percentage of the full speed of the pump. A discussion of the speed change increment is provided below.

The process will exit at step 1511.

If the answer to the query at step 1502 is "no" the process progresses to the next step. The process now reviews the change reports to identify any change reports that are DEC reports (i.e., change reports with CR-change of DEC) at step 1600, as shown on FIG. 16.

If the answer to the review at step 1600 is "yes" the pump control node unit will identify all of the change reports that indicate a CR-change of DEC at step 1601. The change report that has the largest (highest) CR-value of all of the DEC reports will be identified at step 1602. At step 1603 the absolute value of the largest CR-value of the pump control node unit identified at step 1602 will be set as the CR-value.

This re-setting of the CR-value of the pump control node unit isolates the excess node pressure component. (As an example, the excess node pressure component relates to a segment of the operation scale of load node units, load control node units and group node units (and not the pump control node unit) that is above M (such as segment 705, as shown in FIG. 7). The segment of the operation scale that extends above N represents a range that is higher than the operation locus wherein the LLSA of the node unit can function to maintain the target flow setting, and thereby create an efficient and effective system that has balanced pressure at the nodes.)

The pump control node unit will function to convert the CR-value of the pump control node unit (that represents the magnitude of any alteration to decreased pressure required to balance the system) to a speed change increment that is a percentage of the full speed of the pump at step 1604. The speed change increment will be a differential decrease value in pump speed that is a percentage of the full speed of the pump.

The process will exit at step 1511.

If the answer to the review at step 1600 is "no" the process progresses to the next step. The process now reviews the change reports to identify any change reports that are NULL reports (i.e., change reports with CR-change of NULL) at step 1700, as shown in FIG. 17.

If the answer to the review of step 1700 is "yes", the pump control node unit will identify all of the change reports that indicate a CR-change of NULL at step 1701. The change report that has the smallest (lowest) CR-value of all of the NULL reports identified at step 1701 will be identified at step 1702.

The CR-value identified at step 1703 will be reviewed to determine if the CR-value is less than nearM.

If the answer to the query at step 1703 is "yes" the process is completed and exits at step 1511. In this instance the speed of the pump is not changed.

If the answer to the query at step 1703 is "no", at step 1704 the CR-value of the pump control node unit will be set to the CR-value identified at step 1702.

This re-setting of the CR-value of the pump control node unit isolates the excess node pressure component. (As an example, the excess node pressure component relates to a segment of the operation scale of load node units, load control node units, and group node units (and not the pump control node unit) that is above M (such as segment 705, as shown in FIG. 7). The segment of the operation scale that extends between M and N (such as segment 702, as shown in FIG. 7) represents a range that is the operation locus wherein the LLSA of the node unit can function to maintain the target flow setting, and thereby create an efficient and effective system that has balanced pressure at the nodes.)

At step 1705 the pump control node unit will function to convert the CR-value of the pump control node unit (that represents the magnitude of any alteration to decreased pressure required to balance the system) to a speed change increment that is a percentage of the full speed of the pump. The speed change increment will be a differential decrease value in pump speed that is a percentage of the full speed of the pump.

The process will exit at step 1511.

Pump Speed Change Increment

The speed change increment that is generated by the pump control node unit, in accordance with the steps of FIGS. 15-17, will indicate an increase speed change at step 1506, or a decrease speed change at steps 1604, 1705.

Figure 25:
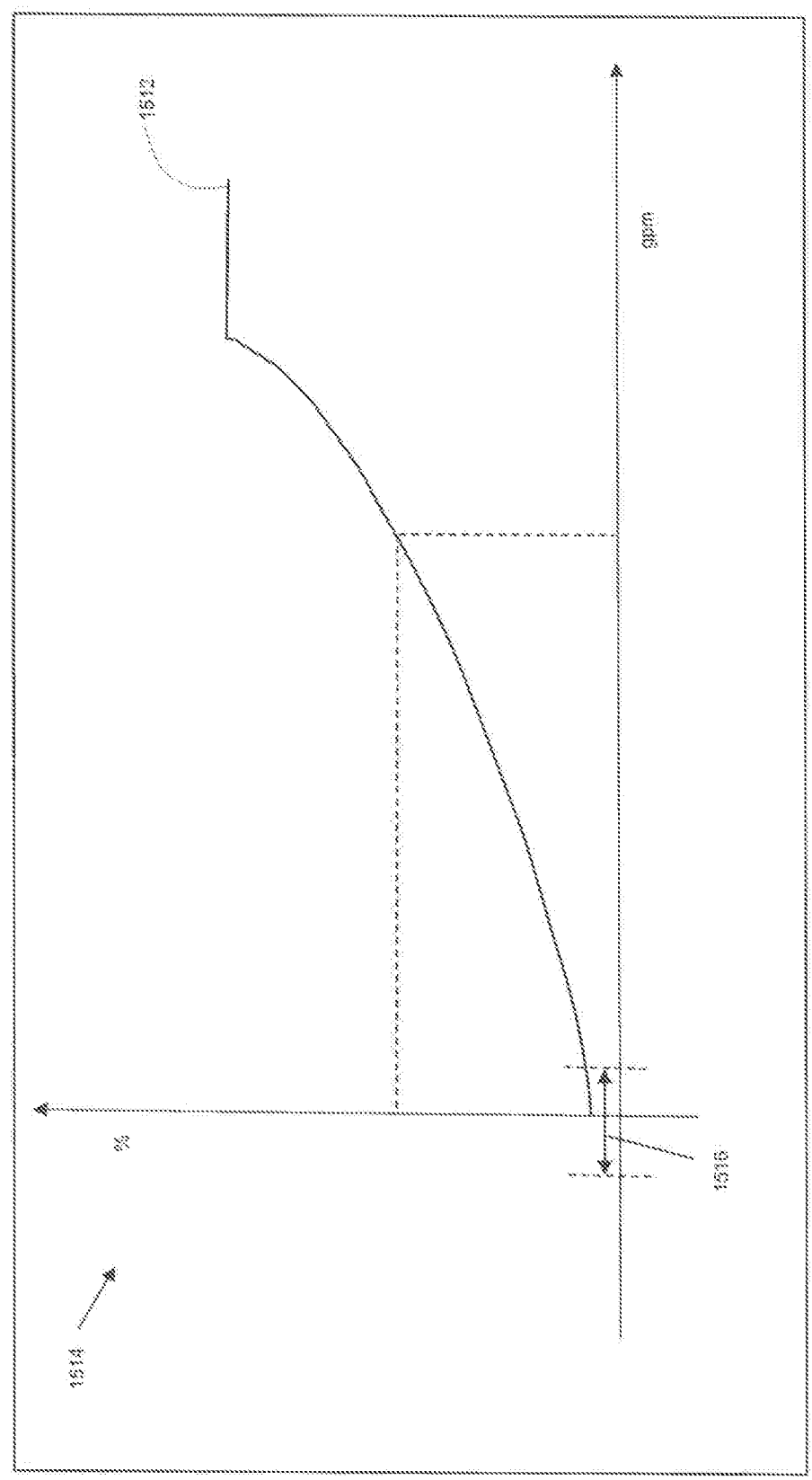
FIG. 25 is a graph showing the determination of the loop control non-linear transfer function whereby differential increase value in pump speed is determined as a percentage of full speed, in accordance with an embodiment of the present invention.

As shown in FIG. 25, a graph 1514 can be utilized to represent the determination of a differential increase or decrease value in pump speed as a percentage of the full speed of the pump occurring at step 1506 of FIG. 15. As shown in graph 1514 of FIG. 25, the horizontal axis indicates a measure of flow as gallons per minute (gpm), and the vertical axis indicates a percentage of the full speed of the pump.

Generally, the differential value that is determined can be referenced as a "jog speed". The jog speed can be a differential increase or a differential decrease as indicated in FIGS. 15-17 and 25-30. The jog speed is a non-linear output. The determined jog speed is transmitted and applied to the loop control elements of the present invention. (The loop control elements of the present invention are those elements that are operated to achieve the loop control process described herein.) The nonlinearity and the instability detection components of the loop control elements are vital to the stability of the node pressures within the fluid distribution system. In particular, the nonlinearity and instability detection components attain and maintain stability while the pump speed is altered, as well as during the node pressure changes that occur as a consequence of the alteration of the pump speed. The nonlinearity and instability detection components also attain and maintain stability during other random disturbances occurring in the fluid distribution system.

A percentage speed differential high limit 1512 may be imposed in the determination. The intersection of the horizontal and vertical dotted lines along the percentage speed differential curve in the graph represents the percentage speed change of the pump.

The graph 1514 further indicates the identification of a dead band range, which is utilized as a parameter by the system. The dead band range 1516 is the neutral zone or dead zone wherein no actions are generated by loop control. The dead band range is identified by the system and can be utilized in determinations and calculations undertaken by the present invention, as described herein.

Pump Speed Change Elements

Figure 26:
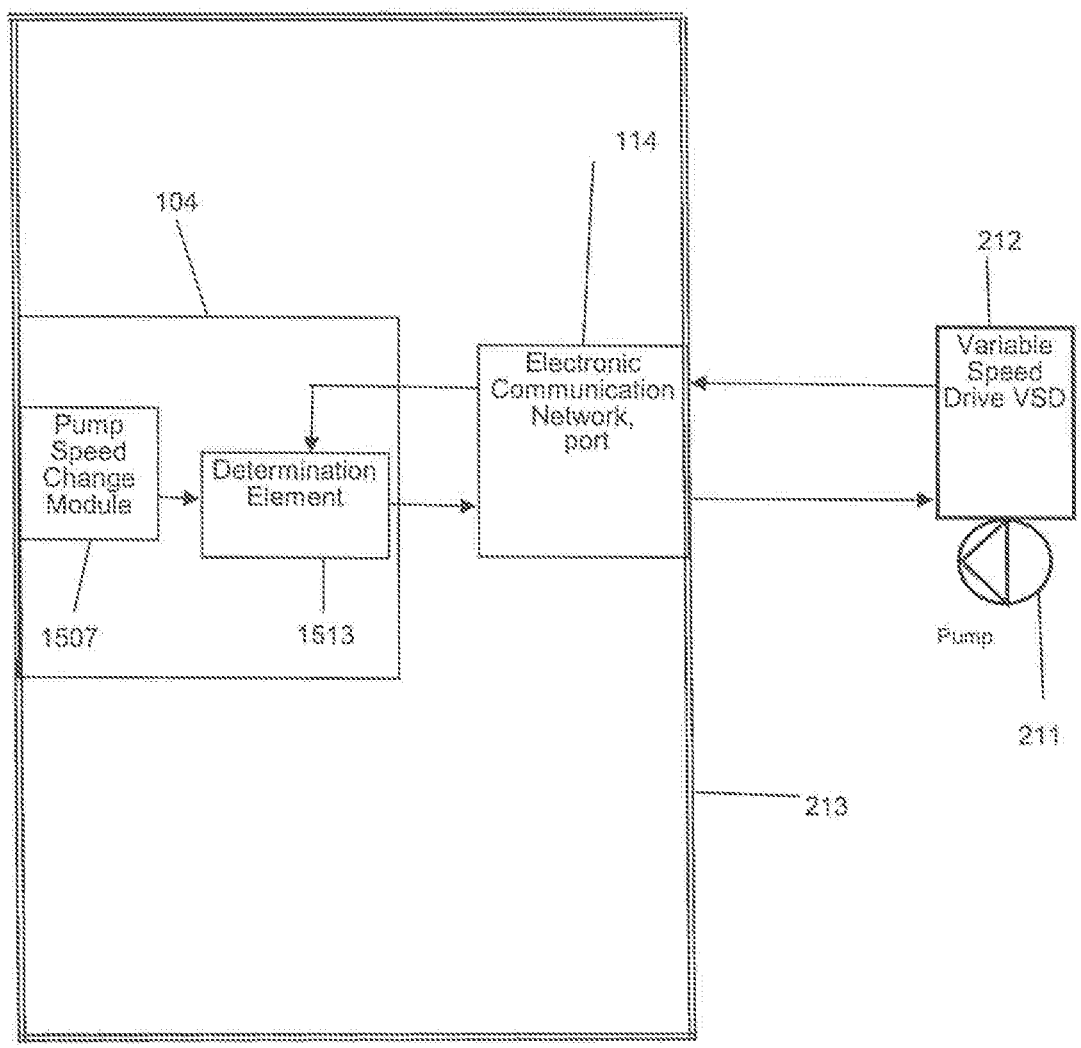
FIG. 26 is a system diagram showing the elements that transmit and receive information to increase or decrease the speed of the pump, in accordance with an embodiment of the present invention.

As shown in FIG. 26, a pump control node unit is operable to effect a change in the speed of the pump. FIG. 26 identifies some elements shown in FIGS. 1 and 2, however, a skilled reader will recognize that other embodiments of the present invention may also incorporate the elements and the function depicted relating to FIG. 26.

As shown in FIG. 26, a pump control node unit 213 is attached to a LLSA that incorporates a microprocessor 104 operable to undertake the steps of FIGS. 15, 16 and 17.

The microprocessor may utilize programming accessible in the program of the pump control node unit. The microprocessor may incorporate a pump speed change module 1507 operable to determine the percentage increase of pump speed change. Depending upon the steps of FIGS. 15-17 that are applied the following may occur:

In accordance with step 1506 of FIG. 15 based upon an identification of change reports that have a CR-change of INC, the percentage increase of pump speed change (i.e., the jog value) is transmitted to the determination element 1513.

In accordance with step 1604 of FIG. 16 based upon an identification of change reports that have a CR-change that is DEC, the percentage decrease of pump speed change (i.e., the jog value) is transmitted to a determination element 1513.

In accordance with step 1705 of FIG. 16 based upon an identification of change reports that have a CR-change that is NULL and the smallest CR-value of those NULL reports identified as having a CR-value greater than nearM, the percentage decrease of pump speed change (i.e., the jog value) is transmitted to a determination element 1513.

The pump 211 is connected to the variable speed drive 212. The pump speed is originally set by the pump variable speed drive and can only be changed by the pump variable speed drive, so the pump variable speed drive always knows the pump speed. The actual current pump speed is transmitted from the variable speed drive to the pump control node unit 213. The electronic communication network port 114 of the pump control node unit receives the actual current pump speed. The electronic communication network port transmits the actual current speed to the determination element 1513.

For an INC report the determination element performs a determination whereby the percentage increase is added to the actual current pump speed. For a DEC report the determination element performs a determination whereby the percentage increase is subtracted from the actual current pump speed.

The determination generates a new speed set point. The new speed set point is transmitted from the determination element to the electronic communication network port 114. The electronic communication network port transmits the new speed set point to the variable speed drive. The variable speed drive alters the frequency of the alternating voltage delivered to the pump, thereby changing the pump speed to a setting that is consistent with the new speed set point. The pump speed is altered so that the pump speed is in accordance with the new speed set point.

The pump speed change module is incorporated in the microprocessor 104 and can utilize programming stored in the program of the pump control node unit.

It is possible that the new speed set point may be the same as the actual current pump speed. In this circumstance the pump speed of the pump will not be altered.

A skilled reader will recognize that utilizing the actual current pump speed in the determination performed by the loop control rather than the current speed target setting achieves a greater level of accuracy. The accuracy reflects the pump speed that needs to be set to achieve pressure balance at all of the nodes within the fluid distribution system.

Control Loop Processes

The group node units in the fluid distribution system operate to collect information from the downstream node units that have a shared node with the group node unit. A group node unit may utilize the collected information to reposition the balancing valve and/or other valves within the LLSA associated with the group node unit. Adjustment of the balancing valve and/or other valves within a LLSA affects the flow of the fluid through the LLSA. This in turn affects the flow of the fluid to the LLSAs connected to the node unit(s) that are downstream of the group node unit, and the flow of fluid generally within the fluid distribution system, as the fluid flows downstream from the LLSA associated with the group node unit.

For example, if flow is increased or decreased at the LLSA associated with the group node unit this will affect the flow that reaches the LLSAs associated with the node units downstream of the group node unit, and if one of the downstream node units is another group node unit the flow from that downstream group node unit to any node units downstream of it will also be affected, and so on.

The adjustment of the balancing valve and/or other valves within a LLSA will also affect the flow of fluid upstream from the LLSA, as information relating to the adjusted fluid flow at the LLSA will be processed at the LLSA and its associated node unit and transferred to the upstream node unit that has a shared node with the LLSA in a node unit grouping. The information transferred upstream may be used to adjust the balancing valve and/or other valves of the upstream LLSA associated with the upstream node unit that receives such information.

As another example, the information processed by a LLSA and associated node unit that is sent upstream (as one or more change reports) to a pump control node unit will further be utilized to adjust the pump speed. Adjustment of the pump speed can affect the fluid flow throughout the fluid distribution system.

Only one change report will be sent upstream from a group node unit and associated LLSA. However, as the change report of the group node unit is generated based upon information collected from multiple downstream node units (in a node unit group). Therefore, the change report of the group node unit (i.e., a net change report) represents consolidated information about multiple nodes. Moreover, the change report of the group node unit that represents processed information from multiple node units may further be processed along with information from other node units in a node unit grouping by an upstream group node unit (that has a shared node with the group node unit in a node unit grouping that sends its change report upstream). Thus, although only a single change report is sent from a group node unit upstream to another upstream node unit, as such change reports are processed by the upstream node unit, the processed information ultimately can represent processed information from multiple node units.

The balancing of the system of the present invention involves adjusting the pump speed, and also involves adjusting the balancing valve and/or other valves of the LLSAs that are each associated with a node unit. The adjusting of either or both of the balancing valve and other valves in any of the LLSAs involves a loop control function.

The loop control function of the present invention differs from closed loop control functions and proportional-integral-derivative controller (PID controller) functions of prior art systems in several manners. For example, closed loop control functions and PID controllers are generally analog functions, whereas the loop control of the present invention is a digital function. Moreover, the closed loop control and PID controllers can involve manual adjustments performed in some cases by human effort. The present invention does not require such manual adjustments performed by human effort.

The closed loop control and PID controllers of the prior art further require that a specific fixed value be set as a fluid flow pressure that is to be achieved by a system. The closed loop control and PID controllers achieve adjustments based upon the identified fixed pressure value. The loop control of the present invention does not require a fixed pressure value to be identified. The loop control of the present invention alters the position of either or both of a balancing valve and other valves within a LLSA in accordance with determinations that do not identify any fixed pressure value. Rather, the present invention operations are based upon ranges of pressure values whereby the position of either or both of the balancing valve and other valves of the LLSA can be altered to achieve target distribution flow within the nodes of the fluid distribution system. These ranges are the operation locus of a node unit and the operation locus range (representing the identified common range that is within operation locus of multiple node units).

The loop control function of the present invention further differs from known prior art, such as PID, in that it is operable to perform an automatic re-stabilization process, and deadband cycling automatic avoidance.

Group Node Unit Control Loop Process

Figure 20:
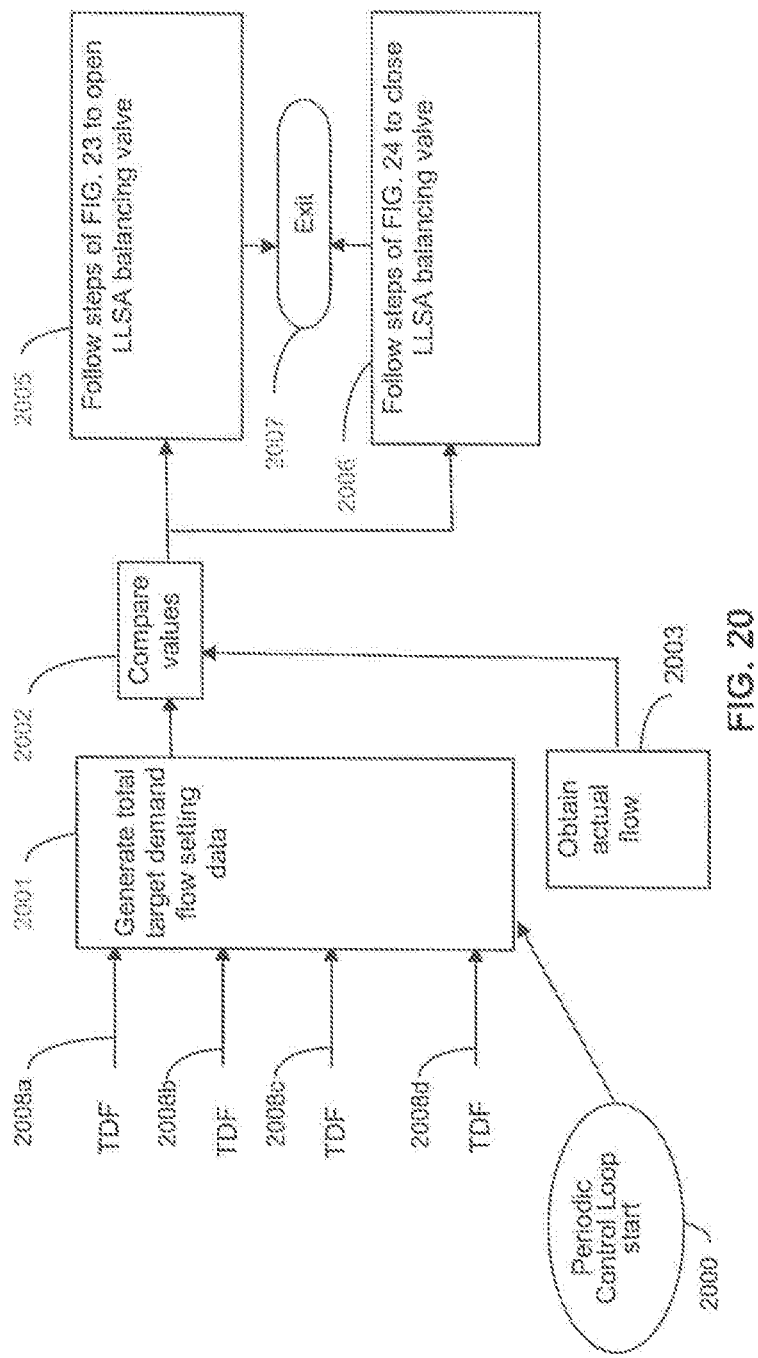
FIG. 20 is a flow chart of operations of a group node unit in accordance with loop control to maintain the total flow of the fluid distribution system, in accordance with an embodiment of the present invention.

FIG. 20 shows steps involved in repositioning a balancing valve incorporated in a LLSA associated with a group node unit. The repositioning in FIG. 20 relates to the opening or closing of a balancing valve, but other repositioning to positions that are not fully open or closed positions can also be achieved by embodiments of the present invention.

The repositioning of the balancing valve is undertaken in relation to the virtual target demand flow and/or the target flow information received by a group node unit from the LLSAs associated with downstream node units in a node unit grouping with the group node unit. As an example, these steps can be undertaken by a LLSA associated with a group node unit that receives virtual target demand flow and/or the target flow information from LLSAs associated with the downstream node units or from the downstream node units. The group node unit may also receive target flow information that is either provided or set by a third party external device or is determined, provided or set by the group node unit during the normal operations of the distribution system.

An example of the loop control process is provided in relation to the embodiment of the present invention shown in FIG. 2, however, a skilled reader will recognize that the loop control process is applicable to all embodiments of the present invention. As an example, the LLSA may be LLSA 116a associated with group node unit 203 that is upstream of node 201, and virtual target demand flow 300, 301 is received by the LLSA 116a, as is target flow information 302, 303 via the ECN.

The virtual target demand flow and/or target flow information is transmitted to the microprocessor of the LLSA. The microprocessor may incorporate a module for processing valve adjustments through the steps of FIG. 20, such as a LLSA valve adjustment module. The steps of FIG. 20 are undertaken by the group node unit periodically upon the group node unit receiving virtual target demand flow and/or target flow information 2008a, 2008b, 2008c, 2008d. The loop control function is initiated at step 2000. The sum of the virtual target demand flow and/or target flow information is determined to be the total target demand flow setting information at step 2001.

Figure 23:
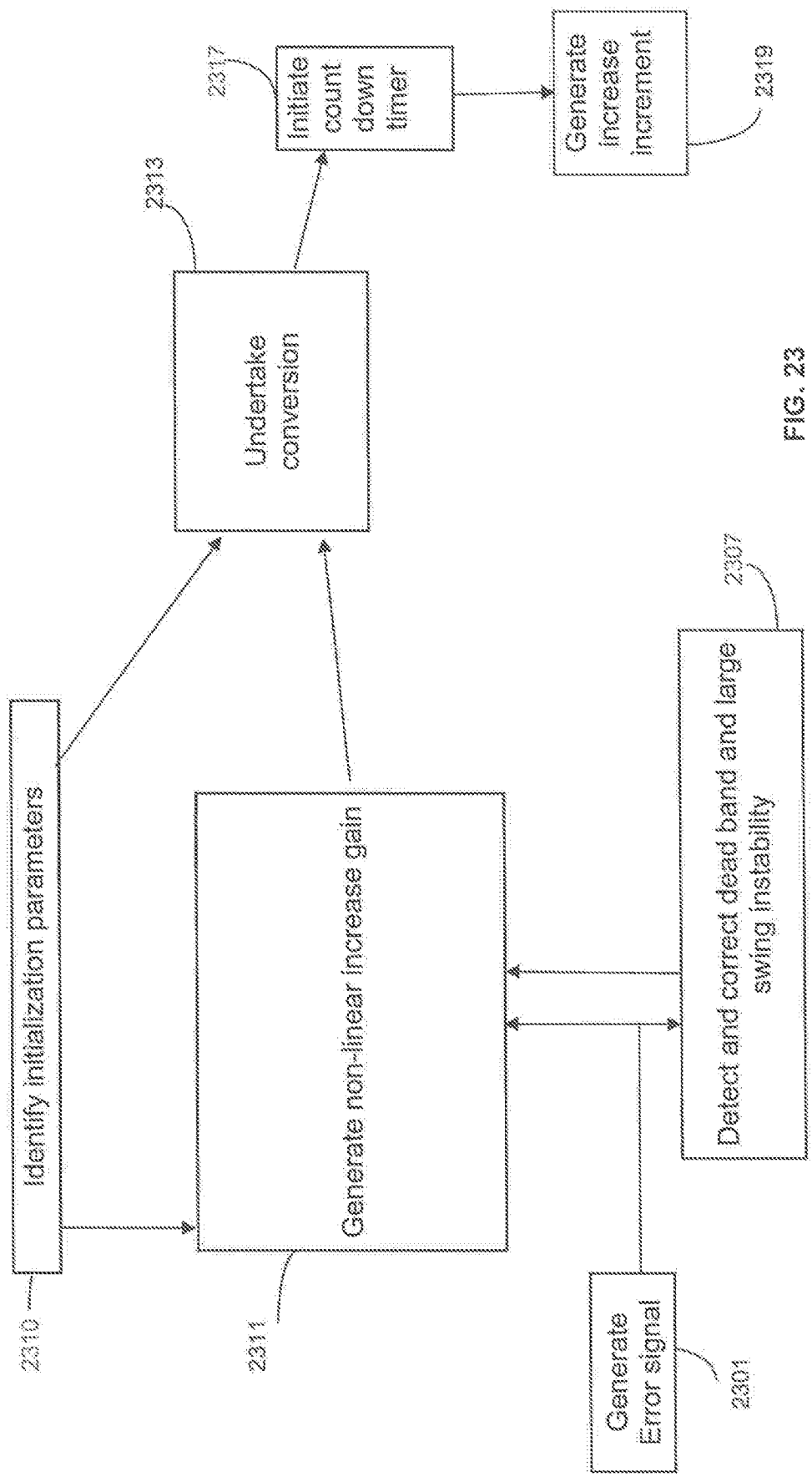
FIG. 23 is a system diagram of the elements that operate to increase pump speed, in accordance with an embodiment of the present invention.
Figure 27:
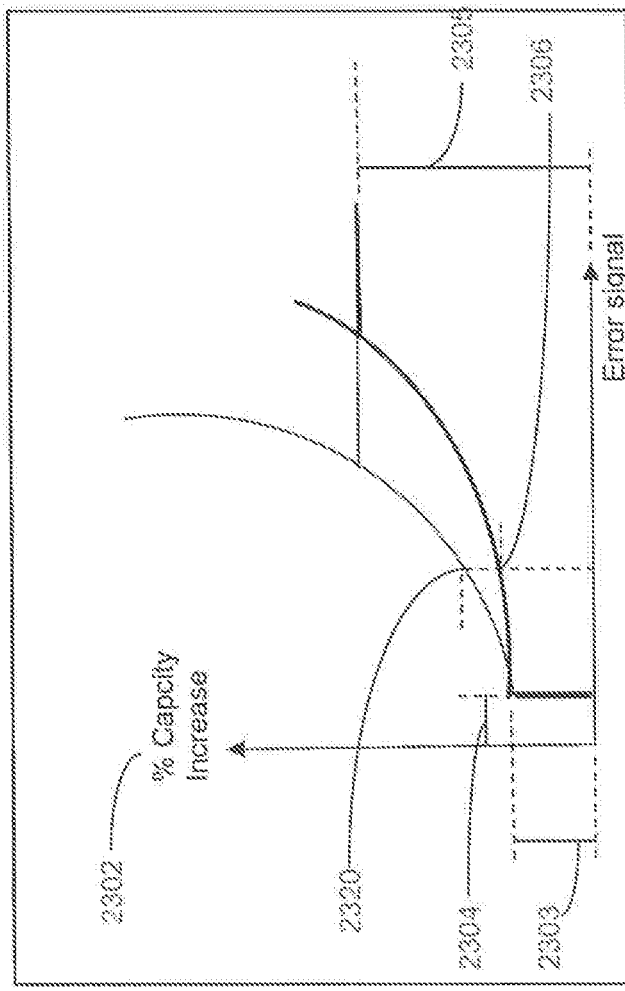
FIG. 27 is a graph showing a determination of percentage capacity increase gain, in accordance with an embodiment of the present invention.
Figure 29:
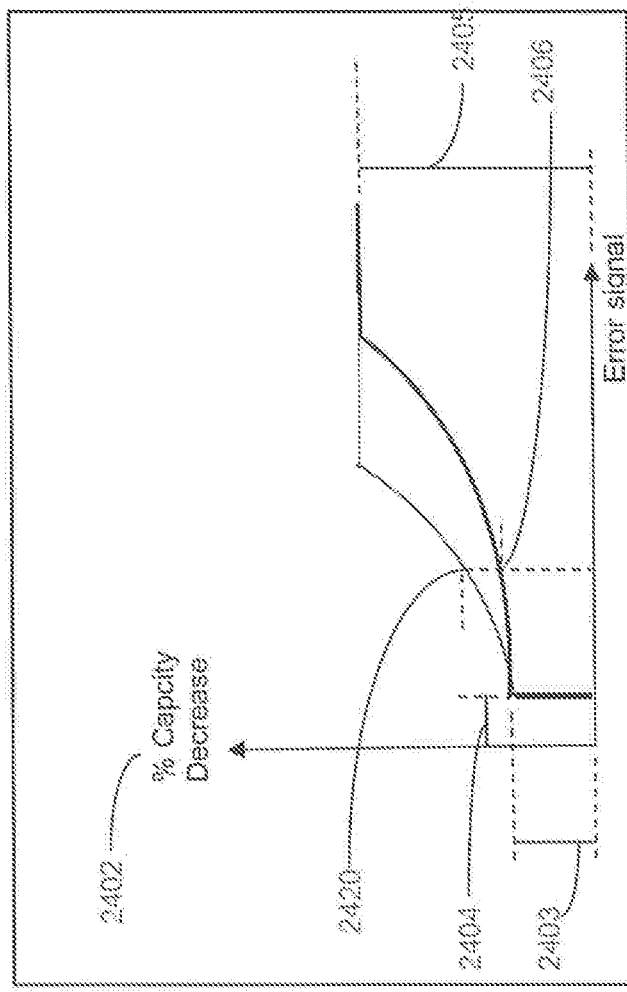
FIG. 29 is a graph showing a determination of percentage capacity decrease gain, in accordance with an embodiment of the present invention.

The actual flow information is compared to the total target demand flow setting information to determine a differential flow value at step 2002. Several determinations also occur at step 2002, such as the following:

The differential flow value is reviewed to determine if it is greater than M and is greater than the dead band range (as shown in FIGS. 25, 27 and 29). If the differential flow value is greater than a value of M and is greater than the dead band range a process relating to opening of the LLSA balancing valve is initiated at step 2005 (and the increase flow procedure ensues, as shown in FIG. 23). The outcome is that there is an increase in actual fluid flow.

Figure 24:
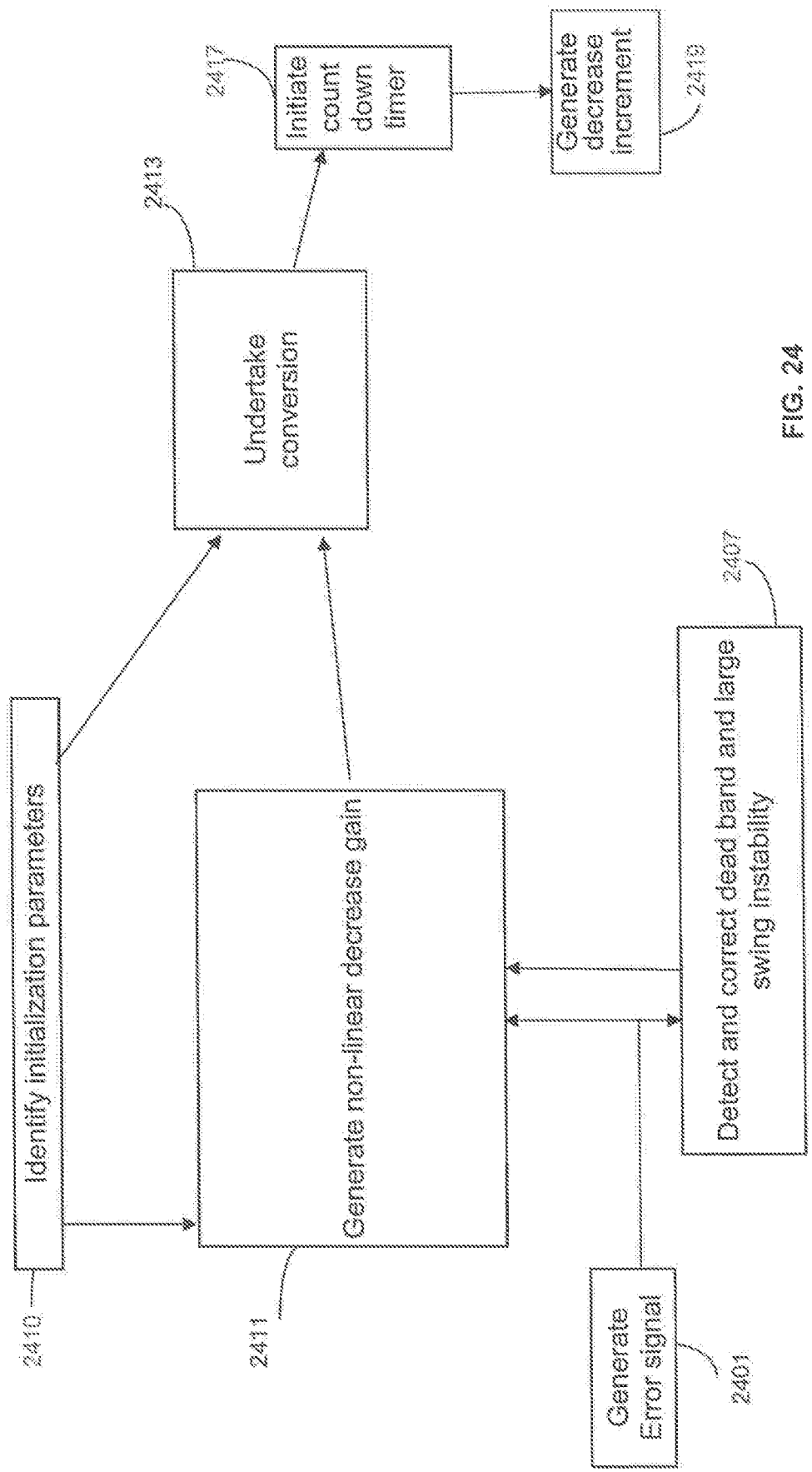
FIG. 24 is a system diagram of the elements that operate to decrease pump speed, in accordance with an embodiment of the present invention.

The differential flow value is reviewed to determine if it is equal to or less than M and is greater than the dead band range. If the differential flow value is less than M and is greater than the dead band range a process relating to closing of the LLSA balancing valve is initiated at step 2006 (and the decrease flow procedure ensues, as shown in FIG. 24). The outcome is that there is a decrease in actual flow.

The flow sensor of the LLSA generates the actual flow information, which represents the flow of the fluid through the LLSA associated with the group node unit at step 2003.

If at steps 2005 or 2006 the differential flow value is identified as less than the magnitude of the dead band range (being the dead band range identified in the steps of either FIG. 23 or FIG. 24) the process of FIG. 20 is ended at exit step 2007.

If the LLSA balancing valve is either opened in accordance with step 2005, or closed in accordance with step 2006, the process of FIG. 20 is ended at exit step 2007.

A skilled reader will recognize that a similar procedure may be implemented to adjust other valves in the fluid distribution system.

Increase Flow Procedure

Figure 21:
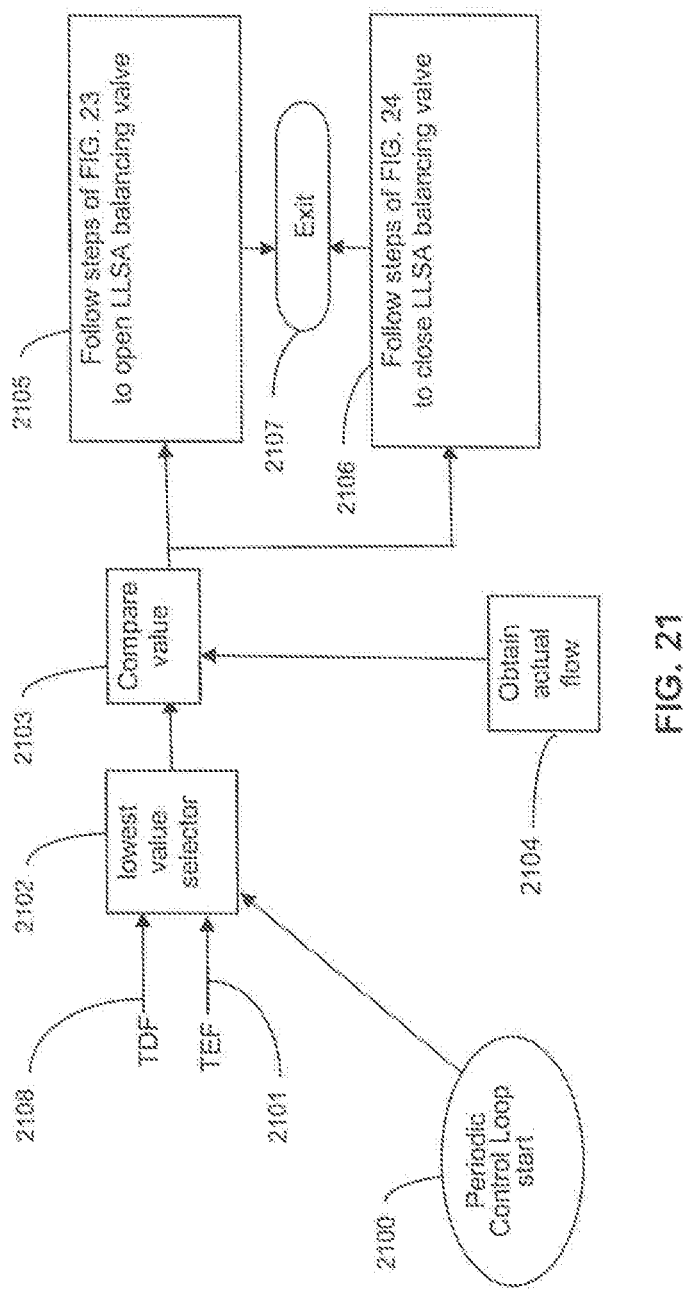
FIG. 21 is a flow chart of operations of a load node unit in accordance with loop control to maintain the target flow of the load node unit, in accordance with an embodiment of the present invention.
Figure 22:
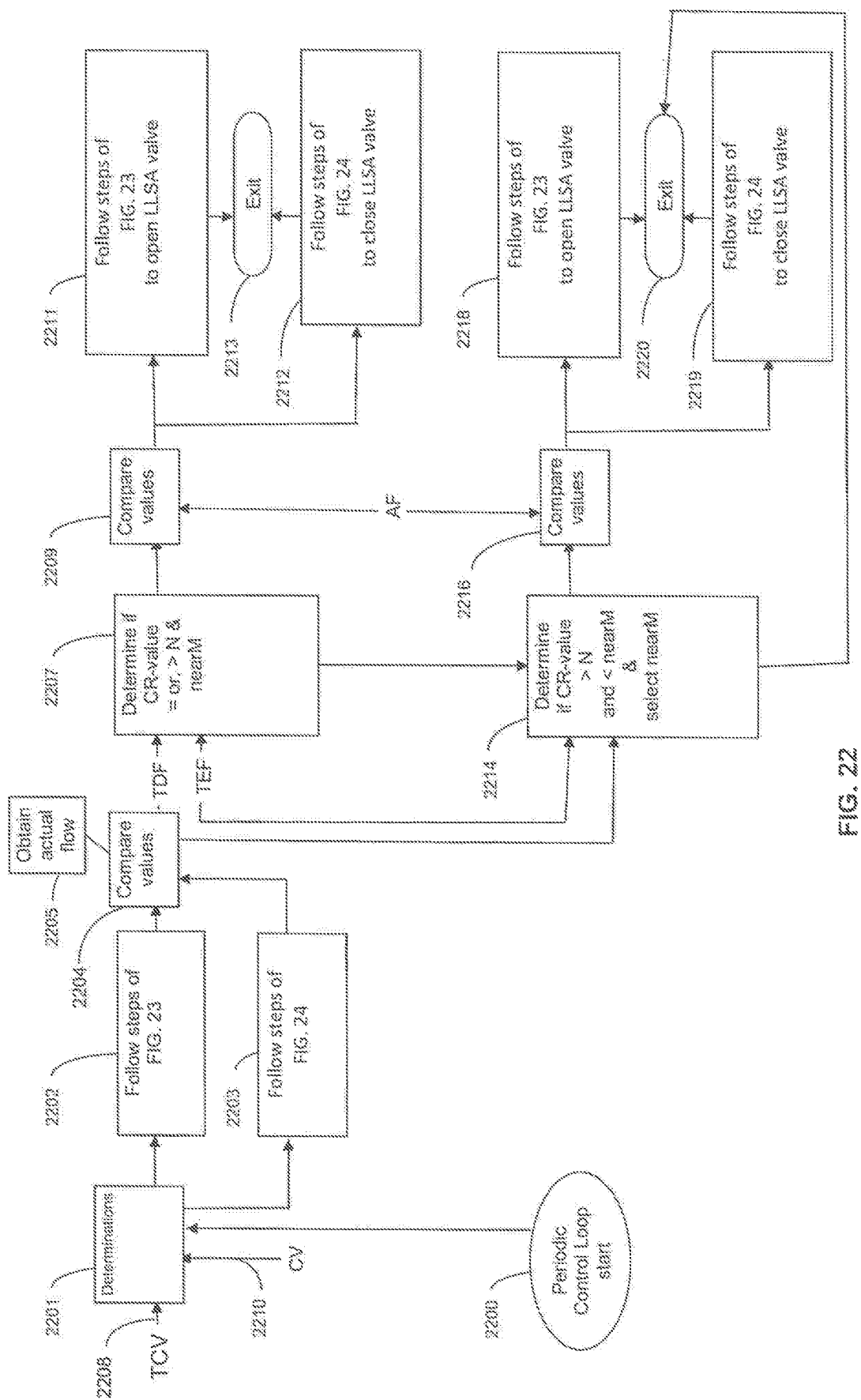
FIG. 22 is a flow chart of operations of a load control node unit in accordance with loop control to maintain the target flow of the load control node unit and to maintain its controlled variable target, in accordance with an embodiment of the present invention.

If the increase flow procedure is initiated in accordance with any of step 2005 of FIG. 20, step 2106 of FIG. 21, or steps 2202, 2211 or 2218 of FIG. 22, the steps shown in FIG. 23 are undertaken. The increase flow procedure can therefore be initiated periodically as part of the processes set out in FIGS. 20-23.

Generally, the increase flow procedure is initiated in accordance with determinations performed by the microprocessor of a LLSA associated a node unit. The node unit may be of various types of node units (e.g., a group node unit can initiate the increase flow procedure at step 2005 of FIG. 20, a load node unit can initiate the increase flow procedure at step 2106 of FIG. 21, and a load control node unit can initiate the increase flow procedure at steps 2202, 2211 or 2218 of FIG. 22). Such determinations by the microprocessor involve information relating to the flow of fluid within the fluid distribution system. Thus, the increase flow procedure steps, as shown in FIG. 23, are incorporated in the loop control of the present invention.

The increase flow procedure steps involve accessing initialization parameters that may be stored in the program of LLSAs associated with the node unit at step 2310. For example, an initialization parameter that is a time parameter may be set as a value range, such as in the range of 1 to 300 seconds, or any other range. The specific initialization parameters utilized and the range values of each initialization parameter will vary with the specific application of the increase flow procedure.

The initialization parameters are accessed and the initialization parameters applicable to the particular application occurring are identified at step 2310. The initial values of the initialization parameter identified in step 2310 are established at time when the fluid distribution system is commissioned and set-up by a system operator. The initialization parameters incorporate several different parameters. For example, the initialization parameters include a ramp rate parameter. The ramp rate parameter is used to define a non-linear increase gain. In embodiments of the present invention, the initial value of the ramp rate may be set in the range of 10% to 40%.

The initialization parameters are utilized by steps 2311 and 2313.

An error signal is generated at step 2301. The error signal generated is generated in accordance with the conversion determination of steps 2002 of FIG. 20, step 2013 of FIG. 21, and steps 2201 and 2205 of FIG. 22.

The magnitude of the error signal is identified and utilized to locate the percentage capacity decrease that is generated at step 2311. The dead band is a range value that is identified by the system at step 2311. The dead band range includes the values between the lowest magnitude of error signal value and the initial percentage capacity increase, as shown in FIG. 27 as range value 2304 and in FIG. 25 as range value 1516.

If the error signal is less than the magnitude of the dead band values then the percentage capacity increase is set to zero (0.0). When the error signal is greater than the magnitude of the dead band then the percentage capacity increase is set to the value occurring at the intersection of percentage capacity increase and the error signal multiplied in relation to the dead band. (This value is shown as the intersection 2306 in FIG. 27. When the error signal is greater than the magnitude of the dead band then the percentage capacity increase could also be set to a value existing on the percentage capacity curve extending above intersection 2306 as shown in FIG. 27.)

The value range that incorporates the minimum values that the percentage capacity increase can be set to may be identified. (For example, value range 2303 as shown in FIG. 27 represents the minimum range that the percentage capacity increase can be set to.

The initial range value of minimum percentage capacity increase (value range 2303) is set initially by an operator of the system.

FIG. 27 shows a graph of the non-linear increase gain that represents the determinations occurring at step 2311, of FIG. 23. As shown in FIG. 27, the horizontal axis represents the error signal and the vertical axis 2302 represents the percentage capacity increase.

The range values 2303 (minimum range), 2304 (dead band range), 2305 (limiting range), are set when the system is initialized, and these range values are application specific.

The intersection 2306 indicates a value existing where the percentage capacity increase intersects with the error signal multiplied in relation to the dead band. (For example, in one embodiment of the present invention the intersection 2306 may represent the intersection of 10% capacity increase, and the error signal that is equal to three times the dead band.) The percentage capacity increase is related to the ramp rate such that the percentage of the ramp rate is equivalent to the percentage capacity increase. (For example, in one embodiment of the present invention, if the ramp rate is set to 10%. the percentage capacity increase will be 10% capacity increase and the error signal that is equal to two or more multiplied dead bands, for example, such as three times the dead band.) Changing the ramp rate to a different percentage will affect the percentage of the capacity increase. This will cause a new intersection 2320 between the percentage capacity increase and the error signal multiplied in relation to the dead band. (For example, if the ramp rate is 15% the new intersection will occur at the intersection of 15% capacity increase and the error signal that is equal to 3 times the dead band.)

The percentage capacity increase is limited to the magnitude represented by range value 2305, which may be set in the range of 10% to 100%.

In one embodiment of the present invention, the non-linear determinations applied may be quadratic functions. Other embodiments of the present invention may utilize cubic functions, or some other mathematical representation that provides the same characteristic benefits as disclosed herein. For example, a form of piecewise linear segment function may be applied in an embodiment of the present invention.

A large swing instability detection and correction occurs at step 2307, as shown in FIG. 23. This step automatically generates a reduction in the ramp rate on detection of large swing instability. This step also automatically generates an increase in the ramp rate on detection of sluggish response rates. Short term cycling is detected by this step, but corrective actions are not undertaken thereto.

The dead band detection and correction step automatically generates a reduction in the minimum percentage capacity increase value range (i.e., value range 2303, as shown in FIG. 27) on detection of dead band cycling instability. The dead band and large swing instability detection and correction step automatically generates an increase in the percentage capacity increase value range on detection of sluggish response levels at the dead band region. Short term cycling is detected by step 2307, as shown in FIG. 23, but corrective actions are not undertaken thereto.

The automatic detection and correction of both the minimum percentage capacity increase value range and percentage capacity increase value range, in response to the identification of significant potential instability issues, is vital to the operation of the loop control in the fluid distribution system and the node balancing function of the system.

A percentage capacity decrease signal is generated by step 2311. The percentage capacity increase signal is transferred to the step 2313. At step 2313 the percentage capacity increase signal is converted to a time value. The time value is determined to be a proportional percentage of the travel time, from closed to full open of the balancing valve of the LLSA.

The 100% full travel time is stored as an initialization parameter accessible by step 2310. The 100% full travel time is transferred by step 2310 to be used in step 2313. The use of this information by the control loop in step 2313 establishes a critical, time dependent, compatibility between the virtual control loop and the controlled real environment.

Figure 28:
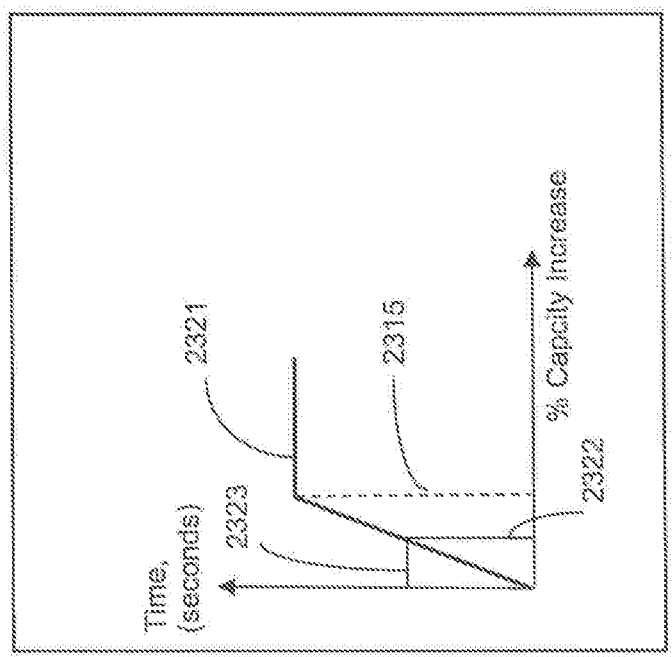
FIG. 28 is a graph showing a conversion of percentage capacity increase signal to a time value, in accordance with an embodiment of the present invention.

The determination of step 2313 is shown in graph form in FIG. 28. The horizontal axis is percentage capacity increase and the vertical axis is time shown in seconds. The 100% capacity increase 2315 aligns with the beginning of the full travel time 2321 of the converter transfer function. Time value 2323 that indicates a time lapse is generated in relation to the change capacity 2322.

The time value generated at step 2313, as shown in FIG. 23, is measured by a count-down timer at step 2317. Step 2313 further generates a signal based upon the time value. The count-down timer accurately measures the duration of the signal. At step 2319 an increase increment signal is generated to be sent to the balancing valve. The balancing valve will be opened to a position in reaction to the increase increment signal received by balancing valve that has been generated by the process set out in FIG. 23.

Decrease Flow Procedure

If the decrease flow procedure is initiated in accordance with any of step 2006 of FIG. 20, step 2107 of FIG. 21, or steps 2203, 2212 or 2219 of FIG. 22, the steps shown in FIG. 24 are undertaken. The decrease flow procedure can therefore be initiated periodically as part of the processes set out in FIGS. 20-22.

Generally, the decrease flow procedure is initiated in accordance with determinations performed by the microprocessor of a LLSA associated with various types of node units (e.g., a group node unit can initiate the decrease flow procedure at step 2006 of FIG. 20, a load node unit can initiate the decrease flow procedure at step 2107 of FIG. 21, and a load control node unit can initiate the decrease flow procedure at steps 2203, 2212 or 2219 of FIG. 22). Such determinations involve information relating to the flow of fluid within the fluid distribution system. Thus, the decrease flow procedure steps, as shown in FIG. 24, are incorporated in the loop control of the present invention.

The decrease flow procedure steps, as shown in FIG. 24, involve accessing initialization parameters that may be stored in the program of LLSAs of the present application at step 2410. For example, an initialization parameter that is a time parameter may be set as a value range in the range of 1 to 300 seconds, or any other value range. The specific initialization parameters utilized and the range values of each initialization parameter will vary with the specific application of the decrease flow procedure.

At step 2410 the initialization parameters are accessed and the initialization parameters applicable to the particular application occurring are identified. The initial values of the initialization parameter identified in step 2410 are established at the time when the fluid distribution system is commissioned and set-up by a system operator. The initialization parameters incorporate several different parameters. For example, the initialization parameters include a ramp rate parameter. The ramp rate parameter is used to define a non-linear increase gain. In embodiments of the present invention the initial value of the ramp rate may be set in the range of 10% to 40%.

The initialization parameters are utilized by steps 2411 and 2413.

An error signal is generated at step 2401 by the conversion determination of steps 2002 of FIG. 20, step 2013 of FIG. 21, and steps 2210 and 2217 of FIG. 22. The magnitude of the error signal locates the percentage capacity decrease that is generated in step 2411, of FIG. 24.

The dead band is a range value that is determined in step 2411. The dead band values are the values between the lowest magnitude of error signal value and the initial percentage capacity decrease, as shown in FIG. 29 as range value 2404.

If the error signal is less than the magnitude of the dead band values then the percentage capacity decrease is set to zero (0.0). When the error signal is greater than the magnitude of the dead band then the percentage capacity decrease is set to the value occurring at the intersection of percentage capacity decrease and the error signal multiplied in relation to the dead band. (This value is shown as the intersection 2406 in FIG. 29. When the error signal is greater than the magnitude of the dead band then the percentage capacity decrease could also be set to a value existing on the percentage capacity curve extending above intersection 2406.)

The value range that includes the minimum values that the percentage capacity decrease can be set to may be identified. (For example, value range 2403 as shown in FIG. 29 represents the minimum range that the percentage capacity decrease can be set to. The initial range value of minimum percentage capacity decrease (value range 2403) is set initially by an operator of the system.)

The horizontal axis represents the error signal and the vertical axis 2402 represents the percentage capacity decrease. The range values 2403 (minimum range), 2404 (dead band range), 2405 (limiting range), are set when the system is initialized and these range values are application specific.

The intersection 2406 indicates a value existing where the percentage capacity decrease intersects with the error signal multiplied in relation to the dead band. (For example, in one embodiment of the present invention the intersection 2406 may represent the intersection of 10% capacity decrease, and the error signal that is equal to three times the dead band.) The percentage capacity decrease is related to the ramp rate such that the percentage of the ramp rate is equivalent to the percentage capacity decrease. (For example, in one embodiment of the present invention, if the ramp rate is set to 10%. the percentage capacity decrease will be 10% capacity decrease and the error signal that is equal to two or more multiplied dead bands, for example, such as three times the dead band.) Changing the ramp rate to a different percentage will affect the percentage of the capacity decrease. This will cause a new intersection 2420 between the percentage capacity decrease and the error signal multiplied in relation to the dead band. (For example, if the ramp rate is 15% the new intersection will occur at the intersection of 15% capacity decrease and the error signal that is equal to 3 times the dead band.)

The percentage capacity decrease is limited to the magnitude represented by range value 2405, which may be set in the range of 10% to 100%.

In one embodiment of the present invention, the non-linear determinations applied may be quadratic functions. Other embodiments of the present invention may utilize cubic functions, or some other mathematical representation that provides the same characteristic benefits as disclosed herein. For example, a form of piecewise linear segment function may be applied in embodiments of the present invention.

A large swing instability detection and correction occurs at step 2407, as shown in FIG. 24. This step automatically generates a reduction in the ramp rate on detection of large swing instability. This step also automatically generates an increase in the ramp rate on detection of sluggish response rates. Short term cycling is detected by this step, but corrective actions are not undertaken thereto.

The dead band detection and correction step automatically generates a reduction in the minimum percentage capacity decrease value range (value range 2403, as shown in FIG. 29) on detection of dead band cycling instability. The dead band and large swing instability detection and correction step automatically generates an increase in the percentage capacity decrease value range on detection of sluggish response levels at the dead band region. Short term cycling is detected by step 2407, as shown in FIG. 24, but corrective actions are not undertaken thereto.

The automatic detection and correction of both the minimum percentage capacity decrease value range and percentage capacity decrease value range, in response to the identification of significant potential instability issues, is vital to the operation of the loop control in the fluid distribution system and the node balancing function of the system.

A percentage capacity decrease signal is generated by step 2411. The percentage capacity decrease signal is transferred to the step 2413. At step 2313 the percentage capacity decrease signal is converted to a time value. The time value is determined to be a proportional percentage of the travel time, from closed to full open of the balancing valve of the LLSA.

The 100% full travel time is stored as an initialization parameter accessible by step 2410. The 100% full travel time is transferred by step 2410 to be used in step 2413. The use of this information by the control loop in step 2413 establishes a critical, time dependent, compatibility between the virtual control loop and the controlled real environment.

Figure 30:
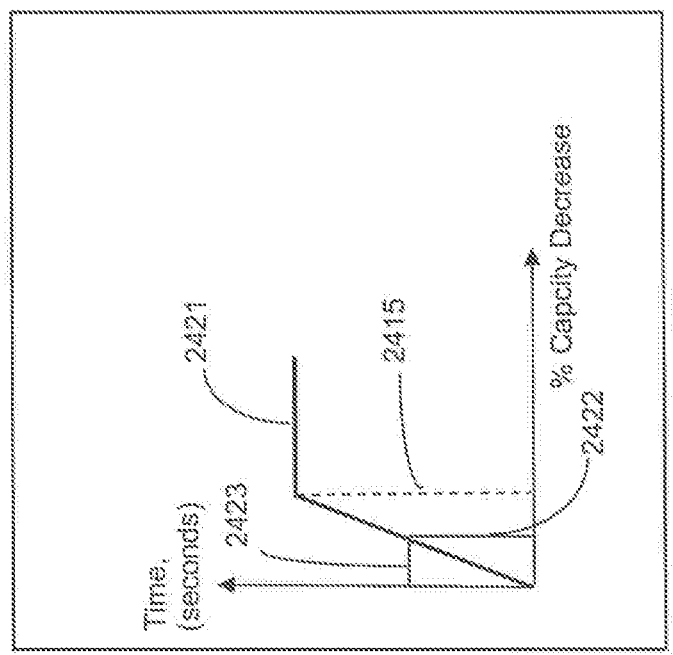
FIG. 30 is a graph showing a conversion of percentage capacity decrease signal to a time value, in accordance with an embodiment of the present invention.

The determination of step 2413 is shown in graph form in FIG. 30. The horizontal axis is percentage capacity decrease and the vertical axis is time shown in seconds. The 100% capacity decrease 2415 aligns with the beginning of the full travel time 2421 of the converter transfer function. Time value 2423 that indicates a time lapse is generated in relation to the change capacity 2422.

The time value generated at step 2413, as shown in FIG. 24, is measured by a count-down timer at step 2417. Step 2413 further generates a signal based upon the time value.

The count-down timer accurately measures the duration of the signal. At step 2419 an INC increment signal is generated to be sent to the balancing valve. The balancing valve will be opened to a position in reaction to the INC increment signal received by balancing valve that has been generated by the process set out in FIG. 24.

Motorized valve opening and closing travel times often differ. This difference is accommodated with the implementation of separate processes for non-linear increase gains (FIG. 23) and for non-linear decrease gains (FIG. 24). In particular each process can incorporate values and determinations relating to the travel times for a valve to open (for the non-linear increase gains process of FIG. 23) and to close (for the non-linear decrease gains process of FIG. 24). The implementation of two separate processes to accommodate the differing travel times for the opening and closing of the balancing valve has the effect of achieving better stable operations.

Load Node Unit Control Loop Process

FIG. 21 shows steps involved in repositioning a balancing valve incorporated in a LLSA associated with a load node unit. The repositioning in FIG. 21 relates to the opening or closing of a balancing valve, but other repositioning to positions that are neither fully open nor fully closed positions can also be achieved by embodiments of the present invention.

The repositioning of the balancing valve is undertaken in relation to the target flow information 2108 that is provided to the load node unit by the operator or the designer of the system (or other third party, including a third party external device, as discussed herein) at a point in time before the fluid distribution system starts operation, or is set by the load node unit during normal operations of the distribution system. The target flow demand setting information is based on the target flow that can best serve the fluid distribution system based on the design of the system. (To exemplify this aspects of the present invention, the LLSA may be LLSA 116b, as shown in FIG. 2, associated with load node unit 204, and the target demand flow setting information may be target flow information 308 as required by the thermal load 205. A skilled reader will recognize that other examples relating to other embodiments of the present invention are also possible.)

The target flow information is transmitted to the microprocessor of the LLSA. The target flow information must be a true flow value, represented as a gpm value, it cannot be a value representing a valve position command signal.

The microprocessor may incorporate a module for processing valve adjustments through the steps of FIG. 21, such as a LLSA valve adjustment module. The steps of FIG. 21 start at step 2100 periodically, in accordance with the transmission of the target flow information 2108.

The highest flow target provided for the thermal load related to the load node unit may also be transmitted to the microprocessor of the LLSA as target engineered flow 2101. The target demand flow may be equal to or less than the target engineered flow.

When all target demand flows are always equal to the target engineered flow the fluid distribution system is regarded as functioning as a constant flow system. Otherwise, the system is regarded as a variable flow system.

At step 2102 the lowest value is selected between the target flow information and the target engineered flow received by the load node unit. This lowest value is identified as the total target demand flow setting information At step 2104 the flow sensor of the LLSA generates the actual flow information, which represents the flow of the fluid through the LLSA associated with the load node unit.

The actual flow information is compared to the total target demand flow setting information to determine a differential flow value at step 2103. Several determinations also occur at step 2103.

A determination as to whether the differential flow value is greater than a value of zero (0.0) and is greater than the dead band range (identified as shown in FIGS. 25, 27 and 29 and as discussed herein) occurs. If the differential flow value is greater than a value of zero (0.0) and is greater than the dead band, range a process relating to opening of the LLSA balancing valve is initiated at step 2105 (and the increase flow procedure ensues, as shown in FIG. 23). The outcome is that there is an increase in actual flow.

A determination as to whether the differential flow value is equal to or less than a value of zero (0.0) and is greater than the dead band range (identified as shown in FIGS. 25, 27 and 29 and as discussed herein) occurs. If the differential flow value is less than a value of zero (0.0) and is greater than the dead band range a process relating to closing of the LLSA balancing valve is initiated at step 2106 (and the decrease flow procedure ensues, as shown in FIG. 24). The outcome is that there is a decrease in actual flow.

If at steps 2105 or 2106 the differential flow value is identified as less than the magnitude of the dead band range (being the dead band range identified in the steps of either FIG. 23 or FIG. 24) the process of FIG. 21 is ended at exit step 2107.

If the LLSA balancing valve is either opened in accordance with step 2105, or closed in accordance with step 2106, the process of FIG. 21 is ended at exit step 2107.

The actual flow information is compared to the total target demand flow setting information to determine a differential flow value at step 2103. A determination as to whether the differential flow value is greater than a value of zero (0.0) also occurs at step 2103. Based upon this determination, a process relating to opening of the LLSA balancing valve is initiated at step 2105 (and the increase flow procedure ensues, as shown in FIG. 23) if the differential flow value is equal to or greater than zero, or a process relating to closing of the LLSA balancing valve is initiated at step 2106 (and the decrease flow procedure ensues, as shown in FIG. 24) if the differential flow value is less than zero. Once the LLSA balancing valve is either opened more in accordance with step 2105, or closed more in accordance with step 2106, the process of FIG. 21 is ended at exit step 2107.

Load Control Node Unit Control Loop Processing

FIG. 22 shows steps involved in the repositioning of either or both of the balancing valve and other valves incorporated in a LLSA associated with a load control node unit. Such repositioning relates to the virtual target controlled variable setting information 2208 associated with a thermal load of the fluid distribution system. A controlled variable 2210 from a temperature probe device is also utilized by the load control node unit. (To exemplify this aspect of the present invention, the LLSA may be LLSA 116*d*, as shown in FIG. 2, associated with load control node unit 208. A skilled reader will recognize that other examples relating to other embodiments of the present invention are also possible.)

As an example, the virtual target controlled variable setting information may be a target setting for air temperature in a duct. The controlled variable may be generated by a temperature probe device located in the air distribution duct.

The controlled variable 2210 is maintained at a target setting that is in accordance with the virtual target controlled variable setting information. The operations of loop control in maintaining the controlled variable at the virtual target controlled variable setting information generates the target flow information of the load control node unit. (To exemplify this aspects of the present invention, the LLSA may be LLSA 116*d*, as shown in FIG. 2, associated with load control node unit 208 that generates target flow information 302. A skilled reader will recognize that other examples relating to other embodiments of the present invention are also possible.) The target flow information is generated through operation of the loop control to maintain the controlled variable at the virtual target controlled variable setting information. The target flow information is utilized in the steps 2207, 2214, 2211, 2212, 2218 and 2219.

The virtual target controlled variable setting information and controlled variable are transmitted to the microprocessor of the LLSA.

The microprocessor may incorporate a module for processing valve adjustments through the steps of FIG. 22, such as a LLSA valve adjustment module. The steps of FIG. 22 start at step 2200 periodically, in accordance with the transmission of the virtual target controlled variable setting information 2208 and controlled variable 2210. At step 2201 the sum of the target flow demand setting information is determined to be the differential error signal.

Several determinations also occur at step 2201.

A determination as to whether the differential error signal is greater than a value of zero (0.0) and is greater than the dead band range (identified as shown in FIGS. 25, 27 and 29 and as discussed herein) occurs at step 2201. If the differential error signal is greater than a value of zero (0.0) and is greater than the dead band range a process relating to adding a positive increase increment to the determination in step 2204 occurs at step 2202 to produce a higher target flow setting. The steps of FIG. 23 are undertaken at step 2202 before step 2204 occurs.

A determination as to whether the differential error signal is equal to or less than a value of zero (0.0) and is greater than the dead band range (identified as shown in FIGS. 25, 27 and 29 and as discussed herein) occurs at step 2201. If the differential error signal is less than a value of zero (0.0) and is greater than the dead band range a process relating to subtracting a positive DEC increment to the determination in step 2204 occurs at step 2203 to produce a lower target flow setting. The steps of FIG. 24 are undertaken at step 2203 before step 2204 occurs.

If at steps 2202 or 2203 the differential error signal is identified as less than the magnitude of the dead band range (being the dead band range identified in the steps of either FIG. 23 or FIG. 24) no positive increase increment is added at step 2204, and no positive DEC increment is subtracted in step 2204. The result is that the target flow setting remains unchanged.

At step 2205 the flow sensor of the LLSA generates the actual flow information, which represents the flow of the fluid through the LLSA associated with the load control node unit.

At step 2204 the actual flow is compared to the output of either step 2202 or step 2203, depending on whether step 2202 or 2203 occurred after step 2201. A target flow setting is determined based upon the comparison occurring at step 2204. If step 2202 preceded step 2204 then the target flow setting will be higher than the target controlled variable setting information. If step 2203 preceded step 2204 then the target flow setting will be lower than the differential target controlled variable setting information.

At step 2207 the target flow setting and the target engineered flow (which is the highest flow target provided for the thermal load related to the load control node unit) are compared to determine the lower of the two values. The CR-value (that represents a value on the operation locus that is a locus position) is also evaluated to determine if it is equal to or greater than N of the operation locus range, that represents the greatest value possible whereby modulation of the LLSA valve to maintain balanced flow within the fluid distribution system is permitted. (For example, N may be 9.0 in an embodiment of the present invention wherein the CR-value (i.e., locus position) of 9.0 corresponds to the position of maximum line pressure loss of the LLSA, as shown at intersection N 402 of FIG. 7. The position of maximum line pressure loss is the upper portion of the operation locus.)

As shown in FIG. 22, if the conditions of step 2207 are satisfied, the target flow setting is compared to actual flow at step 2209. The determinations of step 2209 generates a differential value that is the difference between the target flow setting and the actual flow.

If the differential value is equal to or greater than zero (0.0), and the differential value is greater than dead band of step 2202 or 2203 (as applicable in accordance with whether step 2202 or step 2203 was followed as described herein), step 2211 will begin. At step 2211 a process relating to opening of the LLSA valve is initiated (and the increase flow procedure ensues, as shown in FIG. 23). (For example, the LLSA valve is valve 112 as shown in FIG. 1.)

If the differential value is less than zero (0.0), and the actual flow is greater than dead band of step 2202 or 2203 (as applicable in accordance with whether step 2202 or step 2203 was followed as described herein), step 2212 will begin. At step 2212 a process relating to closing of the LLSA valve is initiated (and the decrease flow procedure ensues, as shown in FIG. 24).

Once the LLSA valve is either opened in accordance with step 2211, or closed in accordance with step 2212, the process of FIG. 22 is ended at exit step 2213.

Or if the differential value is below the magnitude of the dead band threshold when reviewed in accordance with either step 2211 or step 2212, then position of LLSA valve remains unchanged, and the process of FIG. 22 is ended at exit step 2213.

In some embodiments of the present invention the LLSA may incorporate a single valve that operates to function as the balancing valve and the valve. In such an embodiment of the present invention a single motor and gear assembly will be incorporated to function as the motor and motor plus gears in the LLSA.

If at step 2207 the CR-value (i.e., the locus position) is determine to be less than the set value step 2214 will be started. At step 2214 the target flow setting and the target engineered flow are compared to determine the lower of the two values. The CR-value (i.e., the locus position) is also evaluated to determine if it is less than the set value and greater than a lowest set value. Such as nearM, that is near to, but not at, the lower end (i.e., M) of the operation locus range. (For example, nearM may be 1.5 in an embodiment of the present invention wherein the CR-value represents a locus position of 1.5, being CR-value that corresponds to a position near the position of minimum line pressure loss of the LLSA (nearM). The position of minimum line pressure loss is shown at intersection M 401 of FIG. 7, and nearM could be a value slightly above this point, such as 1.5 if M represents 0.0.) The range between N and nearM corresponds to all but the lowest end of the operation locus range, namely M. The operation locus range represents the range required to permit modulation of the LLSA valve to maintain balanced flow within the fluid distribution system. This represents the range required to permit modulation of the LLSA valve to maintain balanced flow within the fluid distribution system.

If the conditions of step 2214 are satisfied, the target flow setting is compared to actual flow at step 2216. The determinations of step 2216 generate a differential value that is the difference between the target flow setting and the actual flow.

If the differential value is equal to or greater than zero (0.0), and the differential value is greater than dead band of step 2202 or 2203 (as applicable in accordance with whether step 2202 or step 2203 was followed as described herein), step 2218 will begin. At step 2218 a process relating to opening of the LLSA balancing valve is initiated (and the increase flow procedure ensues, as shown in FIG. 23).

If the differential value is less than zero (0.0), and the actual flow is greater than dead band of step 2202 or 2203 (as applicable in accordance with whether step 2202 or step 2203 was followed as described herein), step 2219 will begin. At step 2219 a process relating to closing of the LLSA balancing valve is initiated (and the decrease flow procedure ensues, as shown in FIG. 24).

Once the LLSA balancing valve is either opened more in accordance with step 2218, or closed more in accordance with step 2219, the process of FIG. 22 is ended at exit step 2220.

Or if the CR-value (i.e., the locus position) is below N and not between the set value and the lower set value, at step 2214, then position of the LLSA valve remains unchanged, and the process of FIG. 22 is ended at exit step 2220.

Or if the differential value is below the magnitude of the dead band threshold when reviewed in accordance with either step 2218 or step 2219, then position of LLSA balancing valve remains unchanged, and the process of FIG. 22 is ended at exit step 2220.

A skilled reader will recognize that this process can be applied to a LLSA balancing valve or other valves.

Line Pressure Loss Ranges

Figure 18:
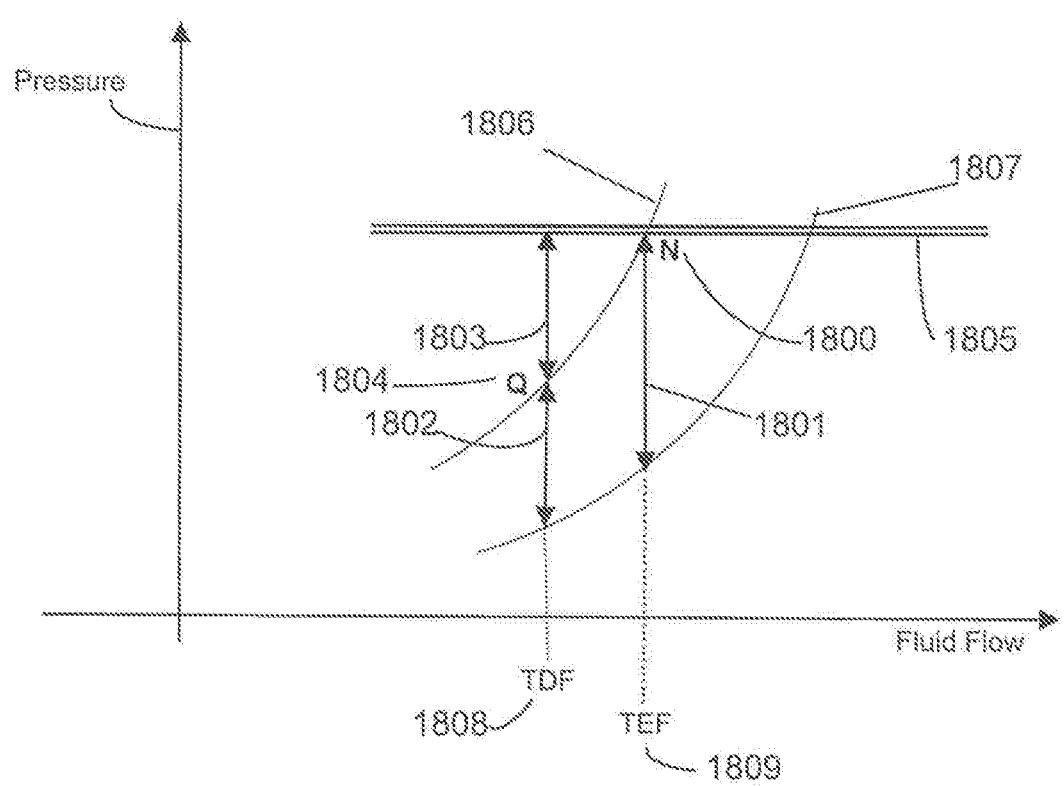
FIG. 18 is a table showing pressure loss distribution at target demand flow at a load control node unit, in accordance with an embodiment of the present invention.

The range of pressure loss wherein the fluid distribution system functions can either be: set by an operator or by the design engineer as a target engineered flow; or set in accordance with the information collected from the node units that is received by the load control node unit. FIG. 18 shows ranges relating to pressure loss when the flow of fluid within the fluid distribution system is at a rate that is a target engineered flow (such as virtual target controlled variable setting information 310, as shown in FIG. 3) as well as when the flow is in accordance with a value that is in accordance with target demand flow setting information generated by the load control node unit. (As an example, FIG. 18 may utilize the target demand flow 1808 (that may be virtual target demand flow) as is collected in accordance with an embodiment of this present invention to determine the adjustments required by the LLSA. A skilled reader will recognize that other embodiments of the present invention may also be applicable.)

The graph of FIG. 18 show a horizontal axis that represents fluid flow, and a vertical axis that represents pressure. The fluid pressure indicated at line 1805 at the node that is upstream of the load control node unit represents an applied pressure at a flow target 1809 (such as virtual target controlled variable setting information 310, as shown in FIG. 3). (As an example, the pressure may be obtained from node 201 (as shown in FIG. 2) that is upstream of load control node unit 208. A skilled reader will recognize the applicability of FIG. 18 to other embodiments of the present invention.) The line pressure loss 1801 represents the maximum pressure loss of the balancing valve of the LLSA related to the load control node unit. (As an example, the maximum pressure loss may be that of the balancing valve 109 (as shown in FIG. 1) of LLSA 116*d* (as shown in FIG. 2) associated with load control node unit 208.) Intersection N 1800 indicates a target engineered flow value occurring at a particular pressure indicated by line 1805. (For example, N may be a value of 9.0.)

If the target demand flow is utilized in the system, the maximum pressure loss 1802 of the LLSA balancing extends within a range from a value within the line pressure loss 1801 occurring at flow target 1809, to a value that is lower than the lowest value of line pressure loss 1801. (For example, the maximum pressure loss may be that of the balancing valve 109, as shown in FIG. 1, of LLSA 116*d*, as shown in FIG. 2, of load control node unit 208.) Intersection Q 1804 indicates a target demand flow value occurring at a particular pressure indicated by line 1805. (For example, Q may be a value of 9.0.) Q and N may be the same value or may be different values.

The pressure 1805 at the node is at the same level for both the flow target 1809 and target demand flow 1808 (such as target flow information 302). The pressure loss 1803 is the range of pressure loss of the LLSA valve, which represents the line pressure loss generated by the LLSA valve. (For example, such as the valve 112, as shown in FIG. 1, of the LLSA.)

The LLSA valve is positioned in accordance with information relating to the line pressure loss required to maintain a balance within the fluid distribution system as is generated and collected in the steps of FIG. 22. This collection and generation of information is integral to the loop control function.

Net downstream pressure loss is shown as curve 1806 in relation to the load control node unit. (Notably, the curve 1806 is similar to the all-loss indicator 404, as shown in FIG. 4 in relation to the load node unit.) Net pressure increase is shown as curve 1807 in relation to the load control node unit. (Notably, the curve 1807 is similar to loss indicator 405, as shown in FIG. 4 in relation to the load node unit.)

Figure 19:
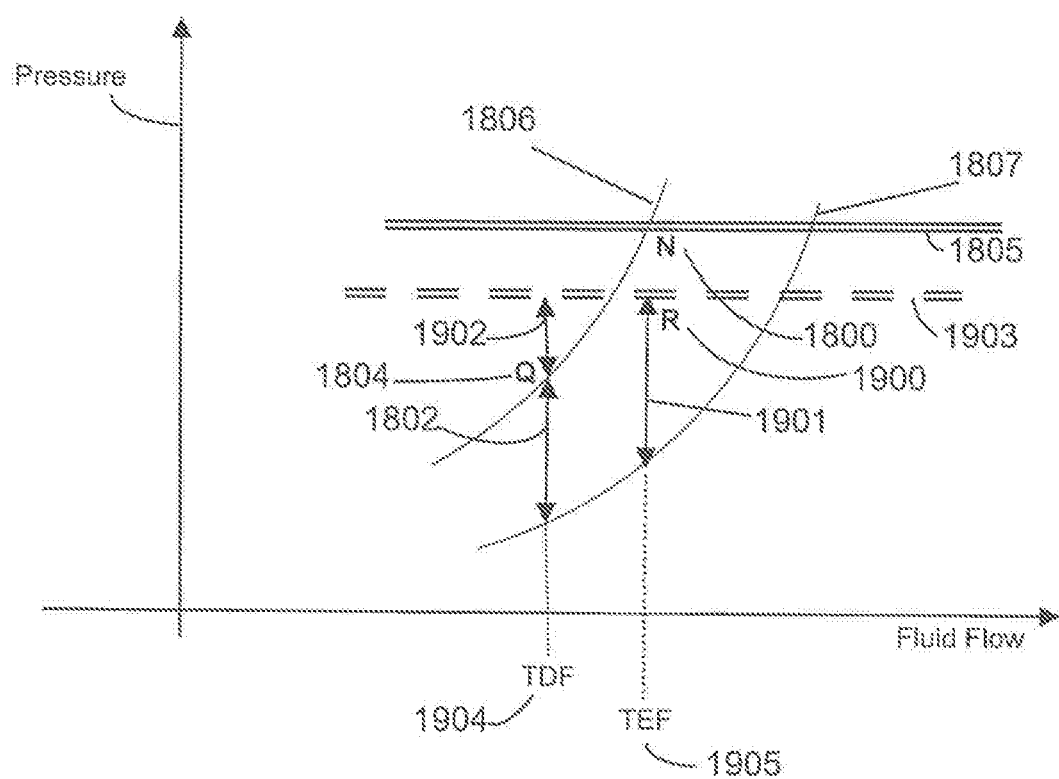
FIG. 19 is a table showing pressure loss distribution at target demand flow at a load control node unit with reduced node pressure, in accordance with an embodiment of the present invention.

FIG. 19 shows a graph with a horizontal axis that indicates fluid flow, and a vertical axis that indicates pressure. The graph shows ranges relating to pressure loss when the flow of fluid within the fluid distribution system is at a rate that is a target engineered flow 1905 as well as when the flow is in accordance with a value that within the range of target flow 1904 as may be generated by the load control node unit. (For example, FIG. 19 utilizes target engineered flow such as virtual target controlled variable setting information 310 (as shown in FIG. 3), and target flow such as target flow information 302 as is collected and generated, respectively, in relation to load control node unit 208, in accordance with an embodiment of this present invention.) As shown in FIG. 19, pressure is altered from a pressure level indicated by line 1805 (as shown in FIG. 18) to a pressure level indicated by line 1903. The effect of lowering the pressure level is shown in the graph. Pressure may be lowered by the result of adjustment activity in other sections of the distribution system where fluid flow demands have increased thereby lowering the upstream node pressure experienced by the node control load unit.

The line pressure loss range caused by the lowered pressure is range 1901 which represents the lower pressure loss of the LLSA occurring due to the lowered pressure. Range 1901 represents the maximum pressure loss of the balancing valve of the LLSA related to the load control node unit at the lowered pressure level indicated by line 1903.

The lowered pressure causes intersection R 1900 to be at a lower value than N 1800 (for example, R may be approximately 6.8). Although N and R occur at the same flow, namely target engineered flow 1905, N is at a higher pressure than R, which causes N to be a higher value than R. Intersection Q 1804 retains the same value in FIGS. 18 and 19.

The values of N, Q and R in FIGS. 18 and 19 represent CR-values that may be generated for a node unit at varying flows and pressures.

Operations at the target flow 1904 have the range of the LLSA at maximum pressure loss 1802 rather than at a lower value than line loss range 1901. To accommodate the reduced pressure level 1903 the valve of the LLSA must provide the additional line loss pressure 1902. This illustrates how the valve and the balancing component of the LLSA operate to provide the required line loss. At the target engineered flow 1905, the valve component of the LLSA is not engaged since the balancing valve is accommodating the applied pressure level 1903 with the line loss range 1901. However, as the invention effects speed reductions while maintaining balance, further reductions in applied pressure below reduced pressure level 1903 reduce again the participation of the valve of the LLSA.

Net downstream pressure loss is shown as curve 1806 in relation to the load control node unit. Net pressure increase is shown as curve 1807 in relation to the load control node unit.

FIGS. 18 and 19, and a comparison of the graphs therein, illustrate the response of a load control node unit to a reduction in applied pressure that occurs as a result of the change reports generated by the load control node unit and other node units in a fluid distribution system. Such change reports would have reported that there were no requests for pressure increase from the node units, but there were valid reports requesting a reduction in pressure from the node units. As described herein, the fluid distribution system can react to such requests.

Specifically, FIGS. 18 and 19 show the effects of lowered pressure. There is an effect upon the ranges of line pressure loss that will cause the system to operate in a balanced manner, in that the ranges are diminished. Moreover, the CR-value generated for the node unit may be lowered due to the lowered pressure. The pressure loss of the LLSA valve is also decreased.

Such alterations are necessary to respond to changes occurring at nodes in the fluid distribution system that are recognized by the node units and associated LLSAs within the system. Such changes can occur at any given time as the environment that a portion of the system is servicing between nodes can change. For example, an open window can lower or raise the temperature in an area of a building that is being serviced by a portion of the system that exists between nodes. A change can also occur if a thermostat in an area that is serviced by a portion of the system existing between two nodes is altered.

Therefore, it is not adequate for the system to be manually set, or for the system only be set at particular times during the day, as is applied by prior art systems. These approaches do not allow the system to be balanced in its functions and to service all areas in a building effectively and efficiently.

The present invention collects information regarding the function of the node units and associated LLSAs on a regular basis, and utilizes the collected information on a periodic basis to adjust the pump speed and to adjust valves and balancing valves of the LLSAs. These adjustments change the flow of fluid within the system. Altering the pump speed changes the flow of fluid throughout the whole of the conduits of the system generally. Whereas altering the valve and balancing valve positions within specific LLSAs alters the flow of fluid through specific LLSAs, which can affect the flow of fluid through LLSAs that are downstream of the LLSA (wherein the valve and/or the balancing valve is adjusted) and flow through return lines downstream of such LLSA.

These alterations can cause the fluid distribution system to achieve flow throughout the system that is effective and efficient, and that services the specific areas of the system that have particular requirements and that are serviced by particular node units within the system. For example, the flow of the fluid through the conduit generally and through each LLSA specifically can affect the level of heating or cooling provided by an embodiment of the present invention, as the system can function to address specific heating and cooling requirements in particular areas of a building. The system is thereby effect throughout the building, supplying the heating and cooling required to each area of the building. Furthermore, the system is efficient in that it supplies the specific heating and cooling needs to each area.

The fluid distribution system of the present invention is not required to operate at an exact fixed value of line loss pressure that each node unit and associated LLSA in the system must achieve, or an exact speed that the pump must be set at (as are requirements for the prior art systems). Instead the system of the present invention determines ranges whereby all of the node units and associated LLSAs in the system can function to achieve balanced function throughout the system. The system of the present invention functions within the determined ranges. The ranges are re-determined by the system to address changes that the system must address. The result is that the system of the present invention remains effective and efficient in its function overtime.

Secondary Distribution Section

Embodiments of the present invention may incorporate secondary distribution sections that include multiple pumps. As an example, as shown in FIG. 2, a system that incorporates a primary pump 211 and a load node unit 206 may be connected to a secondary distribution section 215. As another example, as shown in FIG. 31, a system that incorporates a primary pump 3111 may include a load node unit 3106 connected to a secondary distribution section 3115. As yet another example, as shown in FIG. 31, a load control node unit 3108 may be connected to a secondary distribution section 4115.

The secondary distribution sections may incorporate node units of similar types to the node units of the primary distribution section, such as secondary pump control node units, and other such node units. The function of the node units of the secondary distribution sections will be either the same or similar to the functions of the node units of the same type herein discussed for the primary distribution system. For example, the secondary pump control node unit will have the same or similar functions as are discussed herein for the pump control node unit of the primary distribution system. The secondary pump and secondary pump variable speed drive will also have the same or similar functions as are discussed herein for the pump and pump variable speed drive of the primary distribution section.

The secondary distribution section may be incorporated in the distribution system as an industry standard thermal load component (as one of the many possible thermal load components to be incorporated in the distribution system that are referenced herein) which may be present in the fluid distribution system. The downstream thermal loads accommodated by the secondary distribution section generate target flow demands on the primary distribution section. The target flow demand generated by the secondary pump control node unit that is in the secondary distribution section is transferred to the load node unit (in the primary distribution section) that is directly upstream of the junction node. The load node unit accepts and processes the target flow demand that it receives from the secondary distribution section. The change report that is generated by the load node unit that is directly upstream of the secondary distribution section is transferred to the load node unit. The load node unit accepts and processes the target flow demand that it receives from the secondary distribution section.

However, in some embodiments of the invention the thermal loads require either a higher supply temperature (i.e., thermal loads requiring cooling) or require a lower supply temperature (i.e., thermal loads requiring heating) of the fluid supplied (i.e., delivered) to the thermal loads, than the temperature of the fluid available in the primary distribution section. The temperature of the fluid supplied may be measured by a remote temperature probe in the secondary distribution section line downstream of the junction node. A target setting for this controlled variable is established either by the design engineer, or by the operator of the system.

The secondary distribution section is configured to form a secondary loop of lines incorporating nodes, one or more secondary node units and a secondary pump that is connected at the junction node to the primary distribution section of the system. As an example, the primary distribution section is the section shown in FIG. 2 that is outside of the dotted lines that indicate the secondary distribution section 215. The junction node connects the secondary distribution section to the primary distribution section, as shown in FIG. 35.

As an example of a possible configuration of a secondary distribution section, as shown in FIG. 35, a secondary distribution section 215 may be positioned to be downstream of a load node unit 206. The line extending downstream from the load node unit 206 through which fluid flows within the primary distribution section attaches to a junction node 3500. The points where fluid flows into the junction node are intake ports. There is an intake port where the line extending downstream of the load node unit meets the junction node. Fluid may enter the secondary distribution section 215 through the intake port of the junction node 3500 that is directly downstream of the load node unit 206. The points where fluid flows out of the junction node are discharge ports. There is a discharge port where fluid flows from the junction node into the secondary distribution section. Fluid may travel in a direct line through the junction node 3500, or at an angle in relation to the mid-point 3506 of the junction node (the mid-point is also known as the junction node barrier). For example, that 100% of the fluid may enter an intake port and exit at one of the discharge ports, such as 100% of the fluid entering the intake port that is connected to the line downstream of the load node unit and 100% of the fluid exiting the discharge port that discharges fluid into the secondary distribution section. As another example, portions of the fluid that enters an intake port (each portion constituting less than 100% of the fluid) may exit the junction node at different discharge ports, such that a portion of the fluid exits at each of the discharge ports. The various passages of fluid between the intake and discharge ports are discussed herein.

The fluid that flows into the intake port of the junction node 3500 that is directly downstream of the load node unit 206 may flow into the secondary distribution section 215 through a discharge port. Downstream of the discharge port whereby fluid flows into the secondary distribution section from the junction node 3500 is a secondary supply temperature (SST) sensor 3505 connected to the secondary distribution section line. Downstream of the SST one or more nodes and one or more additional node units 3501 may be positioned, and these nodes and node units may be configured into node unit groupings.

The additional node units in any secondary distribution section are secondary node units and may be one or more of the same types of node units as are in the primary secondary section, and may be configured in any manner, including in similar configurations (including node unit groupings) as discussed herein for primary distribution section node units. The configuration of one or more of the secondary node units may further be in relation to the secondary pump control node unit in a similar manner as one or more of the node units of the primary distribution section are configured in relation to the secondary pump control node unit. The function of any of the secondary node units may be similar or identical to the function of the same type of node unit as is discussed herein in relation to the primary distribution section.

Downstream of the one or more additional node units 3501, a secondary pump 3504 may be positioned. The secondary pump may be connected to a secondary pump variable speed drive 3503. A secondary pump control node unit 3502 may further be incorporated in the secondary distribution section 215. The secondary pump control node unit may be operable to receive and transfer information to other elements within the secondary distribution section, and to the load node unit of the primary distribution section. An intake port is positioned at the point downstream of the pump 3504 where fluid flows from the secondary distribution section into the junction node 3500. The fluid may flow out of the junction node through a discharge point that directs the fluid in the direction of the return line through which fluid will flow to the pump 211 of the primary distribution section.

The flow of the fluid through the secondary distribution section, the function of the elements of the secondary distribution section (e.g., any function of the elements to alter the speed of the secondary pump, or other functions of the elements), and the information relating to the fluid flow in the secondary distribution section that is transmitted to the load node unit directly upstream of the junction node, may be utilized to affect the pressure at the node directly upstream of the load node unit. For example, the fluid flow and function of any elements in the secondary distribution section 215, or information transferred to load node unit 206 from the secondary distribution section 215, may affect the pressure at node 201.

In another possible configuration of a secondary distribution section, as shown in FIG. 41, a secondary distribution section 4115 may be positioned to be downstream of a load control node unit 3108. The line extending downstream from the load control node unit 3108 through which fluid flows within the primary distribution section attaches to a junction node 4100. The points where fluid flows into the junction node are intake ports. There is an intake port where the line extending downstream of the load node unit meets the junction node. Fluid may enter the secondary distribution section 4115 through the intake port of the junction node 4100 that is directly downstream of the load control node unit 3108. The points where fluid flows out of the junction node are discharge ports. There is a discharge port where fluid flows from the junction node into the secondary distribution section. Fluid may travel in a direct line through the junction node 4100, or at an angle in relation to the mid-point 4106 of the junction node (that is also known as the junction node barrier), such that 100% of the fluid may enter an intake port and exit at the same discharge port, or portions of the fluid that enters an intake port may exit the junction node at different discharge ports, as discussed herein.

The fluid that flows into the intake port of the junction node 4100 that is directly downstream of the load control node unit 3108 may flow into the secondary distribution section 4115 through a discharge port. Downstream of the discharge port whereby fluid flows into the secondary distribution section from the junction node 4100 a secondary supply temperature (SST) sensor 4105 may be connected to the secondary distribution section line. Downstream of the SST one or more nodes and one or more additional node units 4101 may be positioned, and these nodes and additional node units (that are secondary node units) may be configured into node unit groupings.

Downstream of the additional node units 4101, a secondary pump 4104 may be positioned. The secondary pump may be connected to a secondary pump variable speed drive 4103. A secondary pump control node unit 4102 may further be incorporated in the secondary distribution section 4115. The secondary pump control node unit may be operable to receive and transfer information to other elements within the secondary distribution section, and to the load control node unit of the primary distribution section. An intake port is positioned at the point downstream of the pump 4104 where fluid flows from the secondary distribution section into the junction node 4100. The fluid may flow out of the junction node through a discharge point that directs the fluid in the direction of the return line through which fluid will flow to the pump 3111 of the primary distribution section.

The flow of the fluid through the secondary distribution section, the function of the elements of the secondary distribution section (e.g., any function of the elements to alter the speed of the secondary pump, or other functions of the elements), and the information relating to the fluid flow in the secondary distribution section that is transmitted to the load control node unit directly upstream of the junction node, may be utilized to affect the pressure at the node directly upstream of the load control node unit in the primary distribution section. For example, the fluid flow and function of any elements in the secondary distribution section 4115, or information transferred to load control node unit 3108 from the secondary distribution section 4115, may affect the pressure at node 3101.

A benefit of the secondary distribution section configuration and the transfer of information between the secondary distribution section and the load node unit or load control node unit of the primary distribution section, is that the present invention may achieve equal temperature in the primary distribution section and the secondary distribution section. Known prior art systems are not operable to achieve equal temperatures in any primary and secondary sections within such systems.

Generally a difference in temperatures between a primary distribution section and a secondary distribution section will occur in cooling systems. In a heating system the secondary distribution section may have fluid that is at a warmer temperature than the temperature of the fluid in the primary distribution section. As discussed herein, equalization of temperature of the fluid in the primary distribution section and the secondary distribution section can be achieved by the present invention.

As an example, the load node unit of the primary distribution section may be operable to measure the temperature of the fluid that flows through the LLSA attached to the load node unit. The fluid temperature sensor and I/O Bus of the LLSA may measure the temperature of the fluid and be able to process information based upon the temperature measurement. The temperature measured by the fluid temperature sensor can be utilized by some embodiments of the present invention. For example, in one embodiment of the present invention the temperature measured by the fluid temperature sensor of LLSA associated with the load node unit is compared to the temperature of the fluid measured by the SST of the secondary distribution section. This comparison effects an operational verification of thermal energy transfer across the junction node from the primary distribution section to secondary distribution section.

A load node unit may further incorporate features whereby it can receive any of: a measurement of the temperature of fluid flowing through a remote conduit of the fluid distribution section from an off-board independent temperature sensor; or a measurement of temperature from a medium related to the performance of the thermal load from an independent temperature probe. Specifically, such information may be transmitted from such off-board independent temperature sensor, or the independent temperature probe, to the I/O Bus of the LLSA attached the load node unit. In one embodiment of the present invention, the measurements of the off-board independent temperature sensor, and/or the independent temperature probe, may be compared with the temperature of the fluid flowing through the LLSA connected to the load node unit, as measured by the fluid temperature sensor of the LLSA. This comparison may effect an operational verification of thermal energy transfer across the junction node from the primary distribution section to secondary distribution section.

These examples are described in relation to a load node unit, but a load control node unit may also operate in a like manner to the load node unit, and receive information from the SST sensor of a secondary distribution section in a similar manner as well.

The secondary distribution section may be configured to incorporate a junction node that is positioned to connect two lines of the primary distribution section with two lines of the secondary section such that there are four connections of lines to the junction node. (For example, as shown in FIGS. 35 and 41 for junction node 3500, 4100, respectively.) The junction node is defined by a four port arrangement, with two intake ports and two discharge ports. The junction node is the physical connection point which is shared by both the primary distribution section and the secondary distribution section. Fluid flowing in the secondary distribution section may enter the junction node through an intake port, flow through the junction node, and exit the junction node via one or two of the two discharge ports in one of three possible ways as discussed below:
1. 100% of the fluid flow that entered the junction node may exit one of the discharge ports and thereby return to the secondary distribution section;
2. 100% of the fluid flow that entered the junction node may exit the other discharge port (not the discharge port indicated in #1) and thereby return to the primary distribution section; or
3. a portion of the fluid flow that entered the junction node may exit one of the discharge ports and thereby return to the secondary distribution section and the remaining portion of the fluid flow may exit the other discharge port line and thereby return to the primary distribution section.

The transfer of fluid flow between the primary distribution section and the secondary distribution section via the junction node in accordance with options 1, 2 or 3 above is solely dependent on the magnitude of the primary distribution section fluid flow and the secondary distribution section fluid flow passing through the discharge ports of the junction node.

The Kirchhoff circuit theorem is applicable in that, if pressure is unknown at junction nodes between the pump of the primary distribution section and the secondary pump of the secondary distribution section, it can be determined. The fluid flow generated by the pump of the primary distribution section and the secondary pump of the secondary distribution section is known and maintained at the various node units in the primary distribution section and the secondary distribution section. The fluid flow of such node units can be utilized to determine the pressure or the effect thereof at the junction nodes.

If the Kirchhoff circuit theorem is applied to the lines of the primary distribution section and secondary distribution section, upon the occurrence of option 2 discussed above for fluid flow through a junction node, it can be determined that, if fluid flow from the discharge port of a load node unit of the primary distribution section that is directly upstream of the junction node (for example, such as load node unit 206 that is directly upstream of junction node 3500) is equal to the total fluid flow at the discharge port of all node units, then this same fluid flow passes unaltered from the primary distribution section, through the junction node, into the secondary distribution section, and into the directly downstream node units. Under such a condition the fluid flow does not flow in either direction across the junction node barrier (that is a virtual barrier at the junction node).

Furthermore, this same fluid flow passes unaltered from the primary distribution section, through the junction node, into the secondary section, and into the directly downstream one or more additional node units of the secondary distribution section, through the secondary pump, and on to the inlet port of the junction node attached to the secondary distribution line, then into the primary distribution section, and ultimately through the return line to the pump of the primary distribution section.

The secondary distribution section incorporates a secondary pump control node unit operable in the secondary distribution section to receive information from the one or more additional node units in the secondary distribution section and to process this information to produce indicators as to whether the speed of the secondary pump should be altered. The secondary pump control unit can process the node unit information that it receives from the one or more additional node units (i.e., secondary node units) that are directly upstream of the secondary pump to determine indicators as to whether the speed of the secondary pump should be altered to achieve an effective, efficient and balanced fluid flow in the secondary distribution system. The indicator as to whether the speed of the secondary pump should be altered is transferred from the secondary pump control node unit to the secondary pump variable speed drive. The speed of the secondary pump is altered by the secondary pump variable speed drive in accordance with the indicator it receives. Information can be sent from the secondary pump variable speed drive to the secondary pump control node unit, such as information relating to real time secondary pump speed and other information.

Each of the one or more additional node units in the secondary distribution section may further be associated with a LLSA, and the balancing valve or other valves of the LLSA may be repositioned to affect flow, and thereby control the pressure at any nodes within the secondary distribution section. The steps for repositioning any balancing valve or other valves of the LLSAs, and for altering the pump speed, undertaken by elements of the secondary distribution system are undertaken in accordance with the steps described herein for determining indications for such repositioning and alterations in relation to corresponding primary distribution section elements.

Thus, the junction node transfers fluid between the primary distribution section wherein fluid flow is at least partially controlled by the speed of the pump, and the secondary distribution section wherein fluid flow is at least partially controlled by the speed of the secondary pump.

Embodiments of the present invention may incorporate one or multiple secondary distribution sections. Some embodiments of the present invention may further incorporate tertiary distribution sections that operate with the secondary distribution section through similar junction nodes. In particular, the configuration of the embodiments of the present invention that incorporate a primary distribution section and one or more secondary distribution sections may be applicable to systems that incorporate any of the following: primary distribution sections that achieve constant flow and secondary distribution sections that achieve constant flow; primary distribution sections that achieve variable flow and secondary distribution sections that achieve variable flow; and primary distribution sections that achieve constant flow and secondary distribution sections that achieve variable flow.

Information may be transferred via an ECN between elements of the primary distribution section and elements of any secondary distribution section of the system. As shown in FIG. 36, in an embodiment of the present invention, the primary distribution system may be a constant flow system and the secondary distribution system may be a variable flow system. The load node unit that is upstream of the junction node operates to maintain the variable target flow received from the secondary pump control node unit of the secondary distribution section.

The secondary pump control node unit can process the node unit information that it receives from the one or more additional node units (i.e., secondary node units) that are directly upstream of the secondary pump to determine indicators as to whether the speed of the pump should be altered to achieve an effective, efficient and balanced fluid flow in the secondary distribution system. The indicator as to whether the speed of the secondary pump should be altered is transferred from the secondary pump control unit to the secondary pump variable speed drive. The speed of the secondary pump is altered by the secondary pump variable speed drive in accordance with the indicator it receives.

Information can be sent from the secondary pump variable speed drive to the secondary pump control node unit, such as information relating to real time secondary pump speed and other information.

For example, the secondary pump control node unit 3502 can process the node unit information 3600 that it receives from the one or more additional node units 3501 that are directly upstream of the secondary pump 3504 to determine indicators as to whether the speed of the secondary pump should be altered to achieve an effective, efficient and balanced fluid flow in the secondary distribution system. The speed indicator 3601 that indicates whether the speed of the secondary pump should be altered is transferred from the secondary pump control node unit 3502 to the secondary pump variable speed drive 3503. The speed of the secondary pump is altered by the secondary pump variable speed drive in accordance with the speed indicator it receives. Information 3602 can be sent from the secondary pump variable speed drive 3503 to the secondary pump control node unit 3502, such as information relating to real time secondary pump speed and other information.

The SST may generate information to be utilized by the load node unit that is directly upstream of the junction node. The information generated by the SST may be transferred via the ECN from the SST to the load node unit. The load node unit may process such information that it receives from the probe in a manner disclosed herein. For example, information 3604 may be transferred from the SST 3505 to the load node unit 206.

Information, such as target flow information may be transferred bi-directionally between the load node unit that is directly upstream of the junction node and the secondary pump control node unit. The load node unit and secondary pump control node unit may each process the information it receives. The secondary pump control node unit may further receive information from the one or more additional node units (i.e., secondary node units) that are downstream of the SST, and such information may include change reports and target flow information from one or more of the additional node units (in accordance with the flow of information between node unit groupings, in the same manner as is described for similar primary distribution section node unit groupings). The secondary pump control node unit may process the information it receives and utilize the processing results to alter the speed of the secondary pump in accordance with operation of the secondary pump variable speed drive, in a manner disclosed herein for such activities of elements of a primary distribution system.

For example, the load node unit 206 may receive target flow information 309 from the secondary pump control node unit 3502. The load node unit 206 may process the target flow information. As discussed herein, the target flow information 309 may be utilized to generate virtual target demand flow 301 that the load node unit 206 transfers to an upstream node unit. The load node unit 206 may also utilize information it receives from the secondary pump control node unit 3502 to generate the change report 305 that it transfers to an upstream node unit.

The secondary pump control node unit 3502 may receive information from the load node unit 206 and may process such received information. The secondary pump control node unit 3502 may receive information from the one or more additional node units 3501, process this information, and utilize the processing results to alter the speed of the secondary pump 3503 in accordance with operation of the secondary pump variable speed drive 3504.

Figure 42:
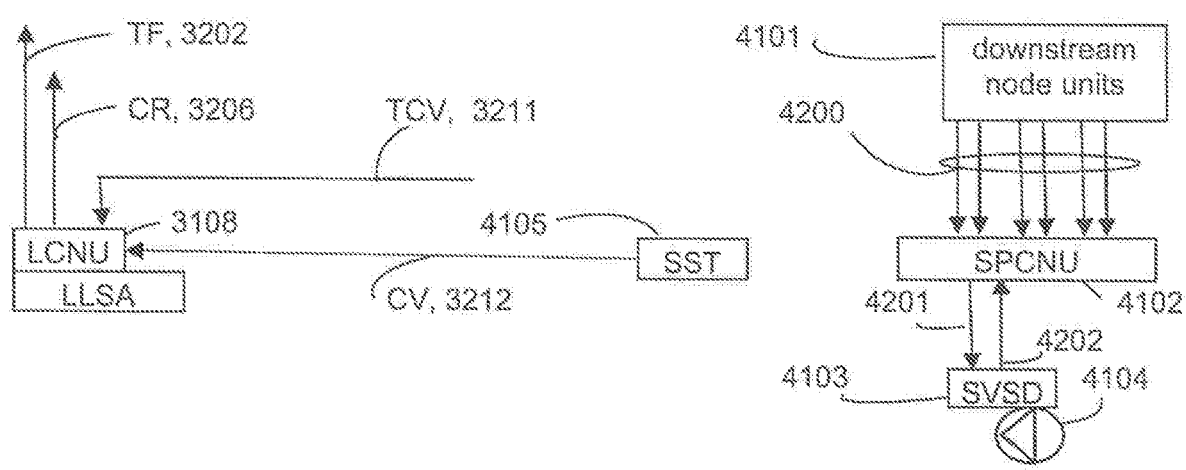
FIG. 42 is a systems drawing showing information sharing in a portion of a distribution system (configured in accordance with FIG. 41), between the node units by way of an electronic communication network, in accordance with an embodiment of the present invention.
Figure 43:
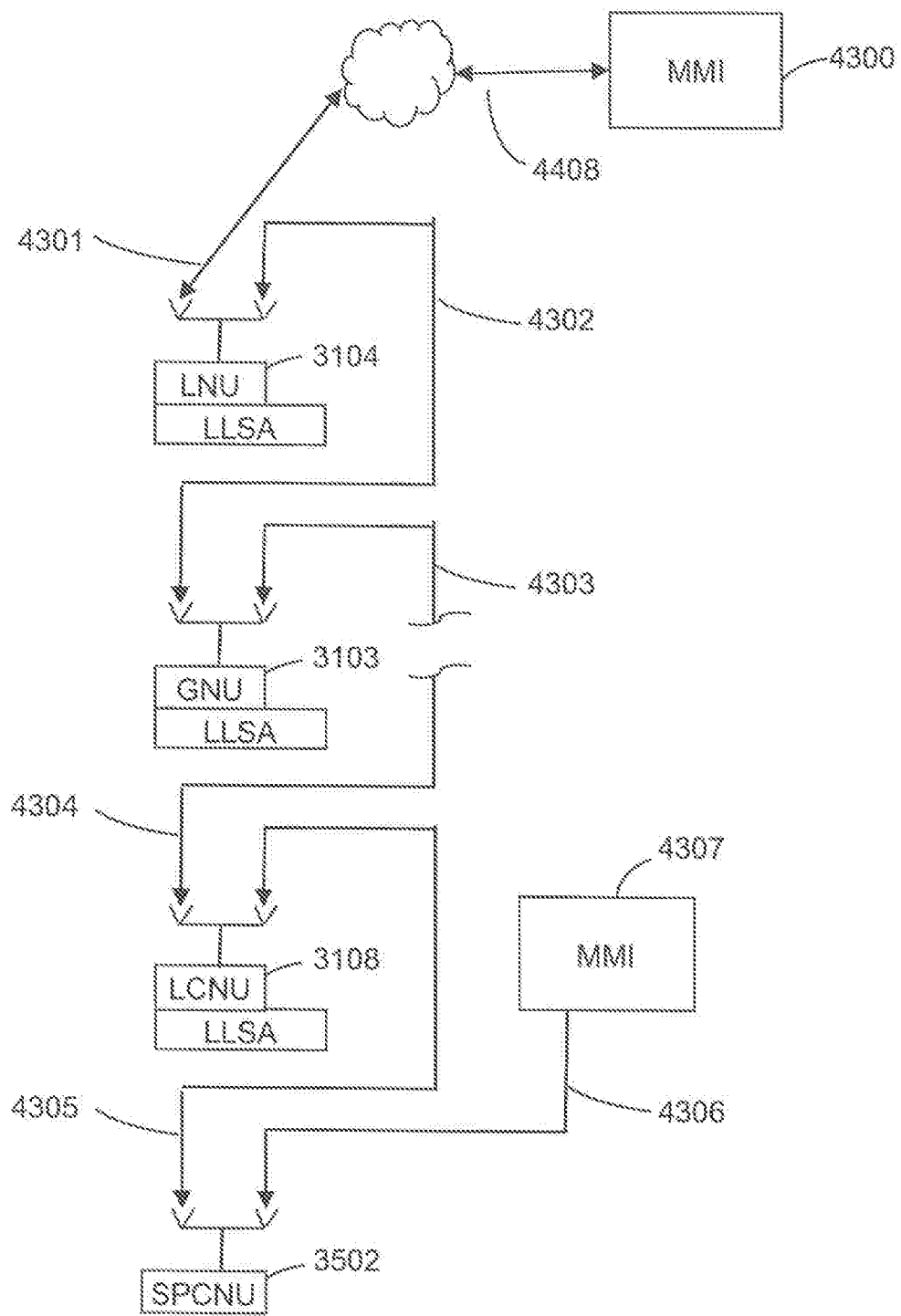
FIG. 43 is a systems drawing showing a distribution system incorporating multiple media units, in accordance with an embodiment of the present invention.

As another example, as shown in FIG. 42, the secondary pump control node unit 4102 can process the node unit information 4200 that it receives from the one or more additional node units 4101 that are directly upstream of the secondary pump 4104 to determine indicators as to whether the speed of the pump should be altered to achieve an effective, efficient and balanced fluid flow in the secondary distribution system. The speed indicator 4201 that indicates whether the speed of the secondary pump should be altered is transferred from the secondary pump control node unit 4102 to the secondary pump variable speed drive 4103. The speed of the secondary pump is altered by the secondary pump variable speed drive in accordance with the speed indicator it receives. Information 4202 can be sent from the secondary pump variable speed drive 4103 to the secondary pump control node unit 4102, such as information relating to real time secondary pump speed and other information.

Information, such as controlled variable information 3212 that is generated by the STT 4105 may be transferred from the SST to the load control node unit 3108 and utilized by the load control node unit. The load control node unit 3108 may receive virtual target controlled variable setting information 3211. The load control node unit 3108 may process the controlled variable information and virtual target controlled variable setting information it receives, as discussed herein, to generate virtual target demand flow 3202 that the load control node unit 3108 transfers to an upstream node unit. The load control node unit 3108 may also utilize information it receives to generate the change report 3206 that it transfers to an upstream node unit.

Embodiments of the present invention may incorporate secondary distribution sections that include one or multiple pumps.

To effect an efficient transfer of energy from the primary distribution section to the secondary distribution section, an amount of energy sent by the primary distribution section must equal to that received by the secondary distribution section. (For example, the energy transferred may be measured in BTUs as a function of temperature differential of the fluid and the fluid flow.) Having the load control unit in the primary distribution section operate with the target supply temperature setting of the secondary distribution section, and measuring the fluid supply temperature in the secondary distribution section, enables the load control node unit of the primary distribution section to generate (through operations of loop control) the precise target demand flow required to be maintained at the target controlled variable setting (i.e., the secondary distribution section supply temperature) in the primary distribution section. The target demand setting for the primary fluid flow at the then current primary distribution section supply fluid temperature delivers the exact energy level (i.e., BTUs) that is required for the independent secondary distribution section thermal load defined target flow to be maintained at the secondary distribution section target supply temperature. This control operation across the junction node achieves the required 100% balanced (i.e., equal) energy transfer between the primary distribution section and the secondary distribution section.

In an embodiment of the present invention that is a cooling system, if the target secondary distribution section supply fluid temperature setting is higher than the temperature of the available fluid of the primary distribution section (as is evident from the details relating to FIG. 35 discussed above), some portion of the fluid discharged from the secondary pump must be transferred across the virtual barrier of the junction node to mix with lower temperature fluid the secondary distribution section is receiving from the primary distribution section via the junction node. Some of the warmer secondary distribution section fluid flow returns to the secondary distribution section supply via the junction node to warm up the secondary distribution section supply fluid.

Thus, the secondary distribution section may operate with a higher flow than the flow in the primary distribution section but at a lower temperature differential of fluid discharged from, and received by, the junction node from the secondary distribution section. (The temperature differential is equal to the supply less the return temperature.) A skilled reader will recognize that the return temperature of the primary distribution section flow through the load node unit is the same temperature as the temperature of the fluid discharged from the secondary pump.

In an embodiment of the present invention that is a heating system, if the target secondary distribution section supply fluid temperature setting is lower than the temperature of the available fluid of the primary distribution section (as is evidence for the detail relating to FIG. 35 discussed above), some portion of the fluid discharged from the secondary distribution section pump must be transferred across the junction node barrier (that is a virtual barrier of the junction node) to mix with higher temperature fluid the secondary distribution section is receiving from the primary distribution section via the junction node. Some of the cooler secondary distribution section fluid flow returns to the secondary distribution section supply via the junction node to cool down the secondary distribution section supply fluid.

Thus, the secondary distribution section may operate with a higher flow than the flow of the primary distribution section but at a lower temperature differential of fluid discharged form and received by the junction node in the secondary distribution section. (The temperature differential is equal to the supply less the return temperature.) A skilled reader will recognize that the return temperature of the primary distribution section flow through the load node unit is the same temperature as the temperature of the fluid flowing at the discharge of the secondary distribution section pump.

The target flow demand generated by any secondary node units in the secondary distribution section that are directly downstream of a junction node is transferred to the secondary pump control node unit. The load control node unit of the primary distribution section operates with the target supply temperature setting of the secondary distribution section (i.e., the target controlled variable setting) and the secondary distribution section measured fluid supply temperature. This enables the primary distribution section load control node unit to generate (through operations of loop control) the precise primary distribution section target demand flow required to maintain its flow at the target controlled variable setting. The load control node unit of the primary distribution section processes the generated target flow demand. The change report that is generated by the load control node unit of the primary distribution section (that is directly upstream of the junction node) is transferred to the group node unit that is directly upstream of the load control node unit (in the primary distribution section).

The remote temperature probe in the conduit of the secondary distribution section that is directly downstream of the junction node exposed to the secondary distribution section fluid of the LLSA associated with the load control node unit of the primary distribution section temperature is measured at the load control node unit. This temperature probe represents the controlled variable in the operations of the load control node unit.

The node units of the secondary distribution section may further process information transferred via the ECN to reposition the balancing valve or other valves of the LLSAs associated with the secondary node units, in accordance with the steps described herein for node units of the primary distribution section. Repositioning of the balancing valve or other valves of the LLSAs associated with secondary node units in the secondary distribution section will be undertaken in accordance with the operation locus of the respective secondary node units and/or the operation locus range for a group of secondary node units, in the same manner as is described for the primary distribution section. The repositioning shall have the effect of maintaining fluid flow as effective, efficient and balanced constant within the secondary distribution section and the primary distribution section.

The secondary distribution section is configured to form a secondary loop of lines incorporating nodes, node units and a secondary pump. The secondary loop is connected to the primary distribution section via the junction node. The secondary distribution section may pass fluid into the primary distribution section and thereby adjust the fluid flow of the primary distribution section. Thus, the secondary distribution section can improve the performance of the primary distribution section to achieve its target flow.

There may be one or multiple secondary distribution sections in an embodiment of the present invention, and each secondary distribution section may function as described herein. The secondary distribution sections may transfer demand target flow changes and alternatively controlled variables of the secondary distribution section may be maintained at a controlled variable target setting by adjustments to the flow in the primary section that increase or reduce the requirement for any adjustment of LLSA operations of primary node units and/or of the speed of the primary pump. This can produce overall efficiency benefits for the system and may reduce the cost and energy required for the system.

Prior Art Example

Prior art systems may incorporate tributary sections, but these sections cannot produce the effects and functions of that can occur between a primary distribution section and secondary distribution section of embodiments of the present invention. The tributary section of the prior art is discussed below, and the principal section of the prior art is the section of the system that is outside of the tributary section.

An example of a prior art system incorporating a tributary section is provided below to demonstrate how the prior art systems cannot achieve the functions of embodiments of the present invention that incorporate one or more secondary distribution sections.

Figure 37:
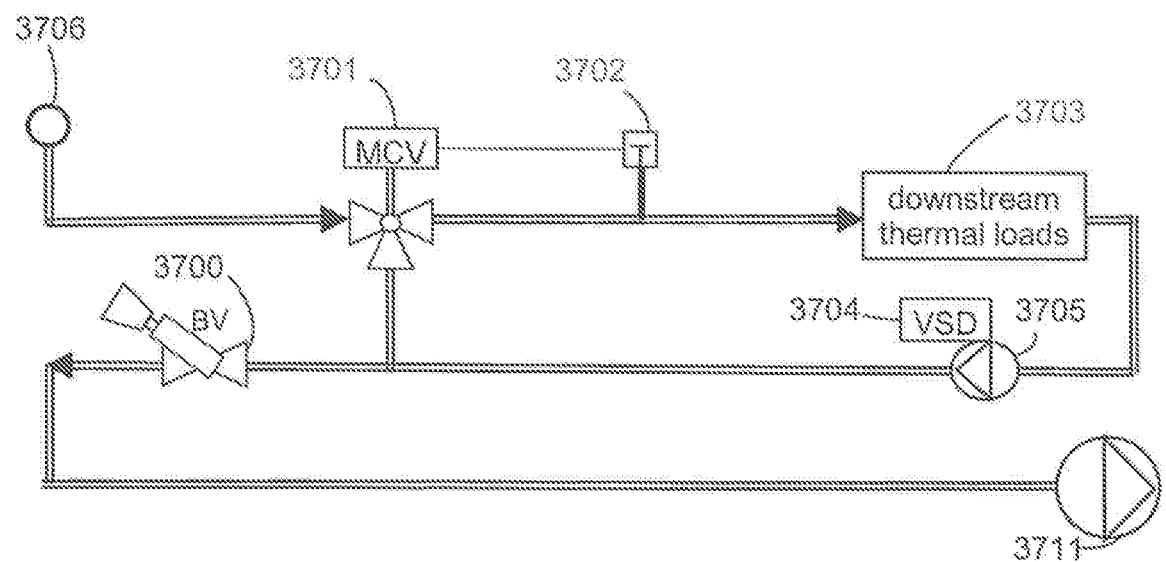
FIG. 37 is a prior art example of a system incorporating a primary and secondary bridge configuration.

Prior art systems, such as that shown in FIG. 37, may include multiple pumps such as a tributary pump 3705 and a principal pump 3711. However, in such prior art systems a motorized control valve 3701 (i.e., that may be a three way motorized control valve) may be positioned at the point where the principal line meets a tributary loop formed of lines. The motorized control valve may be downstream of a node 3706. The motorized control valve operates with a temperature probe installed in the tributary line downstream of the three way valve to maintain the target temperature setting at the temperature probe within the tributary loop which will be transferred to downstream thermal loads 3703. The fluid will then flow to a secondary pump 3705 within the tributary loop that is controlled by a tributary pump variable speed drive 3704. The fluid will flow from the tributary loop to a manually adjusted balancing valve 3700 that can be set to establish a fixed fluid flow within the primary line. The fluid flows from the balancing valve to the principal pump 3711.

The motorized control valve may be modulated to maintain the target temperature setting for measured fluid temperature by operative valve 3702. This operation of the operative valve results in changes in the flows on both the principal and tributary sides of the three way motorized control valve. The manual balancing valve 3700, is set to a fixed position when the maximum target demand flow is provided at thermal loads 3703, and the three way motorized valve is maintaining the specified temperature setting for temperature 3702 and the principal loop is operating at the maximum design pressure delivered by the pump. As detailed above in relation to the prior art system shown in FIG. 12, balance exists in the prior art system only under this one condition. As a non-linear relationship of the line pressure loss is a function of flow, then with only one change in any one of the above settings the principal balance no longer exists, and consequently the balance between the principal distribution section and the tributary distribution section no longer exists.

Once the balance is lost in the principal distribution section, under all other conditions there will be an excess of principal flow:

a. due to the low line pressure loss setting at the balancing valve, in the principal section, set to accommodate the higher, primary flow condition, required of the principal section at maximum load condition;

b. due to the lower line pressure loss of the three way valve, previously operating at a higher line pressure loss, in the principal section, to accommodate the higher principal flow condition, required to direct more principal flow to the tributary section.

With the imbalance condition there are two possible repercussions transferred to the tributary section:

c. when the tributary supply temperature target setting is equal to the principal temperature of the principal fluid entering the three way valve, 100% of the principal flow entering the three way valve will be directed into the tributary section. However, the tributary pump is also operating and will generate flow being transferred to circulate through the principal section via the inlet port of the balancing valve. Since the tributary flow is now the sum total of that produced by both principal and tributary pumps, the tributary pump must be turned off or its speed reduced. Under this condition the principal pump is doing the work that the tributary pumps should be doing. The result is an unnecessary disturbance of the tributary section and energy inefficiency.

d. when the tributary supply temperature target setting is not equal to the principal temperature of the principal fluid entering the three way valve, 100% of the principal flow entering the three way valve will be directed into the tributary section. In a cooling system the tributary supply temperature target setting is higher than the temperature of the principal fluid. At a higher target temperature the three way valve will be repositioned to permit a portion of the warmer fluid discharged from the tributary pump to flow through the three way valve and on to the tributary section discharged from the three way valve. However, the tributary pump is also operating and will generate flow being transferred to circulate through the principal section via the inlet port of the balancing valve. Since the tributary flow is now the sum total of that produced by both principal and tributary pumps, the tributary pump must be turned off or its speed reduced. Under this condition the principal pump is doing less work than in the case of option c discussed above, but the tributary pumps should still be doing more. The result is an unnecessary disturbance of the tributary section and energy inefficiency.

Under these conditions there is a substantial loss in energy efficiency and limitation of the capacity of transfer of energy from the principal to the secondary loop.

A three way valve is adjusted to accommodate maintenance of the target temperature for the temperature probe installed in the tributary distribution section line. The fluid flow from the upstream node of the principal distribution section through the three way valve and then through balancing valve and onward downstream to the pump of the principal distribution section changes in magnitude, thereby losing the balance on the principal distribution section. This demonstrates that the principal distribution section lost balance condition may arise due to valid operations of the tributary distribution section.

In other prior art systems the manual balancing valve 3700 may be replaced with an automatic flow limiting valve. This embodiment of the prior art addresses the possible excessive flows developed on the principal section (as discussed herein). Operating below the maximum setting of the flow limiting valve 3702, the actual flow through the valve, may not be the target demand flow required by the downstream thermal loads 3703 of the tributary section since its line pressure loss performance which is below the limit setting is not related to the target demand flow required by the tributary section. This principal flow is dependent on the line pressure loss generated by operation of the three way motorized valve and on the line pressure loss generated by the automatic flow limiting valve and on the principal loop pressure delivered by the principal pump. Operating above the maximum setting of the flow limiting valve 3702, the actual flow through the valve may not be the target demand flow required by the downstream thermal loads 3703. Under almost all conditions the tributary loop will not receive its target demand flow and the temperature of the fluid will not be equal to that available at the principal loop. Under these conditions there is a substantial loss in energy efficiency.

In both theses embodiments the valve 3702 limits the application of the full principal pressure on the bridge and thus limits the flow from the principal section to the tributary loop, and there is little, or no, precision in the transfer of fluid flow, from the principal section to the tributary section at the setting of the required tributary target flow, other than perhaps the maximum flow conditions detailed above. The adjustment of the three way valve results in simultaneous modification of the line loss pressure drop in both the tributary section and the principal section. This undesirable disturbance to the tributary section results in a readjustment of flow and the related speed of the tributary pump and further readjustments in the tributary section. Only the principal section should experience a change to accommodate the demand of the tributary section.

The prior art is based pressure limiting, or flow limiting, or both, on the principal side of the connecting bridge arrangement, which includes the 3 way control valve. The prior art does not measure, nor transfer to, nor utilize in, the principal loop, the precise flow, target demand flow, required in the tributary loop. Nor does the prior art maintain this target demand flow over a locus of conditions arising on the principal side of the principal and tributary bridge.

Furthermore, there is no isolation between the principal loop and the tributary loop in the prior art example. The 3 way control valve affects both the principal loop and the tributary loop. A teeter-totter scheme is what occurs, whereby should an overflow of the tributary loop occur, there is no access from the tributary loop to the principal loop. Therefore, in the prior art, only the speed of the pump incorporated in the tributary loop will be reduced upon an overflow, while high flows continue in the primary loop. This is yet another reason why the prior art fails to achieve equal temperatures between the fluid in the principal and tributary loops, and is unlike the present invention that can achieve equal temperatures of the fluid in the primary distribution section and secondary distribution section(s). The prior art cannot achieve this benefit of the present invention.

Present Invention with Secondary Distribution Section—Benefits

The prior art differs significantly from the present invention in several aspects and provides benefits that the prior art cannot achieve. As one example, the present invention can function if the primary distribution section or secondary distribution section is constant flow and the other section in the system is variable flow. As another example, the information transferred upstream through the ECN of the present invention allows for intermittent, and almost constant, variation to either the speed of the pump (either the primary pump and/or any secondary pump(s)) based on the operation locus range, and/or repositioning of balancing valves and/or other valves of the unit nodes in the primary or secondary sections based on operation locus of each downstream node unit that has a shared node in a node unit grouping. As yet another example, the present invention can maintain balanced flow over time without the need for manual adjustment.

An embodiment of the present invention that incorporates one or more secondary distribution sections can establish flow balance at the junction node. This provides the facility to transfer conditioned fluid from the primary distribution section, unchanged in temperature, to the secondary distribution section in the precise quantity (i.e., flow) currently required by the secondary distribution section.

Moreover, the remote temperature probe in the conduit of the secondary distribution section directly downstream of the junction node exposed to the fluid and the temperature probe of the LLSA associated with the load node unit of the primary distribution section of the fluid flowing through are measured individually at the load node unit. If the temperature measurements are equal; in the primary distribution section arriving at the inlet port of the junction node: and in the discharge port of the junction node directly upstream of the node units of the secondary distribution section. This provides confirmation of the Kirchhoff circuit theorem, as the theorem is demonstrated by the unaltered and equal flow transfer of conditioned fluid flow. Such confirmation may be useful in particular for the operating staff of the building that the fluid distribution system of the present invention is installed within, as well as for others who are not aware of the Kirchhoff circuit theorem. By measurement of both flow and temperature of the fluid, in both the primary distribution section and the secondary distribution section, when balanced the efficiency of the transfer is 100% (excluding thermal losses at the junction node).

The 100% efficient transfer may occur at both the maximum target flow setting defined by the design engineer of the system, and at all lesser values of target demand flow settings which are flow settings required by the thermal loads of the secondary section.

At the 100% transfer condition, having the temperature of the secondary fluid flow entering the secondary thermal load (downstream of the junction node) equal to that of the primary distribution section fluid flow upstream of the junction node, resolves a significant energy efficiency issue.

Without this facility, the only other possible method for prior art systems to achieve this equality of temperatures is to generate excessive fluid flows on the principal section as in option c as discussed above in relation to the prior art shown in FIG. 37, with the principal section flow at the more than 100% of the target flow. This condition would require oversizing of pumps and related chillers or boilers, to operate at the elevated flow levels. Principal section pumps would also need to generate higher pressures. All this results in higher capital costs. The operability of the present invention to maintain 100% balance over the range of demands of the secondary distribution section (i.e., a type of thermal load), while also providing equal temperatures to the primary distribution section is a unique feature of this invention, and is not achievable by the prior art.

In embodiments of the present invention, if there is a deficiency in achievement of the primary distribution section target flow, while the secondary distribution section flow remains independently maintained by the secondary pump control node unit, then the excess secondary distribution section flow entering an inlet of the junction node will cross the junction node barrier and will continue through the discharge ports of the junction node and impact the temperature measured at secondary distribution section temperature sensor. In a cooling system there will be an incremental deficiency in primary distribution section flow. (A skilled reader will recognize, in a cooling system, the excess secondary distribution section flow discharged from the secondary pump is at a higher temperature than the temperature of the primary distribution section fluid entering the inlet port of the junction node). In a heating system there will be an incremental drop in temperature of the flowing fluid in the secondary distribution section in direct relationship to the incremental deficiency in primary distribution section flow. (A skilled reader will recognize, in a heating system, the excess secondary distribution section flow discharged from the secondary pump is at a lower temperature than the temperature of the primary distribution section fluid entering the inlet ports of the junction node.) The flow deficiency of the primary distribution section is clearly evident in the incremental temperature deficiency of the secondary distribution section fluid flow downstream of the junction node.

If the flow and temperature of the fluid in the primary distribution section and the secondary distribution section are unbalanced then the efficiency transfer will not be 100%. Load node units measure the temperature of the fluid in the primary distribution section, whereas temperature probes (such as SST sensors) measure the temperature of the fluid in the secondary distribution sections.

In the primary distribution section the present invention operates in accordance with the operation locus of each of the node units that produce parallel unequal flows. Such flow is passed through the nodes within the system, and the aim of the present invention is to produce the same pressure at each node. Nodes are shared nodes when they exist directly between an upstream group node unit (or pump) and one or more downstream node units. Thus, node units apply their operation locus (and the operation locus range of a node unit grouping or other groups of node units) so as to achieve operation in series with equal flow through the shared nodes at the same node pressure.

The junction node is a shared node between the load node unit, or load control node unit, that is directly upstream of the junction node and the one or more additional node units (i.e., secondary node units) that is directly downstream of the junction node. The load node unit (or load control node unit) and the one or more secondary node unit(s) also each apply its individual operation locus so as to achieve operation in series with equal flow through the shared junction node and the secondary distribution section generally at the same flow and pressure.

The pump of the primary distribution section generates an applied pressure at all downstream nodes. When pressure is below a maximum level and above a minimum level then node units are able to operate at their respective operation locus to maintain the target demand flow. For example, the change reports generated by each node unit when the target demand flow is achieved and each node unit is operating within its operation locus are NULL reports. If the change reports of the one or more secondary node unit(s) are NULL reports the secondary pump control node unit receives is a NULL report and this indicates to the secondary pump control node unit that no change to the speed of the secondary pump is required to be generated by the secondary pump control node unit.

If pressure at a node is above a maximum level then the operation of one or more node units is not within its operation locus and the flow is no longer being maintained at the target flow. The change report processing that occurs in the system, as described herein, is configured to detect if any node unit is not operating within its operation locus. The result of such a detection is that the node unit undertaking the processing will generate a change report that requests a decrease in the pump speed.

If the system further incorporates one or more secondary distribution sections change report processing can detect if a decrease to the speed of the secondary pump is required to cause fluid flow to be maintained at a target flow. A change to the speed of the secondary pump can be achieved by the function of the secondary pump control node unit and the secondary pump variable speed drive, that operate to achieve a change to the speed of the secondary pump.

If pressure at a node is below a minimum level then the operation of one or more node units is not within its operation locus and the flow is no longer being maintained at the target flow. The change report processing that occurs in the system, as described herein, is configured to detect if any node unit is not operating within its operation locus. The result of such a detection is that the node unit undertaking the processing will generate a change report that requests an increase in the pump speed.

If the system further incorporates one or more secondary distribution sections change report processing can detect if an increase to the speed of the secondary pump is required to cause fluid flow to be maintained at a target flow. A change to the speed of the secondary pump can be achieved by the function of the secondary pump control node unit and the secondary pump variable speed drive, that operate to achieve a change to the speed of the secondary pump.

If the primary distribution section is a constant flow section, then, as shown in FIGS. 31 and 32, a load node unit 3117 has node 3100 as a shared node with the group node unit 3103 and with the upstream pump 3111. The load node unit receives a target flow information 3216 from the pump control node unit 3113. This target flow setting is generated by the pump control node unit and incorporates a value that is equal to the maximum flow level (MaxFL) less the target flow the pump control node unit receives from the one or more downstream group node units that have a shared node with the pump in a node unit grouping. Multiple values of MaxFL are generally set by, and available from, the design engineer of the fluid distribution system. Each of the multiple values will relate to the operational state of and capacity of the pump variable speed drive or any secondary pump variable speed drives, the pump or any secondary pumps, any boiler, or any chiller (or any such capacity component) is changed. MaxFL is changed to a new value (i.e., one of the multiple set values) wherever the operational state, ON or OFF, of a capacity component is changed. Thus the capacity of the system can be staged to match the target demand flow the pump control node unit receives from the one or more downstream group node units that are directly downstream of the pump, or that have a shared node with the pump in a node unit grouping.

In the same system wherein the primary distribution section is a constant flow section, then the load node unit 3117 receives target flow information 3216 from the pump control node unit 3113. This target flow setting is generated by the pump control node unit and it incorporates a value that is equal to the maximum flow level (MaxFL) less the sum total of the target demand flow the pump control node unit receives from the one or more downstream node units that are directly downstream of the pump, or that have a shared node with the pump in a node unit grouping.

Each primary distribution section of the system has a fixed, constant specified target flow for the section within the range of multiple set values of MaxFL. Operating at any one of the multiple set values of MaxFL provides operation as a constant flow distribution system. However, over the full range of MaxFL there may be a significant variation in flow. A skilled reader will recognize such a system as a variable flow distribution system which may operate from the lowest MaxFL value to the highest MaxFL value. Operation at any one of the MaxFL set values may be regarded as a stage in a variable flow system.

As an example of a staged operation, an embodiment may include three boilers, each with a different flow capacity requirement, and installed to operate in parallel. Each one may operate independently, as an independent stage, considered as three stages, and/or any two boilers may operate together, as an independent set, considered as three more stages, and/or all three boilers may operate together, as an independent set, considered as one more stage. The result is that there are a total of nine possible stages, each with constant flow requirements. The same may also be applied to chillers and pumps in the HVAC industry that may be incorporated in the system of an embodiment of the present invention.

Target flow information 3216 represents the bypass flow required to accommodate the constant flow requirement of the primary section operating as a MaxFL set value or stage. As the sum total of the target demand flow the pump control node unit receives approaches the current value of MaxFL, the value of the target flow setting approaches a zero value. If the value of the target flow information 3216 is determined as negative or zero the value of the target flow information 3216 is set to zero.

Load node unit 3117 operates in each stage of an applied pump variable speed drive and any secondary pump variable speed drives, the pump and any secondary pumps, a boiler, and one or more chillers to provide a variable target demand flow 3218 which, when added to the variable target demand flow 3215 (from the node unit that has a shared node with the pump) will be equal to the specified target flow for the stage MaxFL value.

The pump and any secondary pumps are selected to meet flow and pressure needs of the fluid distribution system. A preferred embodiment of the fluid distribution system of the present invention, will be configured to incorporate an additional allowance for the variance between design of the system and practical operation of the system. The application of a pump variable speed drive to a pump, or a secondary pump variable speed drive to a secondary pump, permits on site removal of a percentage of this allowance (for example, in some instances a percentage that is 5% to 10%) after matching the pump performance to the actual distribution system load. This speed reduction also provides a significant reduction in pump energy consumption. At each stage, the pump speed may be set at a fixed constant specified value by the pump control node unit, permitting possible use of fewer larger pumps than number of stages of boilers and chillers.

It is for this rationale that a pump variable speed drive is attached to the pump. The pump may be combined with the pump variable speed drive as a single elements, or one or more pumps and associated pump variable speed drives may be incorporated in embodiments of the present invention. The same variations in configuration are possible for the any secondary pump and secondary pump variable speed drives incorporated in any secondary distribution section(s) in the system.

The operation of the fluid distribution system of the present invention to provide the target flow setting to the pump control node unit, at each stage, with the accurate input of additional flow by a load node unit that has a shared node with the pump is significant to the stable operation at each constant flow stage of a primary distribution section.

A totally variable flow primary distribution section will permit precise adjustment of the speed of the pump by the pump control node unit at all stages of operation. However, these changes to the speed of the pump are limited to the defined multiple set values of MaxFL within each possible stage of pumping and or boiler or chiller application.

In both constant and variable flow cases the downstream load node unit that has a shared node with the pump, or a load node unit that is directly downstream of the pump, transmits a change report to the pump control node unit. This change report is processed by the pump control node unit, and it also processes the change reports of node units that share a node with the upstream pump, as described herein.

Display & Man Machine Interface Units

One embodiment of the present invention may incorporate one or more display units. The one or more display units may be located in the proximity of the distribution system, or remotely, at a distance from the distribution system. The display unit may have a wired or wireless connection with one or more elements of the distribution system. Information may be transferred to the display unit from the one or more elements of the distribution system. The information that is transferred to the display unit may be displayed to a user of the display unit. The user may thereby obtain information relating to the distribution system.

In an embodiment of the present invention, information may also be transferred from the display unit to one or more elements of the distribution system. In such an embodiment the display unit may have an input means connected thereto. For example, such as a keyboard, touch screen, or other input element. The user may utilize the input element to input information that will be transferred from the display unit to the distribution system. In some embodiments of the present invention, such input information may be processed to effect the function of the distribution system.

In an embodiment of the present invention, the display unit may either incorporate a processor, or be connected (through a wired connection or a wireless connection) to a processor. The processor may be operable to process information the display unit receives from one or more elements of the distribution system. For example, the display unit may process the information to: produce a particular report format whereby the information is displayed to a user; or generate new information to be displayed to the user by combining the information received from the distribution system with other information that is obtained or stored by the processor and/or the display unit.

Figure 38:
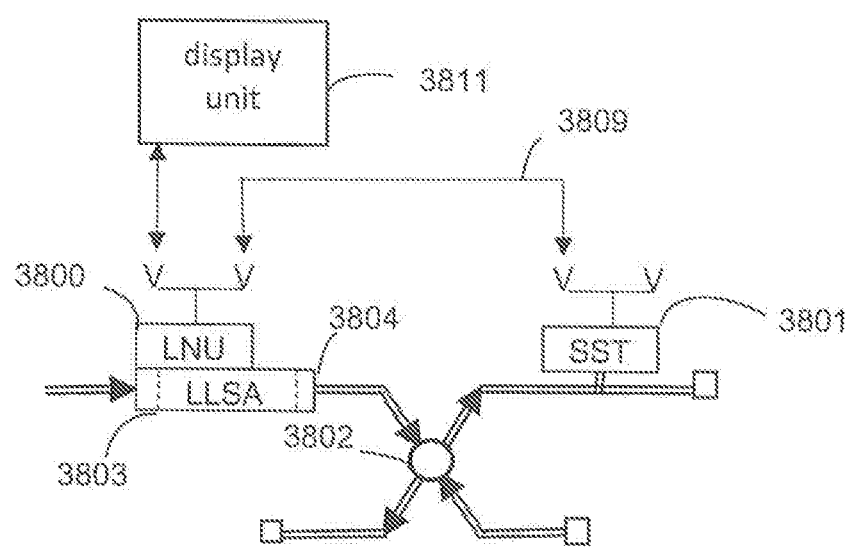
FIG. 38 is a systems drawing showing a distribution system incorporating a display unit, in accordance with an embodiment of the present invention.

As an example, as shown in FIG. 38, a display unit 3811 may have a connection to an element of the distribution system that is a load node unit 3800 of the primary distribution section of the distribution system. The load node unit 3811 may be attached to a LLSA 3803. Fluid may flow from the LLSA through a line 3804 into a junction node 3802 and into a secondary distribution section that incorporates a SST 3801. Information may be transferred from the SST via an ECN connection 3809 to the load node unit 3800. The information transferred from the load node unit 3800 to the display unit 3811 may incorporate information the load node unit receives from the secondary distribution section, such as from the SST 3801. Information may also be transferred from display unit 3811 to the load node unit 3800 and such information may be utilized by the distribution system.

In other embodiments of the present invention, one or more man machine interface units (MMIs) may be permanently connected (through a wired connection or a wireless connection) to a single node unit in the distribution system, or one or more local MMIs may be connected via a local wireless or wired connection to a single node unit and associated LLSA in the distribution system. A MMI may be remotely positioned from the node unit and associated LLSA to which the MMI is connected. The single node unit may be further connected to one or more other node units within a primary distribution section and/or a secondary distribution section of the distribution section. In any configuration, all MMI units may provide the same functional facility, namely to secure and change information within all connected node units.

As an example, a MMI 4300 unit may be remotely connected to one node unit of the distribution system, such as a load node unit 3104, via the Internet 4308, through a wired or wireless connection 4301. The load node unit may be connected through a connection 4302 to a group node unit 3103. The group node unit 3103 may be connected through a connection 4303 to one or more other node units. At least one of the node units that is connected to another node unit through a connection 4304 may be a load control node unit 3108. The load control node unit 3108 may be connected to a secondary pump control node unit 3502, incorporated in a secondary distribution section, through a connection 4305. The secondary pump control node unit may be connected to a MMI 4307 through a connection 4306. The MMI 4307 may be incorporated within the secondary distribution section that secondary pump control node unit 3108 is incorporated within, or remotely from the secondary distribution section.

Information is passed between node units and to and from one or more MMI units through the connections between the node units and the one or more MMI units. In some embodiments there is a connection format least one node unit of the distribution system to the Internet and at least one MMI unit is connected to the Internet and receives the information sent from the at least one node unit to the Internet from the Internet. For example, information may be passed to and from the load node unit and the Internet. Information may also be passed to and from the Internet and an MMI unit.

Information may be passed to and from connected node units within the primary distribution section and/or the secondary distribution section, and to and from the one or more MMI(s). The MMI may incorporate a means whereby a user can input information, such as a keyboard, a touch screen or another input element. The MMI may further incorporate a display element, where by a user can view information displayed by the MMI. The MMI may also incorporate a processor operable to process the information that the MMI receives, whether in isolation, or in combination with other information obtained or stored by the MMI.

As a further example, when local connections (whether wireless or wired connections) are established by one or more MMIs then the same functional accessibility to information available in node units may be provided concurrently. In a system that incorporates multiple MMI units a variety of types of connections to the MMI units may be incorporated in the system.

Further in other embodiments of the present invention, each or all node units may be connected to a dedicated MMI unit such that each MMI unit (whether local or remote from the node units) may be concurrently operable in the same ECN.

MMI units may operate on the same ECN as is used to transmit and receive change reports generated by node units, as discussed herein, or may operation through a separate connection.

One or more MMI units may be remotely located from the distribution system. The MMI unit may be any electronic device such as a laptop, computer, smart phone, tablet or other electronic device.

A MMI unit may be operable to transmit and receive information relating to both the primary distribution section and any secondary distribution section. A MMI unit may transmit and receive information in a variety of formats, including as reports that show processed information from the system, unprocessed information, or other formats.

Information relating to individual node units and associated LLSAs may be reported. As an example, information relating to the secondary pump control node unit may be reported and information relating to a load control node unit of the primary distribution section may be transmitted and received by the MMI. Information relating to the operation scale and/or the operation locus of one or more node units, information relating to the operation locus range, or any other information generated by the system may be received and processed by any of the MMI units in the system.

A MMI may incorporate a display or be connected (through a wired or wireless connection) to a display, for example, such as a display that is remotely located from the system. The display unit may further be the display of any device, such as a laptop, computer, smart phone, tablet, or other device. Secondary distribution section information 3809 (being information from node units and associated LLSA in any secondary distribution system) may be transferred to the load node unit or load control node unit that is directly upstream of the junction node. Therefore, in an embodiment of the present invention, the MMI may be operable to display information relating to both the primary distribution section and any secondary distribution sections. Information relating to one or more individual node units and associated LLSAs may be shown, information relating to the pump may be shown, information relating to pressure at one or more nodes or junction nodes may be shown, information relating to the operation scale and/or the operation locus of one or more node units, information relating to the operation locus range, or any other information generated by the system may be shown on the display.

Boilers and Chillers

Thermal energy is provided in an HVAC system by chillers and boilers. The drawings provided herewith do not show any chillers or boilers. However, a skilled reader will recognize that should the fluid distribution system of the present invention operate as a HVAC system, boilers and chillers will be utilized by the system and such use may produce additional pressure drops in the lines of the primary distribution section of the fluid distribution system. To address such pressure drops the absolute level of pump pressure can be increased. However, since this invention does not function so as to require that any absolute pressure level be defined and utilized, the pressure drops created by the boilers and chillers are not specifically discussed herein. This is also true of any pressure drop in an elbow section of the lines, any isolation valves, or any other elements of the system wherein such pressure drops may occur. The function of the present invention to operate within the operation locus of each node unit, and within the operation locus range identified for the system generally (and for groups of node units within the system) generally, will cause the system to correct any such pressure drops without having to explicitly react to individual pressure drops by identifying any absolute pressure level to do so.

Other Functionalities

Embodiments of the present invention may have additional functionalities, which represent benefits of embodiments of the present invention over the prior art, including the following:

a. automatic control and adjustment of node pressure at all nodes within the fluid distribution system to establish and maintain the lowest possible pump (fan), head pressure.

b. control of pressure throughout the system without measurement of absolute pressure, or measurement of differential pressure.

c. automatic control and adjustment of node pressure at all nodes within the fluid distribution system, based upon a precise measurement of the status of each node unit directly downstream form such node (in a node unit grouping).

d. use of independent control actions of the loop control process to either increase or decrease the node pressure by adjustment of the speed of the related pump (fan).

e. lowest possible energy use by the system pump(s) (fans) are achieves because the lowest required setting of head pressure is being changed at specific time intervals.

f. integration of the functionality of the control valve with the balancing valve provides an economy and significantly greater controllability.

g. provides a process to balance constant volume systems and variable volume system as well as an integrated mix of both constant and variable volume systems.

h. provides a process of seamlessly transferring the balancing demands of a secondary distribution system to a primary distribution system.

i. provides reporting on conditions existing within a distribution system which are beyond the limits of adjustability or which have been generated by a failure in the distribution system.

j. removes the engineering labour costs to define an index setting for balancing valves which filed technicians then use when manually adjusting the system balance. This also removes the technician labour costs.

k. loop control generates nonlinear responses to differential control error (using nonlinear gain functions).

l. loop control incorporates self-tuning, to correct both large swing instability and deadband cycling.

m. loop control operations occur at a specific time interval, providing opportunity to measure the reaction to prior actions taken by loop control, before generation of new responses.

n. loop control separates the process to generate in increase reaction from those used to generate a decrease reaction, permitting opportunity to better match dynamics of the adjusted equipment.

o. when adjusting the pump (fan) head pressure, a decrease response of loop control is determined by a position of a node unit valve, whereas, an increase response of loop control is determined by a flow error at a node unit. Loop control operations with 2 separate feedback variables. (PID of the prior art systems is not structured to be able to achieve the same outcome as the present invention.)

p. loop control uses the actuator (motor) timing data, both time to open and the time to close, to fine tune its control responses.

q. loop control generates incremental increase and incremental decrease responses to change the valve position removing the need, and cost, to equip the valve motor with a converter to accept a 0 to 100% open analog signal.

r. loop control incorporates self-tuning, which minimizes commission labour during initial system setup and again during operation in conditions not available during the initial commissioning of the fluid distribution system.

It will be appreciated by those skilled in the art that other variations of the embodiments described herein may also be practiced without departing from the scope of the invention. Other modifications are therefore possible. For example, the method and apparatus of the present invention can be applied to systems relating to balancing pressure of a variety of gasses, fluids or other matter. The method and apparatus of the system can also be applied to a variety of environments whereby any gas, fluid or other matter is to travel through conduits in a manner that achieves balanced pressure, and is therefore not only applicable to a heating or cooling system within a building.

The invention claimed is:

1. A fluid distribution system comprising:

(a) a pump connected to a pump variable speed drive, and further connected to a conduit;

(b) one or more nodes incorporated in the conduit, each node being a conduit portion itself, each at a specific identified position in the conduit, wherein the conduit portion itself is devoid of a line pressure loss assembly that is positioned between any of the following: two node units; a node unit and the pump; or a node unit and a group node unit, and such position being at any point therebetween so designated including a point devoid of intersections of conduits, said group node unit being associated with a line pressure loss assembly (LLSA) that is operable to generate processed information that is flow target information and a change report that indicates any line pressure loss change required to achieve balance in the fluid distribution system, and further operable to receive from one or more node units flow target information and change reports and to process such flow target information and change reports with the flow target information and change report generated by the group node unit to generate net flow target information and a net change report that the group node unit transmits as flow target information and net change report to one of the one or more node units that is directly upstream of the group node unit;

(c) one or more node units incorporated in the conduit, each of the one or more node units being operable to receive information from other node units and from one or more external sources, and to process the received information to produce processed information for the purpose of determining if balanced flow in the conduit and line pressure loss at the one or more nodes is achieved and to generate adjustments to generate balanced flow and line pressure loss in the fluid distribution system;

(d) a return conduit wherein fluid flows directly to the pump; and said fluid distribution system being operable to maintain balance of flow in the conduit and line pressure loss at each of the one or more nodes after initiation of the fluid distribution system to achieve a high efficiency energy transfer within the fluid distribution system devoid of any of the following: specific absolute flow limit value settings for any pressure value; specific absolute pump speed settings for any exact pump speed; and any manual adjustment of any one or more valves of the one or more node units.

2. The fluid distribution system of claim 1, wherein the system adjustments generated by the one or more node units including the following:
   (a) alteration of the position of the one or more valves of the one or more node units to an open position, a closed position, or any position between open and closed; and
   (b) alteration of the speed of the pump.

3. The fluid distribution system of claim 1, wherein each of the one or more node units is the one or more group node units or one of the following types:
   (a) a pump control node unit that is operable to receive from one or more node units flow target information and change reports and to process such flow target information and change reports to generate: a pump speed signal to indicate if a change in pump speed is required and to transmit the pump speed signal to the pump speed variable drive that utilizes the pump speed signal to make any alteration to the pump speed in accordance with the pump speed signal; and flow target information and to transmit the flow target information to any load node unit that is directly downstream of the pump;
   (b) a load node unit associated with a line pressure loss assembly (LLSA) that is operable to receive flow information and to generate load node unit information relating to the load node unit, and to utilize the flow information and the load node unit information to generate processed information that is flow target information and a change report, and further operable to transmit the flow target information and change report to one of the one or more node units that is directly upstream of the load node unit; or
   (c) a load control node unit associated with a line pressure loss assembly (LLSA) that is operable to receive virtual target controlled variable setting information and controlled variable information, and to generate load control node unit information relating to the load control node unit, and to utilize the virtual target controlled variable setting information, the controlled variable information and the load control node unit information to generate processed information that is flow target information and a change report, and further operable to transmit the flow target information and change report to one of the one or more node units that is directly upstream of the load node unit.

4. The fluid distribution system of claim 1, wherein the one or more of the one or more node units are configured into one or more node unit groupings, and each one or more node unit groupings incorporate one of the one or more nodes that is directly upstream or direction downstream of each of the one or more node units in the node unit grouping.

5. The fluid distribution system of claim 1, wherein one of the one or more node units is directly downstream of the pump in the conduit.

6. The fluid distribution system of claim 1, operable to determine an operation locus for one or more of the one or more node units, and such node units being operable in accordance with the operation locus.

7. The fluid distribution system of claim 1, operable to determine an operation locus range for two or more of the one or more node units, and such node units being operable in accordance with the operation locus range.

8. The fluid distribution system of claim 4, wherein one or more node unit groupings are configured in one or more fluid distribution sections, and the fluid distribution system is configured to incorporate the one or more fluid distribution sections, each of said one or more fluid distribution sections being connected to the return conduit on a downstream end.

9. The fluid distribution system of claim 1, wherein one or more of the one or more node units has a thermal load connected downstream thereof and between such node unit and the return conduit.

10. The fluid distribution system of claim 9, wherein the thermal load is a secondary distribution section incorporating a junction node, at least one sensor, one or more node units that are one or more secondary node units, and a secondary pump connected to a secondary pump variable speed drive.

11. The fluid distribution system of claim 1, further comprising one or more of the following:
    (a) one or more display units; and
    (b) one or more man machine interface units.

12. A method for generating and maintaining balanced of fluid flow and line pressure loss in a fluid distribution system comprising the steps of:
    (a) operating the fluid distribution system configured to incorporate:
       (i) a pump connected to a pump variable speed drive, and further connected to a conduit;
       (ii) one or more nodes incorporated in the conduit, each node being a conduit portion itself, each at a specific identified position in the conduit, wherein the conduit portion itself is devoid of a line pressure loss assembly that is positioned between any of the following: two node units; a node unit and the pump; or a node unit and a group of node units, and such position being at any point therebetween so designated including a point devoid of intersections of conduits, said group node unit being associated with a line pressure loss assembly (LLSA) generating processed information that is flow target information and a change report that indicates any line pressure loss change required to achieve balance in the fluid distribution system, and further receiving from one or more node units flow target information and change reports and processing such flow target information and change reports with the flow target information and change report generated by the group node unit and thereby generating net flow target information and a net change report that the group node unit transmits as flow target information and net change report to one of the one or more node units that is directly upstream of the group node unit;
       (iii) one or more node units incorporated in the conduit;
       (iv) an electronic communications network (ECN) connecting each of the one or more node units to the one node unit that is directly upstream and to any one or more of the one or more node units that are directly downstream; and
       (v) a return conduit; and
    (b) each of the one or more node units: receiving information from other node units and from one or more external sources; processing the received information to produce processed information for the purpose of determining if balanced flow in the conduit and line pressure loss at the one or more nodes is achieved; generating system adjustments to create balanced flow and line pressure loss in the fluid distribution system; and transmitting the processed information to one of the one or more node units that is upstream or to the pump variable speed drive via the ECN; and (c) each of the one or more node units and the pump operating after initiation of the fluid distribution system to achieve a high efficiency energy transfer devoid of any of the following: specific absolute flow limit value settings for any pressure value; specific absolute pump speed settings for any exact pump speed; and any manual adjustment of any one or more valves of the one or more node units.

13. The method of claim 12, further incorporating the following steps:

(a) each of the one or more nodes units determining an operation locus and operating in accordance with the received processed information and the operation locus; and (b) one or more of the one or more node units determining an operation locus range and transmitting processed information that effects operation of the fluid distribution system in accordance with the operation locus range.

14. The method of claim 12, wherein each of the one or more node units is the one or more group node units or one of the following types and the fluid distribution system incorporates the following steps in relation to each of the types of node units:

(a) a pump control node unit receiving from one or more node units flow target information and change reports and further processing such flow target information and change reports to generate: a pump speed signal to indicate if a change in pump speed is required and transmitting the pump speed signal to the pump speed variable drive that utilizes the pump speed signal to make any alteration to the pump speed in accordance with the pump speed signal; and flow target information and transmitting the flow target information to any load node unit that is directly downstream of the pump;

(b) a load node unit associated with a line pressure loss assembly (LLSA) receiving flow information, generating load node unit information relating to the load node unit, and utilizing the flow information and load node unit information to generate processed information that is flow target information and a change report, and further transmitting the flow target information and change report to one of the one or more node units that is directly upstream of the load node unit; or (c) a load control node unit associated with a line pressure loss assembly (LLSA) receiving virtual target controlled variable setting information and controlled variable information, generating load control node unit information relating to the load control node unit, and utilizing the virtual target controlled variable setting information, the controlled variable information, and the load control node unit information to generate processed information that is flow target information and a change report, and further transmitting the flow target information and change report to one of the one or more node units that is directly upstream of the load node unit.

15. The method of claim 14, incorporating one or more of the further steps:

(a) one or more of the load node units receiving information from an external source that one or more of the following: a thermal load; and one or more external probes; and (b) one or more of the load control node units receiving information from an external source that is one or more of the following: a thermal load; and one or more external probes.

16. The method of claim 15, incorporating the steps of the fluid distribution system operating to achieve equal temperatures in any thermal load that is a secondary distribution section and any primary distribution section for the fluid distribution system, said secondary distribution section being downstream of a load node unit or a load control node unit in the primary distribution section, and the secondary distribution system incorporating a temperature sensor, and incorporating the following steps:

(a) the temperature sensor measuring the temperature of the fluid in the secondary distribution section;

(b) the node unit in the primary distribution section that is upstream of the secondary distribution section measuring the temperature of the fluid at said node unit; and (c) said node unit comparing the temperature of the fluid in the secondary distribution section to the temperature of the fluid in the primary distribution section, and operating to adjust the valves of such node unit and to transmit the temperature comparison to an upstream node unit for the purpose of achieving an equal temperature of the fluid in the primary distribution section and the secondary distribution section.

17. The method of claim 14, incorporating the step of the group node units generating the net flow target information and a net change report relating to one or more node units downstream of the group node unit, said one or more node units downstream of the group node unit all being directly downstream of the one of the one or more nodes that is directly downstream of the group node unit, the group node unit and such downstream one or more node units being configured in a node unit grouping.

18. The method of claim 12, incorporating the step of transferring information in any of the following:

(a) from one or more of the one or more node units to one or more display units; and (b) bi-directionally between one or more man machine interface units and one or more of the one or more node units, whereby the fluid distribution system is operable in accordance with the information received from the one or more man machine interface units.

19. The method of claim 12, incorporating the step of the one or more node units operating to balance the flow and line loss pressure in the fluid distribution system that is one of the following: a constant volume system; a variable flow system; and a combination of a constant volume system and a variable flow system.

20. The method of claim 14, incorporating the steps of the load node unit, the load control node unit, and the group node unit, each generating the change report to indicate a requirement for the line pressure to be increased, decreased, or have a null change at the one of the one or more nodes that is directly upstream thereof.

* * * * *